Oct. 4, 1966 B. A. HARRIS ETAL 3,277,443

DATA RECEIVER

Filed Jan. 30, 1963 66 Sheets-Sheet 1

INVENTORS
BEN A. HARRIS
JOHN D. FREY, JR.
BY John A. Harvey
ATTORNEY

Oct. 4, 1966 B. A. HARRIS ETAL 3,277,443

DATA RECEIVER

Filed Jan. 30, 1963 66 Sheets-Sheet 7

DATA RECEIVER

Filed Jan. 30, 1963

Oct. 4, 1966 B. A. HARRIS ETAL 3,277,443

DATA RECEIVER

Filed Jan. 30, 1963 66 Sheets-Sheet 14

Oct. 4, 1966 B. A. HARRIS ETAL 3,277,443

DATA RECEIVER

Filed Jan. 30, 1963 66 Sheets-Sheet 15

Oct. 4, 1966 B. A. HARRIS ETAL 3,277,443

DATA RECEIVER

Filed Jan. 30, 1963 66 Sheets-Sheet 18

Oct. 4, 1966 B. A. HARRIS ETAL 3,277,443

DATA RECEIVER

Filed Jan. 30, 1963 66 Sheets-Sheet 21

Oct. 4, 1966 B. A. HARRIS ETAL 3,277,443

DATA RECEIVER

Filed Jan. 30, 1963 66 Sheets-Sheet 24

Oct. 4, 1966 B. A. HARRIS ETAL 3,277,443

DATA RECEIVER

Filed Jan. 30, 1963 66 Sheets-Sheet 26

DATA RECEIVER

Oct. 4, 1966 B. A. HARRIS ETAL 3,277,443

DATA RECEIVER

Filed Jan. 30, 1963

66 Sheets-Sheet 29

Oct. 4, 1966 B. A. HARRIS ETAL 3,277,443

DATA RECEIVER

Filed Jan. 30, 1963 66 Sheets-Sheet 35

Oct. 4, 1966 B. A. HARRIS ETAL 3,277,443

DATA RECEIVER

Filed Jan. 30, 1963 66 Sheets-Sheet 40

DATA RECEIVER

Oct. 4, 1966 B. A. HARRIS ETAL 3,277,443

DATA RECEIVER

Filed Jan. 30, 1963 66 Sheets-Sheet 43

Oct. 4, 1966 B. A. HARRIS ETAL 3,277,443

DATA RECEIVER

Filed Jan. 30, 1963 66 Sheets-Sheet 47

Oct. 4, 1966 B. A. HARRIS ETAL 3,277,443

DATA RECEIVER

Filed Jan. 30, 1963 66 Sheets-Sheet 52

Oct. 4, 1966 B. A. HARRIS ETAL 3,277,443

DATA RECEIVER

Filed Jan. 30, 1963 66 Sheets-Sheet 53

| SS | 11 |
|---|---|
| → | ← |
| 15° | 28° |
| 50° | 63° |
| 85° | 98° |
| 121° | 133° |
| 156° | 169° |
| 191° | 204° |
| 226° | 239° |
| 261° | 274° |
| 297° | 310° |
| 332° | 345° |

Oct. 4, 1966 B. A. HARRIS ETAL 3,277,443

DATA RECEIVER

Filed Jan. 30, 1963 66 Sheets-Sheet 60

DATA RECEIVER

DATA RECEIVER

Filed Jan. 30, 1963

United States Patent Office 3,277,443

Patented Oct. 4, 1966

3,277,443

DATA RECEIVER

Ben A. Harris and John D. Frey, Jr., Rochester, N.Y., assignors, by mesne assignments, to Friden, Inc., San Leandro, Calif., a corporation of Delaware Filed Jan. 30, 1963, Ser. No. 254,903
17 Claims. (Cl. 340—146.1)

The present invention relates to data transmission systems and, particularly, to systems in which data is collected at a central location by random transmission from plural outlying data-originating locations.

Automatic data collection provides a powerful tool in the solution of many management problems. It enables management to be more fully informed on current transactions and thus to be more analytical and better able to perform the most effective management supervision and control. Automatic data collection provides an efficient means of recording the many kinds of business transactions that occur daily within a business organization. For example, transactions of diverse nature occurring at numerous and often widely separated regions in a large manufacturing organization may be mechanically registered at the point of origin by shop personnel, may then be transmitted quickly and with minimum delay to a central collection point where they are recorded in machine-sensible form, and may then be processed into useful up to the minute reports often prepared quickly yet accurately and with minimum personnel effort by use of modern electronic computer devices and systems. This rapid and accurate collection of the most current transaction data, and its rapid analyses and processing into useful report form, enables management personnel to be fully and currently informed at all times and permits the attainment of prompt decisions premised upon full knowledge of accurate data and in the light of facts as they occur.

The present invention relates to an improvement of a data receiver-recorder unit useful in the data collection system disclosed in the Edwin O. Blodgett United States Patent No. 3,025,498, which enables data to be rapidly and accurately collected automatically at a central location from data originating sources at widely scattered locations. The data receiver-recorder of the present invention preserves the concept of the Blodgett system but enables substantial expansion of the variety and scope of the types of data which may be collected and at the same time establishes certain safeguards against erroneous data transmission.

In this respect, each data originating source of the Blodgett sysetm may include various types of data originating equipments manually selected in various combinations and manually controlled and supplied with various types of data recording media. To permit this combinational equipment selection and manual manipulation by an untrained and relatively unskilled operator, provisions may be made for each selection of an equipment or any available combination of equipments to be automatically indicated by transmission of an initial information item. The latter provides a record of the length-of-message number of data information items which are to be transmitted by the selected data originating equipment or equipments. The data receiver of the invention receives this initial information item, automatically translates it directly to a storage means and thereafter isolates the storage means from further received data information items, upon receipt of an end-of-transmission signal from the data source automatically uses the stored information item to verify that the number of information items received is or is not that identified by the length-of-message stored item, and automatically records at the end of the received and recorded data information items at verification or lack thereof of length-of-message accuracy.

The present application is related to the concurrently filed and copending application of Ben A. Harris et al., Serial No. 254,896, entitled "Data Transmission System," which claims the overall system herein disclosed including at each data originating source the preliminary test control system operative automatically to verify, by certain preliminary tests performed on all operative data originating equipments of such source, that the source is ready for access to the common data transmission channel extending to the central data receiver-recorder. These preliminary tests not only enhance the system efficiency by avoiding waste of system operational time which would otherwise occur if an improperly conditioned data originating source were permitted to gain access to the common data transmission channel and thus deny access to a ready source, and the system efficiency is further enhanced by a system error control system which immediately disconnects an operative data source from the common transmission channel whenever certain transmission errors are detected at the central receiver-recorder. The present application is also related to the concurrently filed and copending application of Ben A. Harris, Serial No. 254,901, entitled "Data Transmission System," which claims the system features herein disclosed wherein each data-source transmission is preceded by an indication of the length of message or quantity of data items to be transmitted and this indication is received and used at the central location for comparison against a count of the quantity of data items actually received during a transmission to detect any prevailing quantity-transmission error. The present application is additionally related to the concurrently filed and copending application of John V. Neel, Serial No. 254,895, entitled "Data Transmitter," which claims a data transmitter structure used in the system herein disclosed and by which a unit-record medium manually inserted into reading position in a data reader is retained in reading position while all data recorded therein is automatically read and stored, after which the record medium is released from reading position and demand is automatically made for access to a data transmission channel for automatic transmission of the stored data together with data from a source identifying the particular transmitter. The present application is further related to the concurrently filed and copending application of Ben A. Harris et al., Serial No. 254,894, entitled "Data Transmission System," which claims those aspects of the system herein disclosed wherein time transmissions are automatically recorded at the end of each data transmission, and an attendance mode of system operation when manually or periodically time selected inhibits data transmission from all data readers except personnel identification badge readers at each of the several transmitter localities. All of the several foregoing related copending applications are assigned to the same assignee as the present application.

It is an object of the present invention to provide a new and improved data receiver particularly suitable for use in a data collection system wherein a relatively untrained and unskilled operator is able manually to select and manually to operate for data transmissions a data originating equipment or various combinations of available data originating equipments, and is one which during data transmission detects transmission errors to halt further data reception and upon completion of data transmissions provides automatic verification that the length of message received and recorded is or is not that which corresponds with the equipment or equipments selected and properly manually operated.

It is a further object of the invention to provide a data receiver which receives and records successive transmissions of data each preceded by length-of-message information item and which upon detecting a transmission error records the fact thereof and halts further recording of the data of such erroneous transmission or upon completion of each transmission automatically uses the length-of-message information item to verify and record, in association with the received and recorded data, information that the quantity of data received during a transmission does or does not correspond with the length-of-message information item and thus does or does not reflect a length-of-message error.

It is an object of the present invention to provide a new and improved data transmission and collection system and components therefor, and one adapted to collect rapidly and with extreme accuracy various types of data manually supplied by personnel having little or no training or aptitude for clerical functions or procedures.

It is a further object of the invention to provide a novel data transmission and collection system and components therefor wherein all data is supplied to the system manually and by untrained personnel yet one having such inherent safety checks and controls as effectively to eliminate all significant operator error.

It is an additional object of the invention to provide an improved data transmission and collection system and components therefor having unusual versatility and flexibility in system format and application, and one which accordingly is suitable for use in numerous types of business enterprise requiring different and often diverse system configurations for optimum effectiveness in collection of data.

It is yet a further object of the invention to provide a data transmission and collection system and components therefor which permits various character of data to originate from time to time at any given data source yet to be readily supplied for collection at a central location with dispatch, there being immediate local control over such required changes of system operation as to maintain system compatibility for the prevailing character or change of character of the originating data at the particular locality.

Other objects and advantages of the invention will appear as the detailed description thereof proceeds in the light of the drawings forming a part of this application and in which.

Figure 1:
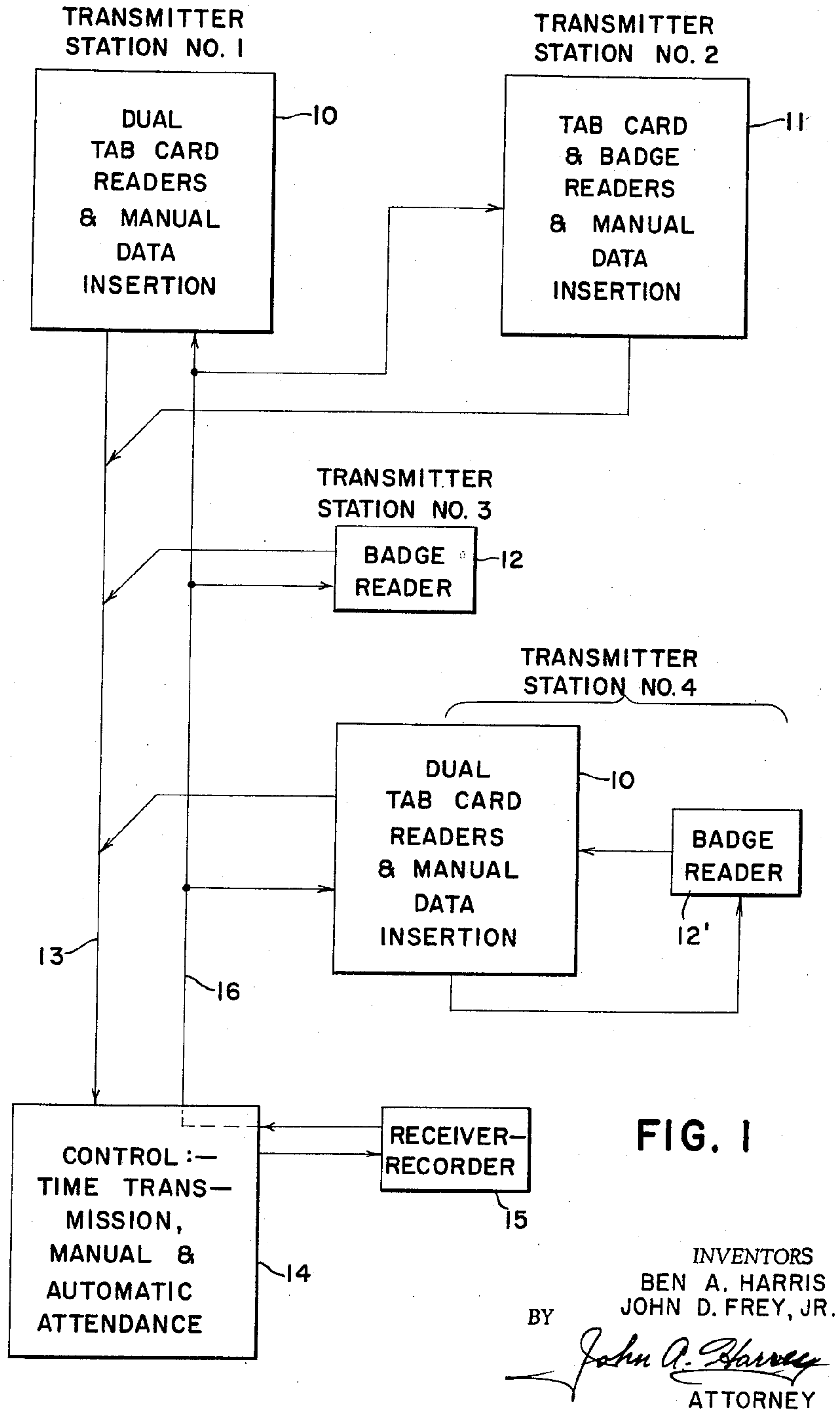
FIG. 1 represents schematically in block diagram form a complete data collection system embodying the present invention.
Figure 4:
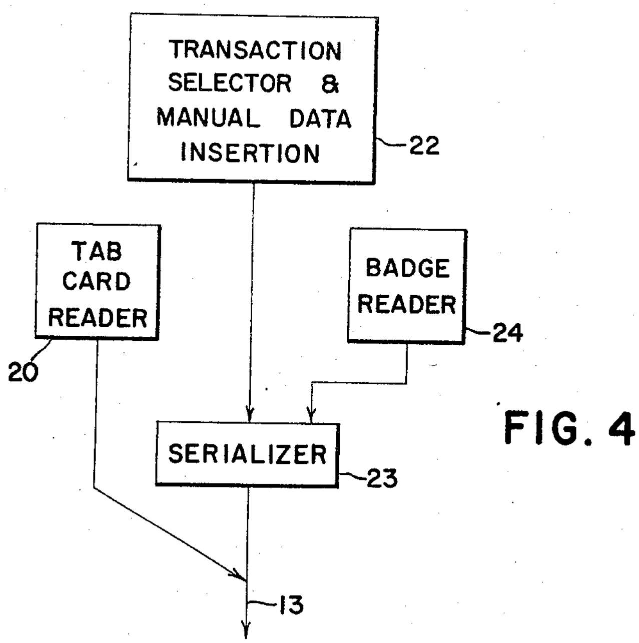
Figure 5:
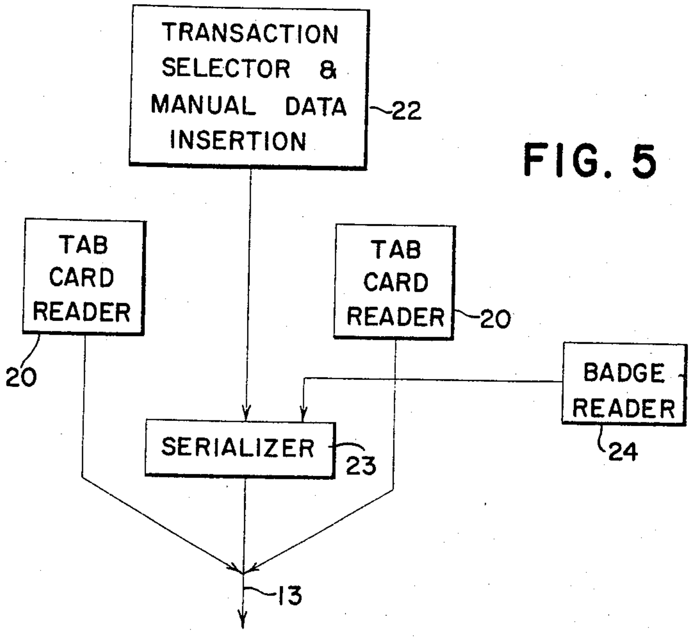
Figure 6:
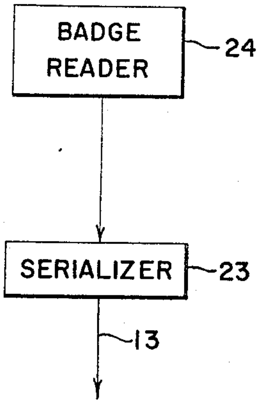
Figure 7I:
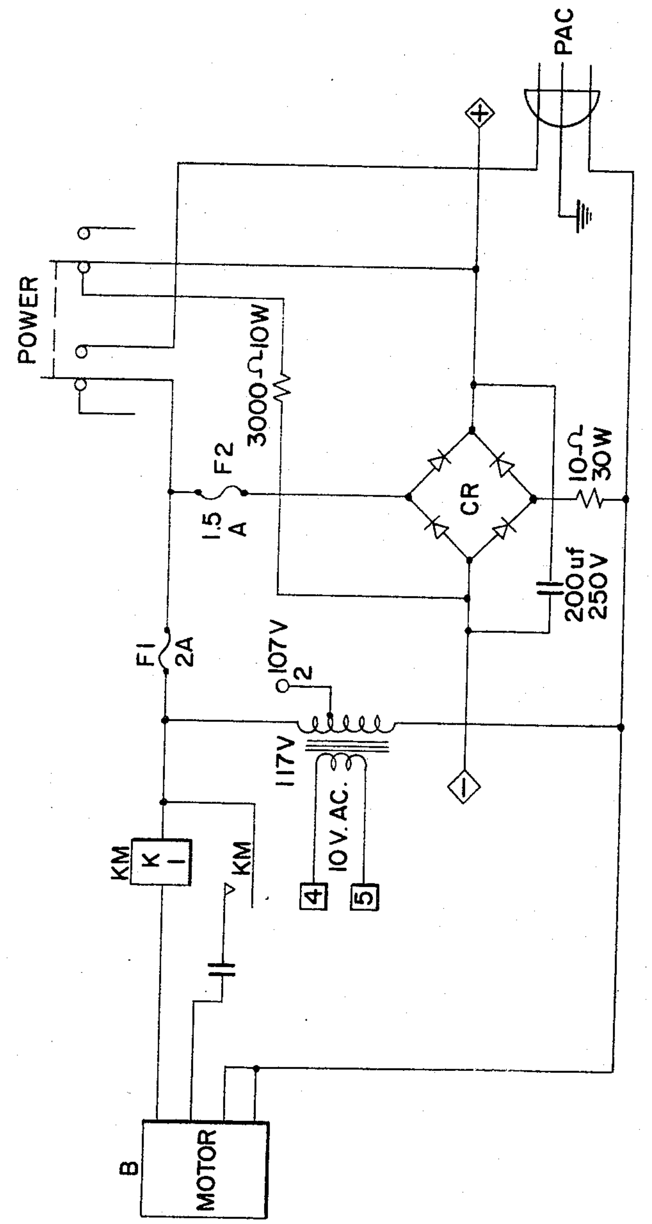
Figure 7:
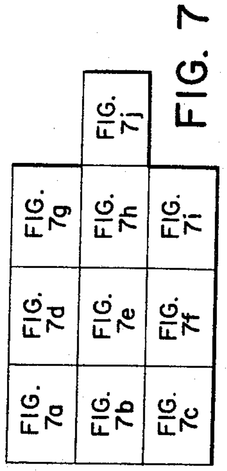
Figure 7A:
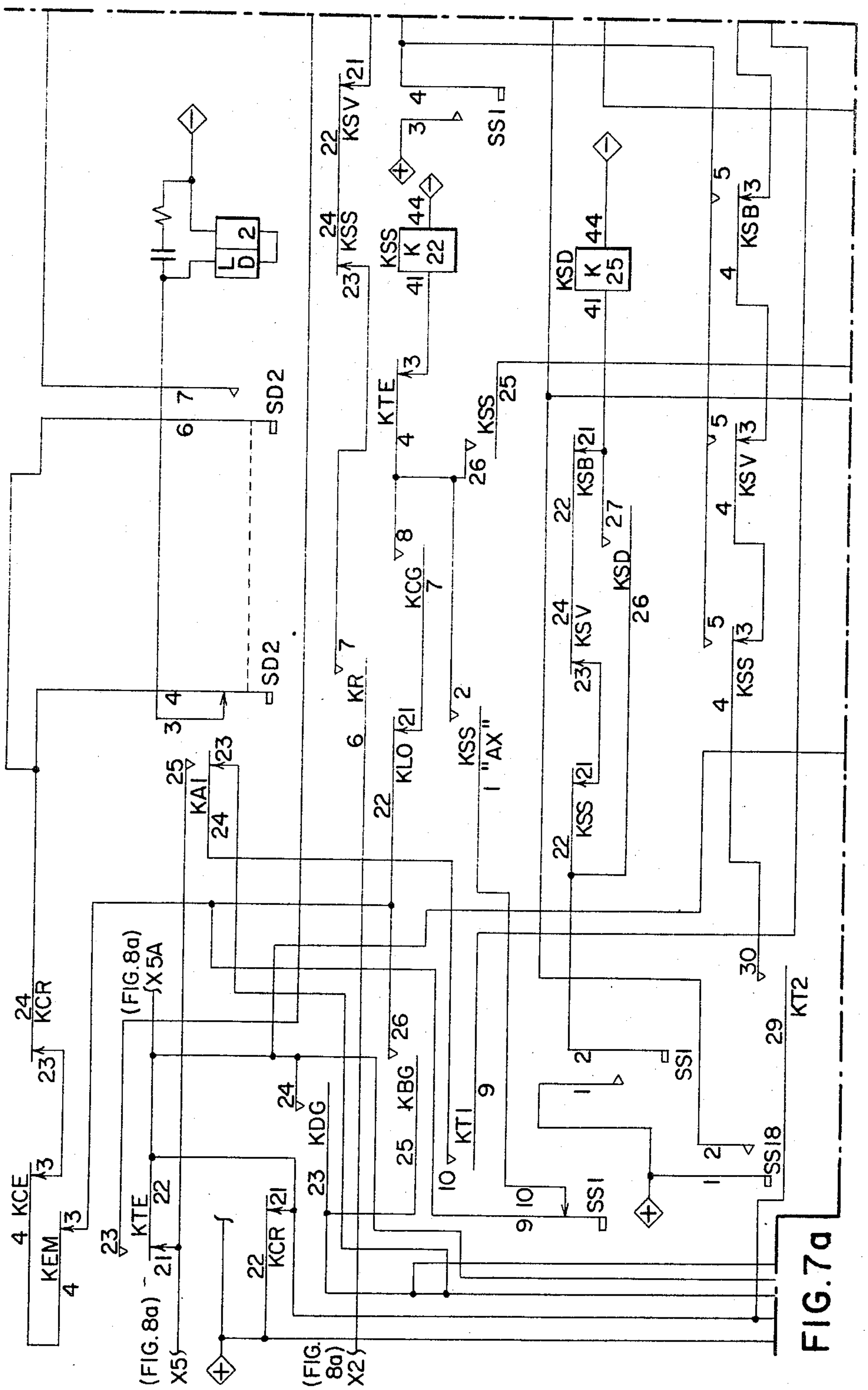
Figure 7B:
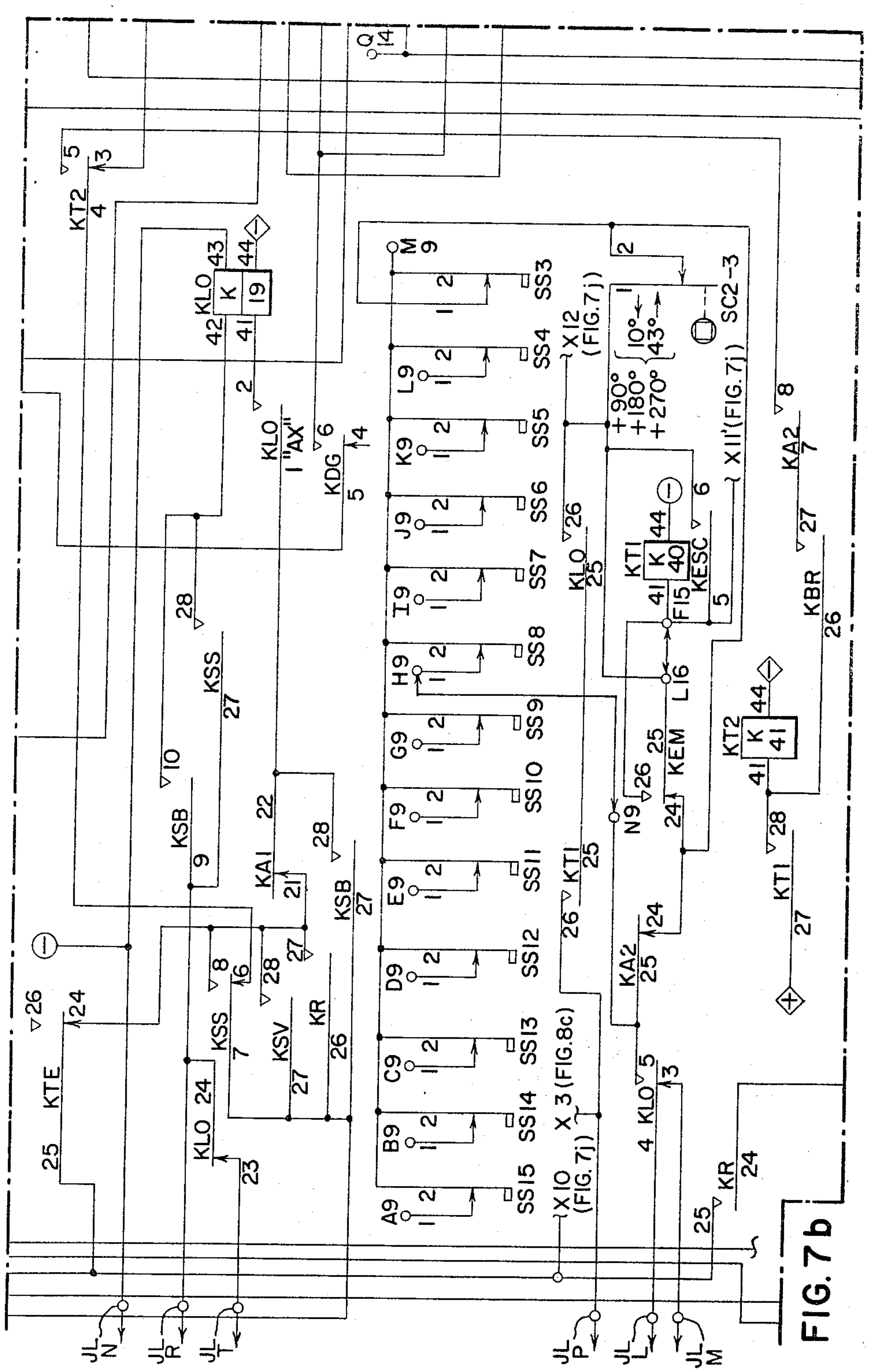
Figure 7C:
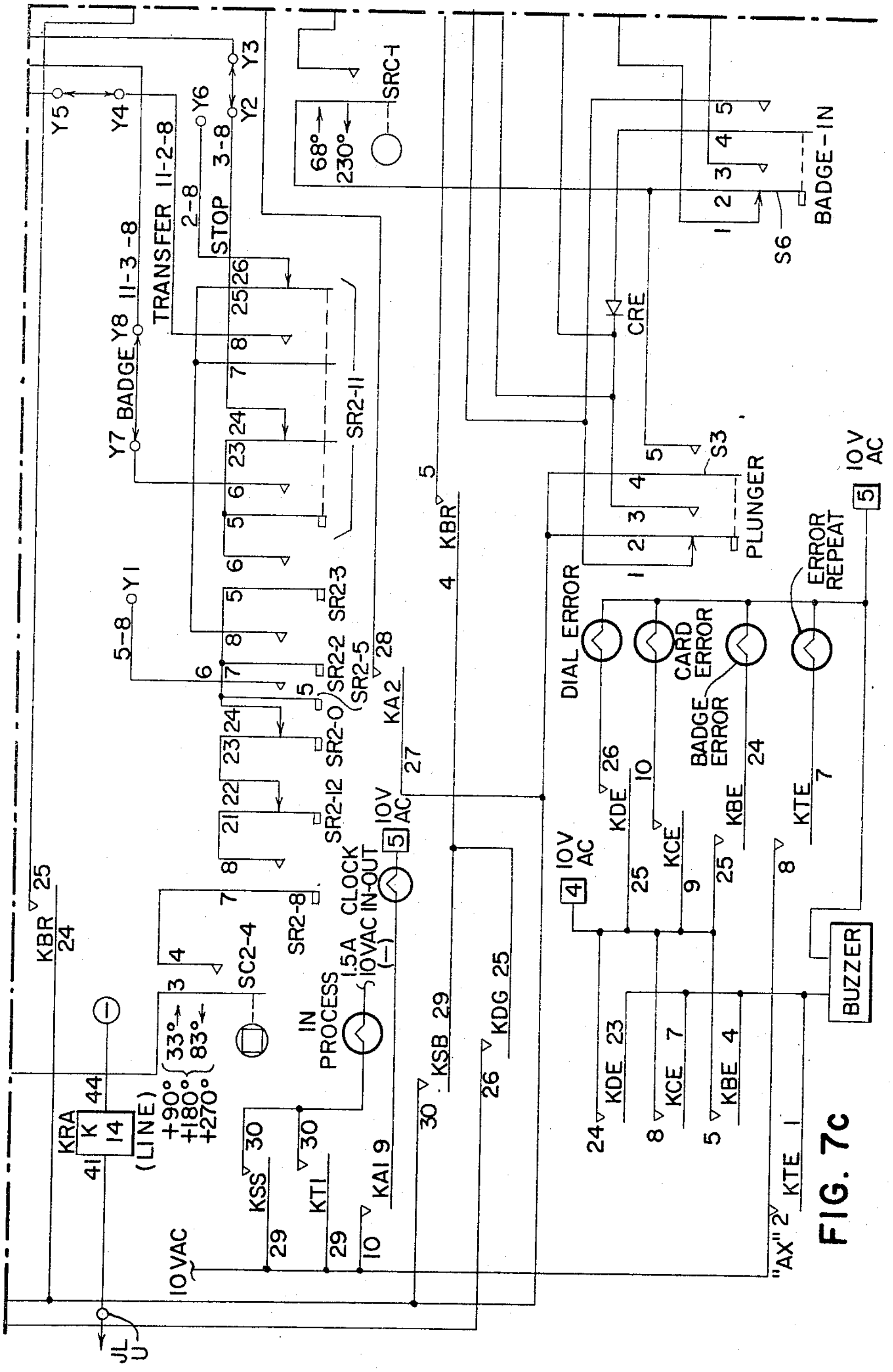
Figure 7D:
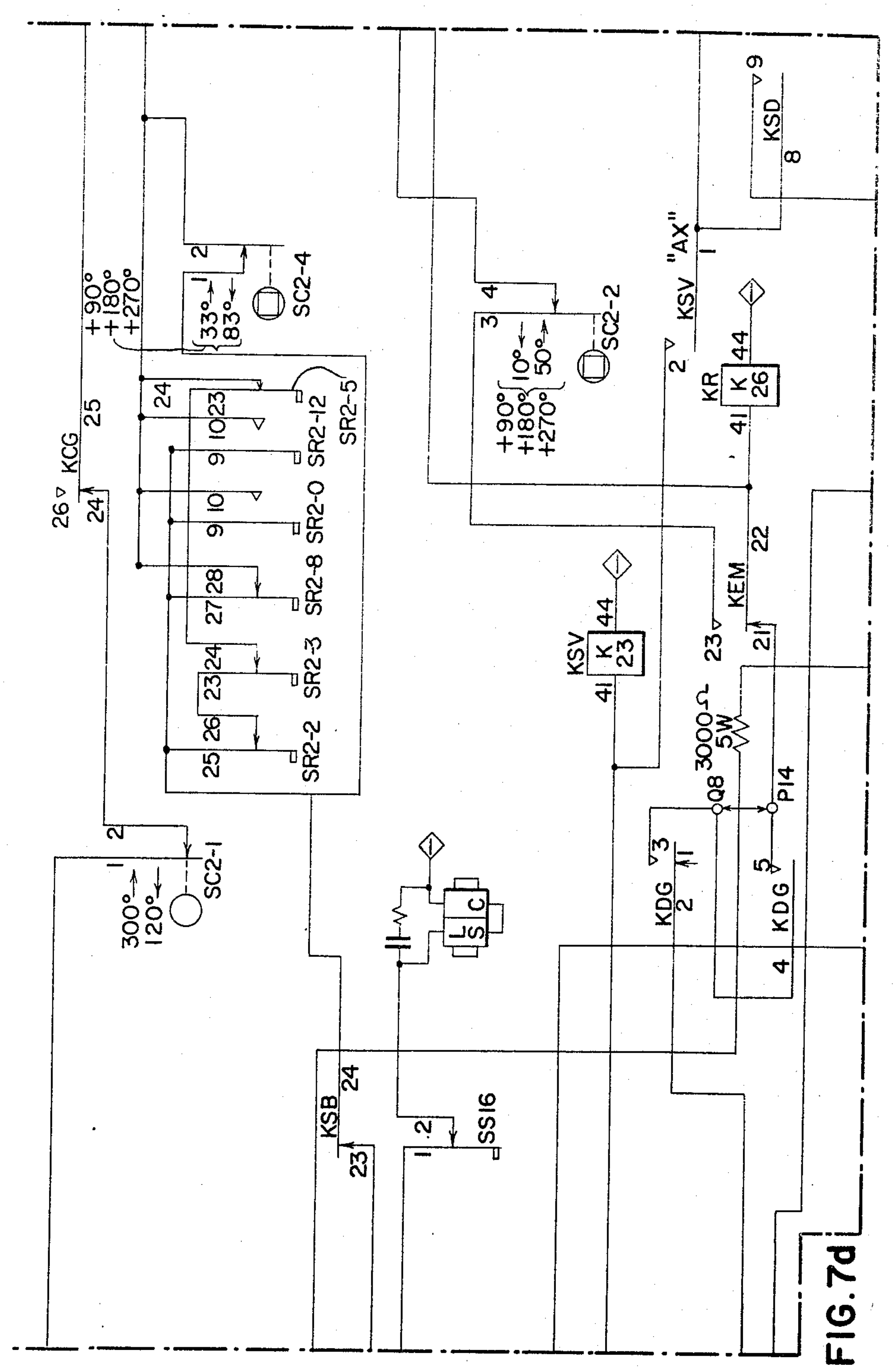
Figure 7E:
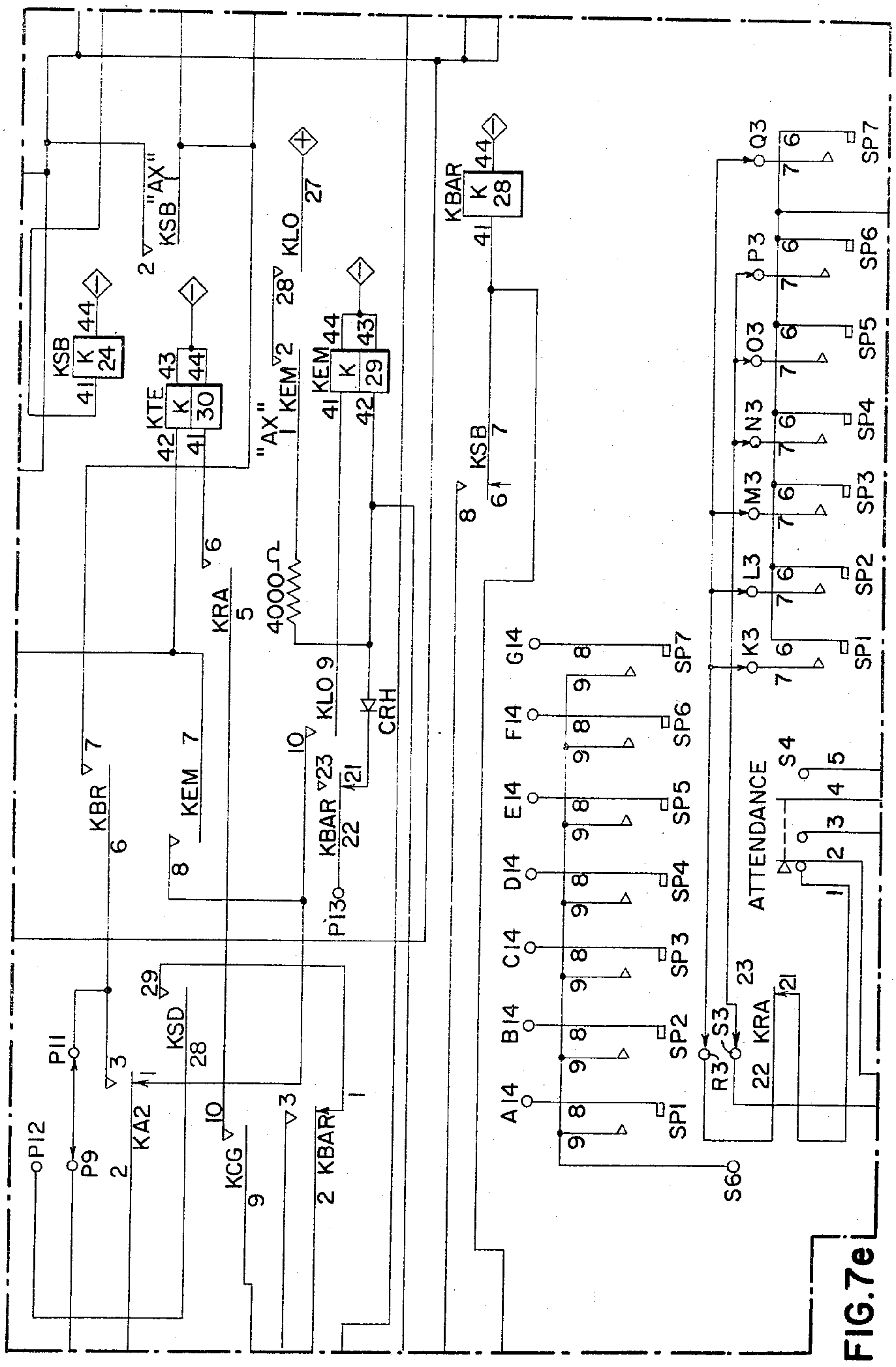
Figure 7F:
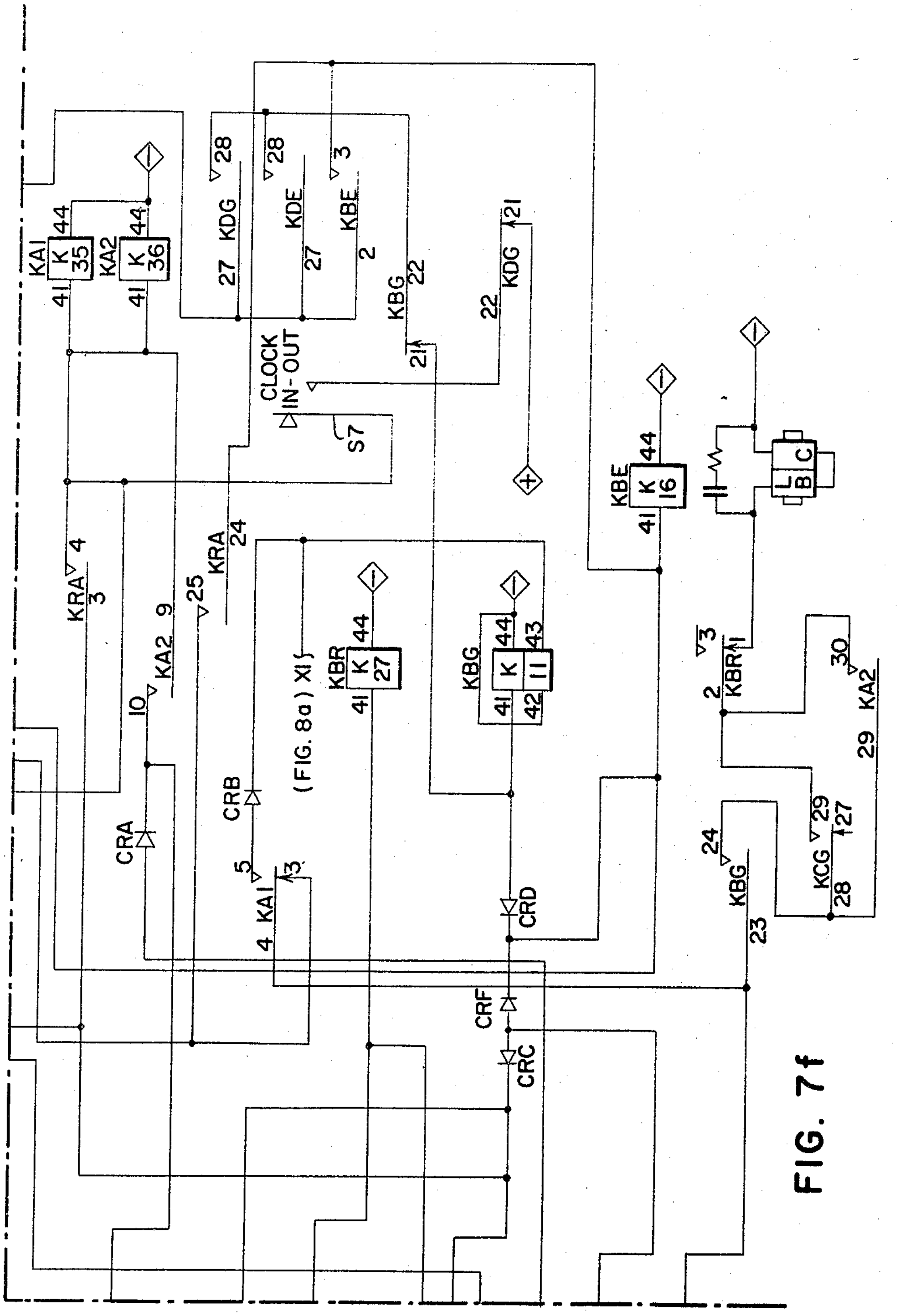
Figure 7G:
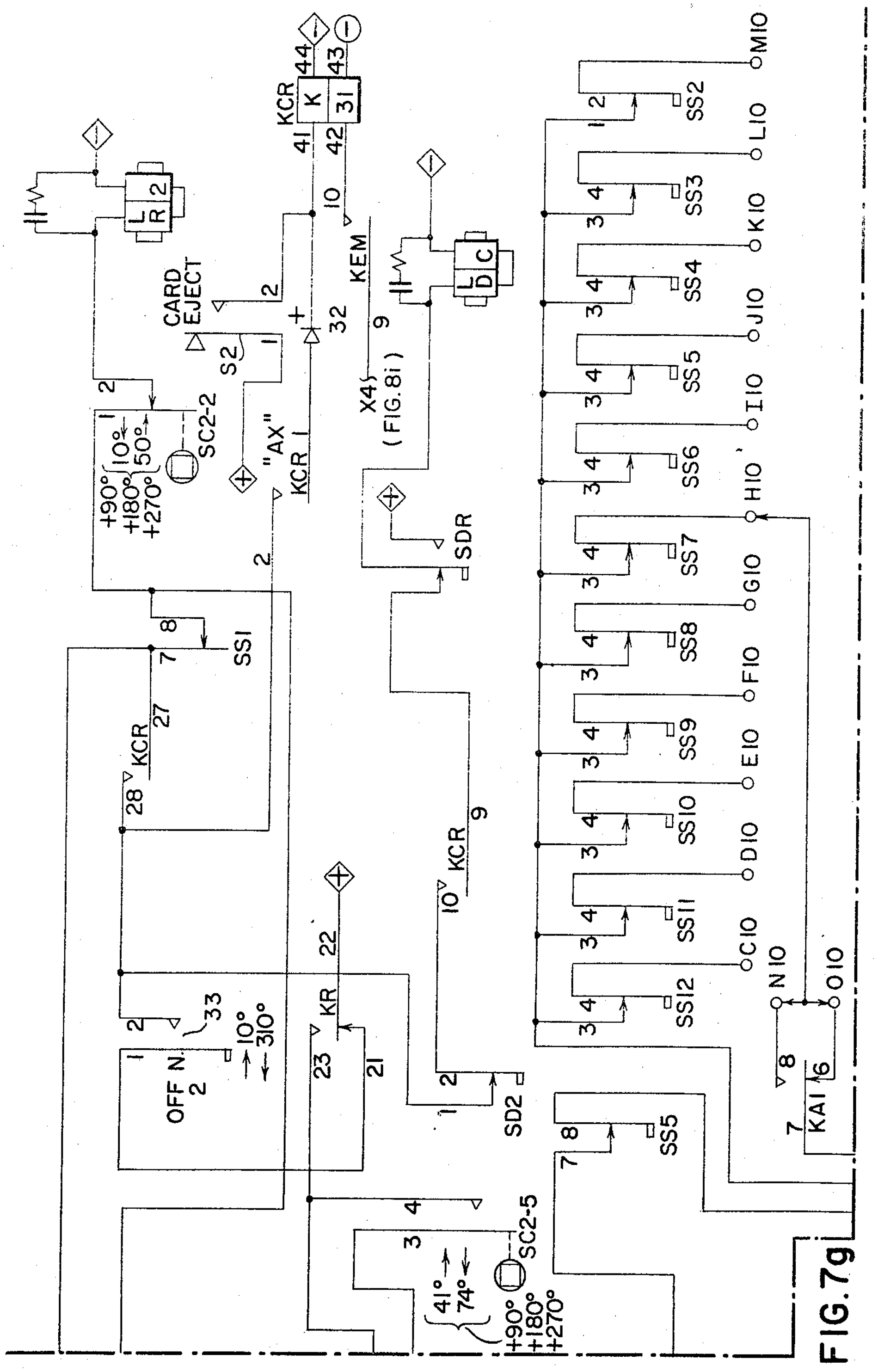
Figure 7H:
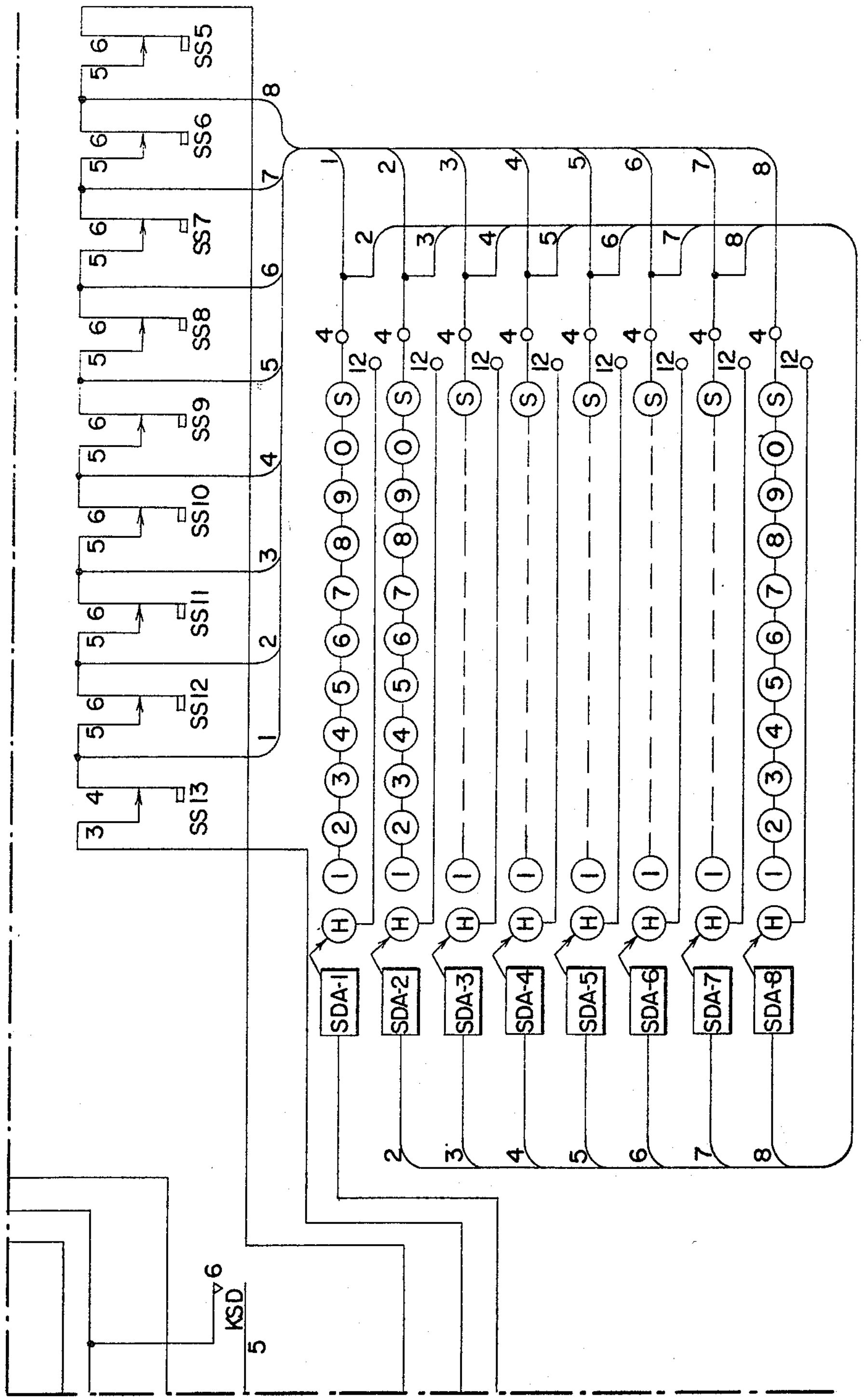
Figure 7J:
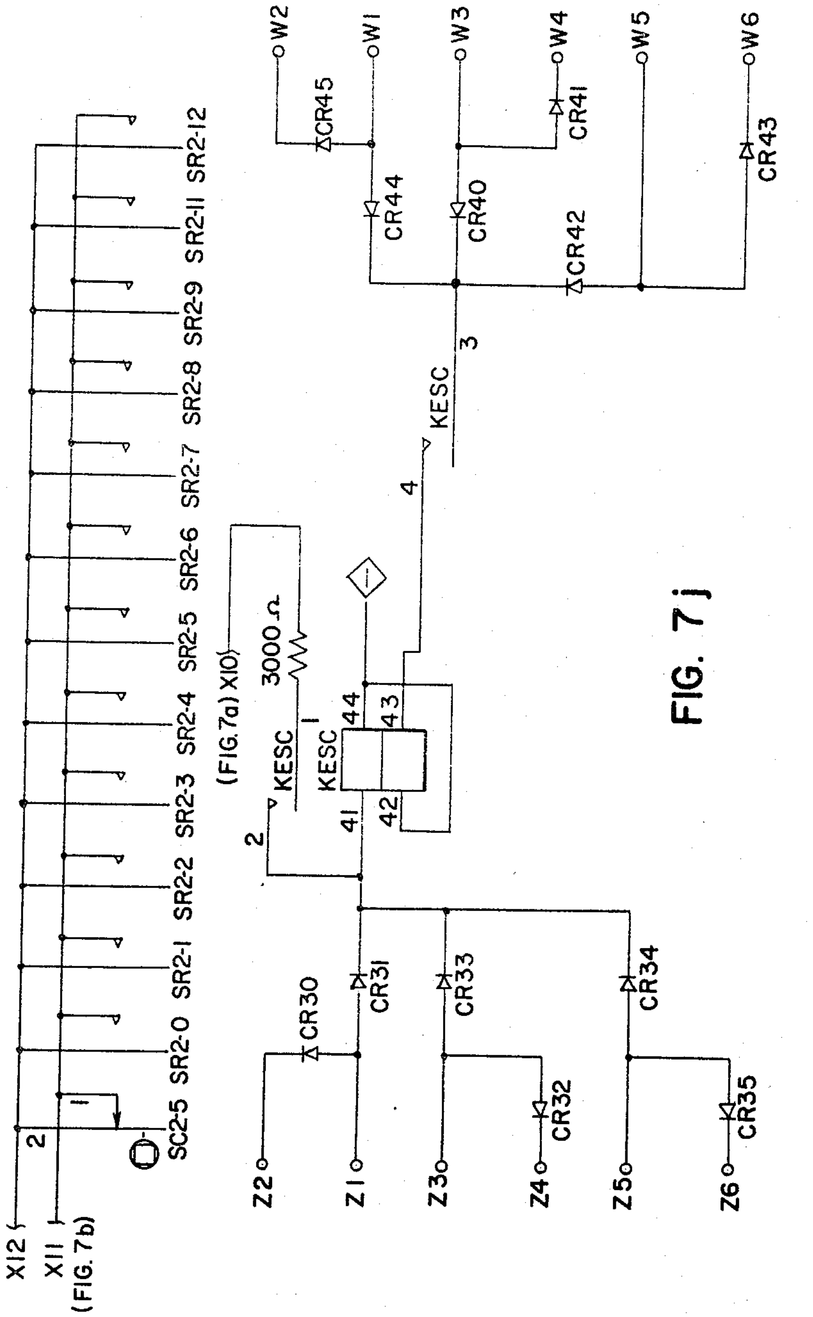
Figure 8A:
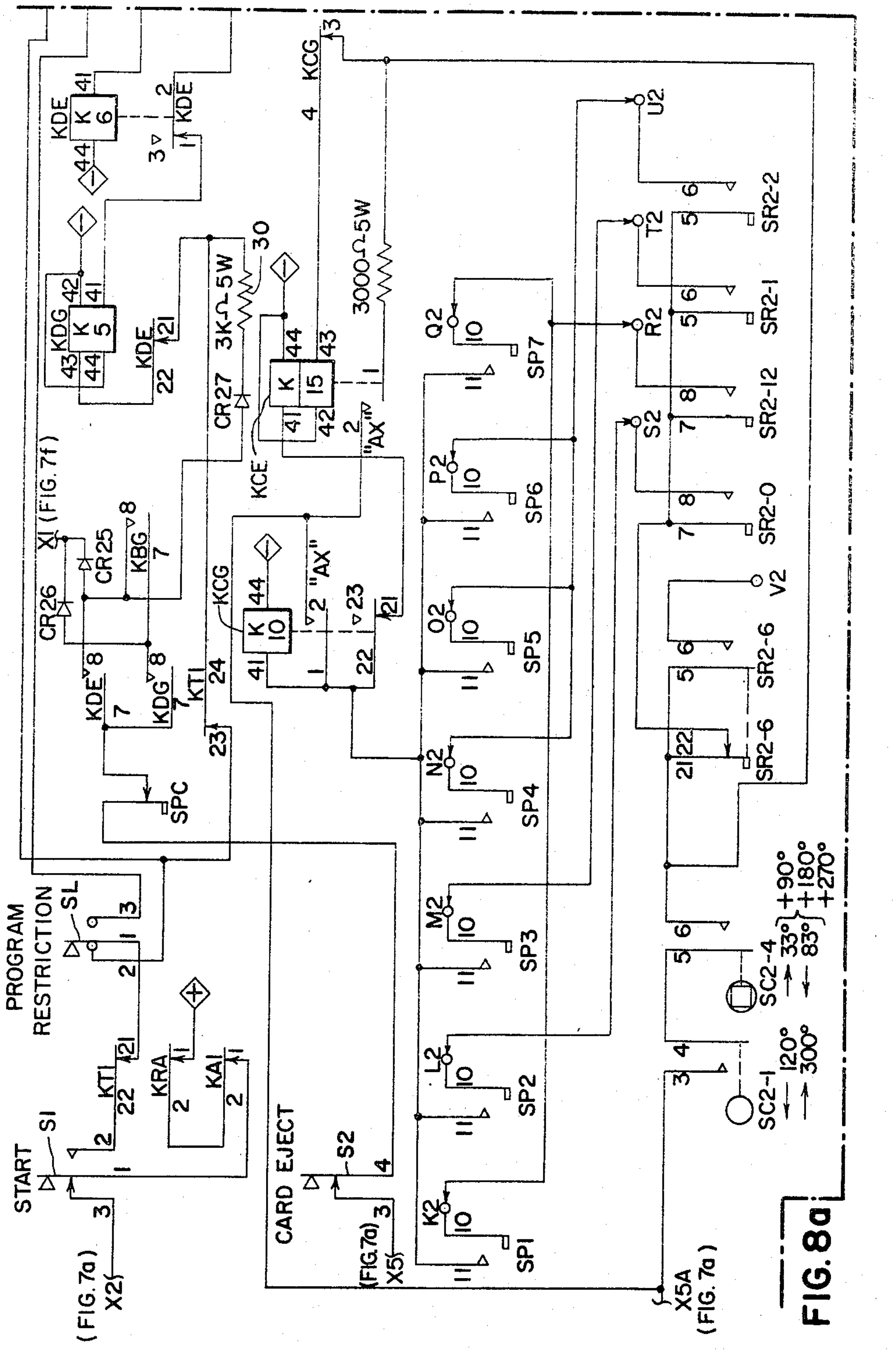
Figure 8B:
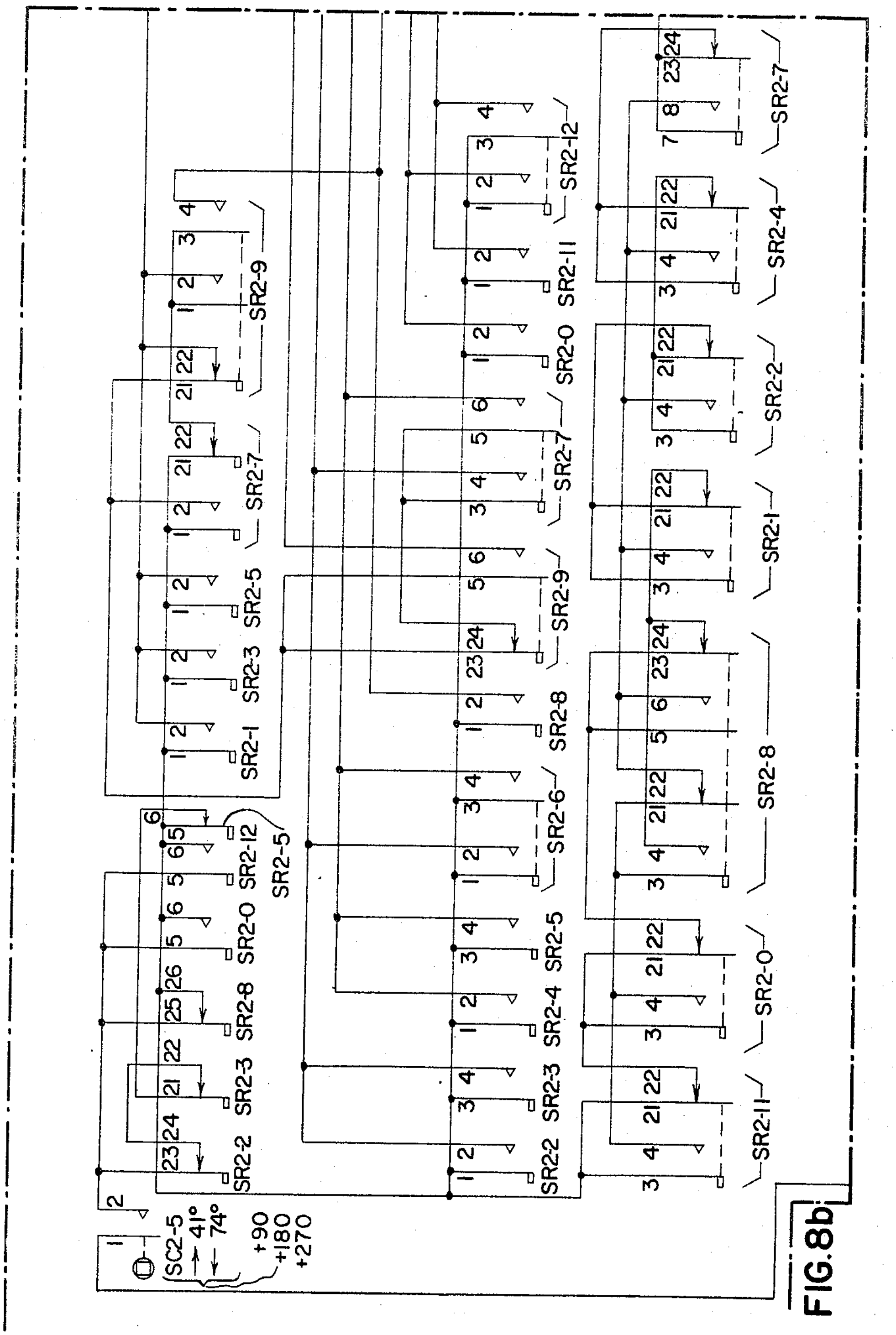
Figure 8C:
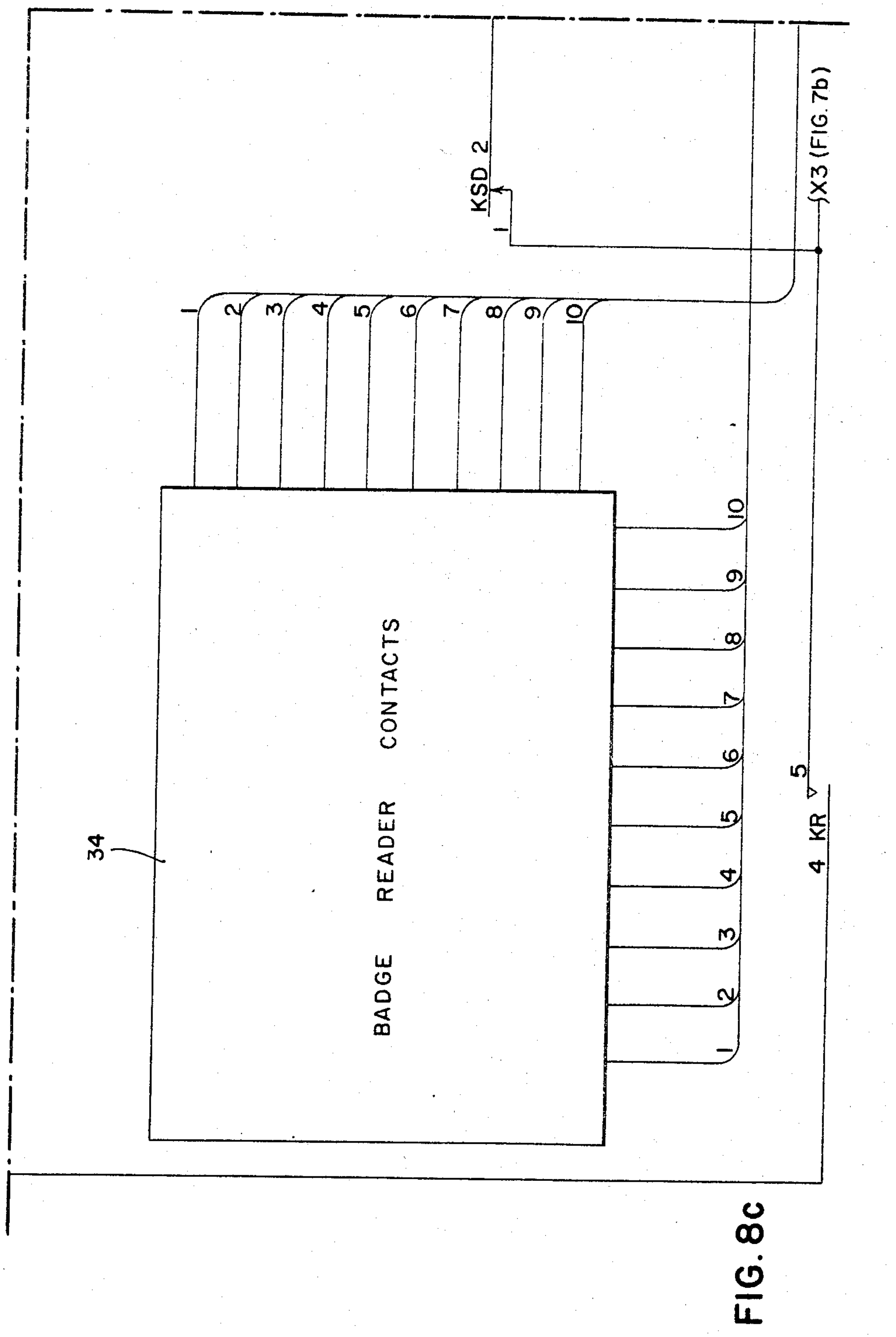
Figure 8D:
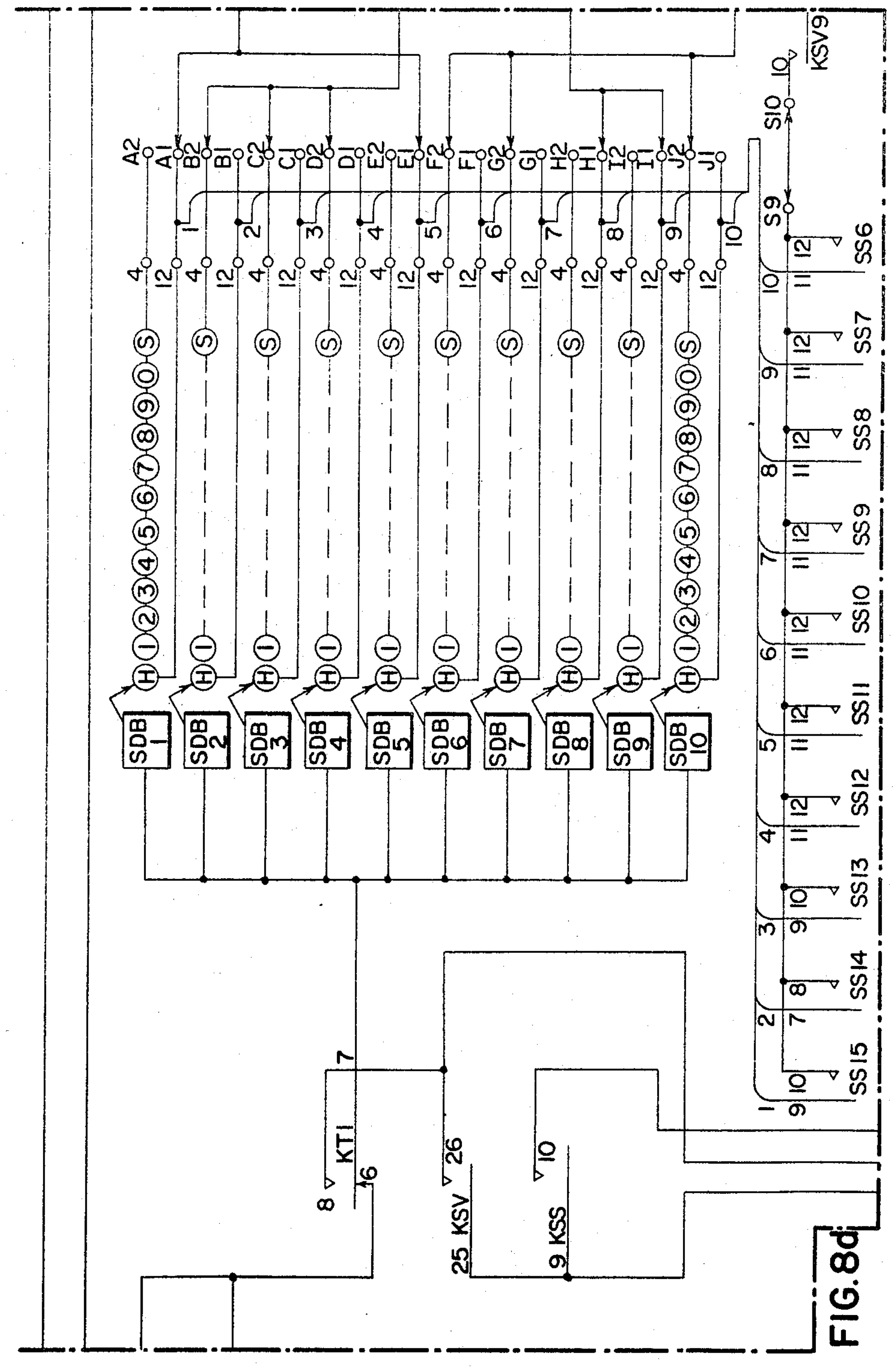
Figure 8E:
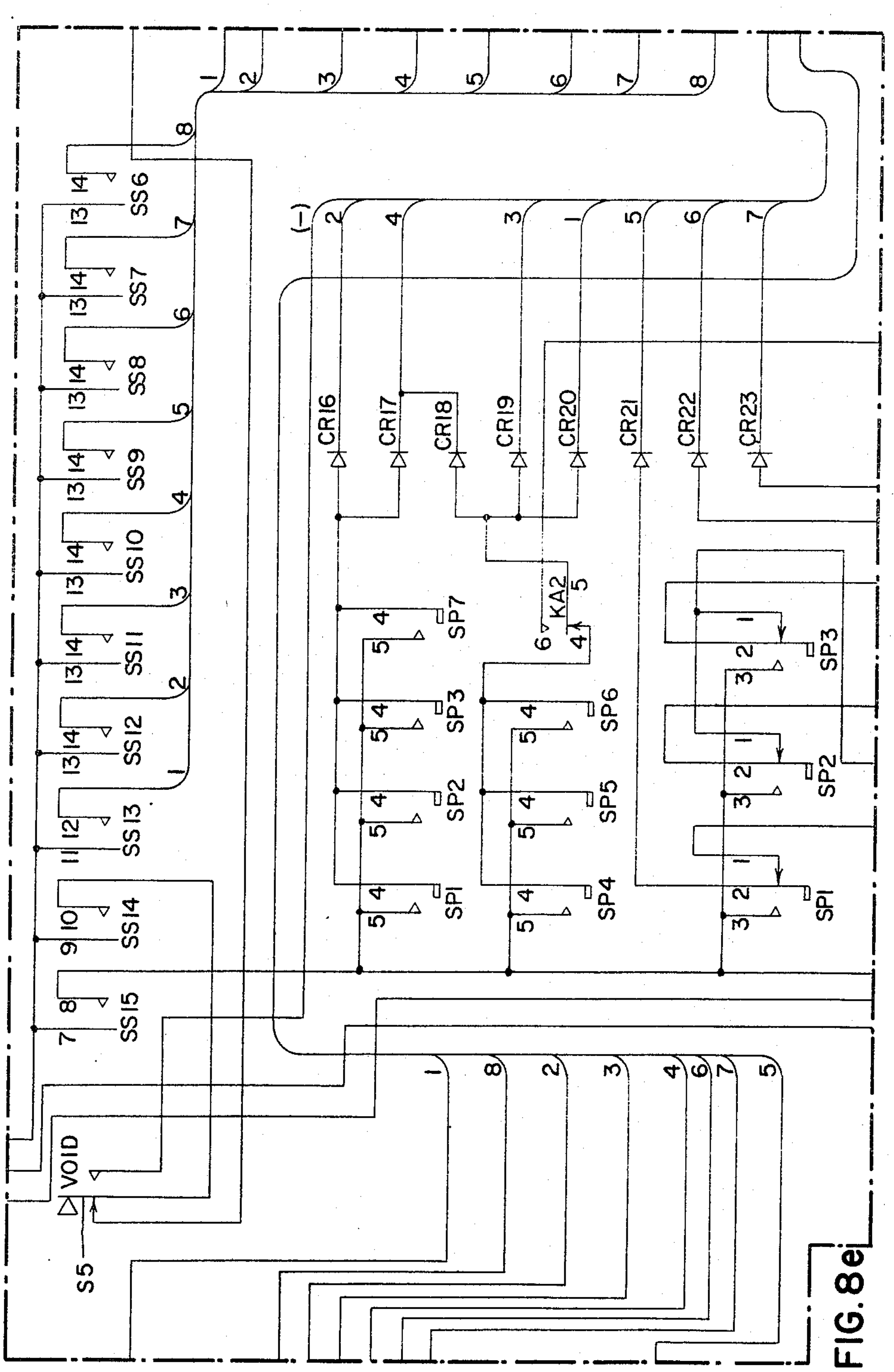
Figure 8F:
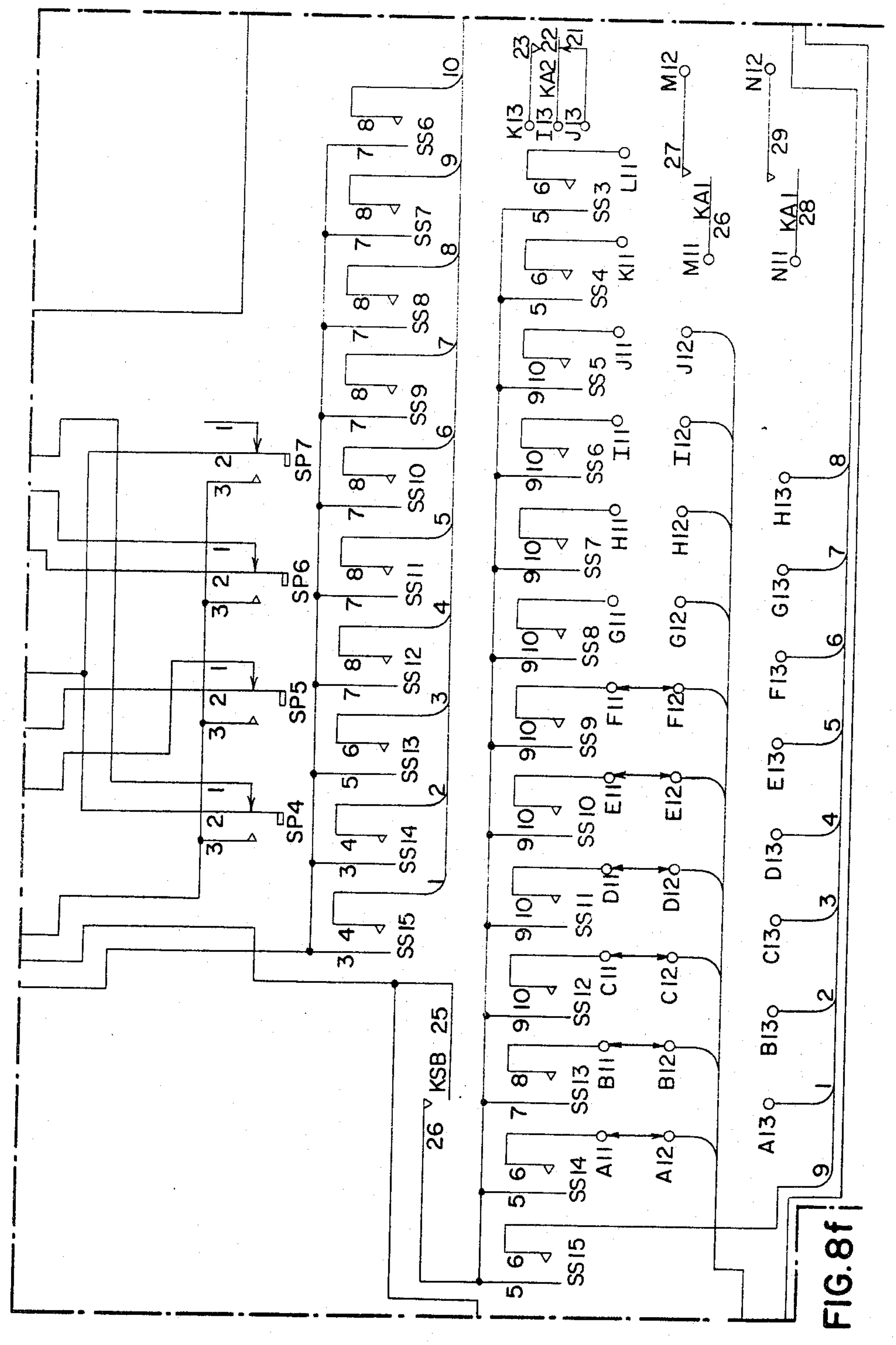
Figure 8G:
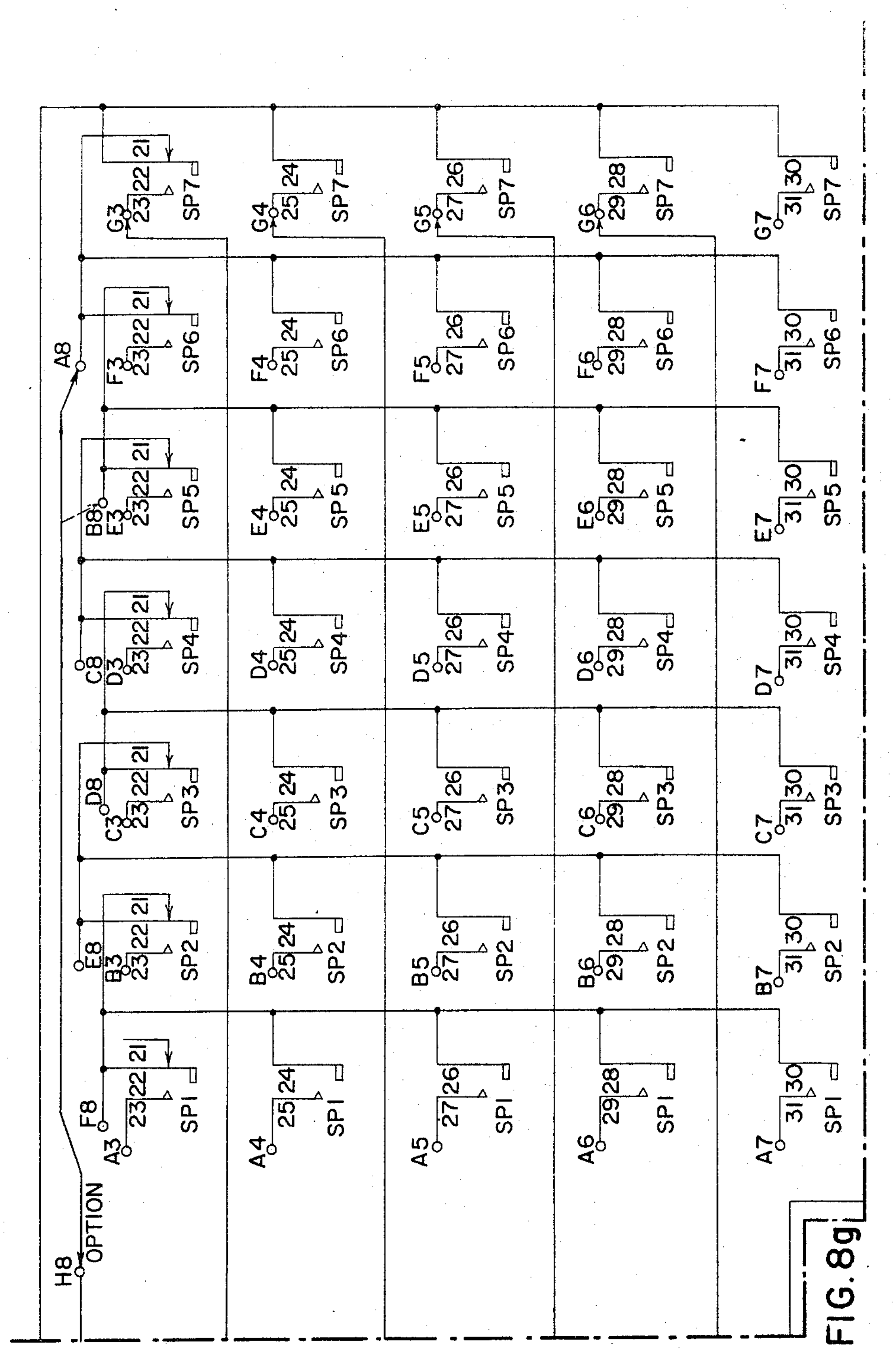
Figure 8H:
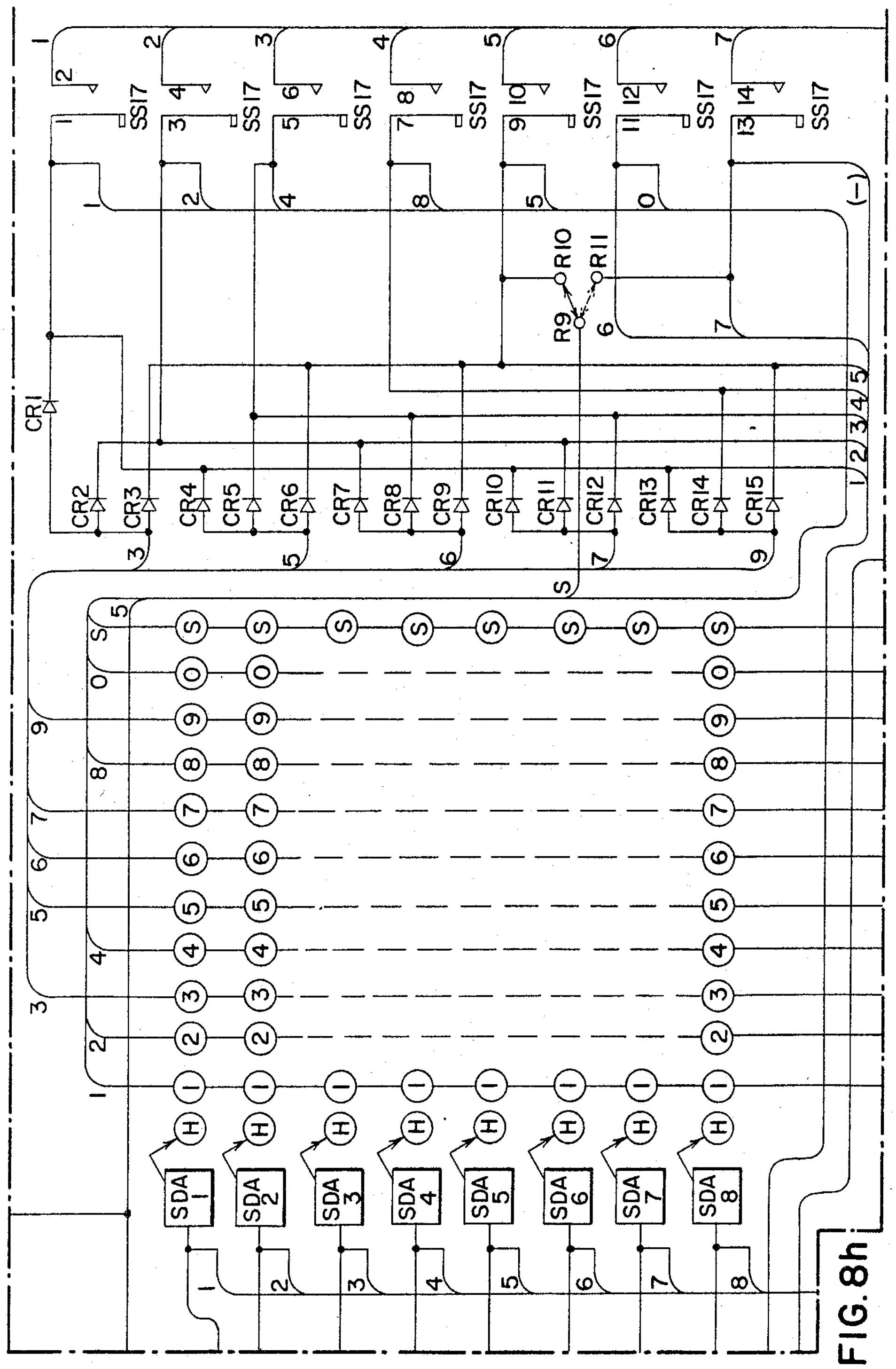
Figures 8, 8I:
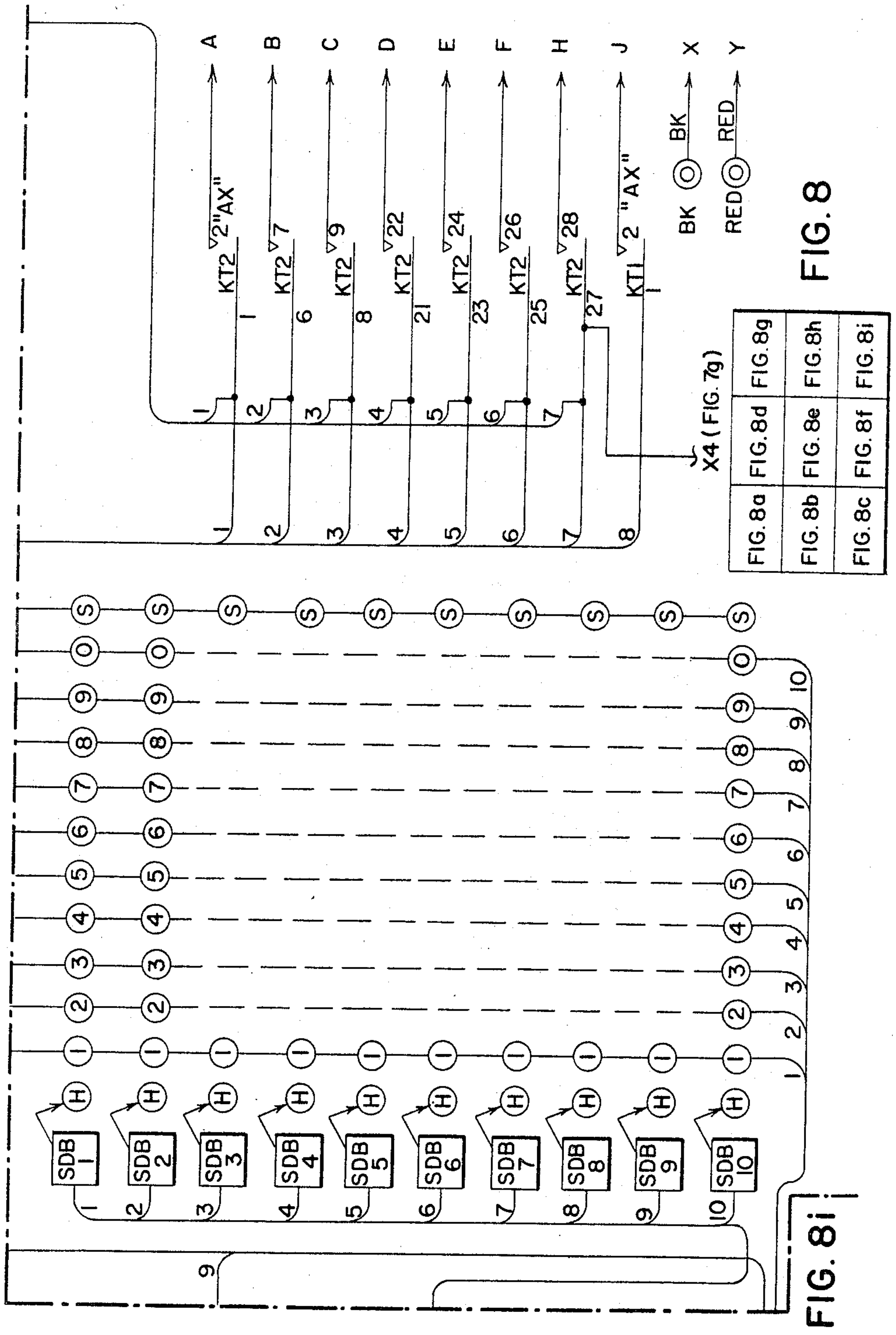
Figure 9A:
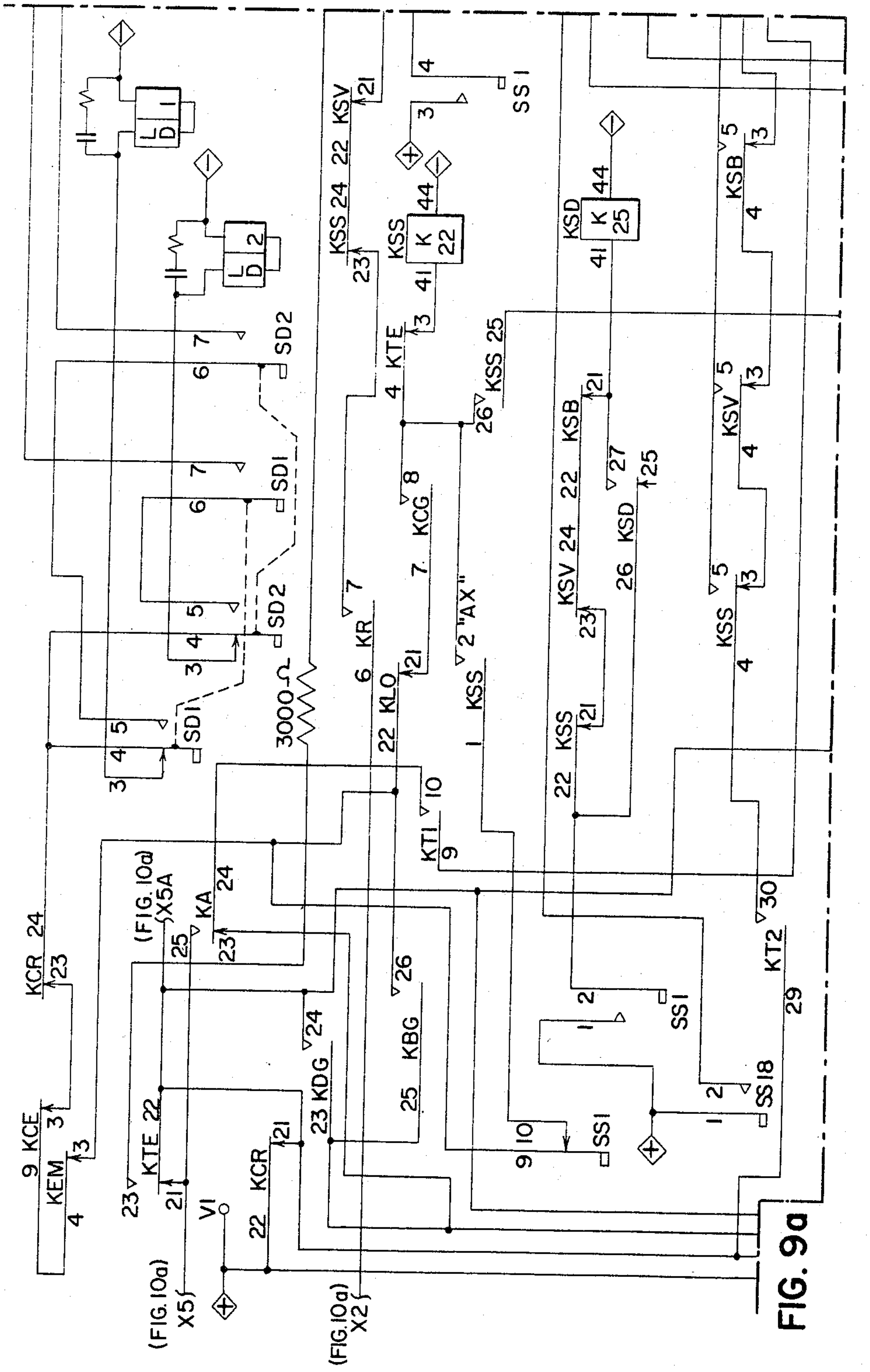
Figure 9B:
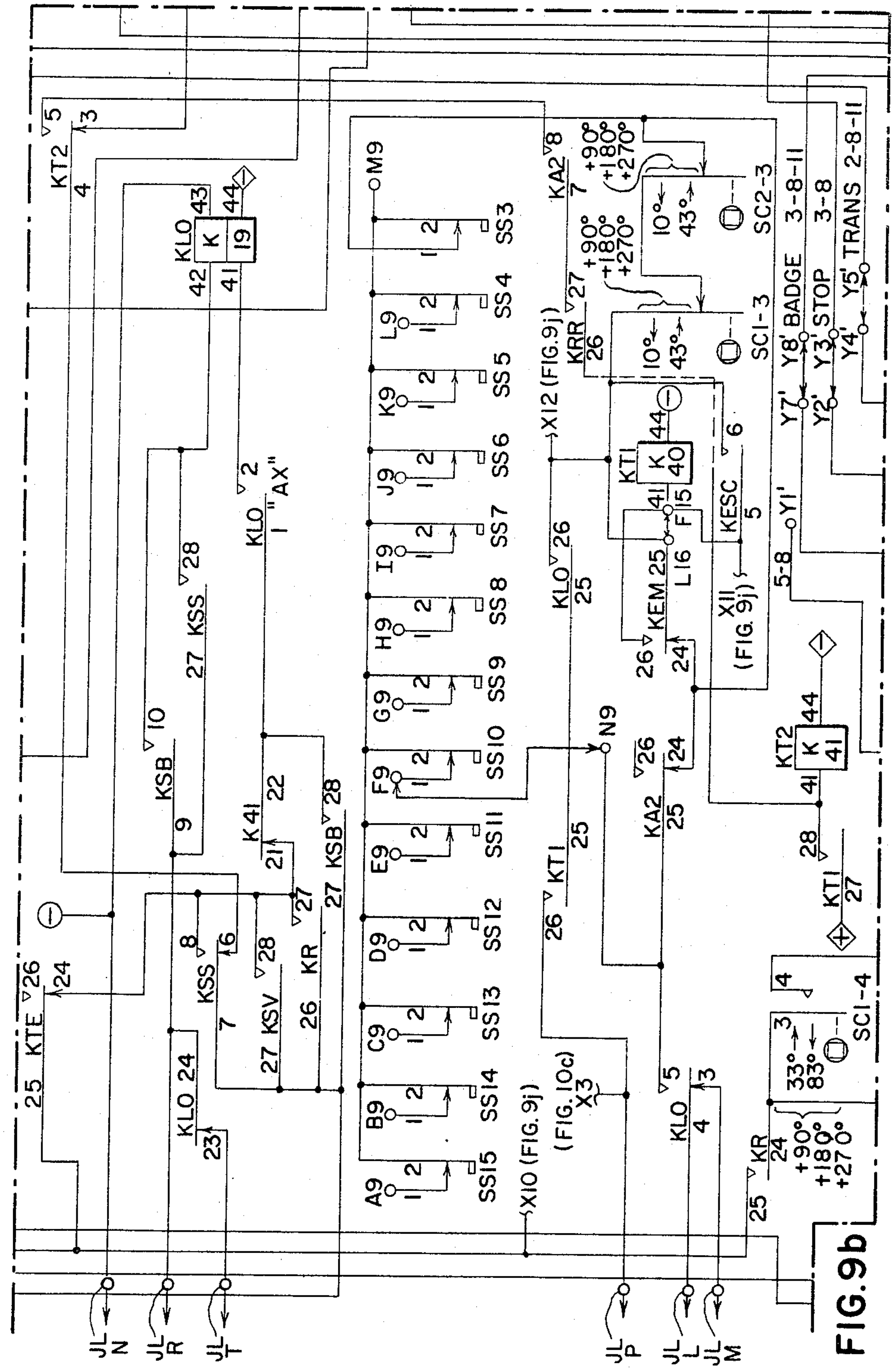
Figure 9C:
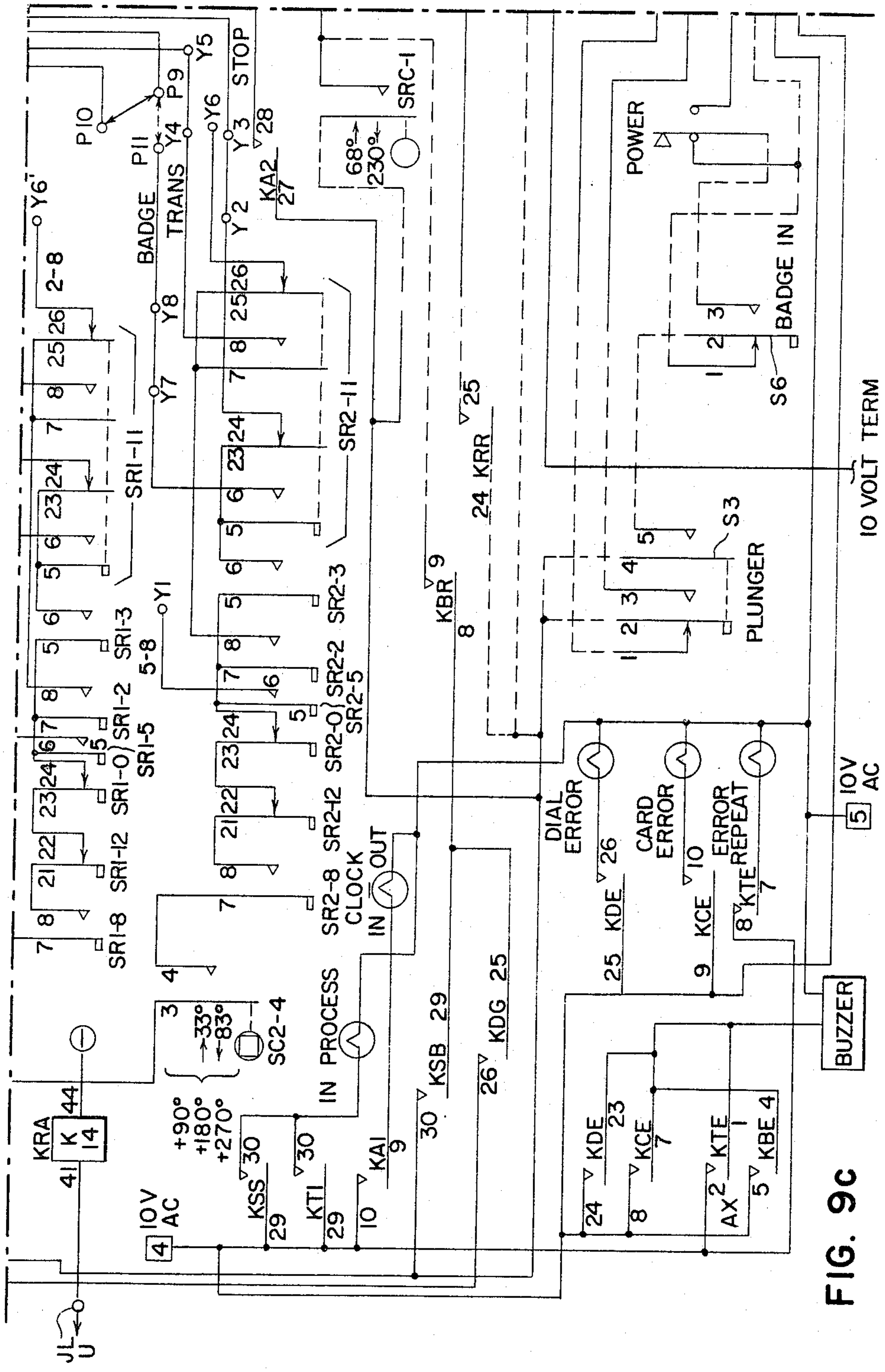
Figure 9D:
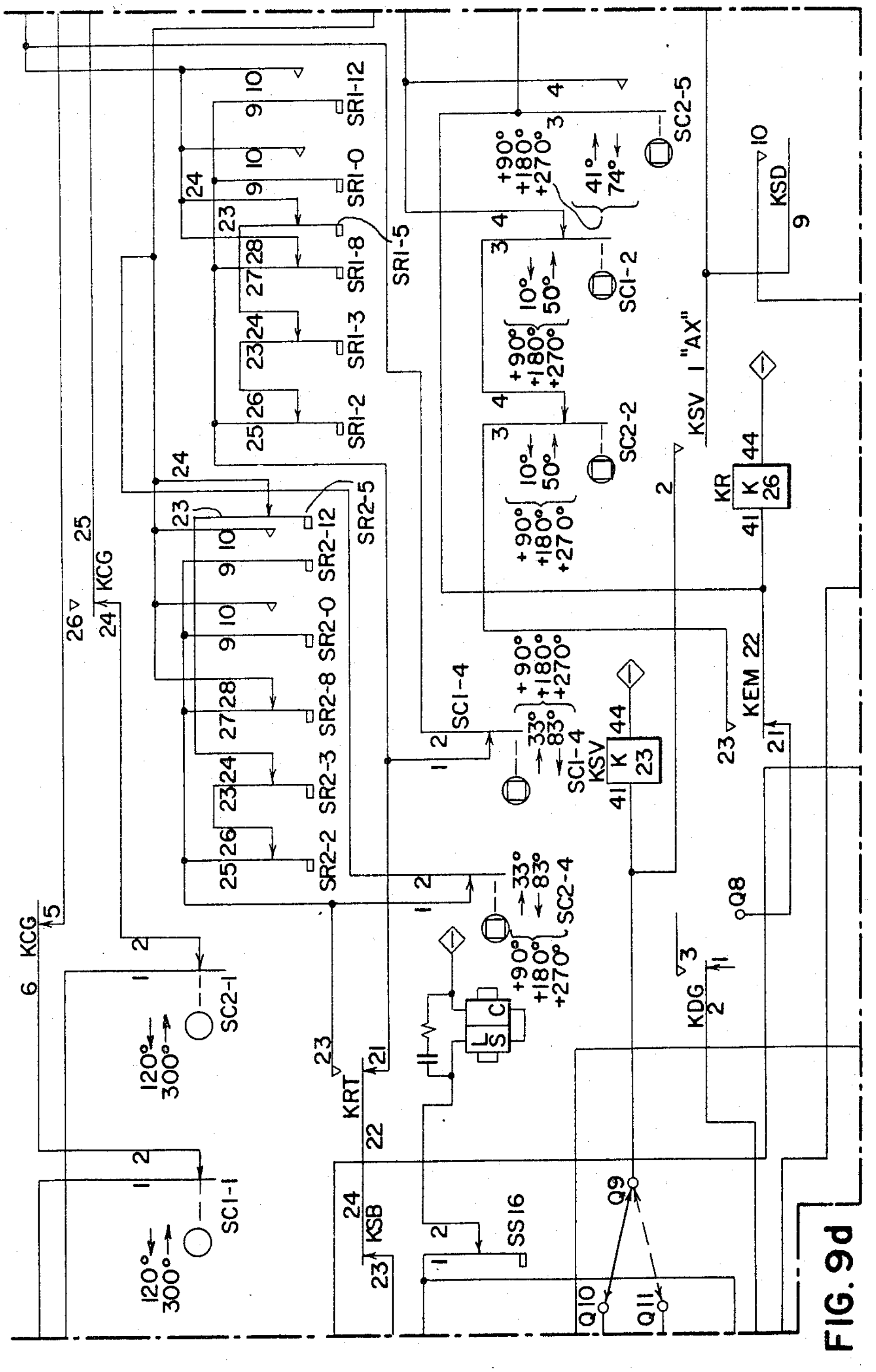
Figure 9E:
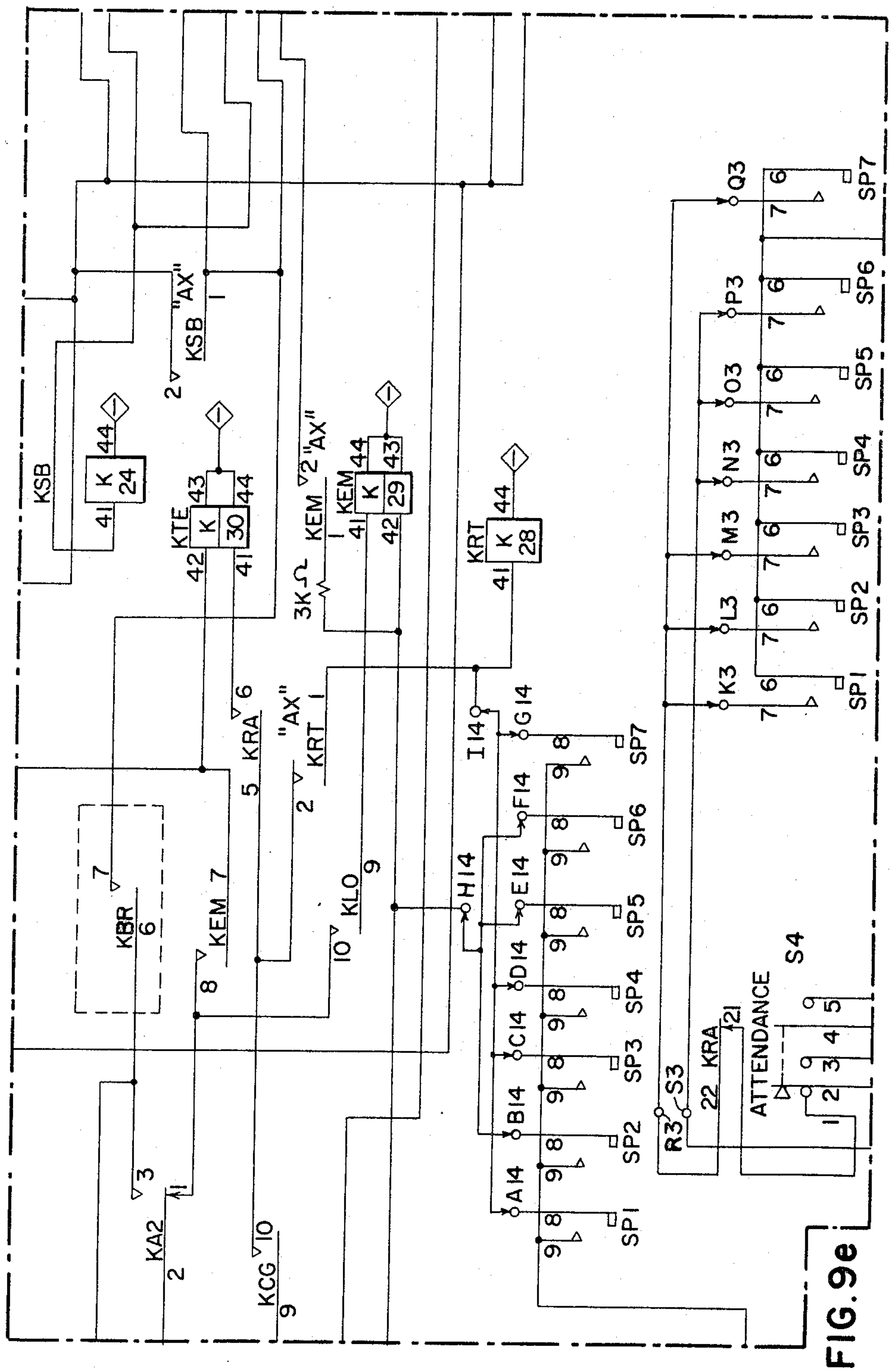
Figure 9F:
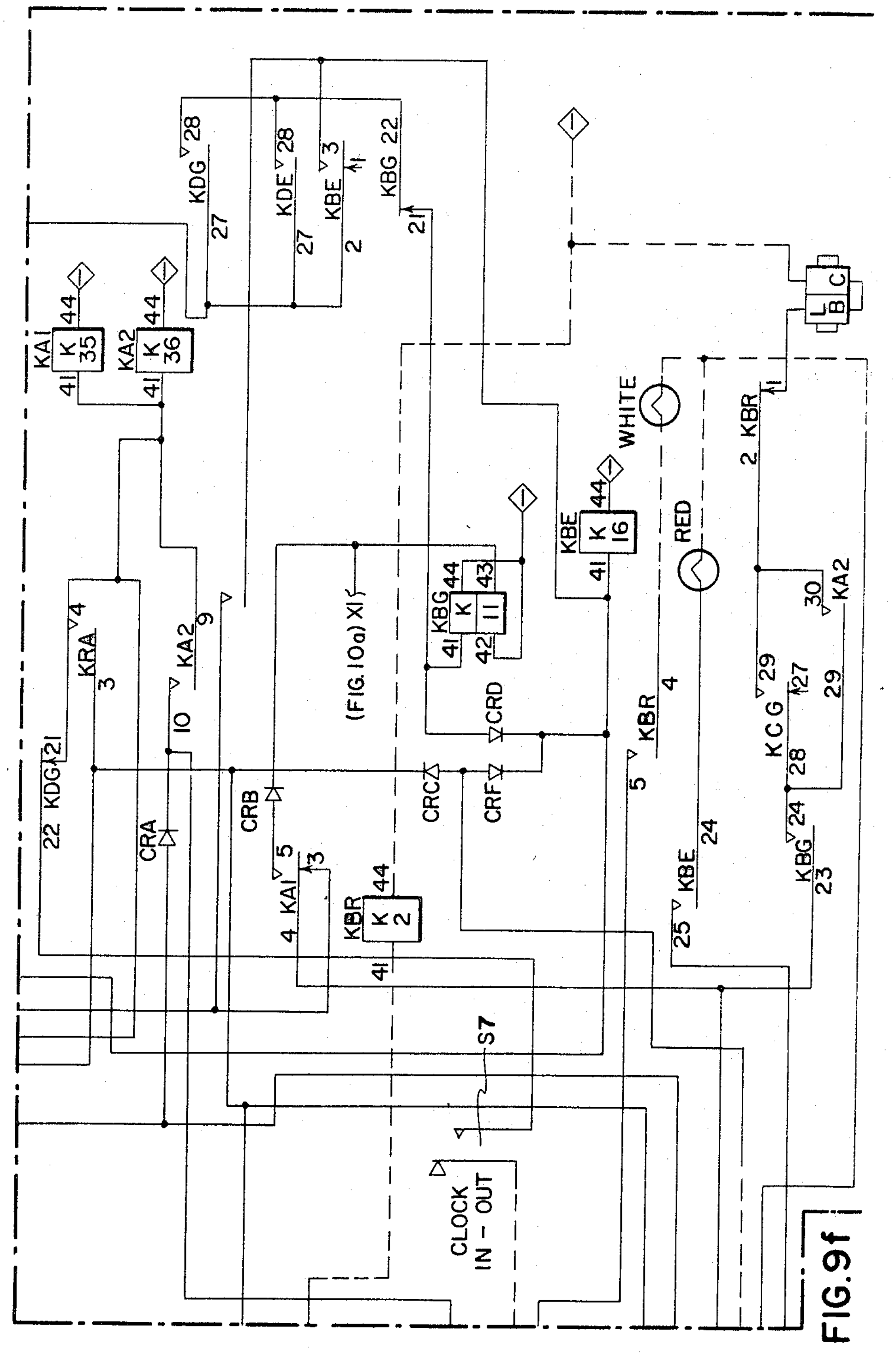
Figure 9G:
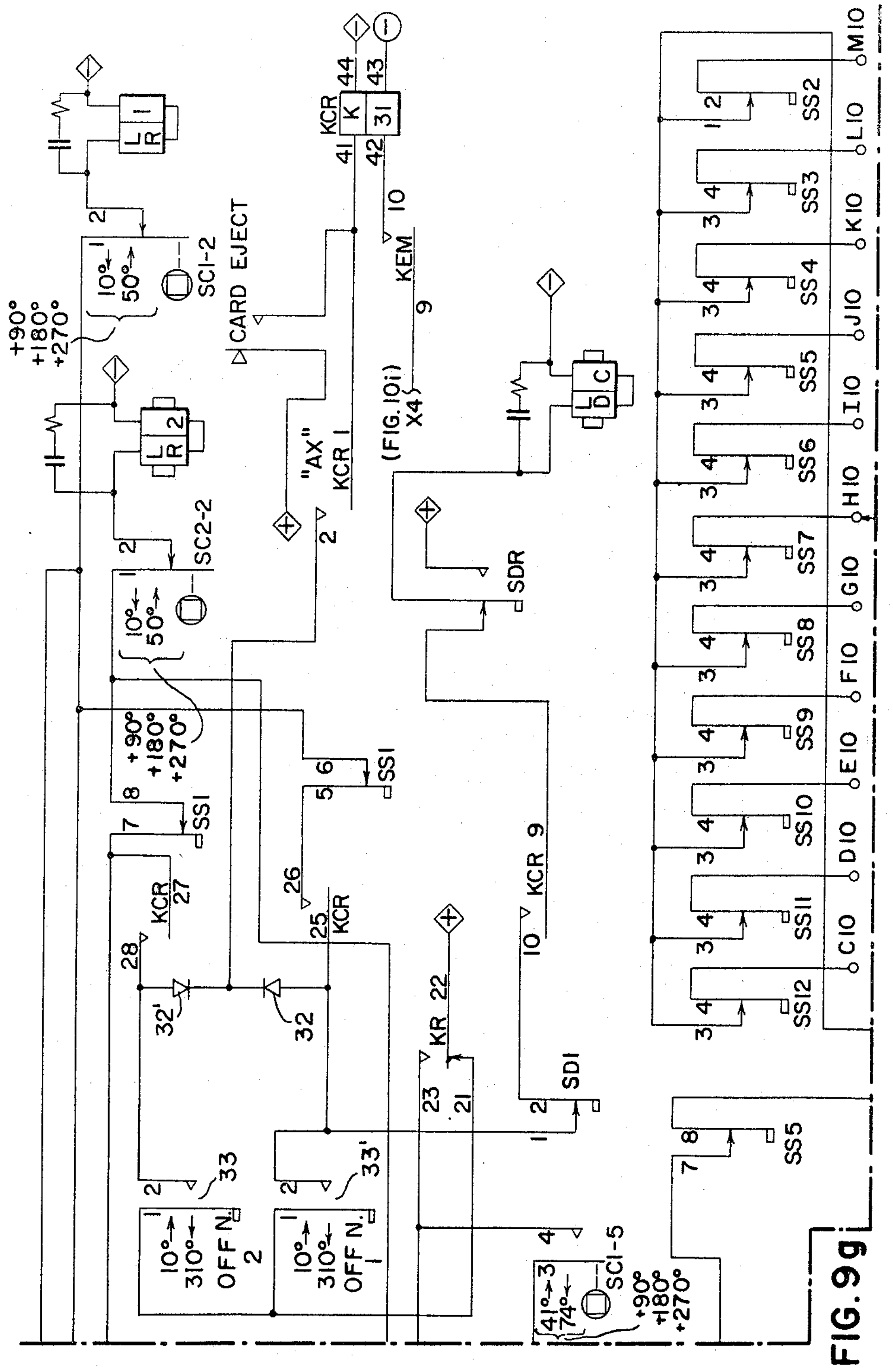
Figure 9H:
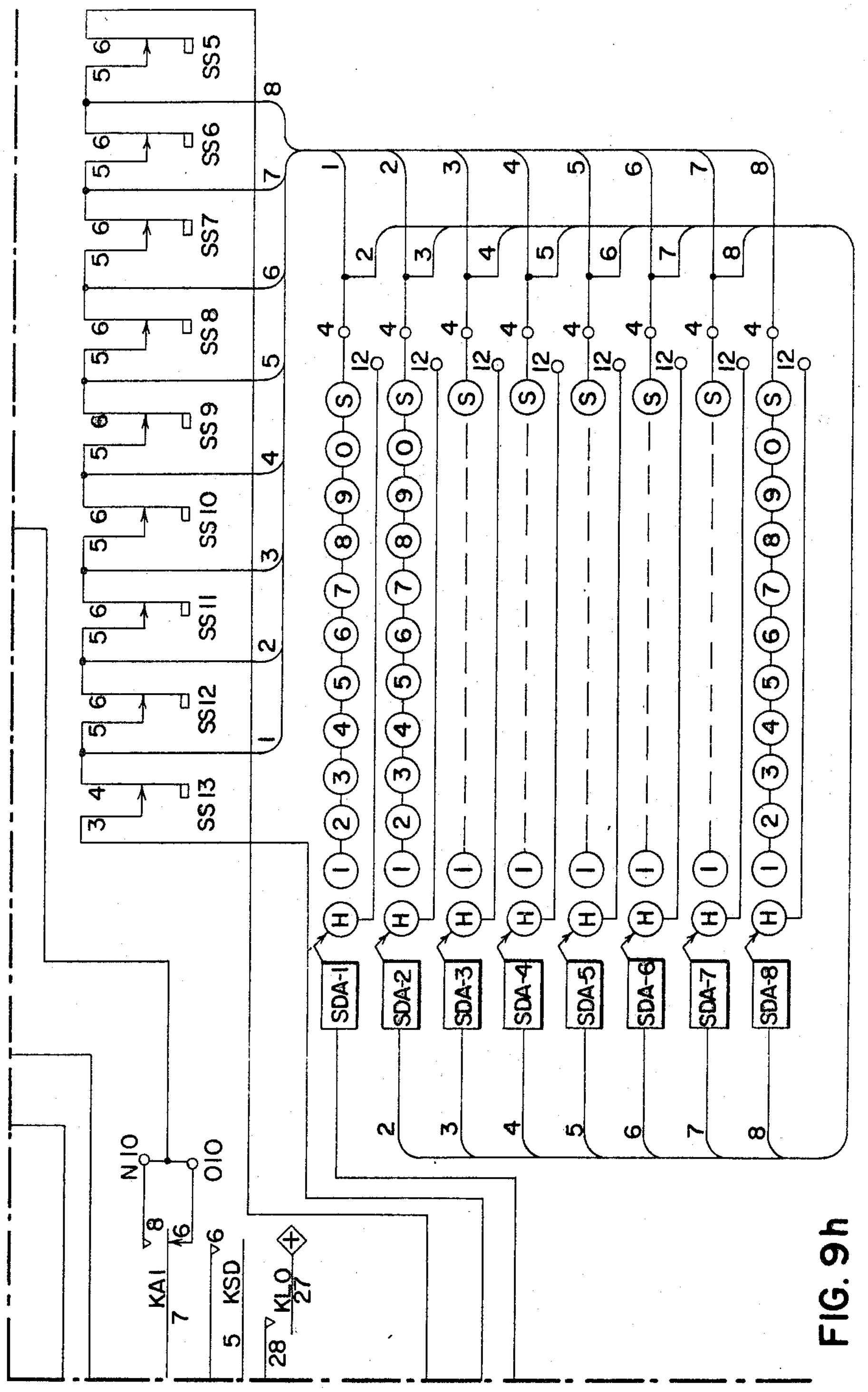
Figure 9:
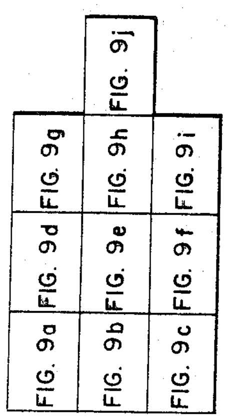
Figure 9I:
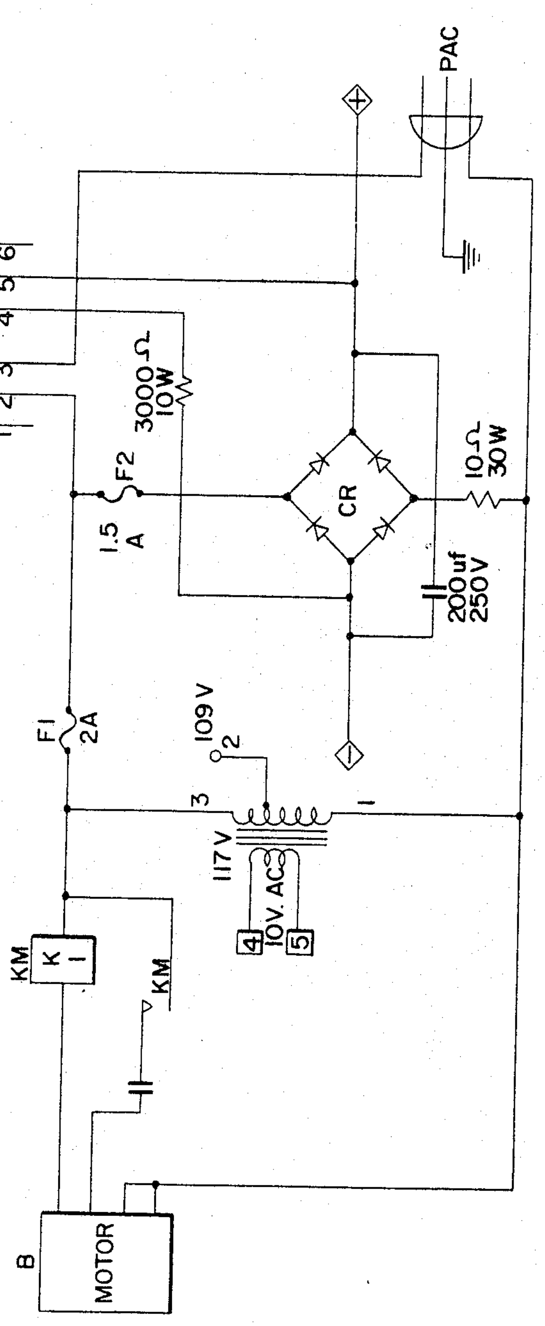
Figure 9J:
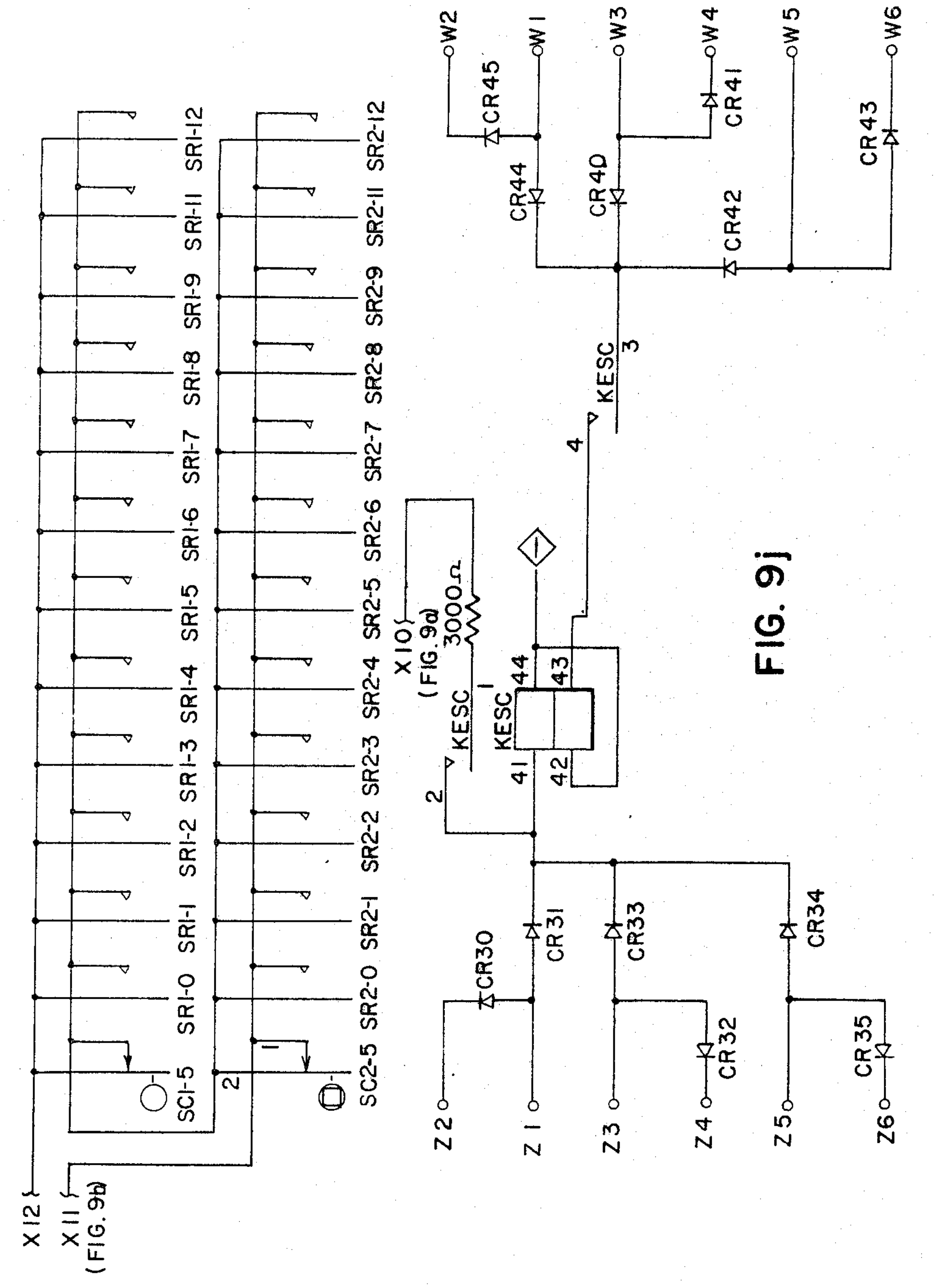
Figure 10A:
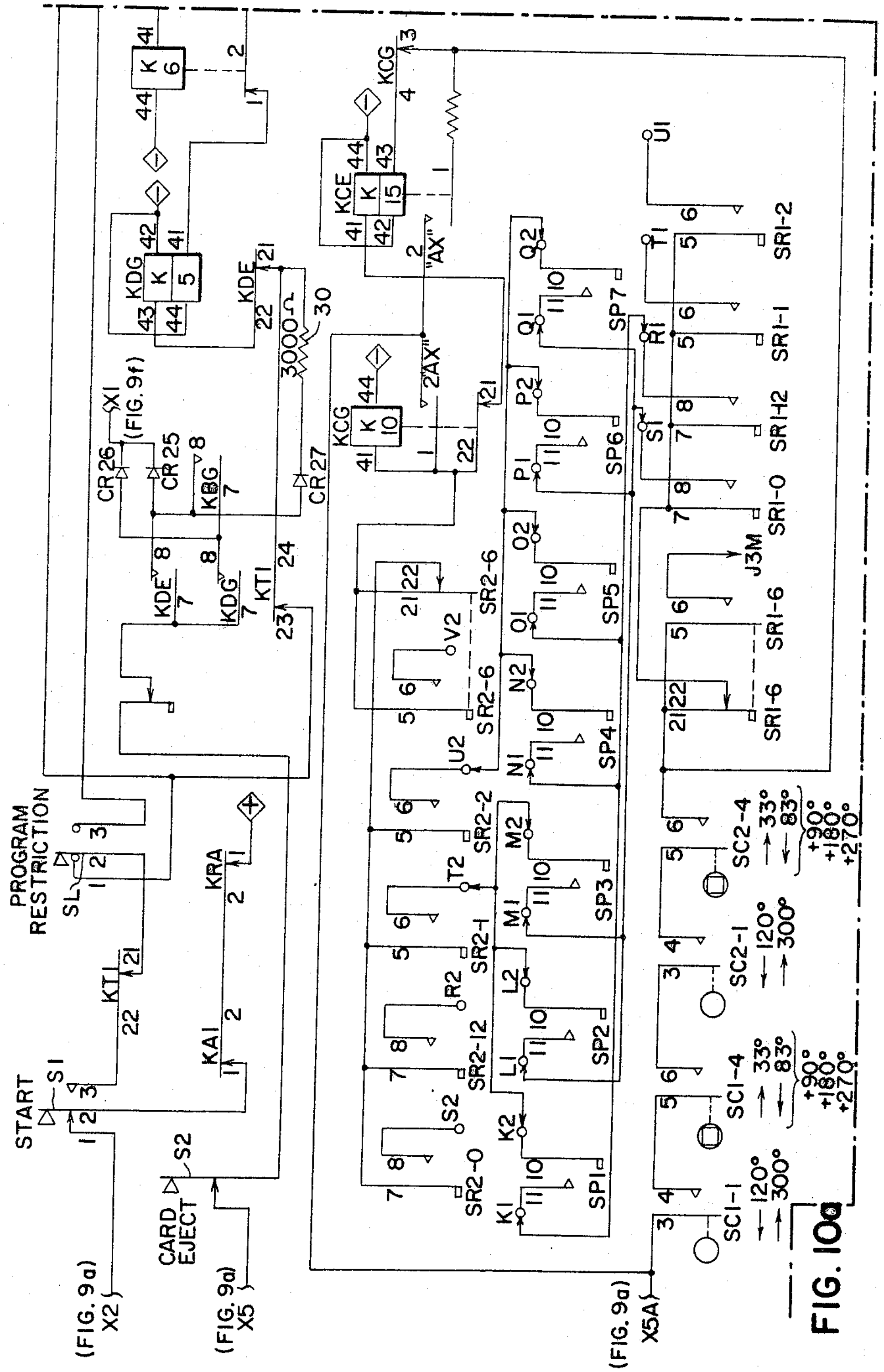
Figure 10B:
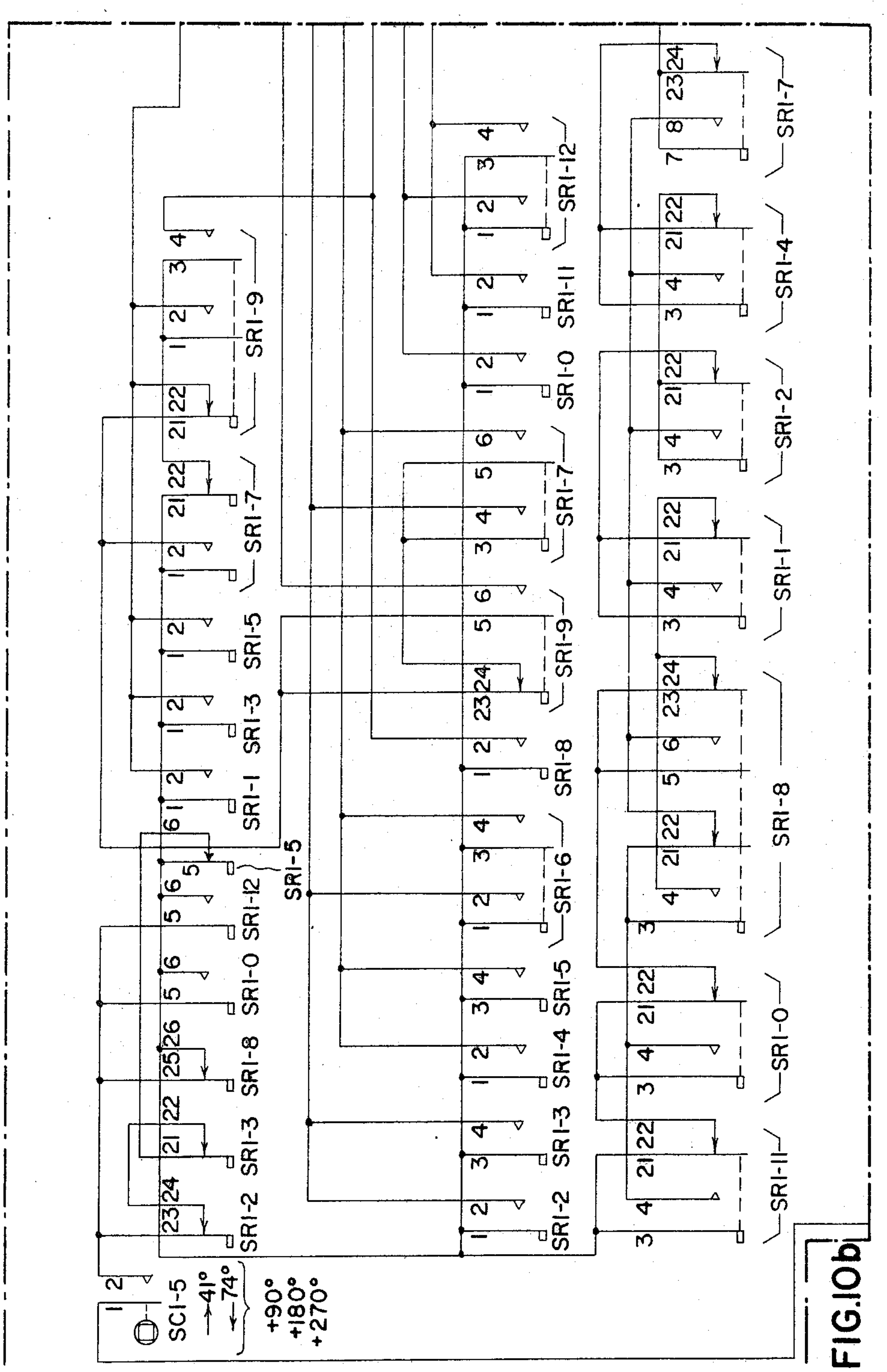
Figure 10C:
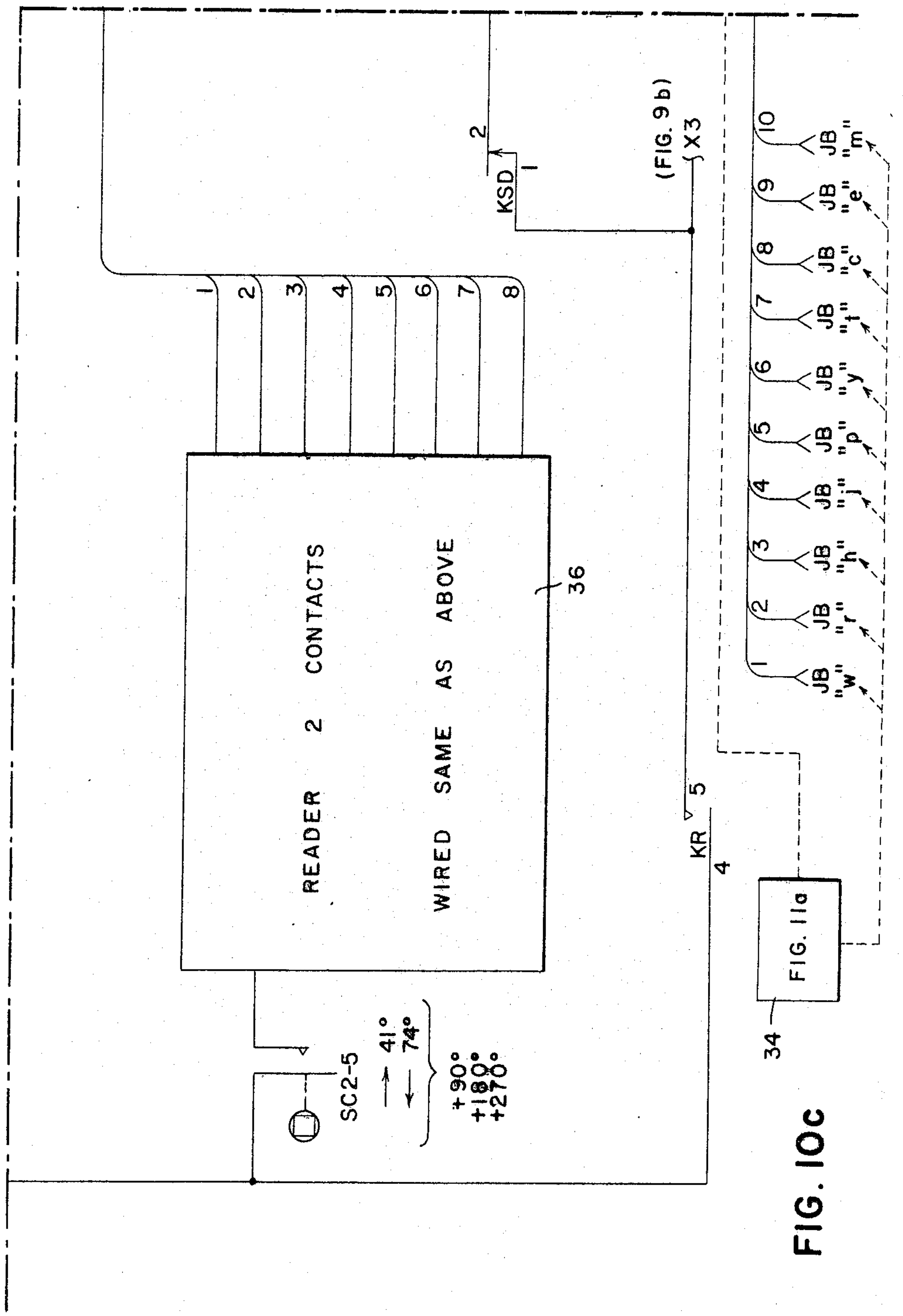
Figure 10D:
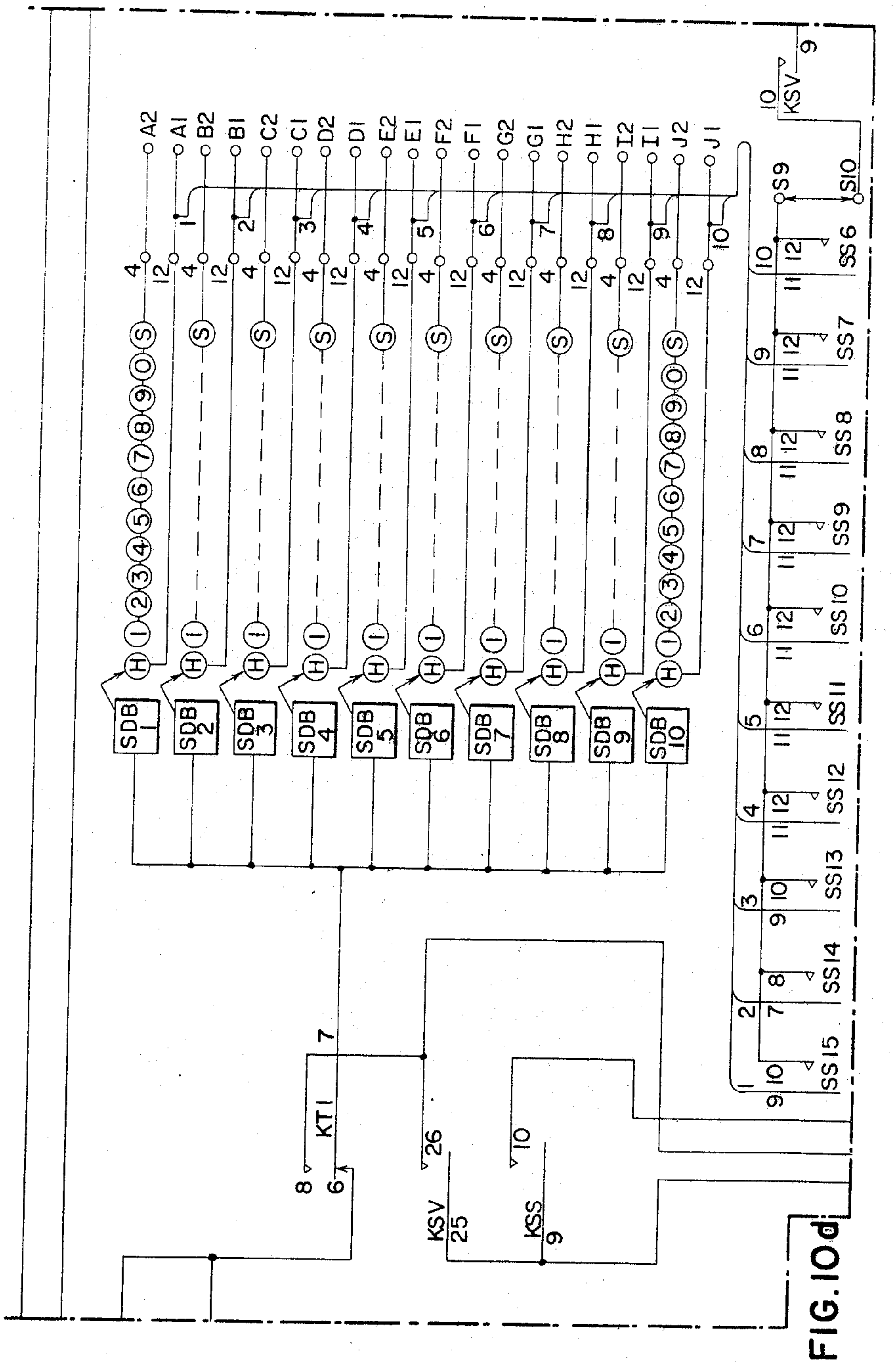
Figure 10E:
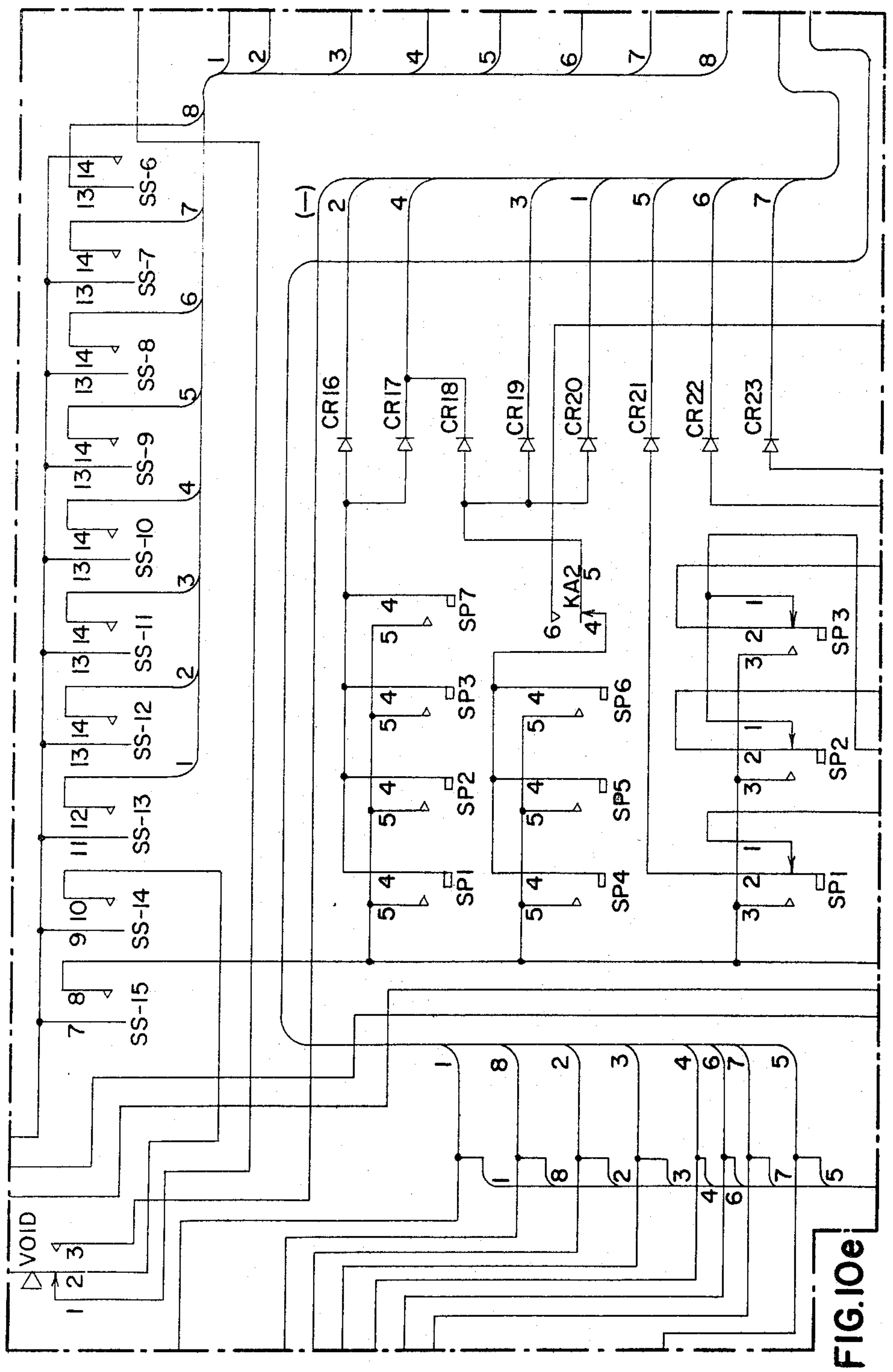
Figure 10F:
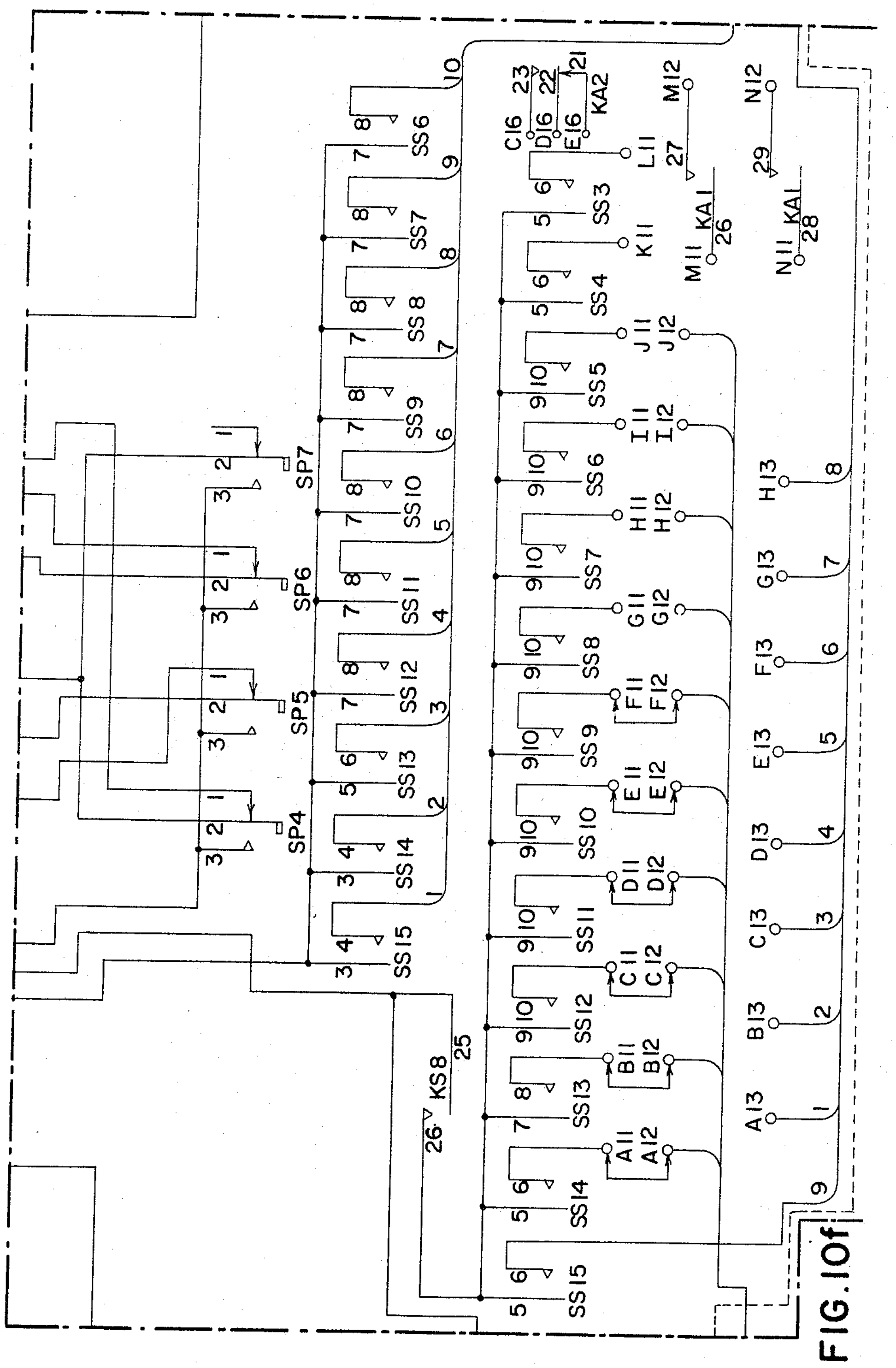
Figure 10G:
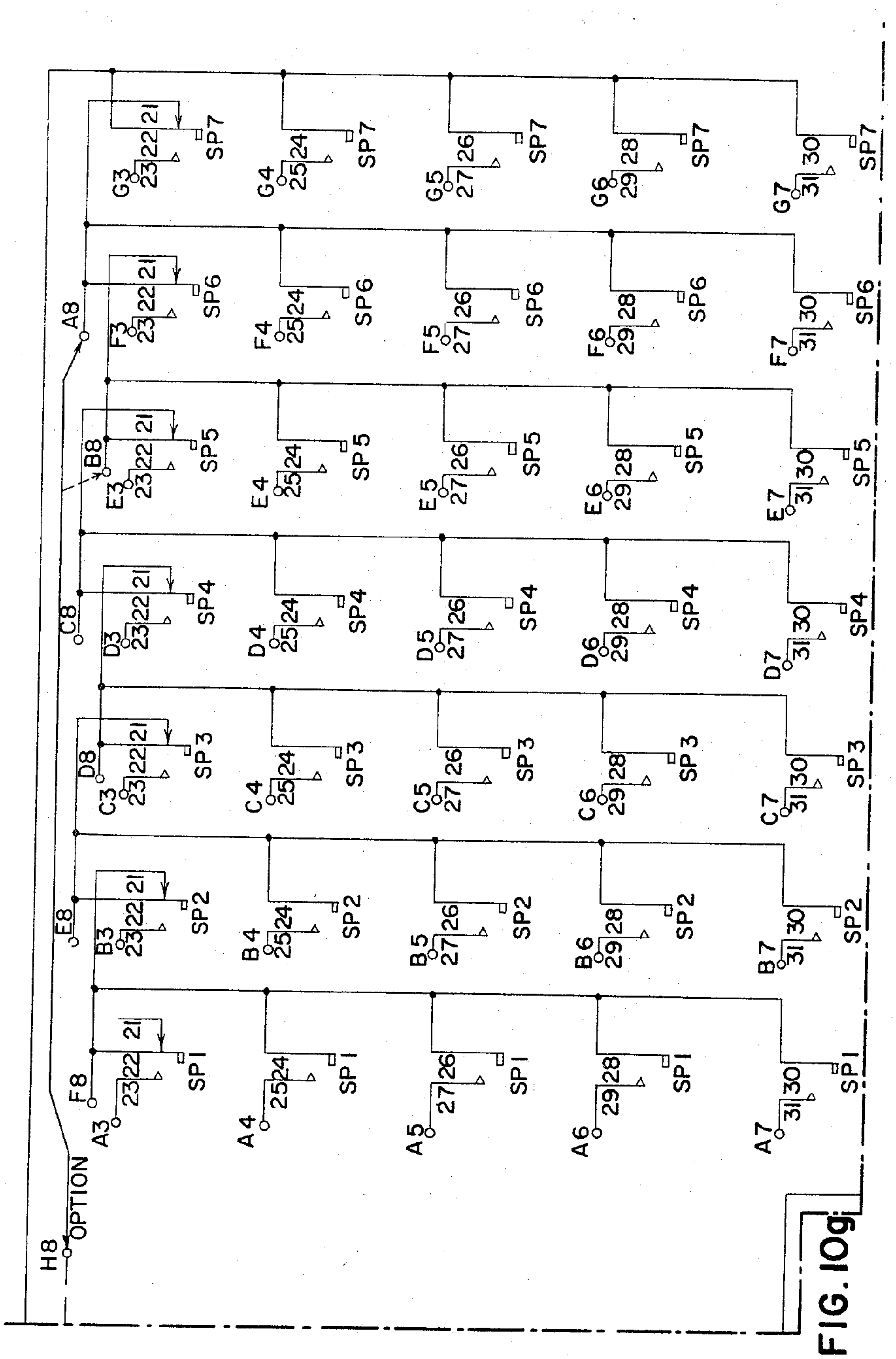
Figure 10H:
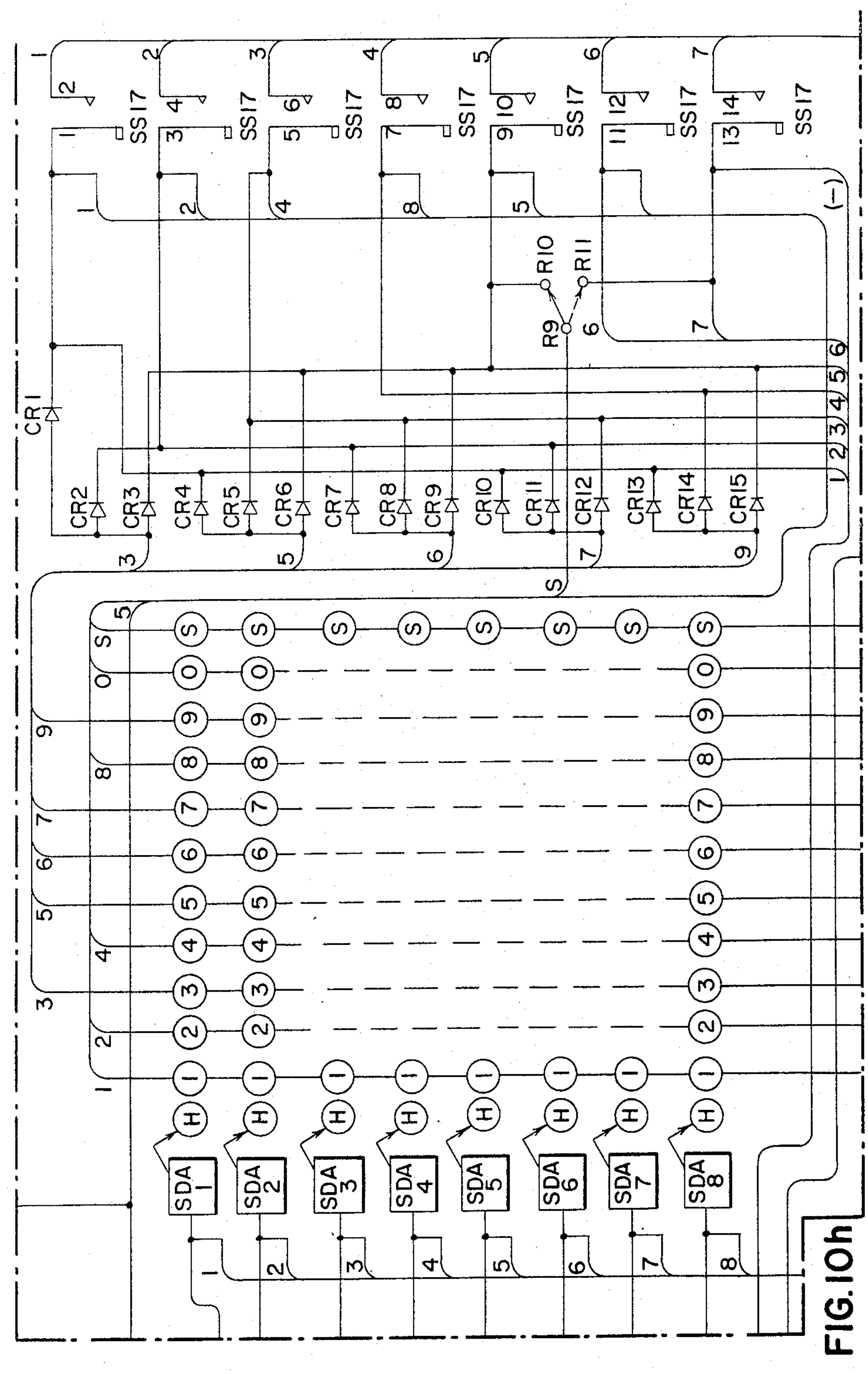
Figures 10, 10I:
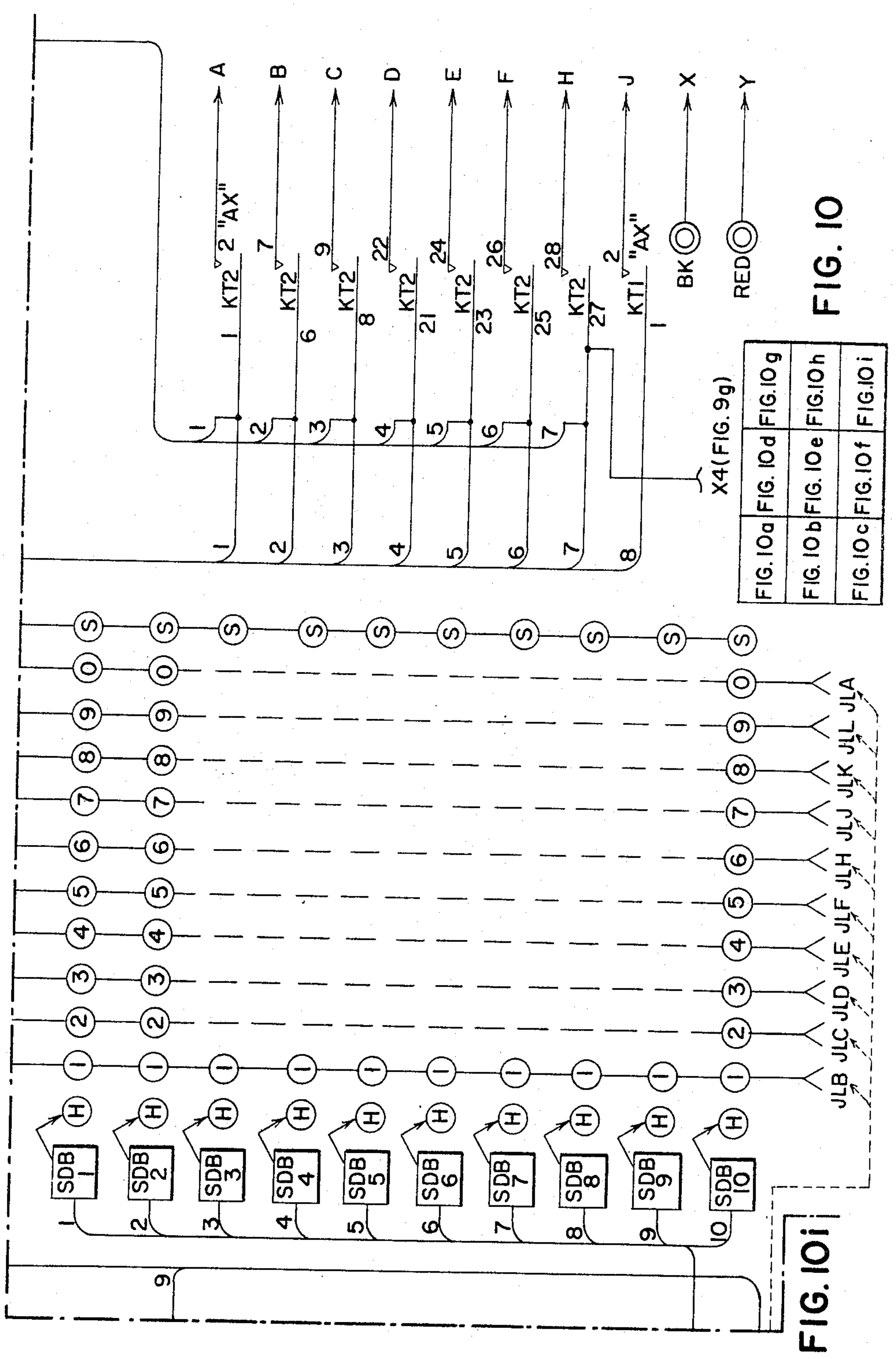
Figures 11, 11B:
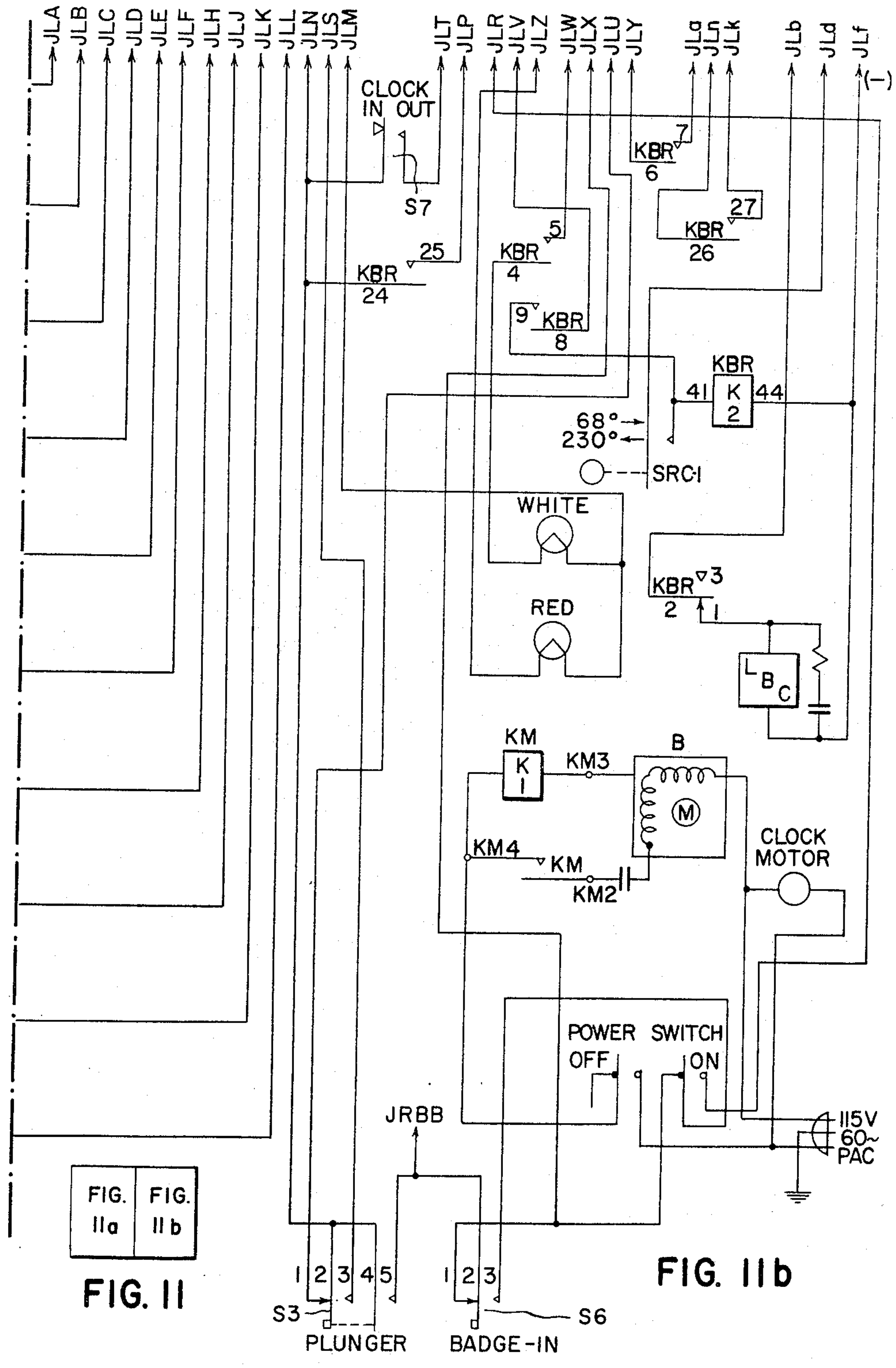
Figure 11A:
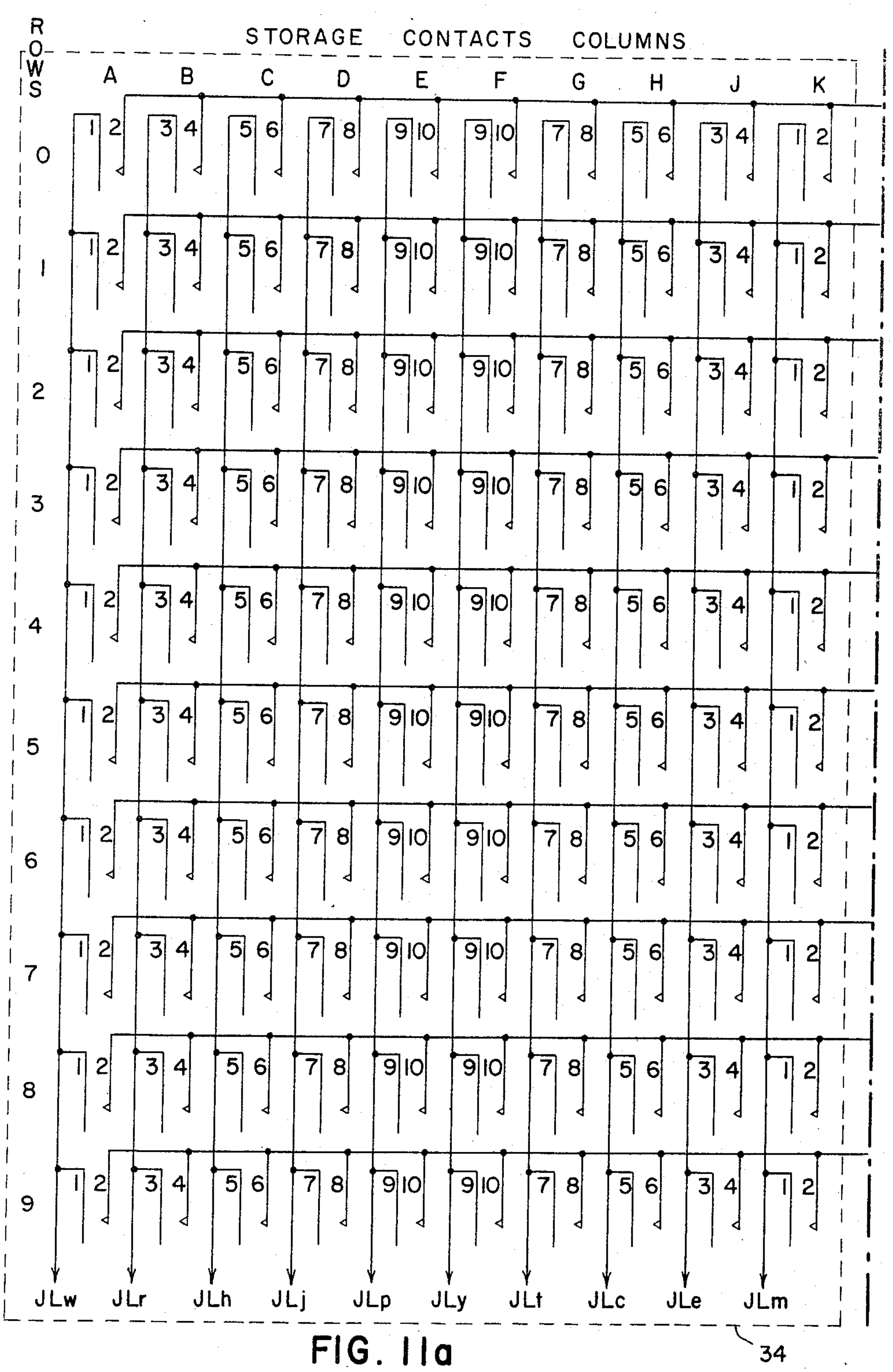
Figure 12A:
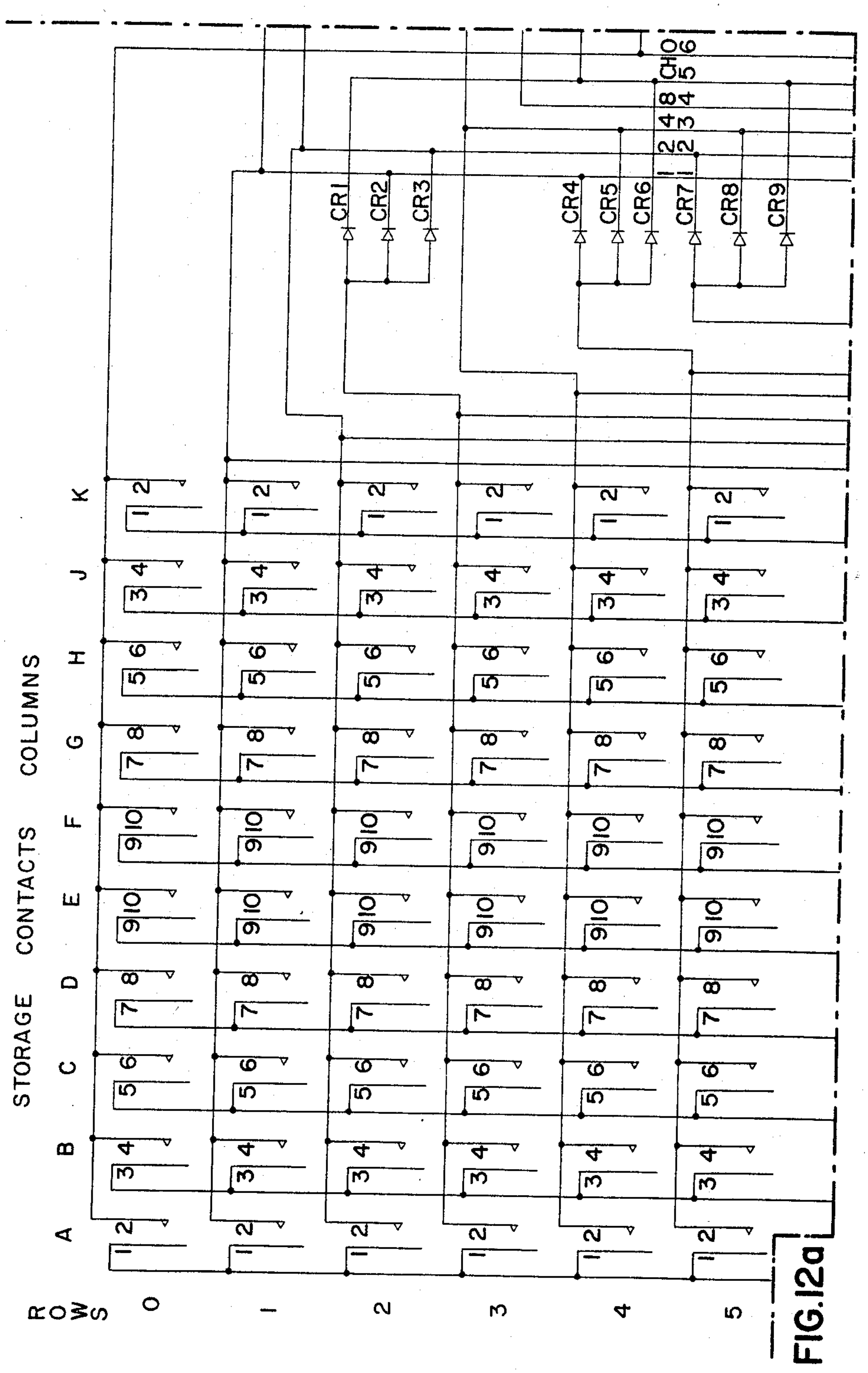
Figure 12B:
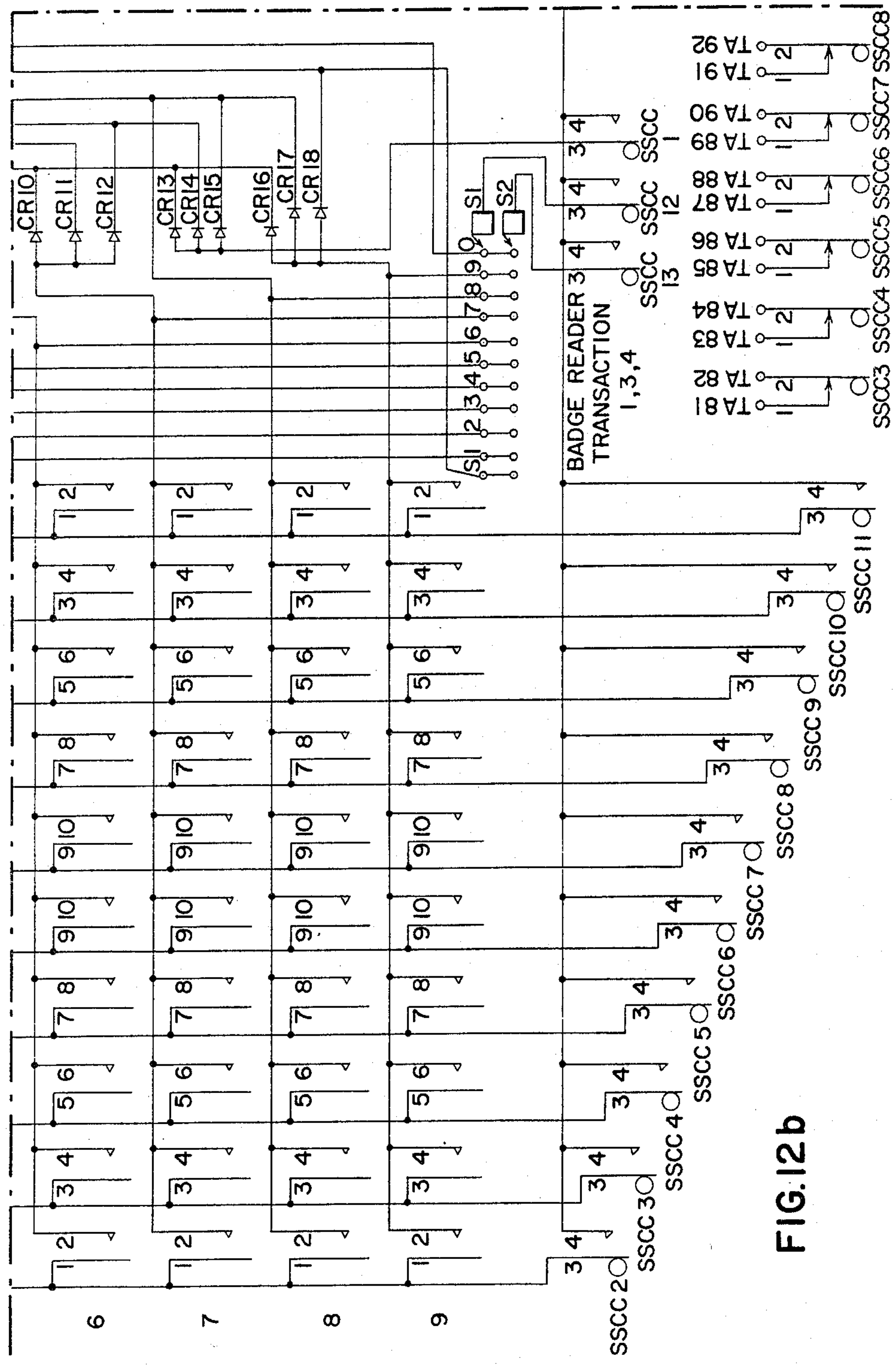
Figures 12, 12C:
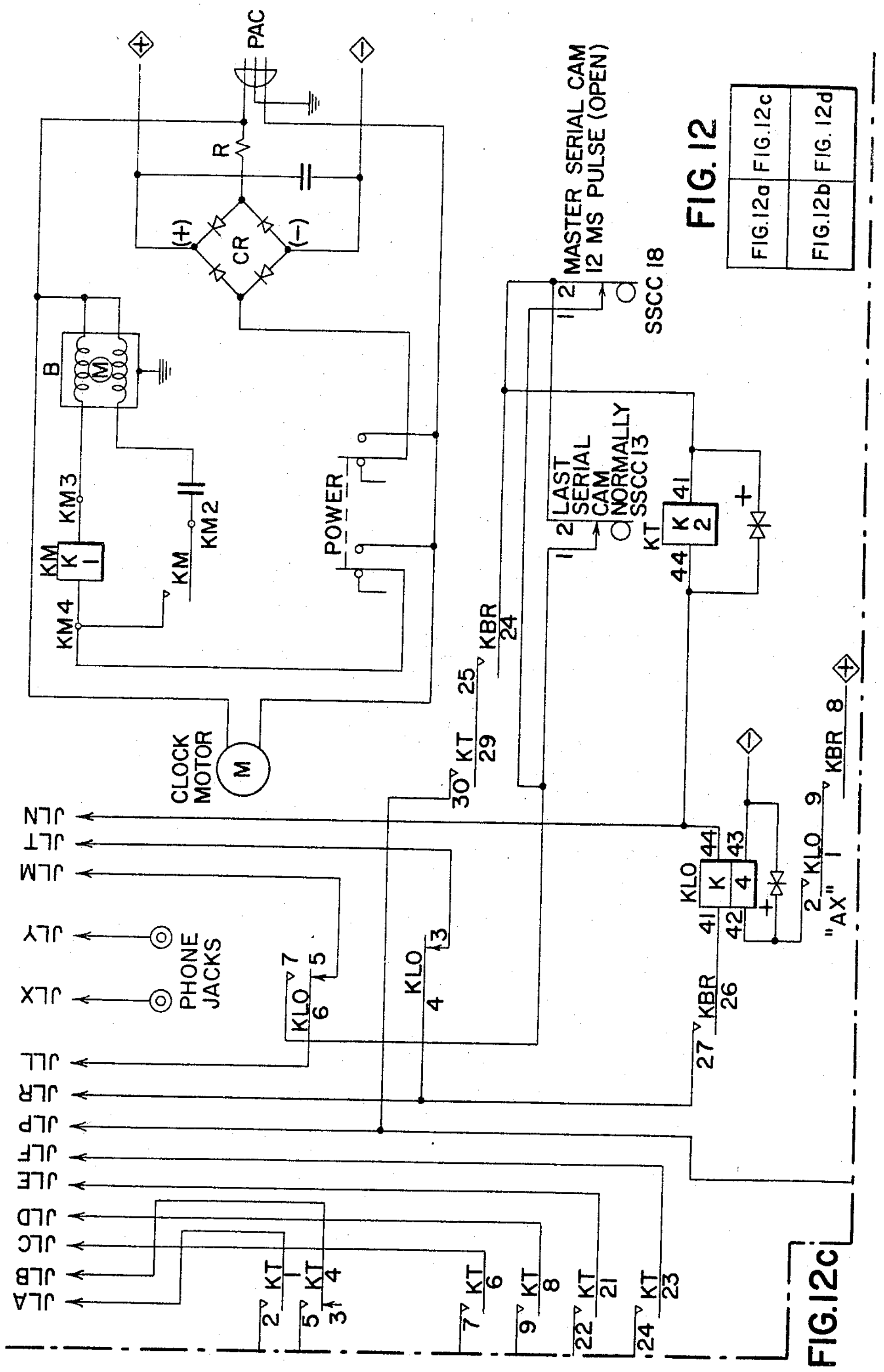
Figures 13, 13B:
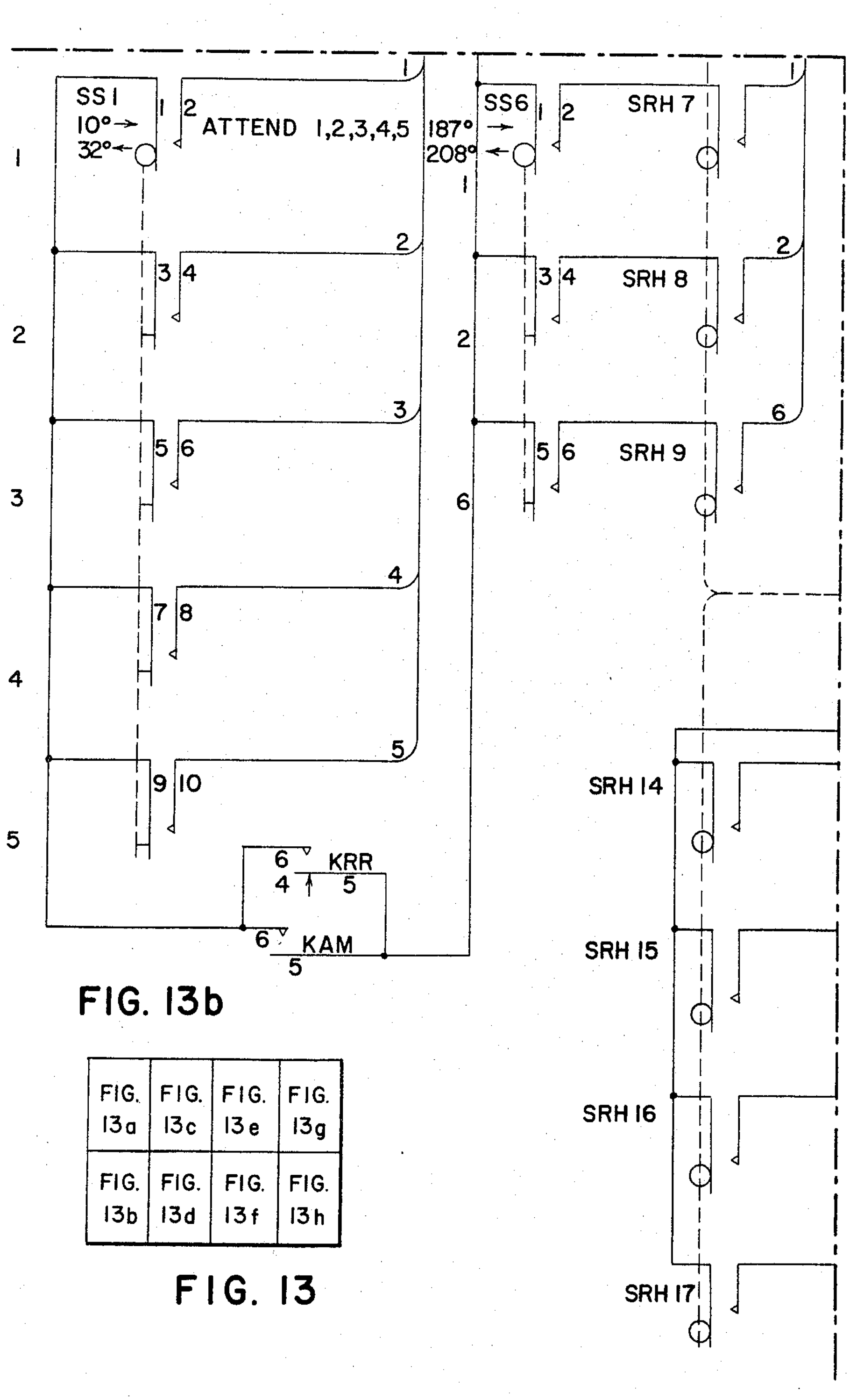
Figure 13A:
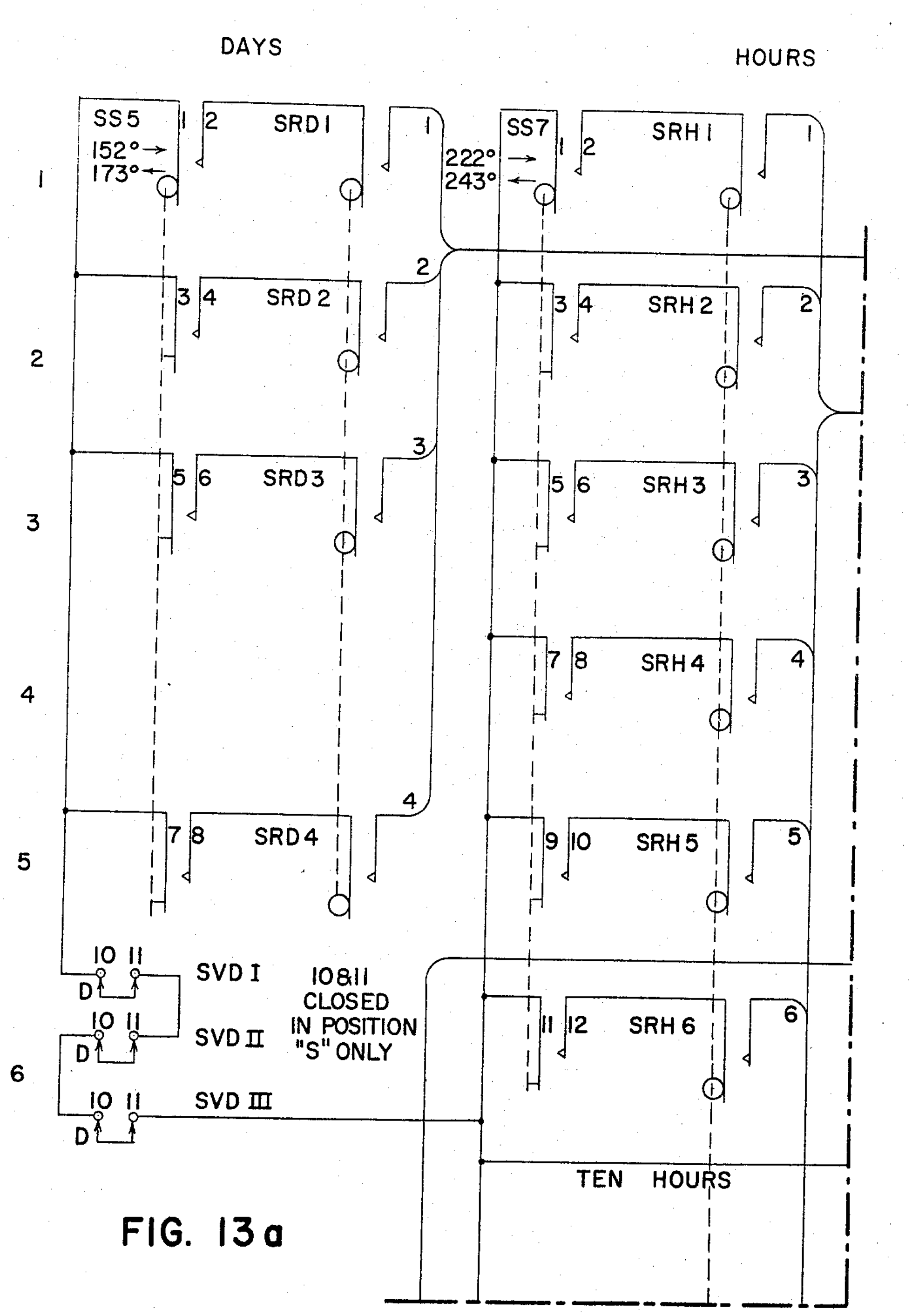
Figure 13C:
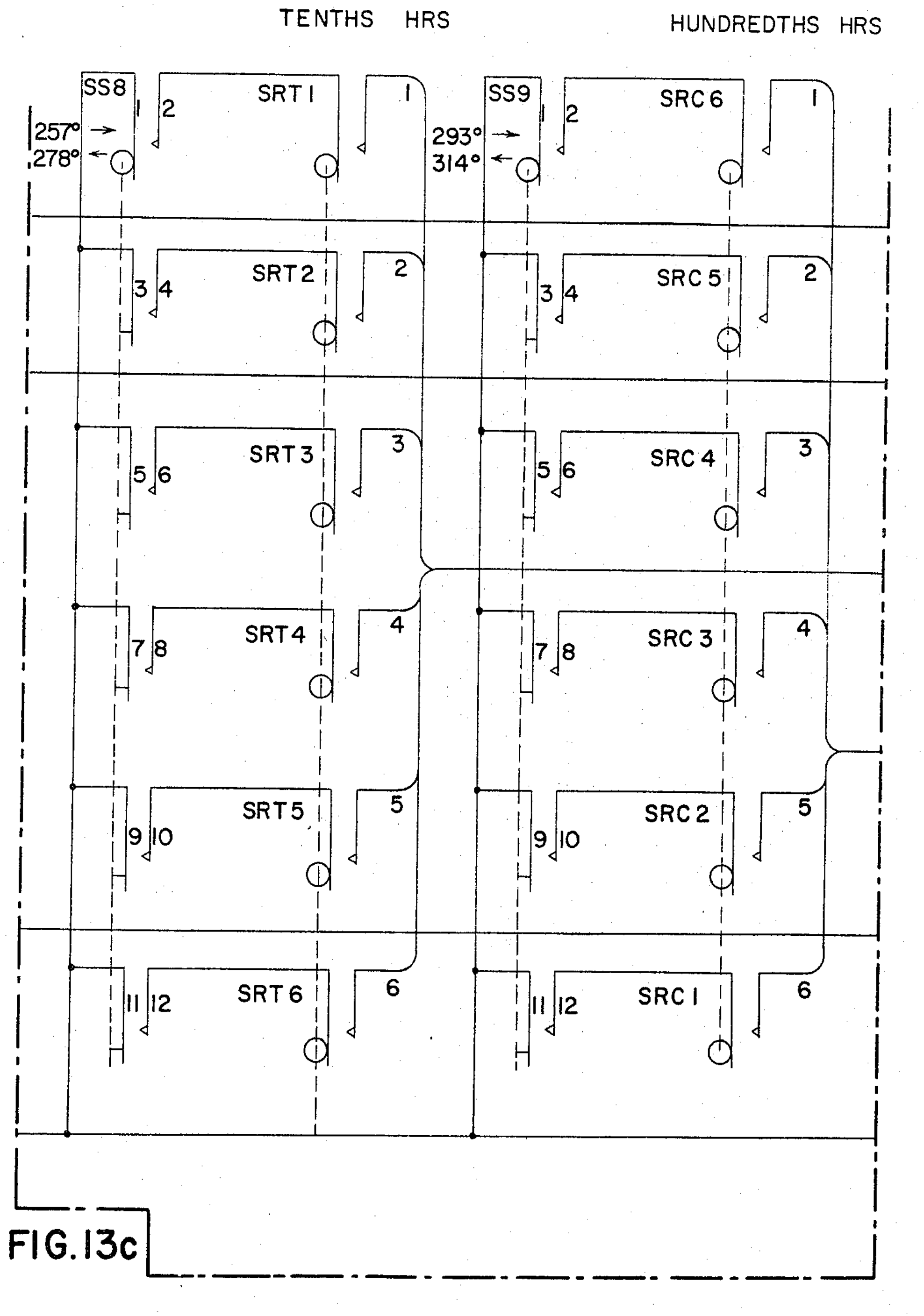
Figure 14A:
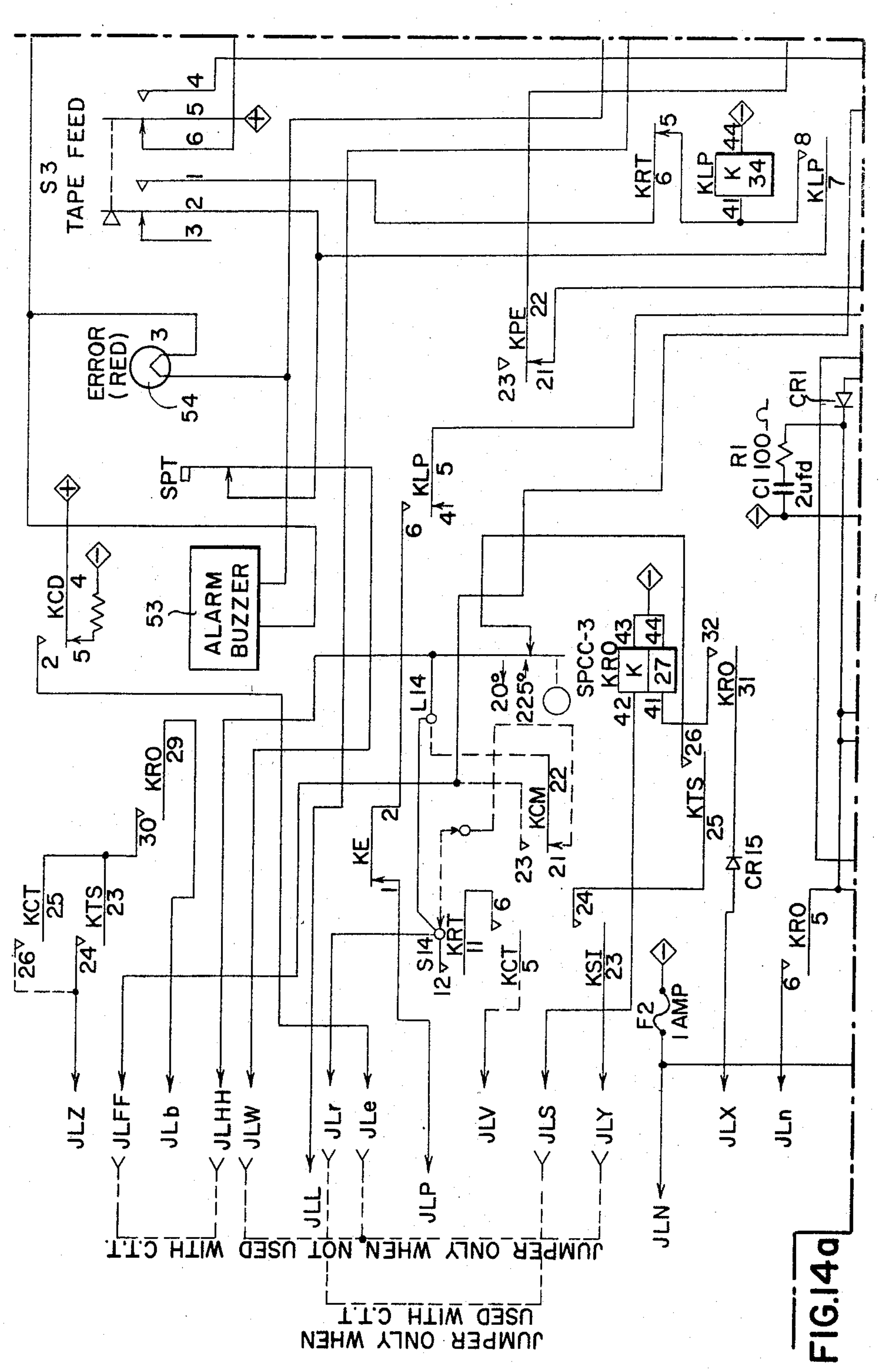
Figure 14B:
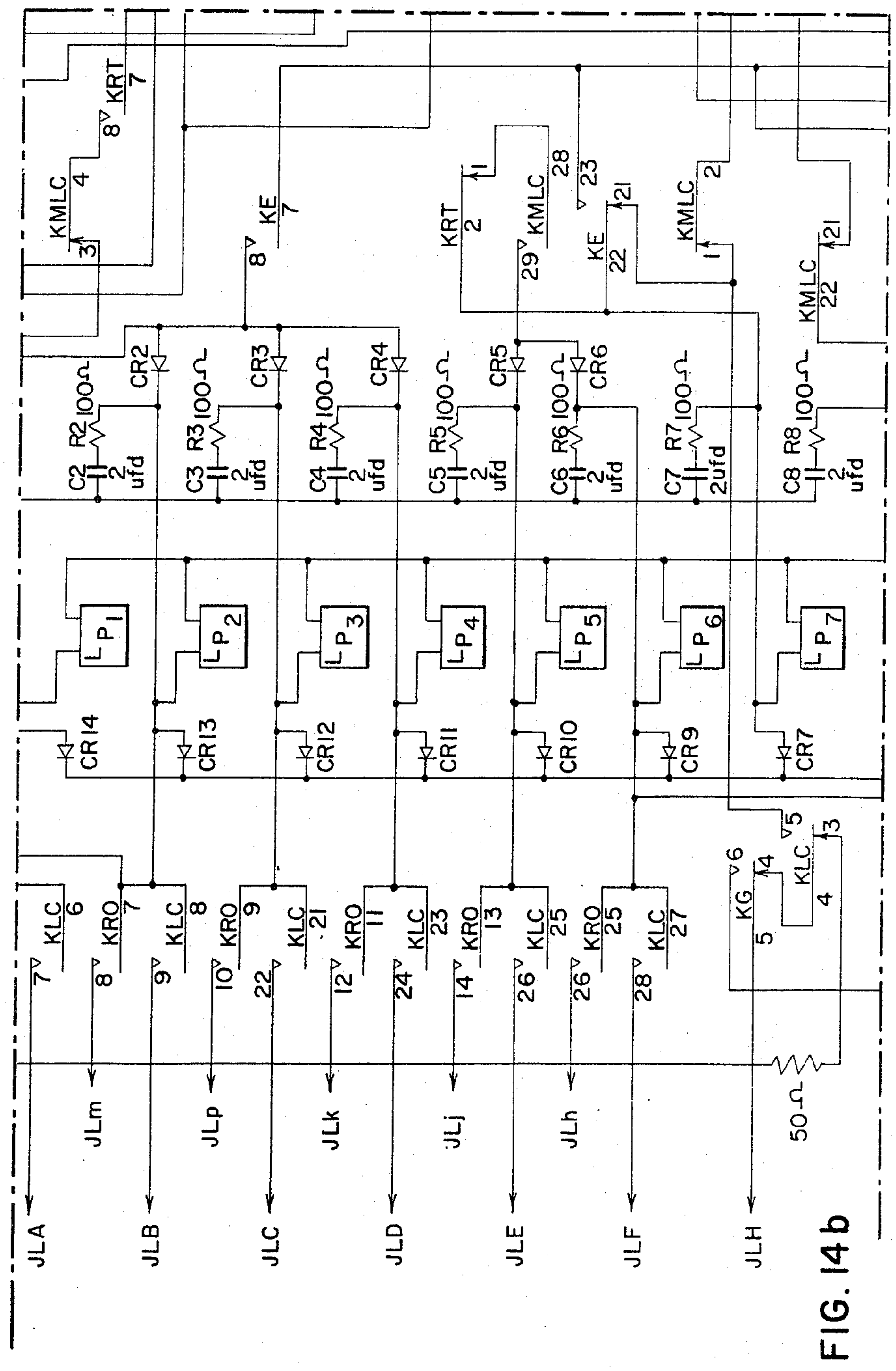
Figure 14C:
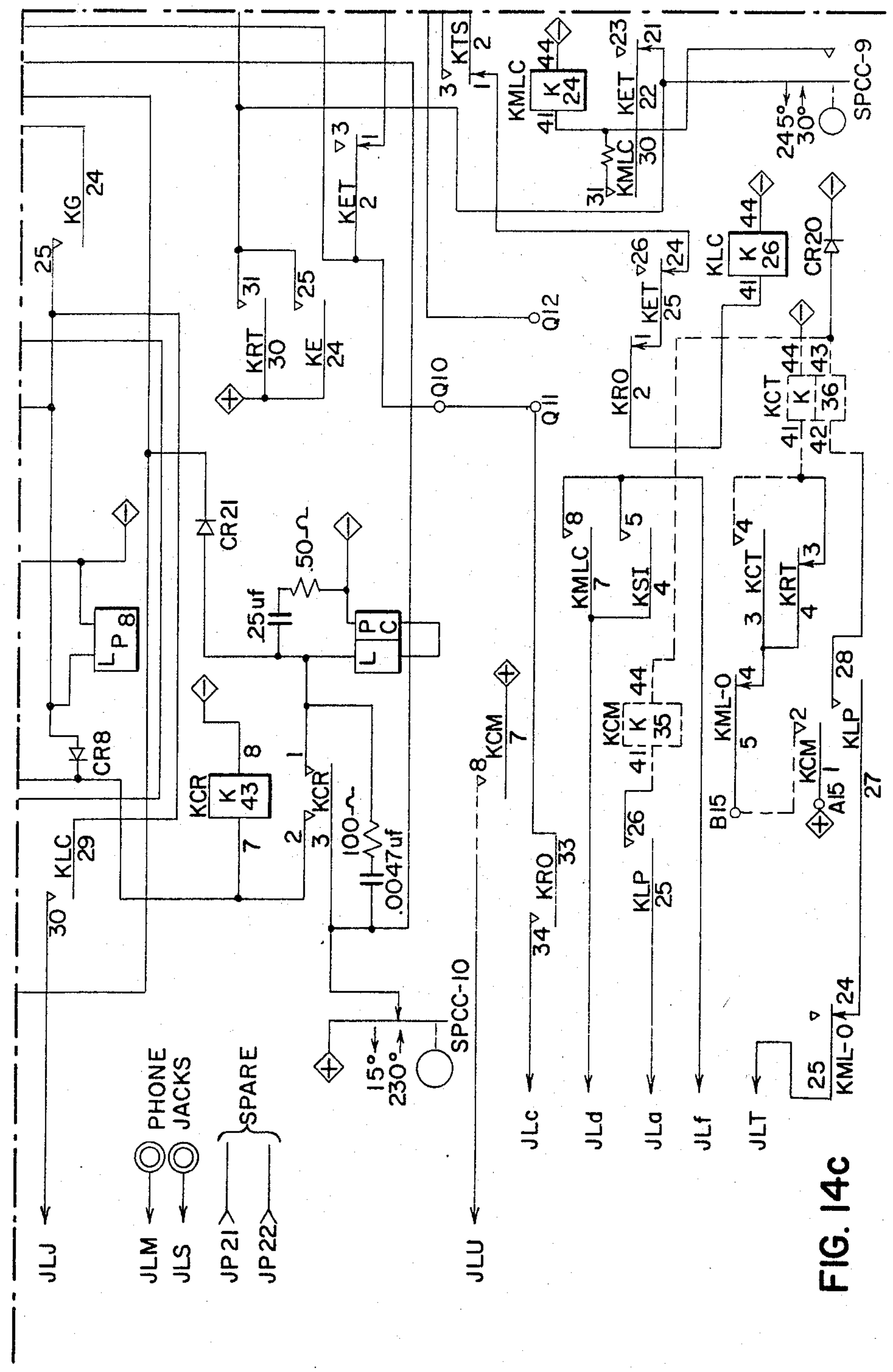
Figure 14D:
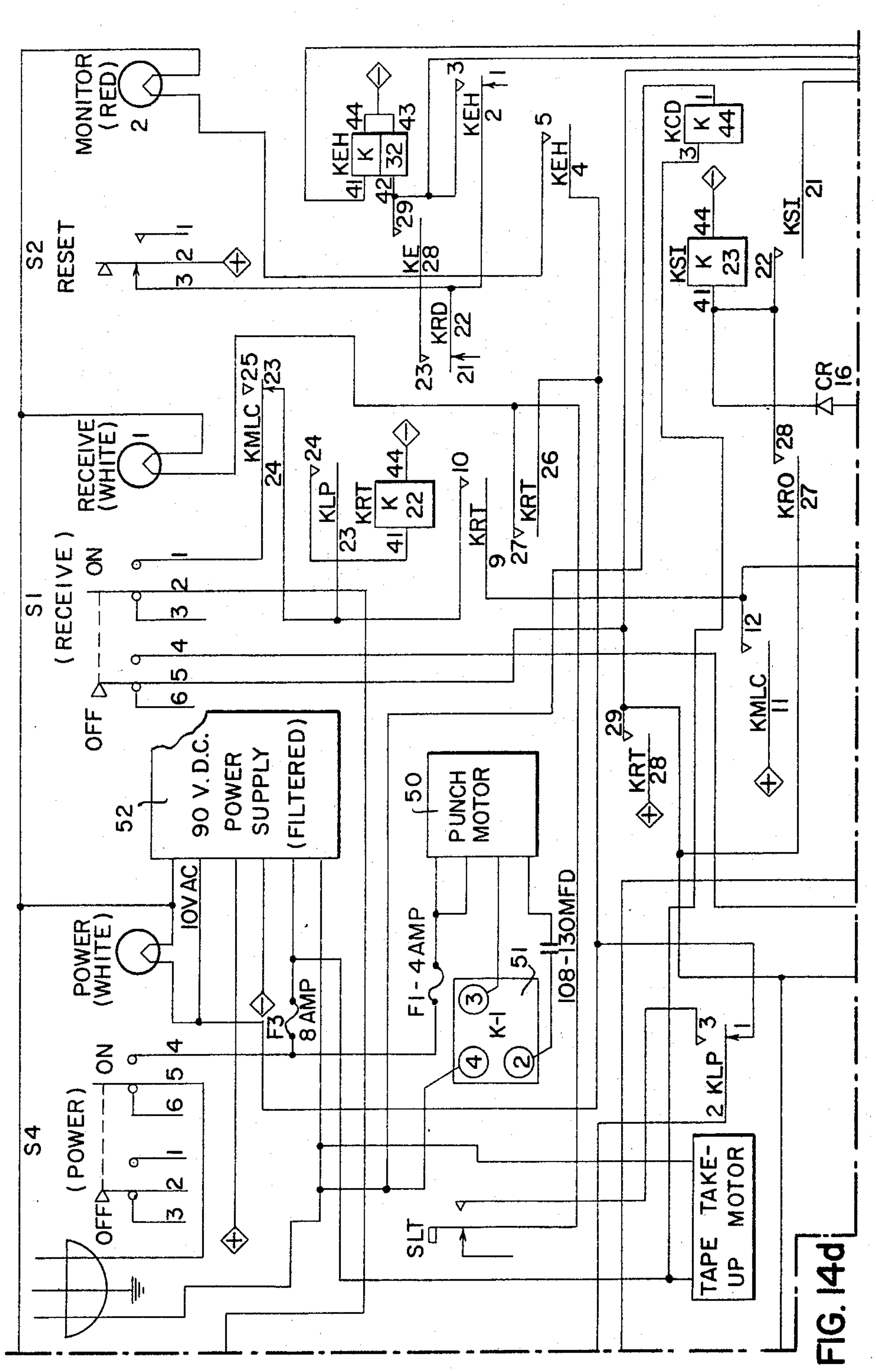
Figure 14E:
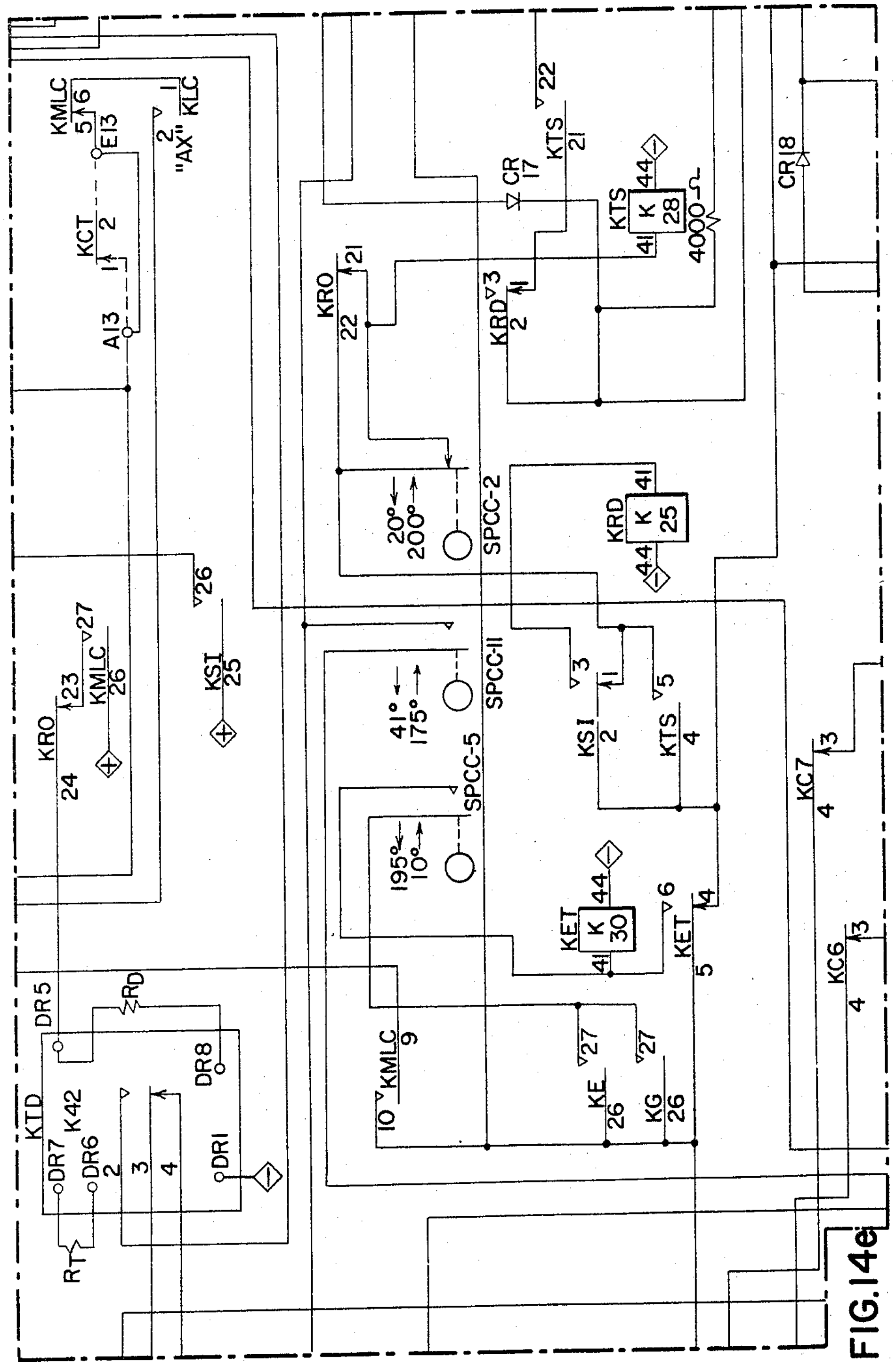
Figure 14F:
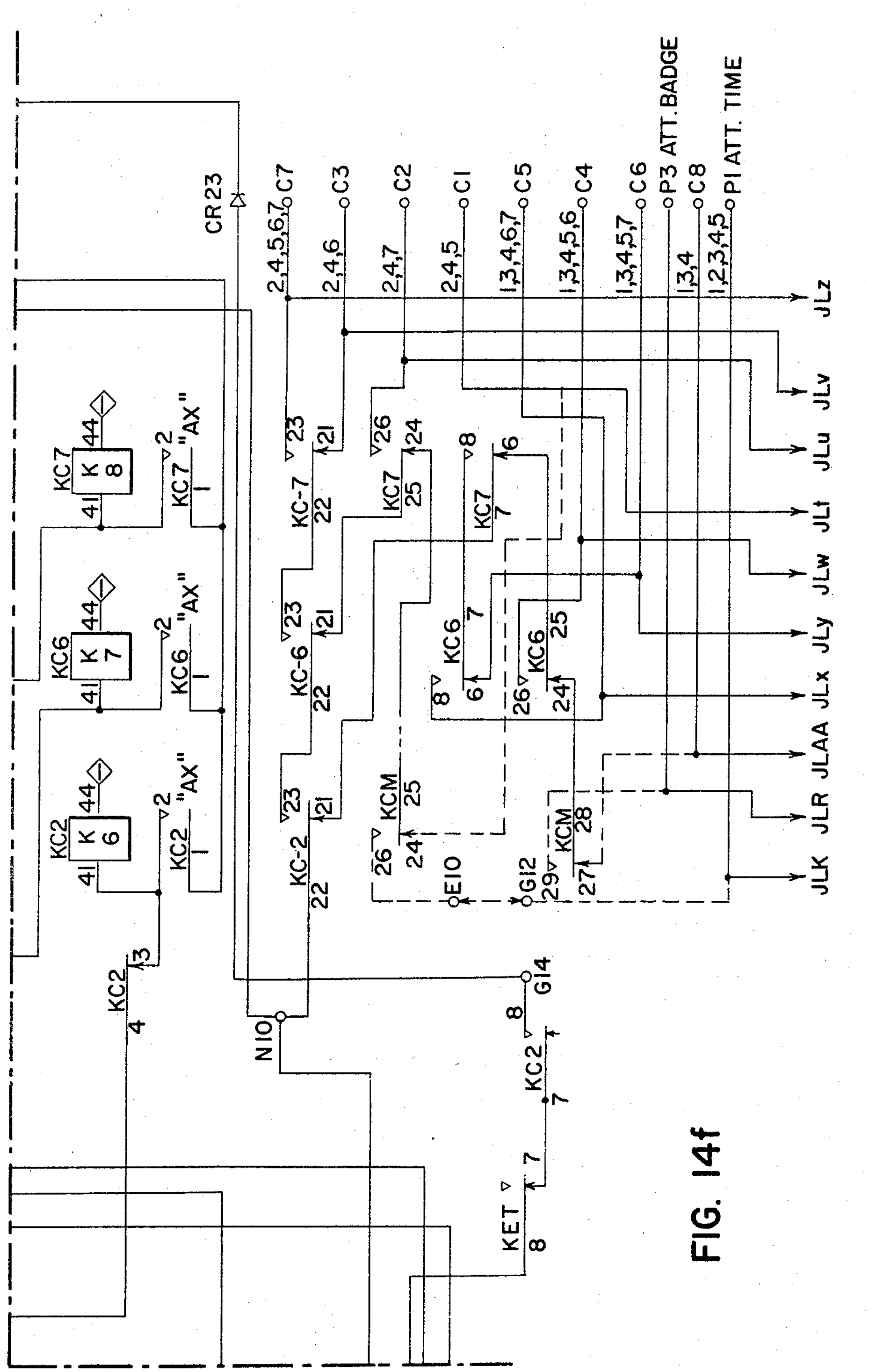
Figures 14, 14G:
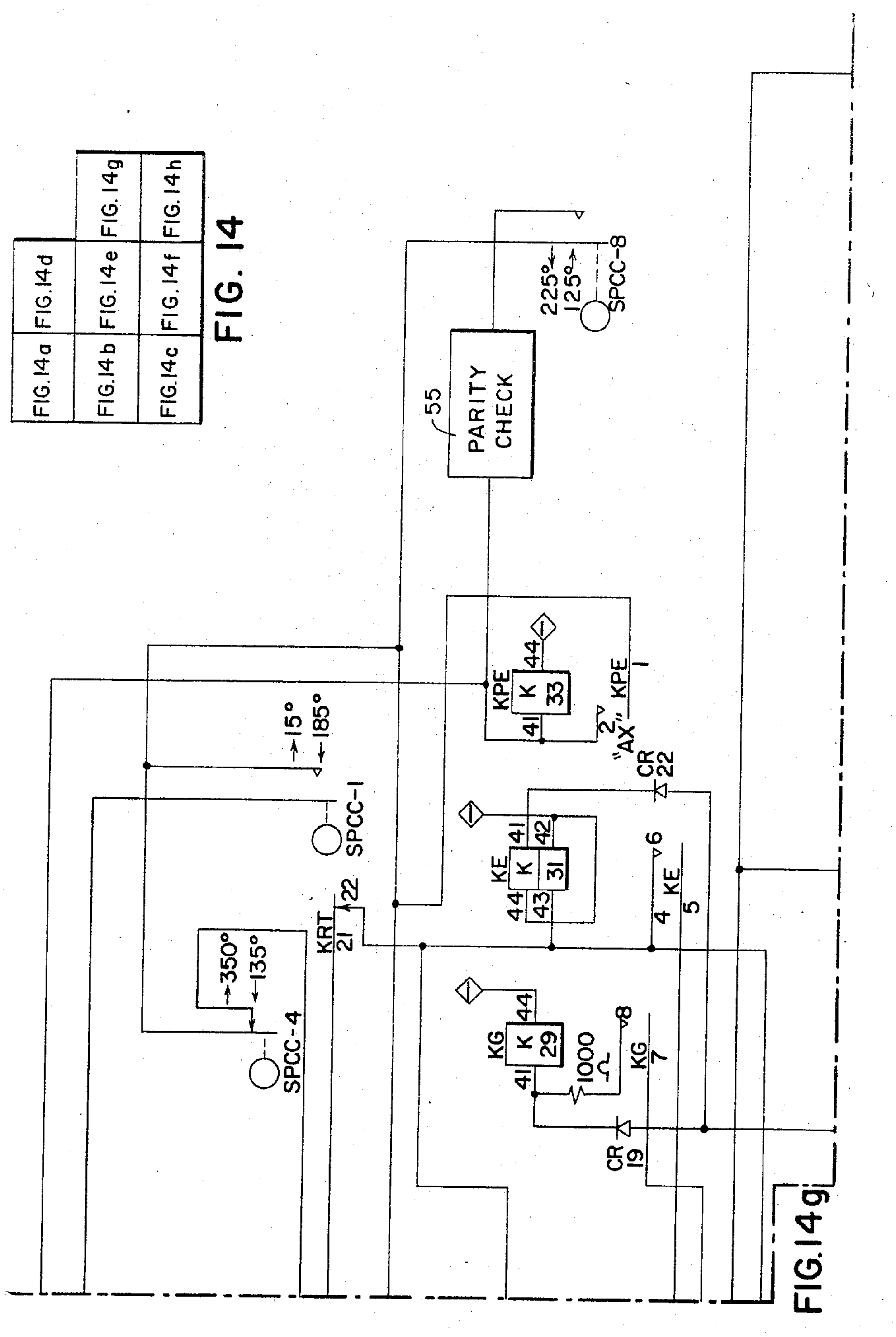
Figure 14H:
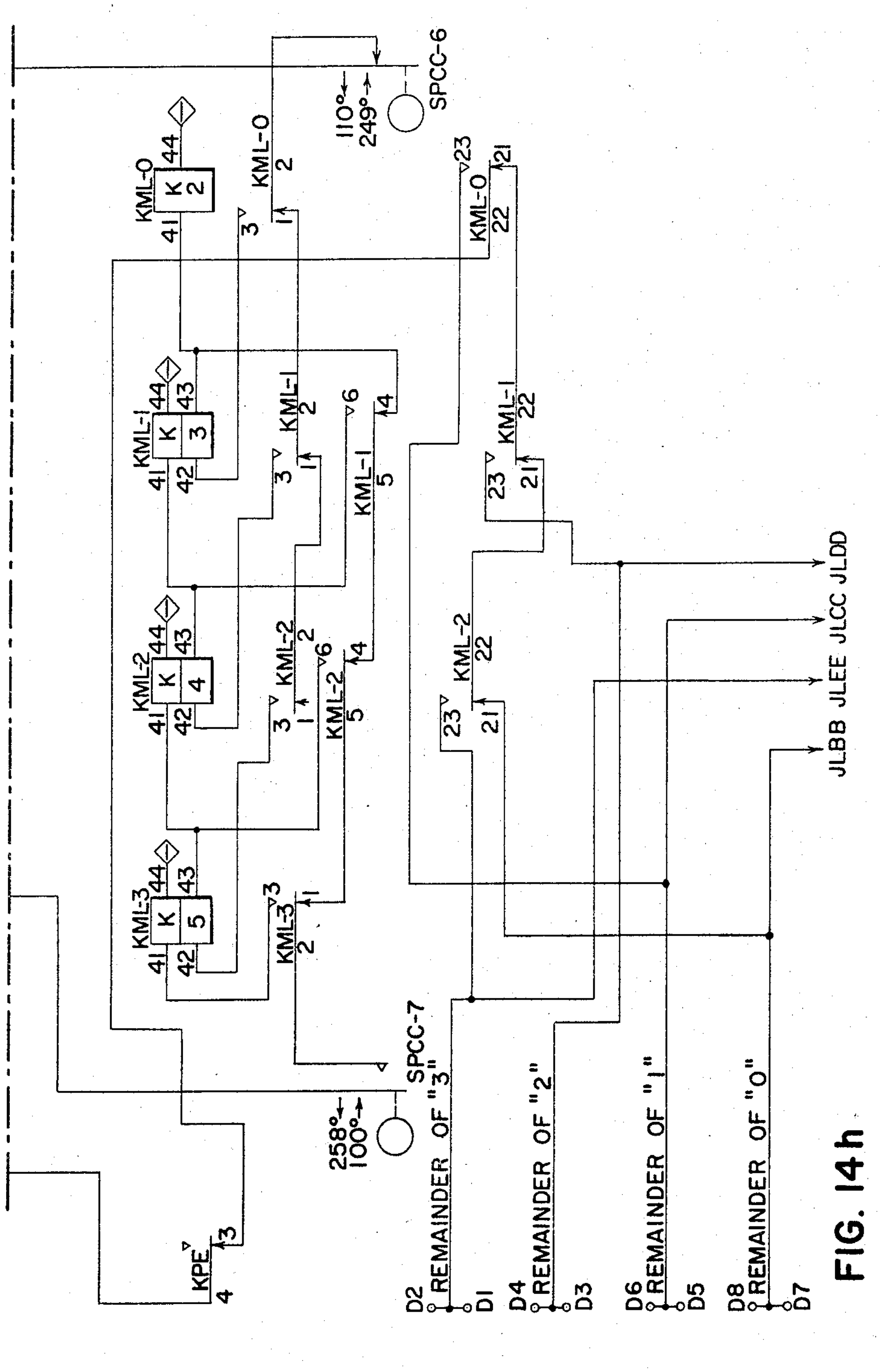
Figure 15A:
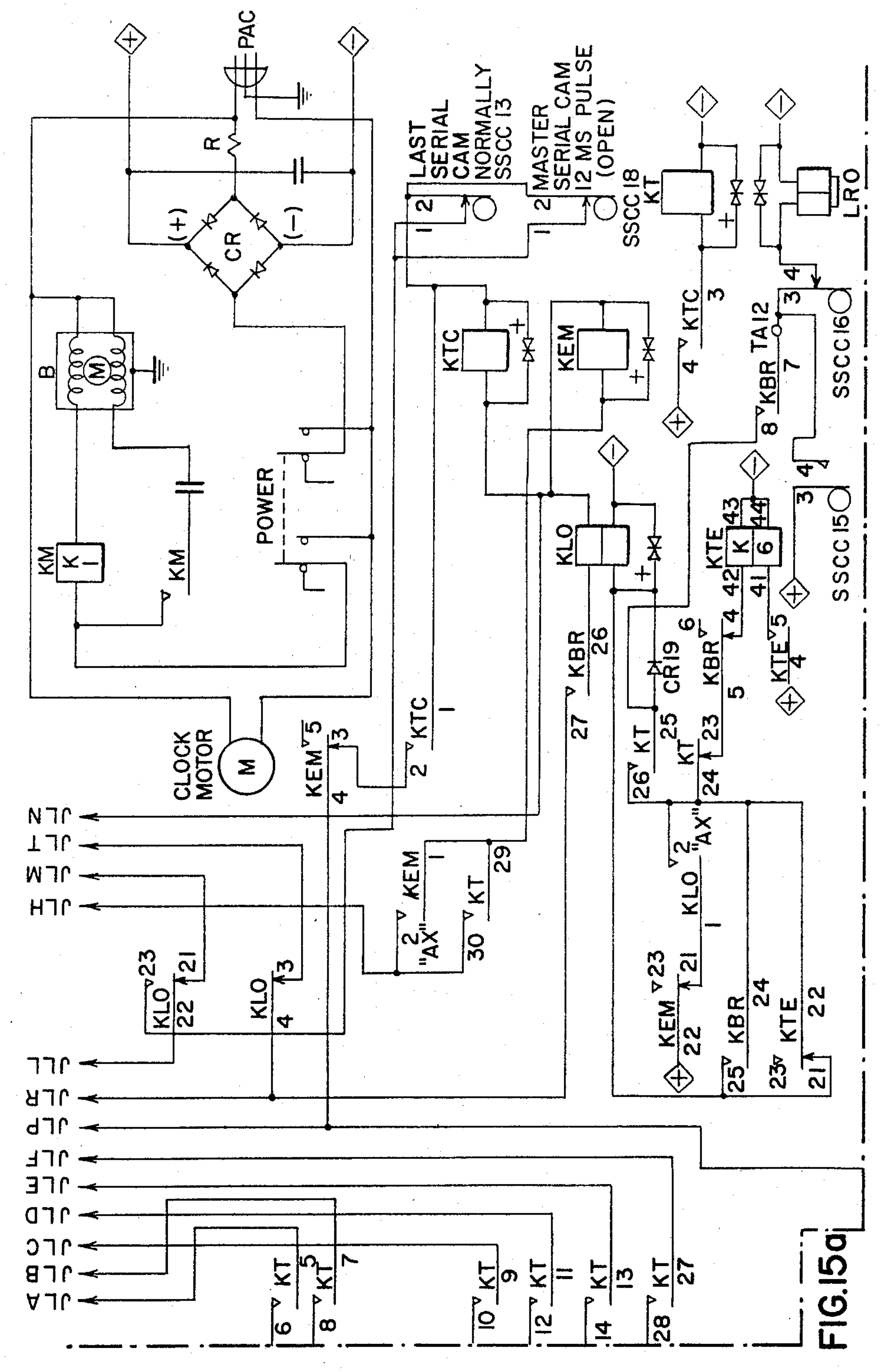
Figures 15, 15B:
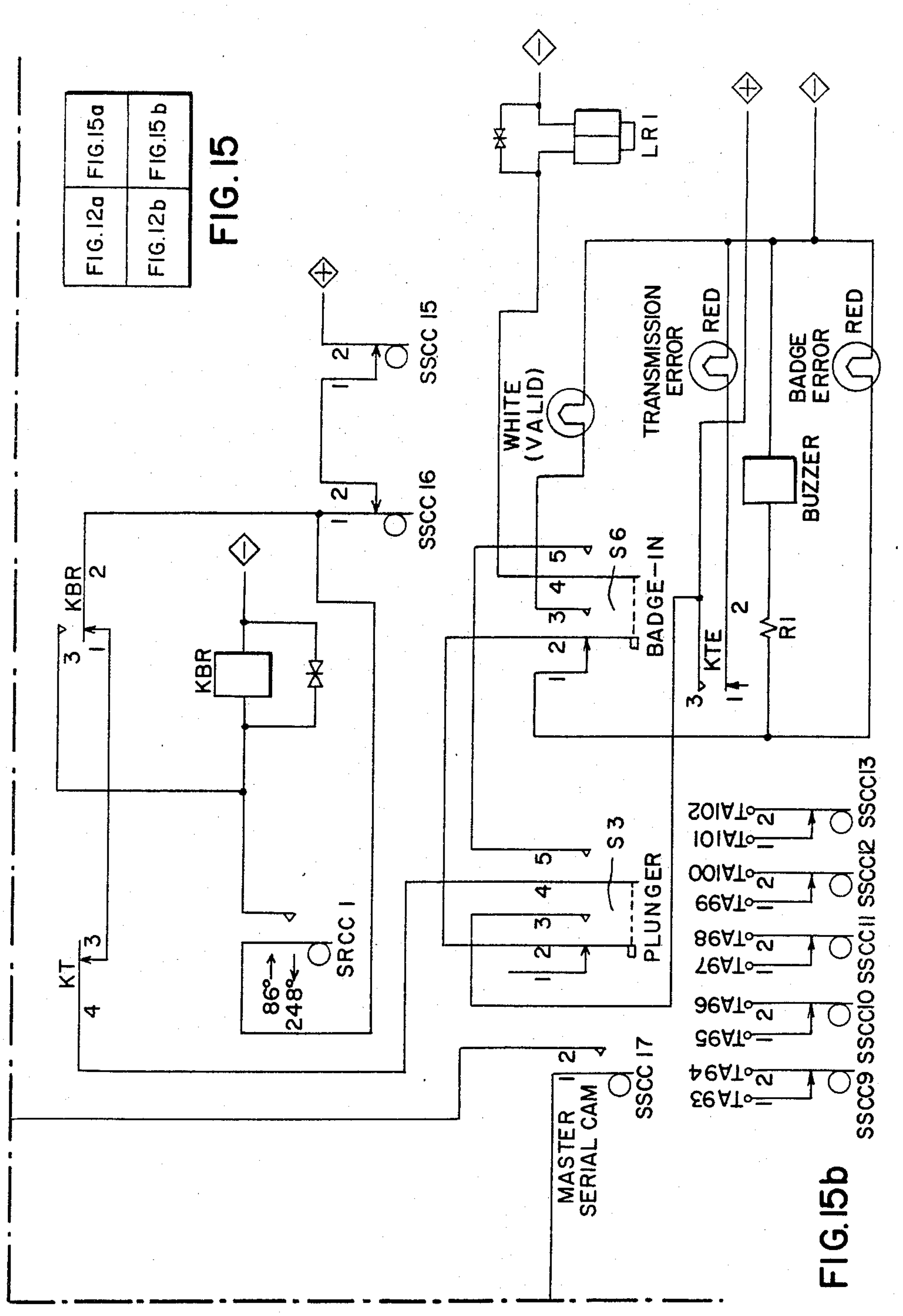

FIGS. 7*a*–7*j* arranged as in FIG. 7 and FIGS. 8*a*–8*i* arranged as in FIG. 8 together show the electrical circuit diagram of a data transmitter of the FIG. 4 type;

FIGS. 9*a*–9*j* arranged as in FIG. 9, FIGS. 10*a*–10*i* arranged as in FIG. 10, and FIGS. 11*a*–11*b* arranged as in FIG. 11 together show the electrical circuit diagram of a data transmitter of the FIG. 5 type;

FIGS. 12*a*–12*d* arranged as in FIG. 12 show the electrical circuit diagram of the FIG. 6 badge transmitter;

FIGS. 13*a*–13*h* arranged as in FIG. 13 show the electrical circuit of the control and time transmission unit 14 of FIG. 1;

FIGS. 14*a*–14*h* arranged as in FIG. 14 show the electrical circuit arrangement of the receiver-recorder unit 15 of FIG. 1; and FIGS. 15*a*–15*b* when used in conjunction with FIGS. 12*a* and 12*b* all arranged as in FIG. 15 show the electrical circuit diagram of a modified form of badge transmitter.

GENERAL ORGANIZATION AND OPERATION

An illustrative form of a complete data collection system embodying the present invention is schematically represented in block diagram form in FIG. 1 of the drawings. By way of illustrative example, the system is considered as including at four data originating locations various configurations of data transmitters each having a complement of equipment suitable for transmission of the particular type or types of data originating at the location. Thus at location or station No. 1, the transmitter 10 includes two readers for reading conventional tabulating cards, and also includes provision for manual insertion of additional data such as in factory operations the identification of the transmitting locality and the character and extent of a fabrication operation completed. The data transmitter at the data originating location or station No. 2 includes a transmitter 11 having a reader for reading conventional tabulating cards, a reader for reading data recorded in the identifying badge furnished the employe making the data transmission (usually the operator who has performed the fabrication process or other transaction reported), and provision for the manual insertion of pertinent data. The data originating location or station No. 3 is shown by way of example as merely including an identification badge reader and transmitter unit 12 such as might be utilized at an appropriate location in a plant or facility for employe attendance reporting. The data originating source or station No. 4 is represented as including a transmitter 10 like that used at station No. 1, comprised by two tabulating card readers with additional provision for manual insertion of data, together with a badge reader 12′ equivalent to that at station No. 3 but used both for attendance reporting during certain times of the day and for identification of personnel making data reports during the normal working hours of the day.

All of the data transmitting equipments of the several stations just described transmit data through a common multi-conductor transmission channel 13 extending through a central control unit 14 to a central receiver-recorder unit 15 where the received data is recorded in machine-sensible form as by use of punched paper tape. There may be recorded with this data the time of data transmission as furnished by the central control unit 14. The latter unit also contains provision for manually or automatically changing the system operation, through a control channel 16 extending through the receiver-recorder unit 15 to each of the station transmitters, to one where all badge readers in the system operate only for attendance reporting or alternatively to a system operation where badge readers in the system identify each person performing a data transmission. The control channel 16 also includes a system electrical priority interlock control presently to be described.

Before considering in more detail the nature and arrangement of the various complements of equipment which make up the transmitters used at each data originating locality, attention will first be directed to the electrical priority interlock control last mentioned and which is used in the data collection system to insure high efficiency of system operation with freedom from interference by the transmitter at one locality on that at another locality.

Figure 2:
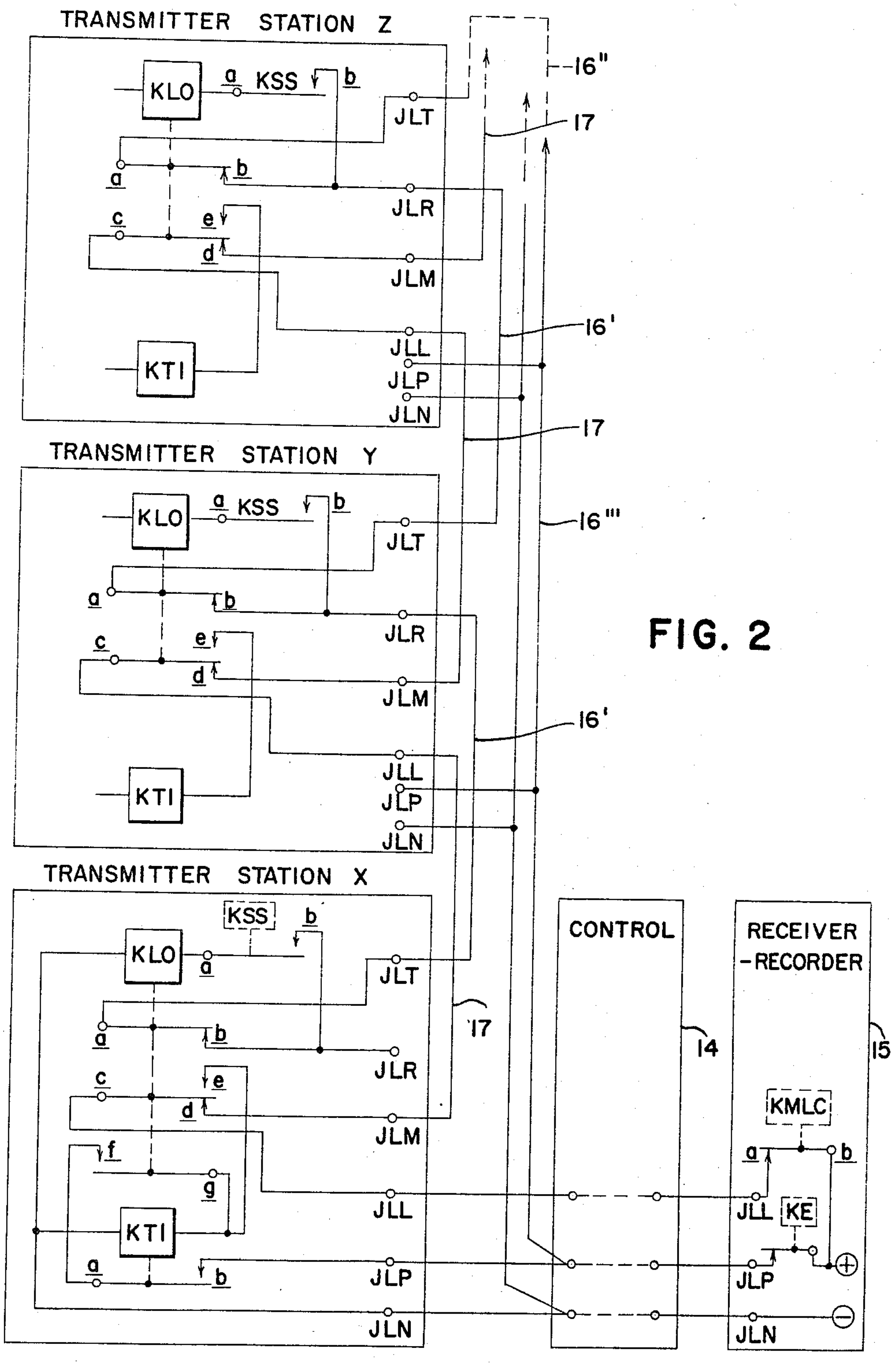
FIG. 2 is a simplified circuit diagram of an electrical priority interlock control used between the equipments located at data originating sources and effective to attain high efficiency of system operation consistent with minimized system and installation costs.

This electrical priority interlock control has the circuit arrangement represented in simplified form in FIG. 2 for three representative data transmitting stations identified generally as X, Y and Z. This general identification of the transmitting stations by alphabetic characters is adopted for the reason that the electrical interlock components hereinafter described are used at each transmitter station without regard to the complement of data transmitting equipments used in the transmitter.

As will presently be explained more fully, each transmitting station having a tabulating card reader also is provided with a transaction selector manually set by the operator preliminary to each data transmission and identifying a particular category or class of data with which the transmission is concerned. This transaction selector not only identifies the type of transaction reported by the data transmission, but assists the operator in performing the manual insertion of data manually set into the transmitter and in reminding him that one or more tabulating cards should be manually inserted in one or both tabulating card readers provided and that a badge should be inserted in a badge reader when provided. Having accomplished the required manual data insertion, having further inserted the required tabulating card or cards in the tabulating card readers provided, and having lastly inserted a badge in a badge reader if provided, the operator depresses a start button. The transmitter thereupon performs an automatic check operation to ascertain that manual data insertion dials have been properly set as required by the transmission selector, that the system is not at that time operating in the attendance reporting mode, that a tabulating card has been properly inserted in each tabulating card reader if such is required, and that a badge has properly been inserted in a badge reader if this is required by the character of data to be transmitted. Upon completing this automatic check operation and finding no error in the preliminary set-up conditions required, a relay KSS is energized to signify readiness of the transmitter to perform a transmission operation and to initiate demand for access to the central receiver-recorder unit 15.

Energization of the relay KSS as last described effects closure of its contacts *a* and *b* for the purpose of energizing a lockout relay KLO through an energizing circuit which includes normally closed contacts of lockout relays provided in each of the other transmitters considered in their order of arrangement in the system. Specifically, the energizing circuit of the lockout relay KLO of the transmission station X extends from a negatively energized output line terminal JLN of the receiver-recorder unit 15 through the control unit 14 to the energizing winding of the relay KLO; through the now closed contacts *a* and *b* of the relay KSS (assuming that station X is requesting access to the central receiver-recording unit 15) and through normally closed contacts *a* and *b* of the relay KLO to the output line terminal JLT of this transmitter station; through a control circuit conductor 16′ to an input terminal JLR of the higher order transmitter station Y and through normally closed contacts *a* and *b* of the relay KLO of this station to the output terminal JLT of the station; through a further extension of the control circuit conductor 16′ to the input terminal JLR of the even higher order tranmitter station Z; through the normally closed contacts *a* and *b* of the relay KLO of this station and to its output terminal JLT; and in similar manner through extensions of the control circuit involving normally closed contacts of KLO relays of yet higher order transmission stations (indicated by the broken line conductor 16″) to a control circuit conductor 16‴ which is positively energized through the control unit 14 from the output terminal JLP of the receiver-recorder unit 15 in the absence of energization of an error relay KE of the latter.

Once the lockout relay KLO becomes energized, it maintains its energization through a hold circuit (not shown for simplicity) energized internally of the individual transmitter station. The lockout relay remains so energized until the transmitter station generates and transmits to the receiver-recorder unit 15 an "end-of-message" signal and receives back from the latter a "message received good" signal, or until the transmitter station receives from the receiver-recorder unit 15 an error signal indicating that erroneous data has been received. It will be evident from the energizing circuit last traced that no lower order transmitter can have its lockout relay KLO energized if the lockout relay of any higher order station is energized at the time the lower order station energizes its relay KSS.

Whenever the lockout relay KLO of a transmitter station becomes energized in the manner last explained, its contacts *c*, *d* and *e* transfer to energize a secure lockout relay KT1 of the station. For the transmitter station X, this energizing circuit extends from the negatively energized output circuit JLN of the central receiver-recorder unit 15 through the input terminal JLN of the transmitter station to the energizing winding of the relay KT1, and extends from the latter through the now closed contacts *c* and *e* of the lockout relay KLO to the station line terminal JLL which is positively energized from the output terminal JLL of the receiver-recorder unit 15 in the event that a relay KMLC of this unit is not energized at this time. The secure lockout relay KT1 remains energized either (1) from the positive energization supplied from the positively energized output terminal JLP of the receiver-recorder 15, this energizing circuit including the now closed contacts *a* and *b* of the relay KT1 and the now closed contacts *f* and *g* of the relay KLO, or (2) by the original energizing circuit extending through the transfer contacts *c* and *e* of the relay KLO. Thus the lockout secure relay KT1 is de-energized with the relay KLO at the end of a data transmission or upon receipt of an error signal from the receiver-recorder unit 15 which interrupts the hold circuit of the relay KLO as earlier explained.

It will be noted that the normally closed contacts *c* and *d* of the lockout relay KLO in each transmitter station complete a closed circuit between the input terminal JLL and an output terminal JLM of the transmitter. A control conductor 17 connects the output terminal JLM of each lower order transmitter to the input terminal JLL of the next higher order station. Since the secure lockout relay KT1 is energized under control of its associated lockout relay KLO by reason of energization applied to the transmitter input terminal JLL, it will be evident that energization of the lockout relay KLO of any lower order station prevents energization of the secure lockout relay KT1 of all higher order stations. The energization of both the lockout relay KLO and the lockout secure relay KT1 of each transmitter station is required before that station may transmit data to the receiver-recorder unit 15. Thus while the energization of the lockout relay KLO of an intermediate order station prevents energization of the lockout relay of lower order stations, it does not prevent energization of the lockout relay of higher order stations. At the same time, however, the intermediate order stations upon energizing its secure lockout relay KT1 prevents energization of the secure lockout relays of higher order stations so that the latter are unable to initiate data transmissions until the transmissions of the intermediate order transmitter have been completed. Accordingly, an essentially concurrent demand by several transmitter stations for access to the receiver-recorder unit 15 are honored successively in the order of arrangement of the demanding stations from lower to higher order thereof in the data collection system.

Figure 3:
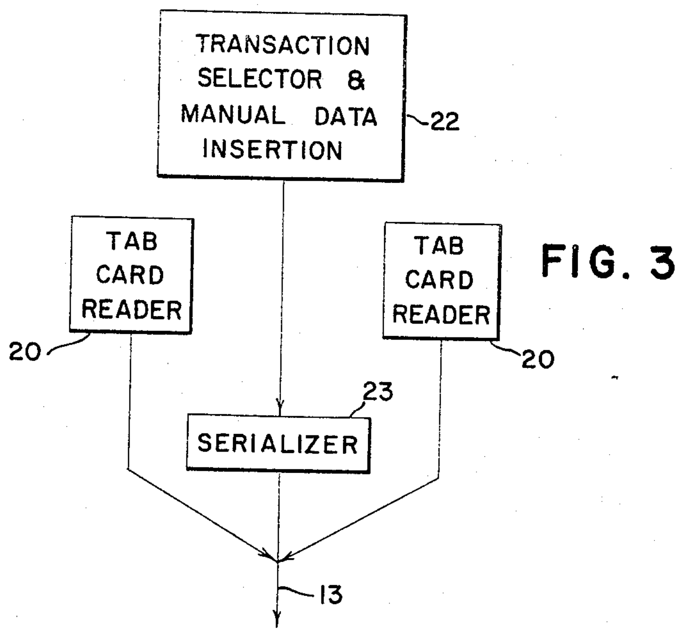
FIGS. 3–6 represent schematically in block diagram form various complements of equipments which may be used at each data originating location according to the various characters of data originating at the location and which is to be collected from time to time at a central location.

The complement of data translation equipments making up the transmitter station 10 in FIG. 1 are indicated in block diagram form in FIG. 3. The equipment includes two tabulating card readers 20, each of which may have the construction disclosed and described in the copending Edwin O. Blodgett application Serial No. 249,228, filed January 3, 1963, entitled "Tabulating Card Reader," and likewise disclosed in the copending application of Wilbur C. Ahrns Serial No. 249,202, filed January 3, 1963, entitled "Tabulating Card Reader," both of which applications are assigned to the assignee of the present application. There is also included in the arrangement of FIG. 3 a transaction selector and manual data insertion unit 22 which may have the construction disclosed in the Edwin O. Blodgett application Serial No. 254,992, filed January 30, 1963, now Patent No. 3,227,847, granted January 4, 1966, entitled "Transaction Selector," and which is also disclosed in the copending application of Warren T. Van Buskirk Serial No. 254,991, filed January 30, 1963, entitled "Transaction Selector," both of which applications are assigned to the assignee of the present application. The FIG. 3 arrangement lastly includes a serializer 23 which may have the construction disclosed in the copending application of Edwin O. Blodgett, Serial No. 254,990, filed January 30, 1963, now Patent No. 3,204,051, granted October 31, 1965, entitled "Electrical Time Control Device," and assigned to the same assignee as the present application. As explained in the copending applications above identified, each of the tabulating card readers 20 operates to read successive alphanumeric characters, symbols, or functional control items of information recorded in a conventional tabulating card inserted into reading position in the reader. As will presently be pointed out more fully, the tabulating card readers 20 read their tabulating cards one at a time and in succession, and transmit the data read from the card through the common data communication channel 13 which as earlier explained extends to the central receiver-recorder unit. The units of FIG. 3 have inter-related order of operations which will now be briefly considered. The first data transmitted is a single digit transaction code which is manually inserted into the unit 22 and expresses the character or type of data which is the subject of each data transmission. This transaction code is the first one transmitted by the serializer 23 through the common transmission channel 13, and may be followed by certain data (hereinafter called "semi-variable" dial data) which is manually set into a data insertion unit, not shown, serving to identify the particular transmitting station. Thereafter at least one of the tabulating card readers 20 is placed into operation and, depending upon the transaction program manually selected by the setting of the transaction selector, completion of reading by the first card reader may be followed by the reading of a card placed in the second of the card readers 20. While reading operation is in progress, it may be temporarily halted by a functional code read from a card calling for selection by the serializer 23 of data manually inserted into the unit 22. Each transmission terminates upon completion of reading operation by the transaction program selected card reader or readers.

The complement of equipment included in the transmitter station 11 of FIG. 1 is represented in block diagram form in FIG. 4 and includes a tabulating card reader 20, a transaction selector and manual data insertion unit 22, and a serializer 23 all having the same construction and character of operation as described in reference to FIG. 3. In addition, the FIG. 4 arrangement includes a badge reader 24 which may have the construction disclosed in the Edwin O. Blodgett copending application, Serial No. 249,252, filed January 3, 1963, entitled "Coded Information Punched-Card Reader," and assigned to the same assignee as the present application. As explained in this Blodgett application, the reader 24 is particularly suited to read punch-code recorded information of a personnel identification badge, and is accordingly herein referred to as a badge reader. It operates to read concurrently all numeric coded digits recorded in successive digit recording positions of the badge, and the recorded digits thus read from the badge are stored in the reader until they are readout in succession by the serializer 23 to the common data transmission channel 13. This serializer read-out may occur (according to the system arrangement as will hereinafter be explained) prior to initiation of reading operation by the tabulating card reader 20, subsequent to completion of reading operation by the latter, or when the tabulating card reader during its operation reads a functional code which temporarily halts the reader operation while the serializer 23 reads data stored in the badge reader to the data channel 13.

The complement of equipment included in the transmitter station No. 4 of FIG. 1 is shown schematically in block diagram form in FIG. 5. It includes two tabulating card readers 20, a transaction selector and manual data insertion unit 22, a serializer 23, and a badge reader 24 all having the constructions and modes of operation just explained in reference to FIGS. 3 and 4.

The transmitter station No. 3 shown in FIG. 1 is comprised simply by a badge reader 24 and a serializer 23 as schematically shown in block diagram form in FIG. 6. These units have the construction of the corresponding units just described with reference to FIGS. 3–5. As explained in the aforementioned copending Blodgett application relating to the reader 24, the operation of this reader is initiated upon the manual insertion into reading position in the reader of a badge, the reader immediately completing a cycle of operation to retain, until a subsequent reading cycle, all information read from the badge. The serializer 23 is then placed into operation as soon as the station gains access to the data common communication channel 13 and reads the stored data of the reader 24 to the data channel 13.

OVERALL SYSTEM ELECTRICAL CIRCUIT ARRANGEMENT

It will be evident from the foregoing general description of the data collection system that various types and configurations of data transmitters may be employed in the system according to the particular application concerned. In this, it will be understood that the FIG. 1 system is merely intended to indicate the several representative types of data transmitter stations which may be used in a data collection system embodying the invention. A typical such system in practice will ordinarily use a larger number of one or more of any of the types of data transmitters shown in FIG. 1, but the transmitters of each type will duplicate one another both in their complement of data translation equipments and their electrical circuit arrangement.

Accordingly, the electrical circuit arrangement of the overall data collection system is most conveniently described in relation to the circuit arrangement of each of the several typical types of data transmitter stations shown in FIG. 1 and utilizing complements of data translation equipments as shown and described in connection with FIGS. 3–6. This will be followed by a description of the circuit arrangement of the receiver-recorder unit 15 of FIG. 1, and will conclude with a description of the electrical circuit arrangement of the central control and time transmitting unit 14.

A description will first be given of the electrical circuit arrangement of a data transmitter corresponding to the transmitter station 11 of FIG. 1 and utilizing the complement of data translation equipments shown in FIG. 4. This will be followed by a description of the electrical circuit arrangement of the transmitter station No. 4 of FIG. 1 which, as described in reference to FIG. 5, utilizes two tabulating card readers with provision for manual data insertion and to this extent duplicates and is descriptive of the transmitter 10 utilized in the transmitter station No. 1 of the FIG. 1 system. The electrical circuit of the transmitter station No. 3 of FIG. 1 will be described separately.

1. *Electrical circuit arrangement of the FIG. 4 data transmitter*

The electrical circuit arrangement of the FIG. 4 data transmitter is conveniently considered in two sections. The first of these is shown in FIGS. 7*a*–7*i* arranged as in FIG. 7 and the other is shown in FIGS. 8*a*–8*i* arranged as in FIG. 8. The circuit section shown in FIG. 7 generally concerns various functions performed by relay control, and that of FIG. 8 generally relates to data transmission functions. There are, however, a number of circuit interconnections and controls between these two circuit sections which necessitate consideration of them together.

As indicated in FIG. 7*i*, the transmitter includes a synchronous drive motor B with starting relay KM which is energized from an alternating current power source PAC upon manual actuation of a "POWER" toggle switch to close its contacts. This switch also energizes a conventional unidirectional power supply system which includes rectifier diodes CR. The motor B drives a power take-off shaft, not shown, from which mechanical drive power is obtained for driving the tabulating card and badge readers and the serializer, and for resetting the manual data inserting unit at the end of each data transmission.

It will be assumed at the outset that, as explained in reference to FIG. 4, a manual setting of the transaction selector of the unit 22 has been made to indicate the type of transaction with which a transmission is concerned, that manual insertion of data as required has also been set into the semi-variable data insertion portion of unit 22, that a tabulating card has been placed in reading position in the tabulating card reader 20, and that a badge has been inserted into the badge reader 24.

The transmitter is now placed into operation by manual actuation of a start switch S1 (FIG. 8*a*) to close its contacts 1 and 2 and thereby energize a dial good relay KDG through normally closed contacts 1 and 2 of an attendance relay KRA (this relay being energized only when the entire data collection system is operated for short periods in the personnel attendance reporting mode), the normally closed contacts 1 and 2 of a relay KA1, the contacts 1 and 2 of the switch S1, the normally closed contacts 21 and 22 of the secure lockout relay KT1, the normally closed contacts 1 and 2 of a manually operable program restriction switch SL, the normally closed contacts 23 and 24 of the secure lockout relay KT1, and the normally closed contacts 21 and 22 of a dial error relay KDE.

Manual actuation of the start switch S1 as last described effects an immediate and automatic check of the correctness with which any required manual settings of manual data insertion variable data switch dials have been made, to ascertain either that a badge has or has not been correctly inserted into the badge reader as required by the selected transaction, and to ascertain that a tabulating card has been correctly inserted into the tabulating card reader. These several initial check operations will now be considered in turn.

The first check performed is for correct setting of the ten variable data switch dials by which ten numeric digits of data may be manually inserted for transmission. These ten switches are each comprised by multiple decks of single pole 12-position rotary switches. For convenience of reference hereinafter these data insertion switches will be called variable dial switches to distinguish them from similar data insertion switches (called semi-variable dial switches) which are enclosed within a locked compartment available only to supervisory personnel and which transmit data identifying the particular transmitting station and like information.

There are two types of variable dial setting checks which may be initially made depending upon supervisory available setting of the program restriction switch SL (a toggle form of switch which remains in either of the two positions to which it may be manually set) and these will be considered in turn.

The positioning of the program restriction switch SL to close its contacts 1 and 2 effects, upon manual actuation of the start switch S1 to close its contacts 1 and 2 and energize the dial good relay KDG as previously described, energization of the selector program switch contact bank SP7 of the transaction selector having further contact banks SP1–SP6 as shown in FIG. 8*g*. Normally closed transfer contacts 21 and 22 of the selector switch contact banks SP7–SP1 provide energization of the contact banks in order from the contact bank SP7 to the contact bank SP1, so that for this position of the program restriction switch SL any of the seven available transaction programs may be freely selected for use in a transmission. Jumper connections are made from the terminals of the switch contact banks SP1–SP7 to the terminals A1–J1 and A2–J2 of the check contact decks of the variable data dial switches SDB1–SDB10 according to whether a particular variable data dial switch should be set off of its home position H or should remain set at the home position (to which it is automatically set, in a manner later described, at the end of each data transmission). FIG. 8*g* illustrates typical such jumper connections for the program switch bank SP7 and which require a data setting of switches SDB2, SDB3, SDB4, SDB6, SDB7 and SDB10, and a home setting of all others of these switches. Thus upon operation of the contact bank SP7 to close its contacts 22–31, the previously mentioned energization applied to the contact bank SP7 is transmitted by the variable dial check switch decks of any of the switches SBD1–SDB10 which are improperly set. The transmitted energization is thereupon applied through normally closed contacts 6 and 7 of a relay of the secure lockout relay KT1 and normally closed contacts 1 and 2 of a dial error relay KDE to reverse energize the dial good relay KDG so that the latter cannot operate its contacts. This energization also energizes the dial error relay KDE, and the contacts 1 and 2 and further contacts 21 and 22 of the latter thereupon open to remove the reverse energization and the previously described direct energization of the dial good relay KDG effected by manual actuation of the start switch S1.

It will be noted from FIG. 8*g* that the transaction program selector switch contact banks SP1–SP7 are energized through normally closed transfer contacts 21 and 22 of these switch banks successively in order from the bank SP7 to the bank SP1. Jumpers may thus be provided between the output terminals of these switch banks and input terminals of the check decks of the variable dial switches to insure that each one of the ten variable dial switches is set either at home position or off home position according to the particular transaction selected. Such connections are ordinarily made as shown in FIG. 8*g* by selective "fields" of the variable dial switches (such as one wherein the dial switches SDB2, SDB3 and SDB4 as a first field are set off home position to indicate quantity, the dial switches SDB7 and SDB9 as constituting a second field is set off its home position to indicate shortage, and the dial switch constituting SDB10 as a third field is set off its home position to indicate quantity of scrap in a processing operation). All dial switches not included in the field or fields of a transaction are jumper wired for setting at their home positions.

Upon operation of the program restriction switch SL to close its contacts 1 and 3, a terminal H8 in FIG. 8*g* is energized upon closure of the start switch S1 previously described. This permits jumper connections to be completed from the terminal H8 to any one of the energizing terminals A8, B8, C8, D8, E8 and F8 of the transaction program selector switch banks, and the terminal to which the jumper connection is completed then permits use of all programs of lower numeric order but prevents use of programs of higher numeric order. For example, a jumper connection between terminals H8 and D8 energizes program contact banks SP1, SP2 and SP3 for program selection but disables contact banks SP4, SP5, SP6 and SP7 for program use. The checking operation in this case is accomplished in the manner just described except that direct energization of the dial good relay KDG is now effected from the energized ones of the terminal A8–F8 through normally closed contacts of the switch banks SP1–SP7 to the contact 23 of the relay KT1.

When the dial error relay KDE becomes energized by reason of any erroneous variable dial setting as just described, it remains energized after manual release of the start switch S1 through the variable dial check contact deck or decks and the transaction program selector contact banks SP1–SP7 and from the normally closed contacts 23 and 24 of a relay KT1, a current limiting resistor 30, a diode rectifier CR7, the now closed contacts 7 and 8 of the dial error relay KDE, the normally closed contacts SPC (which open upon each change of manual setting of the transaction selector), the contacts 3 and 4 of a manually operable card eject switch S2, a conductor X5 which extends to FIG. 7a, normally closed contacts 21 and 22 of a relay KTE, and normally closed contacts 21 and 22 of a relay KCR. Thus when the erroneous variable dial setting is manually corrected, the energizing circuit last traced is interrupted to de-energize the dial error relay KDE. This extinguishes a dial error light (FIG. 7c) previously energized by the contacts 25 and 26 of the relay KDE, and de-energizes an error buzzer previously energized by the contacts 23 and 24 of the relay KDE. The start switch S1 may now be manually actuated once more to initiate operation of the transmitter.

The dial good relay KDG when energized remains so energized, from the energizing circuit last traced, through its now closed contacts 7 and the contacts 7 and 8 of a badge good relay KBG when the latter is immediately next energized in a manner next to be described.

The second check initially performed after operation of the start switch S1 is a check to ascertain either that a badge has or has not been inserted in the badge reader according to whether the transaction selected requires or does not require badge reading. This determination is made by selector program switch bank contacts shown in FIG. 7e having terminals K3, L3, M3, N3, O3, P3 and Q3 which may be jumper connected singly or in various combinations shown to a control terminal R3. A badge good relay KBG (FIG. 7f) is initially energized and remains so energized unless it is reverse energized in a manner presently to be explained, through a circuit which extends through a conductor X1 to FIG. 8a and through an isolation diode rectifier CR25 or CR26 and the now closed contacts 7 and 8 of either the dial good relay KDG or dial error relay KDE and contacts SPC to the card eject switch S2 energized as previously described. However, the badge good relay KBG may be reverse energized if the reading of a badge is required by the transaction selected but a badge is not properly inserted in the badge reader. This reverse energizing circuit extends from positive potential through normally closed contacts 21 and 22 (FIG. 7a) of a relay KCR, contacts 1 and 2 of a plunger switch S3 (shown in FIG. 7c and non-operated if a plunger in the badge reader is not in unlatched position to lock a badge in the reader), normally closed contacts 1 and 2 of an attendance switch S4 (FIG. 7e), normally closed contacts 21 and 22 of a relay KRA, a jumper connection between the terminal R3 and the transaction program selector contact bank earlier mentioned and of which one set of contacts will be closed to indicate that badge reading is required, now closed contacts 27 and 28 of the dial good relay KDG or now closed contacts 27 and 28 of the dial error relay KDE, and normally closed contacts 21 and 22 of the badge good relay KBG to the reverse energizing circuit of the relay KBG. Those contacts of the transaction contact banks of FIG. 7e which are not jumper connected to the terminal R3, and thus are not included in the energizing circuit last mentioned, are connected to a terminal S3 as shown and one is closed when the transaction selected does not require the reading of a badge. Thus if the plunger switch S3 (FIG. 7c) is transferred to close its contacts 2 and 3 by reason of the plunger locking a badge in reading position in the badge reader, the badge good relay KBG is also reverse energized through a circuit which extends from the contact 3 of the plunger switch S3 to the terminal S3 last described and through the jumper connected transaction program switch bank contacts to the reverse energizing circuit just considered.

If the badge good relay KBG fails to be energized, a badge error relay KBE (FIG. 7f) is energized through a diode rectifier device CRD and normally closed contacts 21 and 22 of the badge good relay KBG from the reverse energizing circuit of the badge good relay KBG just considered. The badge error relay KBE remains energized through its now closed contacts 2 and 3 from the reverse energizing circuit last traced and which will become de-energized when a badge is inserted, or is removed from the badge reader properly to position the plunger switch S3 contacts as correctly required by the transaction selected. While the badge error relay KBE is energized, its contacts 24 and 25 (FIG. 7c) energize a badge error light, and its contacts 4 and 5 energize the error buzzer. This error light and buzzer signal become de-energized with de-energization of the badge error relay KBE in the manner last explained.

The badge error relay KBE will also be energized if the badge is improperly inserted (i.e. backwards or upside-down) into the badge reader. In this event, the lock-in plunger does not lock the badge in reading position and the badge may therefore be removed. When so removed, however, the lock-in plunger now moves to lock-in position to transfer the contacts S3 without corresponding transfer of the badge contacts S6 and thereby effect energization of the badge error relay KBE. The latter is de-energized upon manual reset of the lock-in plunger.

The third initial check automatically performed after manual actuation of the start switch S1 is one to ascertain that a tabulating card is properly inserted in the tabulating card reader. The tabulating card reader herein described reads a standard tabulating card utilizing the 12-bit Hollerith code, and the code recorded in the first column of the card must be one using a punched aperture in the 12, 0, 1 or 2 card rows. Thus in performing this tabulating card initial check, it is necessary that the card reader operate through one cycle to read the first card column. In order that this may be done, both the dial good relays KDG and badge good relays KBG must have been energized in the manner previously explained. To accomplish this first card reader cycle, a magnet LD2 (FIG. 7a) must be energized to release a latch structure in the tabulating card reader and thereby unlatch a pressure roll which presses the card against a feed roll provided in the reader. This energizing circuit for the magnet LD2 extends through normally closed contacts 21 and 22 (FIG. 7a) of a relay KCR, now closed contacts 23 and 24 of the dial good relay KDG, the now closed contacts 25 and 26 of the badge good relay KBG, normally closed contacts 3 and 4 of a relay KEM, normally closed contacts 3 and 4 of a relay KCE, normally closed contacts 23 and 24 of a relay KCR, and normally closed contacts 3 and 4 of a switch SD2 to the magnet LD2. Upon latch release of the pressure roll to card engaging position, the switch SD2 last mentioned transfers to close its contacts 4 and 5. This de-energizes the magnet LD2 last considered and the now closed contacts 6 and 7 of the switch SD2 now extend the energizing circuit last traced through card reader cam actuated contacts SC2–1, normally closed contacts 24 and 25 of a card good relay KCG, normally closed contacts 7 and 8 of a serializer operated contact SS1, and card reader cam actuated contacts SC2–2 to the tabulating card reader clutch magnet LR2. The reader cam actuated contacts SC2–2 open between 10° and 50° (plus 0°, plus 90°, plus 180°, plus 270°) and the reader clutch may halt at 90°, 180°, 270° and 360° of the reader drive shaft as explained more fully in the aforementioned Blodgett application Serial No. 249,228.

For this initial reader cycle, both of the cam actuated contacts SC2–2 and SC2–1 are closed at 90° so that the reader clutch magnet LR2 is energized past the 90° halt point and stops at 180°. In moving from 0° to 90°, the reader reads the first card column. The card reader contacts which are effective to read the code of the first card column are shown in FIG. 8a and are identified as contacts SR2–0, SR2–1, SR2–2 and SR2–12. These terminate in terminals S2, R2, T2 and U2 as shown and these terminals are jumper connected as indicated by the illustrative jumper connections shown to appropriate terminals K2, L2, M2, N2, O2, P2 and Q2 of the transaction program selector contact switch banks shown in FIG. 8*a*. Thus if the code read in the first card column is the correct one for the particular transaction selected, as established by the jumper wiring of the reader and selector contacts last mentioned, a card good relay KCG (FIG. 8*a*) is energized through an energizing circuit extending through the transaction selector and reader contacts, a normally closed contact SR2–6 which is operated to open position only if no tabulating card is positioned in the reader, the card reader cam actuated contacts SC2–4 and SC2–1 when these contacts close during reading of card column No. 1, a conductor X5A which extends to FIG. 7*a*, normally closed contacts 21 and 22 of a relay KTE, and the normally closed contacts 21 and 22 of the relay KCR.

When the card good relay KCG is energized as last described, its normally closed contacts 21 and 22 apply reverse energization to a card error relay KCE (FIG. 8*a*) which also receives direct energization from the cam actuated contacts SC2–4 through the normally closed contacts 3 and 4 of the card good relay KCG. Thus if the card good relay becomes energized, the card error relay KCE remains de-energized by reason of its direct and reverse energizations. If the card good relay KCG does not become energized by reason of a wrong initial card code in disagreement with the transaction selected (the jumper connections earlier mentioned between the card reader contacts and program contacts), the card error relay KCE receives only direct energization from the cam actuated contacts SC2–4 and accordingly becomes energized. Its contacts 9 and 10 (FIG. 7*c*) thereupon close to illuminate a card error lamp and its contacts 7 and 8 close to energize the error buzzer.

If the card error relay KCE becomes so energized, it must be de-energized by manual actuation of the card eject switch S2 (FIG. 7*g*) directly to energize a card release relay KCR. The latter establishes a hold circuit for itself through a rectifier 32, the now closed contacts 1 and 2 of relay KCR, the now closed off-normal reader drum contacts 33 of the tabulating card reader (which close as soon as the card is moved to card column 1 and which do not again open until the card has been transported through the reader to what would correspond to a card column 88), and normally closed contacts 21 and 22 of a relay KR. Energization of the relay KCR opens its contacts 21 and 22 (FIG. 7*a*) to de-energize the card error relay KCE and all other relays which stand energized at this time. The card reader clutch magnet LR2 (FIG. 7*g*) is now continuously energized through the cam actuated contacts SC2–2, normally closed serializer SS1 contacts 7 and 8, now closed contacts 27 and 28 of the relay KCR, the now closed off normal reader drum contacts 33, and the normally closed contacts 21 and 22 of the relay KR. This causes the card reader clutch to cycle the card reading operation continuously to the end of the card. While the reader thus operates, the reader contacts (shown in FIG. 8*b*) are not energized for transmission of card data since these contacts are energized only upon energization of a relay KR (to close its contacts 4 and 5 as shown in FIG. 8*c*) which remains de-energized at this time. Near the end of the card reading operation thus effected, the pressure roll of the card reader is automatically moved to and latched in spaced relation to the card feed roll so that the card drops by gravity out of the card reader, and the reader then continues on to its home position where the drum off-normal contacts 33 (FIG. 7*g*) open to de-energize the reader clutch magnet LR2.

Assume now that the foregoing described initial check operations have been completed and that the checking operations have detected no errors. The transmitter preliminary checks accordingly indicate readiness of the transmitter to gain access to the common data communication channel extending to the remote receiver-recorder. The manner in which such access is gained will now be considered.

Having completed satisfactorily the preliminary checks just described, a serializer semi-variable relay KSS (FIG. 7*a*) is energized through normally closed contacts 3 and 4 of a relay KTE, now closed contacts 7 and 8 of the card good relay KCG, normally closed contacts 21 and 22 of a relay KLO, now closed contacts 25 and 26 of the badge good relay KBG, now closed contacts 23 and 24 of the dial good relay KDG, and normally closed contacts 21 and 22 of the relay KCR. The contacts 27 and 28 of the relay KSS now close to energize the lockout relay KLO (FIG. 7*b*) through the normally closed contacts 23 and 24 of the relay KLO from the input line JLT if the latter is itself energized. This will be the case, as explained in connection with the electrical interlock control arrangement of FIG. 2, if there are no previously energized lockout relays of other transmitting stations of higher order between the present transmitting station and the one of highest order through which this control circuit is energized from the central receiver-recorder unit. Assuming the relay KLO is so energized, it establishes a hold circuit for itself through its contacts 1 and 2 "AX" (an "AX" contact signifies that this contact closes before other contacts of the particular relay open), normally closed contacts 21 and 22 of a relay KA1, normally closed contacts 24 and 25 of a relay KTE, now closed contacts 23 and 24 of the dial good relay KDG, and the normally closed contacts 21 and 22 of the relay KCR.

As soon as the lockout relay KLO becomes energized as last described, a relay KT1 (FIG. 7*b*) is energized through normally closed contacts 24 and 25 of a relay KEM, normally closed contacts 24 and 25 of a relay KA2, and the now closed contacts 4 and 5 of the lockout relay KLO if energization is applied to the input lines JLL which will be the case if, as explained in connection with FIG. 2, there are no transmitters of lower order than the present transmitter which stand with their lockout relays KLO energized and thus interrupt energization of the line JLL from the central receiver-recorder unit. It will be noted in this respect that, as shown in FIG. 7*b*, the now transferred contacts 3 and 4 of the relay KLO interrupt energization between the input line JLL and the output line JLM which, as explained in connection with FIG. 2, extened to the KT1 relay energizing circuits of higher order transmitters. It may also be noted at this point that, as shown in FIG. 7*b*, the contacts 23 and 24 of the lockout relay KLO open to interrupt the energizing circuit between the input line JLT and the output line JLR which extends to the KLO energizing circuit of lower order stations.

When the relay KT1 becomes energized as just described, it establishes a hold circuit for itself through the now closed contacts 25 and 26 of the relay KLO and the now closed contacts 25 and 26 of the relay KT1 to the input line JLP upon which a positive potential is impressed directly from the central receiver-recorder if the latter is in condition to receive data transmissions. A relay KT2 (FIG. 7*b*) is directly energized through the now closed contacts 27 and 28 of the relay KT1. These energizations of the relays KSS, KLO, KT1 and KT2 gain access of the transmitter to the common data communication channel extending to the central receiver-recorder, and the transmitter thereupon initiates data transmission in a manner which now will be explained.

The first data transmitted is a digit code identifying the transaction manually selected and indicated by the selector program switch contacts of the program banks SP1–SP7 which are shown in FIGS. 8*e* and 8*f*. To this end the serializer clutch LSC shown in FIG. 7*d* is now energized through normally closed contacts 1 and 2 of the cam actuated serializer contacts SS16, which as explained in the aforementioned copending Blodgett application Serial No. 254,990 are mounted upon a driven cam shaft and close between 338° of one cam shaft cycle and 16½° of the next cam shaft cycle. The energizing circuit of the serializer clutch also includes now closed contacts 4 and 5 of the relay KSS, now closed contacts 29 and 30 of the relay KT2, and the normally closed contacts 21 and 22 of the relay KCR. The serializer cycle of operation includes one rotation of a slow shaft which operates the serializer cam actuated contacts SS1–SS15 and includes two complete revolutions of the serializer cam shaft last mentioned, and to this end the serializer clutch LSC is re-eneergized at the end of the first cam shaft rotation through the serializer contacts SS16 and contacts 3 and 4 of a serializer cam actuated contact SS1 which remain closed between 16.5° and 338° of the slow shaft and thus are closed at the completion of the first revolution of the cam shaft. Thus the serializer upon being placed into operation continues through a complete cycle of the operation of its slow shaft even though the relay KSS or the relay KT2 might become de-energized to open their respective contacts 4 and 5 or 29 and 30 during this complete serializer cycle.

The serializer cam actuated contacts which effect the initial data transmissions are shown in FIG. 8*e*, and are energized in common through the now closed contacts 9 and 10 of the relay KSS, the normally closed contacts 1 and 2 of a relay KSD, a conductor X3 extending to FIG. 7*b*, and the control circuit conductor JLP which is positively energized from the central receiver-recorder unit. The serializer also includes what may conveniently be called "strobe" cam actuated contacts SS17 (FIG. 8*h*) which are mounted upon the serializer cam shaft and close for intervals of 18° of this shaft coincident in point of time with the closing of every other set of serializer cam actuated contacts which effect data transmissions. The contacts 7 and 8 (FIG. 8*e*) of the serializer cam actuated contacts SS15 are the first to close, and thus effect transmission of a transaction code digit by energization of the selector switch contacts SP1–SP7 shown in FIGS. 8*e* and 8*f*. The closed ones of these selector switch contacts are coupled through coding diode rectifiers CR16–CR23 and now closed contacts 1–14 of the serializer cam actuated contact SS17 (FIG.8*h*) and the now closed contacts 1–2 "AX", 6–9 and 21–28 of the relay KT2 to energize common data transmission channel conductors A–H extending to the central receiver-recorder unit.

Contacts 9 and 10 (FIG. 8*e*) of the serializer cam actuated contacts SS14 next close to transmit a "5" space code through normally closed contacts of a "VOID" switch S5, a jumper connection between terminals R9 and R10 (Fig. 8*h*), the now closed contacts 9 and 10 of the serializer cam actuated contacts SS17, and the now closed contacts 23 and 24 of the relay KT2 to the data channel contact E extending to the central receiver-recorder unit.

As the serializer continues its cycle of operation, its cam actuated contacts SS13–SS6 next close in succession from the contact SS13 to the contact SS6. These successively closed contacts energize in succession the semi-variable dial switches SDA1–SDA8 (FIG. 8*h*). These semi-variable dial switches are usually enclosed within a locked compartment available only to supervisory personnel, and are set to transmit a maximum of eight digits usually identifying a particular transmitting station of the data collection system together with like semi-variable data. As the semi-variable dial switches are successively energized as last described, those which are set off of their home positions energize code combinations of diode rectifier devices CR1–CR15 connected as shown in FIG. 8*h* to transmit successive digits of semi-variable data through the serializer cam actuated contacts SS17 and the now closed contacts (FIG. 8*i*) of the relay KT2 to the common data communication channel conductors A–H. If not all eight semi-variable dial switches are required for the semi-variable dial data, the semi-variable data is set into these switches successively in order from the switch SDA1 toward the switch SDA8 and the serializer transmission is automatically halted after transmission of the last semi-variable data digit.

This is accomplished by de-energization of the serializer relay KSS (FIG. 7*a*), to open its contacts 9 and 10 (FIG. 8*d*) and thereby remove energization from the serializer cam actuated contacts shown in FIG. 8*e*. To this end, it will be recalled that the serializer relay KSS was initially energized through the contacts 9 and 10 of the serializer cam actuated contacts SS1 (FIG. 7*a*) which open at approximately 8° of the serializer cam shaft after the serializer has initiated a complete cycle of its operation. After opening of these serializer cam actuated contacts SS1, the hold circuit of the relay KSS extends through normally closed contacts 3 and 4 of relay KTE, now closed contacts 25 and 26 of relay KSS, and through a series connected arrangement of normally closed serializer cam actuated contacts SS5–SS13 shown in FIG. 7*h* to semi-variable switch contacts shown in FIG. 7*h* having all contacts except the home contact of each deck electrically connected together. Further, and as shown in Fig. 7*h*, the common circuit of the contacts of each switch deck are connected to the movable contact of the next switch deck in order from the switch deck SDA–1 to the deck SDA–8. Thus the hold circuit of the relay KSS is completed through the normally closed contacts of all yet unoperated ones of the serializer contacts in order from contact SS5 toward contact SS13 and through those semi-variable switch contacts of FIG. 7*h* which have been set off of their home positions and through now closed contacts 9 and 10 (FIG. 7*a*) of the relay KT1, normally closed contacts 23 and 24 of a relay KA1, now closed contacts 23 and 24 of the dial good relay KDG, and normally closed contacts 21 and 22 of the relay KCR. The hold circuit of the relay KSS thus is maintained energized by those of the semi-variable switch decks of FIG. 7*h* which have been set off home position and thereby provide a hold circuit shunt around the serializer cam actuated contacts SS5–SS13 as the latter open in order from the contact SS13 toward the contact SS5. It will be evident, however, that when one of the serializer cam actuated contacts SS13–SS5 opens which is not included in the shunt connection provided by the semi-variable switch decks of FIG. 7*h*, this serializer cam actuated contact interrupts the hold circuit of the relay KSS to effect de-energization of the latter.

The serializer thereup continues its cycle of operation to completion at its home position, but the transmiting contacts of the serializer shown in FIG. 8*e* are no longer energized by reason of the interruption of their energizing circuit by the now open contacts 9 and 10 of the relay KSS. This energizing circuit is further interrupted by later energization of the relay KSD to open its contacts 1 and 2 (FIG. 8*c*). In particular the relay KSD (FIG. 7*a*) is energized upon completion of the serializer cycle of operation through the normally closed contacts 21 and 22 of a relay KSB, the normally closed contacts 23 and 24 of a relay KSV, the now closed contacts 21 and 22 of the relay KSS just de-energized, and the contacts 1 and 2 of the serializer cam actuated contacts SS1 which reclose at approximately 349° of the serializer cam shaft revolution. The now closed contacts 26 and 27 of the relay KSD establishes a circuit around the normally closed contacts 21 and 22 of the relay KSB, the normally closed contacts 23 and 24 of the relay KSV, and the normally closed contacts 21 and 22 of the relay KSS so that the relay KSD is maintainedl energized even though any of the relays last mentioned should later become energized.

It may be noted at this point that the contacts 1 and 2 (FIG. 8*c*) of the relay KSD control energizations of three sets of serializer read-out contacts: (1) the previously discussed serializer contacts of FIG. 8*e* through contacts 9 and 10 of the relay KSS; (2) contacts 3 and 4, 5 and 6, or 7 and 8 of variable dial data read out serializer cam actuated contacts SS6–SS15 shown in FIG. 8*f* with energization supplied through contacts 25 and 26 of relay KSV; and (3) contacts 5 and 6, 7 and 8, or 9 and 10 of badge reader data read out cam actuated serializer contacts SS3–SS15 also shown in FIG. 8*f* and energized through contacts 25 and 26 of relay KSB. Thus energization of the relay KSD de-energizes all of these data transmission serializer cam actuated contacts.

The semi-variable dial data transmission having now been completed, either the badge reader or the tabulating card reader may be next placed into operation dependent upon certain selectable jumper wiring connections hereinafter discussed. These jumper connections may alternatively cause the badge reader operation to follow completion of the tabulating card reader operation, or the operation of the badge reader may be initiated by a code read from the tabulating card in which event the card reader operation halts temporarily until completion of the badge reading operation. All of these alternative modes of operation of the badge reader will be considered more fully hereinafter, as will the reading of manually inserted variable dial data under control of a code read from a tabulating card. However, for purposes of the present description, it will be assumed that the tabulating card reader is next automatically placed into operation and that its operation continues to completion without interruption.

The tabulating card reader operation is initiated by energization of a relay KR (FIG. 7*d*) through normally closed contacts 21 and 22 of a relay KEM, a jumper connection between terminals P14 and Q8, the now closed contacts 2 and 3 of the dial good relay KDG, the normally closed contacts 3 and 4 of a relay KSB, the normally closed contacts 3 and 4 of a relay KSV, the normally closed contacts 3 and 4 of the relay KSS (just de-energized as last described), the now closed contacts 29 and 30 of the relay KT2, and the normally closed contacts 21 and 22 of the relay KCR. A hold circuit for the relay KR extends through card reader cam actuated contacts SC2–5 and the now closed contacts 22 and 23 of the relay KR, but this hold circuit is important only in connection with the termination of transmissions and will be considered hereinafter.

As explained more fully in the aforementioned copending Blodgett application Serial No. 249,228, the tabulating card reader includes star wheels which sense the presence and absence of individual ones of a maximum of twelve possible code apertures of the tabulating card. Each star wheel operates a corresponding contact bank which is comprised of plural pairs of reader contacts. These reader contacts are shown in FIG. 8*b* and are identified as SR2–1—SR2–9 corresponding to the respective index-point numeric code rows 1 through 9 of the tabulating card, together with SR2–0, SR2–11, and SR2–12 corresponding to the respective 0, 11 and 12 index point field rows of the card. The reader contacts are electrically interconnected as shown in FIG. 8*b* to convert the 12-bit Hollerith code of the tabulating card to a corresponding 8-bit binary code of any desired code format. These reader contacts are energized through reader cam actuated contacts SC2–5 shown in FIG. 8*b*, the now closed contacts 4 and 5 of the relay KR, the conductor X3 which extends to FIG. 7*b*, and the data transmission line conductor JLP which has positive potential applied to it from the central receiver-recorder unit. The reader clutch magnet LR2 (FIG. 7*g*) is now energized through reader cam actuated contacts SC2–2, a number of electrically interconnected special control-code reader contacts SR2–0, SR2–2, SR2–3, SR2–8 and SR2–12 shown in FIG. 7*d* (which operate either to continue or to interrupt energization of the reader clutch magnet according to a special control code read), the normally closed contacts 23 and 24 of a relay KSB, normally closed contacts 21 and 22 of a relay KSV, normally closed contacts 23 and 24 of the now de-energized relay KSS, now closed contacts 6 and 7 of the relay KR, a conductor X2 extending to FIG. 8*a*, the normally closed contacts 1 and 3 of the start switch S1, normally closed contacts 1 and 2 of a relay KA1, and normally closed contacts 1 and 2 of a relay KRA. The reader clutch magnet LR2 is energized at every 90° rotation of the cam shaft upon which the cam actuated contacts SC2–2 are positioned and, as explained in the aforementioned copending Blodgett application Serial No. 249,228, each 90° rotation of the cam shaft causes the tabulating card reader to read successive tabulating card index point columns. The tabulating card reader clutch magnet LR2 continues to be thus energized until the special control code contacts SR2–2, SR2–3, SR2–8, and SR2–11 (FIG. 7*d*) read a badge read code 3–8–11, a variable dial read code 2–8–11 or a stop code 3–8. The effect of the stop code only will now be considered, and the effect of the badge read code and variable dial read code will be considered hereinafter.

The last item of information recorded in the tabulating card to be transmitted must be an "end of data" or stop code 3–8. When this code is read by the tabulating card reader, an end-of-message relay KEM (FIG. 7*e*) is energized through a circuit which extends through the normally closed contacts 23 and 24 of the reader SR2–1 (FIG. 7*c*) contacts, the normally open contacts 5 and 6 of the reader SR2–3 contacts, the normally closed contacts 23 and 24 of the SR2–0 contacts, the normally closed contacts 21 and 22 of the reader SR2–12 contacts, and the normally open contacts 7 and 8 of the reader SR2–8 contacts to the reader cam actuated contacts SC2–4 which are energized at this time through the now closed contacts 24 and 25 of the relay KR, now closed contacts 23 and 24 of the dial good relay KDG, and normally closed contacts 21 and 22 of the relay KCR. The relay KEM is maintained energized through its now closed contacts 1 "AX" and 2 contacts and the now closed contacts 27 and 28 of the lockout relay KLO. The now closed contacts 22 and 23 (FIG. 7*d*) of the relay KEM now close to establish a hold circuit for the relay KR through the card reader cam actuated contacts SC2–2 and the now closed contacts 22 and 23 of the relay KR. After reading the 3–8 stop code, the card reader special code contacts 23 and 24 (FIG. 7*d*) of reader contact SR2–3 and 27 and 28 of reader contact SR2–8 close so that the reader clutch magnet LR2 (FIG. 7*g*) is once more energized through the cam actuated contacts SC2–2. After the next 10° of rotation of the reader cam shaft, the contacts 3 and 4 of the cam actuated contacts SC2–2 interrupt the last described hold circuit for the relay KR, and the contacts 4 and 5 (FIG. 8*c*) of the relay KR thereupon open to de-energize the tabulating card reader contacts shown in FIG. 8*b*. This prevents transmission of any item of data which may appear in the next card column.

The presently energized state of the relay KEM to open its contacts 24 and 25 (FIG. 7*b*) effects insertion of the contacts 1 and 2 of the cam actuated card reader contacts SC2–3 into the circuit extending from the positively energized transmission line conductor JLP (energized from the central receiver-recorder unit) to the transmission line conductor JLL which extends to the receiver-recorder unit, this circuit now including the now closed contacts 25 and 26 of the relay KT1, the now closed contacts 25 and 26 of the relay KLO, contacts 1 and 2 of the reader cam actuated contacts SC2–3, normally closed contacts 24 and 25 of the relay KA2, and the now closed contacts 4 and 5 of the lockout relay KLO. Thus when the contacts 1 and 2 of the reader cam actuated contacts SC2–3 open for 12 milliseconds between 10° and 43° of rotation of the reader cam shaft as just previously mentioned, the circuit last traced between the line conductors JLP and JLL is briefly interrupted and the positive voltage theretofore returned from the line JLP to the receiver-recorder through the line JLL disappears for a brief interval. While the line JLL was initially positively energized by the central receiver-recorder unit, the first data code received by this unit removed receiver energization from the line JLL and required that this energization be thereafter supplied through the transmitter circuit last traced from the energized line JLP. Removal of transmitter energization from the line JLL during a brief interval as just described indicates to the receiver-recorder that the transmission has been completed (i.e., the removal briefly of the positive voltage from the line conductor JLL effectively constitutes the generation of an "end of message" signal). As will hereinafter be described more fully during description of the receiver-recorder unit, this unit upon receiving the "end of message" signal records an end of message code (unless a time of recording is required, in which event the receiver demands a time signal from the central control unit 14 previously described in connection with FIG. 1 and records the time followed by the end of message code).

If the receiver-recorder has detected no parity error in the previous transmission and the length of the message is correct as indicated by a message digit counter in the receiver-recorder unit, the latter impresses a positive potential upon the conductor H (FIG. 8*i*) of the common data transmission channel. This potential is applied through the now closed contacts 27 and 28 of the relay KT2, the conductor X4 extending to FIG. 7*g*, and the now closed contacts 9 and 10 of the relay KEM to energize a card release relay KCR. The latter establishes a hold circuit for itself through a diode rectifier 32, the now closed contacts 1 "AX" and 2 of the relay KCR, reader off normal contacts 33 (which are closed between 10° and 310° of the rotation of the reader main feed drum), and now closed contacts 21 and 22 of the relay KR. The now closed contacts 27 and 28 of the card release relay KCR now apply the energization of the circuit last traced through the serializer normally closed SS1 contacts and the reader cam actuated contacts SC2–2 continuously to energize the reader clutch magnet LR2. As the card reader operation progresses beyond the 80th column of the tabulating card, at some point between equivalent card columns 81 and 88 the pressure roll of the card reader is automatically moved into spaced relation with the feed roll in a manner more fully explained in the aforementioned copending Blodgett application Serial No. 249,252. This releases the card which falls by gravity into an output card hopper, and the contacts SD2 (FIG. 7*a*) retransfer to open its contacts 4 and 5 and close its contacts 3 and 4. The pressure roll latch release magnet LD2 is not again energized at this time by reason of the now open contacts 23 and 24 of the card release relay KCR, but the closure of the contacts 1 and 2 of the pressure-roll actuated contact SD2 (FIG. 7*g*) now energizes a dial restore clutch magnet LDC from the reader clutch magnet energizing circuit and through the now closed contacts 9 and 10 of the relay KCR. Energization of the dial restore clutch magnet LDC reciprocates a dial switch resetting mechanism more fully described in the aforementioned Blodgett copending application Serial No. 254,992 to restore all of the variable dial switches to their home position settings. As this operation progresses, a contact SDR shown in FIG. 7*g* transfers sufficiently long to maintain the dial restore clutch magnet LDC energized to completion of the dial reset operation.

When the card reader has progressed to a position of its main feed roll equivalent to the 88th column of a tabulating card, the reader off-normal contacts 33 open to de-energize the reader clutch magnet LR2 and halt the reader at its home position. The opening of the reader off normal contacts 33 also interrupts the hold circuit of the relay KCR. The previous energization of the latter relay to open its contacts 21 and 22 shown in FIG. 7*a* interrupts a main relay hold energizing circuit, and this de-energizes most of the relays which are energized at this time and particularly the lockout relay KLO. The latter upon opening its contacts 25 and 26 de-energizes the relays KT1 and thereby of KT2, the contacts 27 and 28 of the lockout relay KLO opening to de-energize the end of message relay KEM. The contacts 9 and 10 (FIG. 7*g*) of the relay KEM open to de-energize the direct energizing circuit of the card release relay KCR, and the last mentioned interruption of the hold circuit of this relay at the off-normal contacts 33 effects complete de-energization of the relay KCR. The transmitter thus relinquishes its access to the common data communication channel extending to the receiver-recorder unit and stands in readiness for a subsequent data transmission operation.

Assume now that during the interval when the tabulating card reader is operating to read a tabulating card a variable dial code 2–8–11 is read. This code effects energization of a relay KSV (FIG. 7*d*) through the 2–8–11 code reader contacts shown in FIG. 7*c* energized as previously described through the reader cam actuated contacts SC2–4. A hold circuit for the relay KSV is etsablished through its contacts 1 "AX" and 2, the serializer contacts SS5 (FIG. 7*g*) which open on the 11th step of the serializer read out, now closed contacts 9 and 10 of the relay KT1, normally closed contacts 23 and 24 of the relay KA1, now closed contacts 23 and 24 of the dial good relay KDG, and normally closed contacts 21 and 22 of the relay KCR. The variable dial code read by the special code reader contacts shown in FIG. 7*d* will temporarily interrupt the energizing circuit of the reader clutch magnet LR2 (FIG. 7*g*), the contacts 3 and 4 of the relay KSV open to de-energize the card relay KR, and the contacts 4 and 5 of the relay KSV close to energize the serializer clutch magnet LSC (FIG. 7*d*). The contacts 4 and 5 (FIG. 8*c*) of the relay KR thus open to de-energize the card reader contacts, and the serializer variable dial read out contacts 3 and 4, 5 and 6, 7 and 8 of the serializer cam actuated contacts (FIG. 8*f*) SS6–SS15 are now energized through the now closed contacts 25 and 26 of the relay KSV and the normally closed contacts 1 and 2 of the relay KSD from the conductor X3 which as previously explained has positive potential applied to it directly from the central receiver-recorder unit.

The serializer contacts SS6–SS15 last mentioned close in succession from the serializer contact SS15 to the serializer contact SS6 and thus energize successively the variable dial switches SDB1–SDB10 of FIG. 8*i*. Those dial switches which are set off their home position accordingly supply energizations through the coding diode rectifiers CR1–CR15, the concurrently actuated serializer strobe contacts SS17, and the now closed contacts of the relay KT2 shown in FIG. 8*i* to the common data communication channel conductors A–H extending to the central receiver-recorder unit. On the 11th step of the serializer read out, its contacts SS5 (FIG. 7*g*) open as previously mentioned to interrupt the hold circuit of the relay KSV and thereby de-energize this relay. Reclosing of the contacts 3 and 4 of the relay KSV effects re-energization of the card read relay KR, and the contacts 6 and 7 (FIG. 7*a*) of the latter now again close to energize the card reader clutch magnet LR2 (FIG. 7*g*) and thus effect resumption of operation of the tabulating card reader. While this resumption of reader operation is initiated on the 11th step of the serializer operation as just explained, it may be noted that the serializer continues on to the end of the serializer cycle in the manner previously explained, but without further serializer transmissions, and concurrently with resumed operation of the tabulating card reader.

During the variable dial switch read out accomplished by the serializer operation last described, there may be variable dial switches which remain set at their home position. The serializer reading of these dial switches accomplishes no data transmission and thus results in what might conveniently be considered the transmission of a "blank" code. If desired, these "blank" codes may be converted to a space code by utilizing a jumper connection between terminals S9 and S10 shown in FIG. 8*d*. In this event the energization of the serializer reader contacts applied through the contacts 25 and 26 (FIG. 8*d*) of the relay KSV is also applied through the now closed contacts 7 and 8 of the relay KT1 to the movable contacts of all of the variable dial switch check contacts shown in FIG. 8*d*. Those switch contacts which are set at the home position are connected as shown to individual ones of the serializer contacts SS6–SS15 also shown in FIG. 8*d*. As these serializer contacts accordingly close in succession, any energization applied to them by the home position settings of the variable dial switches applies energization through now closed contacts 9 and 10 of the relay KSV to the contacts 9 and 10 of the serializer contacts SS17 to the terminal shown in FIG. 8*h* to effect transmission of a 5-space code.

Assume now that during the period of operation of the tabulating card reader as previously described a badge code 3–8–11 is read from the tabulating card. If a transaction program has been selected that does not require reading of a badge, the badge read relay KBR will not have been energized and the badge code will be ignored. Otherwise the badge code temporarily halts the operation of the tabulating card reader and places the badge reader into operation to transmit data read from a badge. This will occur when the transaction program selected calls for a badge to be placed in the badge reader, and by reason of which the initial check steps earlier described effect energization of the badge good relay KBG and the card good relay KCG. Upon satisfactory completion of these check operations the badge is immediately read and the data read from it is stored during a single card cycle of reading operation. This reading cycle is effected by energization of the badge reader clutch magnet LBC (FIG. 7*f*) through normally closed contacts 1 and 2 of a relay KBR, the now closed contacts 28 and 29 of the card good relay KCG, the now closed contacts 23 and 24 of the badge good relay KBG, the now closed contacts 2 and 3 of the badge-in switch S6 (transfer of these contacts is effected upon manual insertion of a badge into reading position in the badge reader), the now closed contacts 4 and 5 of the badge reader plunger switch S3 (operated by the plunger which, as previously explained, locks the badge in reading position), and the normally closed contacts 21 and 22 of the relay KCR. This initiates the cycle of badge reader operation, and at 68° of the badge reader cycle a relay KBR (FIG. 7*f*) is energized through the badge reader cam actuated contacts SRC–1 from the energizing circuit last described. The contacts 1 and 2 of the relay KBR thereupon open to remove energization from the badge reader clutch magnet LBC, thus limiting the badge reader to one cycle of operation since the relay KBR remains energized through its contacts 4 and 5 (FIG. 7*c*), the contacts 25 and 26 of the dial good relay KDG, and the contacts 21 and 22 of the relay KCR. As explained in the aforementioned copending Blodgett application Serial No. 249,252, this reading cycle of operation physically releases the badge which can then be manually removed from the reader. Due to the energization of the relay KBR, no further cycle of badge reading operation can take place until the badge data read and stored by the preceding reader cycle has been transmitted and the relay KBR de-energized, in a manner presently to be explained.

Now when the tabulating card reader reads a 3–8–11 badge code, the special code reader contacts shown in FIG. 7*d* temporarily interrupt the energizing circuit of the card reader clutch magnet LR2 in the manner previously explained and the tabulating card reader contacts shown in FIG. 7*c* energize a circuit which extends to a terminal P9 (FIG. 7*e*) and by jumper connection to a terminal P11, through now closed contacts 6 and 7 of the relay KBR, and normally closed contacts 6 and 7 of a relay KA1 to a terminal O10 (FIG. 7*g*). The terminal O10 is connected by a jumper to one of the terminals C10–M10 associated with the serializer cam actuated contacts SS2–SS12 shown in FIG. 7*g*, for example the terminal H10 as shown in FIG. 7*g*, the particular one of the last mentioned terminals selected for this connection depending upon the number of data digits which are to be read from the badge reader. The energization thus applied to the selected one of the serializer contacts SS2–SS12 is transmitted through its normally closed contacts to energize a relay KSB (FIG. 7*e*). The contacts 23 and 24 (FIG. 7*d*) of the relay KSB now open to interrupt the energizing circuit of the tabulating card reader clutch and thereby impose a temporary halt on the card reader operation. The contacts 3 and 4 (FIG. 7*a*) of the relay 2SB open to de-energize the card read relay KR, and the contacts 4 and 5 of the relay KSB now close to energize the serializer clutch magnet LSC (FIG. 7*d*) through the now closed contacts 1 and 2 of the serializer cam actuated contact SS16.

This initiates a cycle of operation of the serializer. The serializer cam actuated contacts which are used in effecting read out of the data stored at this time in the reader contacts of the badge reader are shown in FIG. 8*f* and are comprised by contacts 5 and 6, 7 and 8 and 9 and 10 of the serializer cam actuated contacts SS3–SS15 having terminals A11–L11. As many of the latter as required are jumper connected, as shown by way of example in FIG. 8*f*, to appropriate ones of the read out terminals A12–J12 which are effective when energized to read out individual numeric data digits stored in the badge reader contacts included in a reader contact unit 34. One or more data digits set into the semi-variable dial switches of FIG. 8*h* may also be read out at this time (either before or after read out of the badge data) by appropriate jumper connections between the serializer terminals A11–L11 and terminals A13–H13 (FIG. 8*f*) which are connected to the semi-variable dial switch rotor contacts as shown, it being understood in this respect that all badge data digits are read as a group and all semi-variable dial digits are also read as a group either preceding or following as desired the group of badge data digits. In operation the serializer progresses through its cycle successively to close its contacts SS15–SS3, and these are energized at this time through the now closed contacts 25 and 26 of the relay KSB, the normally closed contacts 1 and 2 of the relay KSD, and the conductor X3 which is positively energized directly from the central receiver-recorder unit. The data digits are thus successively read out from the contacts included within the badge reader contact unit 34 shown in FIG. 8*c*. As shown in FIG. 11*a*, there are 100 pairs of such contacts arranged in twelve columns (energized by the serializer cam actuated contacts SS3–SS15 successively) and ten contact rows which energize reader contact output circuits according to the individual digit numeric value. These output data digits are translated through the coding rectifier devices CR1–CR15, through the serializer strobe cam actuated contacts SS17 (which as earlier explained are closed during each interval of closure of the serializer cam actuated contacts SS15–SS3) and through the now closed contacts of the relay KT2 shown in FIG. 8*i* to the common data transmission channel conductors A–H extending to the central receiver-recorder unit.

While the read out of semi-variable dial digits in the manner explained just above may if desired be accomplished with each read out of badge data digits, the semi-variable dial digits are usually read as station identification data in the attendance mode of operation hereinafter described and involving the energizations of attendance mode relays KA1 and KA2 (FIG. 7*f*) and having normally open contacts shown in FIG. 8*f*. To this end, the appropriate serializer terminals A11–L11 are jumper connected through terminals M11–M12 and N11–N12 of contacts 26–29 of the relay KA1 to the semi-variable dial terminals A13–H13. The transfer contacts 21–23 of the attendance relay KA2 have terminals I13, J13 and K13 which may be similarly used to read out as desired one semi-variable dial digit in each of the attendance and non-attendance modes of operation.

When the serializer in reading the data digits out of the badge reader contacts reaches the step corresponding to the serializer cam actuated contact to which the jumper connection from the terminal O10 (FIG. 7*g*) has been made, the corresponding serializer contact pair of FIG. 7*g* opens to de-energize the relay KSB. The contacts 4 and 5 (FIG. 7*a*) of the latter thereupon open to de-energize the serializer clutch magnet LSC, and the contacts 3 and 4 of the relay KSB again close to re-energize the card read relay KR. The serializer operation continues without further data transmission (the serializer cam actuated contacts which effect badge reader data read out being de-energized by the now open contacts 25 and 26 of the relay KSB) to its home position where it halts. Energization of the card read relay KR to close its contacts 6 and 7 (FIG. 7*a*) re-energizes the tabulating card reader clutch magnet LR2 (FIG. 7*g*) to effect resumed operation of the tabulating card reader.

As an alternative mode of operation to the read out of badge reader data under control of a badge read code read from a tabulating card as last described, the present data transmitter may be arranged to effect automatic badge reader operation prior to operation of the tabulating card reader. For this character of operation, the jumper connection between the terminals P14–Q8 (FIG. 7*d*) is removed as is the jumper connection between the terminals P9–P11 (FIG. 7*e*) and a jumper connection is now made between the terminals P11–P12 of FIG. 7*e*. Operation of the transmitter now proceeds through the preliminary checks previously described and through the initial phase of the serializer operation by which the transmission of the transaction code and semi-variable dial data is effected. The relay KBR stands energized at this time by reason of the operation previously described and wherein a cycle of badge reader operation automatically occurs upon completion of the check conditions which energize the dial good relay KDG, the badge good relay KBG and card good relay KCG. The relay KSS has been de-energized to energize the relay KSD.

The relay KSB (FIG. 7*e*) now becomes energized through an energizing circuit which includes normally closed contacts of the serializer cam actuated contacts shown in FIG. 7*g* and through a jumper connection from one of the contact terminals C10–M10 to the terminal O10, the normally closed contacts 6 and 7 of the relay KA1, the now closed contacts 6 and 7 of the badge read relay KBR, the jumper connection P11 to P12, now closed contacts 28 and 29 of relay KSD, normally closed contacts 1 and 2 of a relay KBAR, now closed contacts 5 and 6 of the dial good relay KDG, now closed contacts 9 and 10 of relay KT1, normally closed contacts 23 and 24 of relay KA1, now closed contacts 23 and 24 of the dial good relay KDG, and the normally closed contacts 21 and 22 of the relay KCR. The now closed contacts 7 and 8 of the relay KSB now energize the relay KBAR (FIG. 7*e*) through the contacts 5 and 6 of the dial good relay KDG from the energizing circuit last traced and which effected energization of the relay KSB. The contacts 2 and 3 of the relay KBAR now close to maintain a hold circuit for the relay KBAR from the energizing circuit last mentioned. The relay KBAR upon becoming energized prevents a subsequent cycle of badge reading operation upon any subsequent energization of the relay KSB, and remains energized until de-energized with all other energized relays at the end of each transmission operation. The relay KSB upon becoming energized as just described closes its contacts 4 and 5 (FIG. 7*a*) to energize the serializer clutch magnet LSC and thereby effect serializer transmission of the data read and stored in the reader contacts of the badge reader, this operation being that previously described.

The present transmitter may also be operated to effect automatic operation of the badge reader following operation of the tabulating card reader. For this character of operation, any jumper connection between the terminals P9, P11 and P12 of FIG. 7*e* is removed and a jumper connection is made between the terminals P11 and P13 also shown in FIG. 7*e*. Now when a stop code 3–8 is read by the card reader contacts shown in FIG. 7*c*, the stop code energizes the end of message relay KEM. This energization is also applied through the diode rectifier device CRH, the now closed contacts 21 and 22 of the relay KBAR, and the jumper connection P11–P13 to energize the relay KSB through the serializer contacts shown in FIG. 7*g* and in the manner earlier described. The serializer read out of the data read and stored in the reader contacts of the badge reader now progresses in the manner earlier described. However, while this is occurring it is necessary to halt the operation of the tabulating card reader until completion of the badge reading operation. In this, it will be recalled that the actual "end of message" signal is an interruption of the potential applied to the transmission line conductor JLL effected by operation of the tabulating card cam actuated contacts SC2–3 of FIG. 7*b* after reading the end of message code from the tabulating card. Accordingly the necessary temporary halt of the tabulating card reader is effected by de-energization of the card reader clutch LR2 (FIG. 7*g*) by interruption of its energizing circuit at the now open contacts 23 and 24 of the relay KSB energized in the manner just explained. Upon completion of the serializer read out of data from the badge reader, the relay KSB is de-energized in the manner earlier explained and its contacts 23 and 24 close to re-energize the reader clutch magnet of the tabulating card reader to effect transmission of the "end of message" potential pulse last mentioned and to continue the tabulating card operation to the home position of this reader.

It was previously mentioned that the data collection system of the invention could operate in the attendance mode using all badge readers in the system for personnel attendance recording. There are three ways in which the data transmitter presently described can be placed into the attendance mode character of operation. One of these is controlled by the central control unit 14 described in connection with FIG. 1, which enables the attendance mode of system operation to be manually selected or alternatively effects automatic changeover of the system to the attendance mode of operation during preselected times of the day. Any attendance system operation effected by the central control unit will render the start switch S1 (FIG. 8*a*) ineffective to initiate a data transmission and will cause the receiver to energize the input line JLU (FIG. 7*c*) to energize the attendance relay KRA. The second method by which the present data transmitter may itself be caused to operate in the attendance mode is by manual actuation of the attendance switch S4 (FIG. 7*e*) to its attendance mode position where its contacts 2, 3 and 4, 5 are closed. The switch S4 is of the toggle type and remains in either of the two positions to which it may be set, and is usually placed within a locked compartment available only to supervisory personnel. The third method by which the present transmitter may itself be operated in the attendance mode is by manually inserting a badge into reading position in the badge reader and thereafter briefly actuating a "clock in-out" switch S7 (FIG. 7*f*). These several methods by which the transmitter may be operated in the attendance mode will now be considered in turn.

When the central receiver-recorder unit places positive energization on the input line JLU as occurs when the system is changed to the attendance mode of operation, the relay KRA (FIG. 7c) is energized. Attendance relays KA1 and KA2 (FIG. 7f) are now energized through now closed contacts 3 and 4 of the relay contacts KRA and normally closed contacts 1 and 2 of the plunger switch S3 and the normally closed contacts 21 and 22 of the relay KCR. It will be noted in relation to the energizing circuit last traced that the badge plunger switch S3 must have its contacts 1 and 2 normally closed to complete the energizing circuit, thus requiring that there be no badge in the badge reader at this time. The character of operation which prevails when a badge is in the badge reader at the time of changeover of the system to the attendance mode will be considered hereinafter. The relays KA1 and KA2 are maintained energized through a hold circuit which includes the contacts 3 and 4 of relay KRA and the now closed contacts 27 and 28 of the relay KA2.

Assume now that a badge is placed into reading position in the badge reader. The badge good relay KKBG (FIG. 7f) is now energized through the diode rectifier CRB, the now closed contacts 4 and 5 of the relay KA1, the now closed contacts 2 and 3 of the badge-in switch S6, the now closed contacts 4 and 5 of the plunger switch S3, and the normally closed contacts 21 and 22 of the relay KCR. This energizing circuit for the badge good relay KBG is now extended through the now closed contacts 23 and 24 of the relay KBG, the now closed contacts 29 and 30 of the relay KA2, and the normally closed contacts 1 and 2 of the relay KBR to energize the badge reader clutch LBC. The badge reader thereupon completes a cycle of operation during which the data of the badge is read and retained in storage in the badge reader contacts. During this reader cycle, the badge reader cam actuated contacts SRC–1 (FIG. 7c) energize the badge reader relay KBR (FIG. 7f).

This causes the relay KSB (FIG. 7e) to be energized through the normally closed contacts 1 and 2 or 3 and 4 of the serializer cam actuated contacts SS2–SS12 and a jumper connection provided between an appropriate one of the serializer contact output terminals C10–M10 (selected according to the number of data digits to be read from the badge) to the terminal N10 as shown in FIG. 7g, now closed contacts 7 and 8 of the relay KA1, now closed contacts 6 and 7 of the relay KBR just energized, now closed contacts 2 and 3 of the relay KA2, normally closed contacts 3 and 4 of the relay KT2, and normally closed contacts 6 and 7 of the relay KSS. Now closed contacts 29 and 30 (FIG. 7c) of the relay KSB establish with the now closed contacts 4 and 5 of the relay KBR a hold circuit for the latter relay so that the relay KBR remains energized with the relay KSB until the latter becomes de-energized at the completion of transmission of the badge data in a manner presently to be explained.

The contacts 9 and 10 (FIG. 7b) of the relay KSB are now closed to energize the lockout relay KLO through the normally closed contacts 23 and 24 of the relay KLO from the electrical interlock line conductor JLT which extends through other transmitters of higher order for positive energization from the central receiver-recorder as explained in connection with FIG. 2. The lockout relay KLOG establishes a hold circuit through its now closed "AX" contacts 1 and 2 and the contacts 27 and 28 of the relay KSB. The contacts 23 and 24 of the relay KLO open to interrupt energization from the interlock line conductor JLT to the interlock line conductor JLR extending to the lockout relay circuits of lower order transmitters as explained in connection with FIG. 2. Now closed contacts 4 and 5 of the lockout relay KLO energize the lockout secure relay KT1 from the input line JLL having positive energization impressed upon it from the central receiver-recorded unit, this energizing circuit including a jumper from a terminal N9 shown in FIG. 7b to an appropriate one of terminals A9–L9 (selected according to the number of data digits to be read out from the badge reader) associated with normally closed serializer contacts SS15–SS3 and further including the normally closed contacts 24 and 25 of the relay KEM. The relay KT1 is maintained energized through the now closed contacts 25 and 26 of the relay KLO and its now closed contacts 25 and 26 from the line conductor JLP which is positively energized from the central receiver-recorder unit. The now closed contacts 27 and 28 of the relay KT1 directly energize the relay KT2 shown in FIG. 7b.

The serializer clutch magnet LSC (FIG. 7d) is now energized through the now closed serializer contacts SS16, the now closed contacts 4 and 5 of the relay KSB, normally closed contacts 3 and 4 of the relay KSV, normally closed contacts 3 and 4 of the relay KSS, now closed contacts 29 and 30 of the relay KT2, and normally closed circuts 21 and 22 of the relay KCR. The serializer initiates a cycle of operation, and the first data code transmitted to the central receiver-recorder unit causes the latter to remove positive energization from the line conductor JLL. This requires that the line JLL be now energized at the transmitter by energization from the energizing circuit of the relay KT1 from the positively energized line conductor JLP, this energizing circuit for the line JLL including the normally closed one of the serializer cam actuated contacts SS3–SS15 selected by the jumper connection from one of the terminals A9–L9 to the terminal N9, and the now closed contacts 4 and 5 of the lockout relay KLO. Thus as the serializer in progressing through its cycle of operation transmits the last data digit read from the badge reader contacts, the corresponding one of the serializer cam actuated contacts SS3–SS15 of FIG. 7b opens briefly to remove (for 12 milliseconds) the positive potential placed on the line conductor JLL in the manner last explained. This signifies to the central receiver-recorder, by the drop of potential on the line conductor JLL, an "end of message" or completion of data transmissions. One of the serializer contacts shown in FIG. 7g next opens to de-energize the relay KSB. The contacts 27 and 28 of the relay KSB open to de-energize the lockout relay KLO, and the contacts 25 and 26 of the latter thereupon open to de-energize the secure lockout relay KT1 which in turn de-energizes the relay KT2. This terminates access of the transmitter to the common data communication channel extending to the central receiver-recorder, and it will be noted that for this transmission of badge data there is at the end of the transmission no acknowledgment from the central receiver-recorder that the data has been correctly received.

When the local "attendance" switch S4 (FIG. 7e) is manually operated to the attendance mode, one pair of its contacts 2 and 3 close to provide a circuit in shunt to the contacts 3 and 4 of the relay KRA and a second pair of the attendance switch contacts 4 and 5 close to provide an electrical shunt around the contacts 24 and 25 of the relay KRA. It may further be noted that the normally closed but now open contacts 1 and 2 of the switch S4 interrupt the energizing circuit for the program selector switches shown in FIG. 7e. Thus actuation of the attendance switch S4 to the attendance mode position effects immediate energization of the relays KA1–KA2 in the same manner as their energization by the attendance mode relay KRA so that the operation of the transmitter in its attendance mode is the same as that just described.

Upon brief manual actuation of the "clock in-out" switch S7 (FIG. 7f) to close its contacts, the relays KA1–KA2 are energized through the normally closed contacts 21 and 22 of the dial good relay KDG and are maintained energized through now closed contacts 9 and 10 of the relay KA2, a diode rectifier CRA, and normally open but now closed contacts 2 and 3 of the plunger switch S3 operated by a badge placed into reading position in the badge reader. The badge transmission thereafter proceeds in the same manner as just described.

In all of the attendance mode method of transmitter operation just described, a badge-reader transaction code 1–3–4 is automatically generated and transmitted just prior to transmission of any badge data. The circuit by which this is accomplished extends from the line conductor JLP (FIG. 7*b*), positively energized from the central receiver-recorder unit, the conductor X3 extending to FIG. 8*c*, the normally closed contacts 1 and 2 of the relay KSD, the contacts 25 and 26 of the relay KSB which is energized for each badge transmission, contacts 5 and 6 of cam actuated serializer contacts SS15 which are the first serializer contacts to close during each cycle of serializer operation, now closed contacts 5 and 6 (FIG. 8*e*) of the relay KA2, diode rectifiers CR18, CR19, and CR20, the strobe serializer contacts SS17, and the now closed contacts of the relay KT2 shown in FIG. 8*i* to the line conductors A, C and D of the common data communication channel extending to the central receiver-recorder unit.

Assume that during a period of data transmission the central control unit 14, described in connection with FIG. 1, changes the system operation over to the attendance mode by energization of the relay KRA (FIG. 7*c*) in the manner just described and at a time when a badge is in reading position in the badge reader. These operating conditions cause a badge error relay KBE (FIG. 7*f*) to be energized through the now closed contacts 24 and 25 of the relay KRA, the normally closed contacts 3 and 4 of the relay KA1, the now closed contacts 2 and 3 of the badge-in switch S6, the now closed contacts 4 and 5 of the plunger switch S3, and the normally closed contacts 21 and 22 of the relay KCR. Neither of the relays KA1 and KA2 can be energized upon energization of the relay KRA since the energizing circuit of the relays KA1 and KA2 includes the normally closed but now open contacts 1 and 2 of the plunger switch S3. When the relay KBE becomes thus energized, its contacts 24 and 25 (FIG. 7*c*) energize a badge error light and its contacts 4 and 5 energize the error buzzer to inform the person attempting to make the transmission that the system operation has been changed to the attendance mode. The person is thus required to remove his badge from the badge reader, without transmission of any data therefrom due to the deenergized states of the relays KA1 and KA2. Upon removal of the badge, the badge-in switch S6 and plunger switch S3 transfer their contacts to de-energize the badge error relay KBE and effect normal energization of the relays KA1 and KA2 by the now energized relay KRA to change the transmitter to the attendance mode of operation.

Assume that the central control unit 14 changes the system operation over to the attendance mode at a time when a card is in the card reader and a badge is in the badge reader and when all preliminary automatic checks are completed awaiting access of the transmitter to the common data communication channel. Energization of the attendance relay KRA (FIG. 7*c*) by energization of the line conductor JLU from the central receiver-recorder unit, to change the system to the attendance mode, energizes a transmission error relay KTE (FIG. 7*e*) through the now closed contacts 5 and 6 of the attendance relay KRA, the now closed contacts 9 and 10 of the card good relay KCG, and the normally closed contacts 21 and 22 of the relay KCR. The relay KTE thereupon closes its contacts 7 and 8 (FIG. 7*c*) to illuminate an error repeat lamp and its contacts 1 and 2 "AX" to energize the error buzzer. The error relay KTE can be de-energized upon manual actuation of the card eject switch S2 (FIG. 7*g*) to energize the card release relay KCR, which as previously explained causes the card reader to read and release the tabulating card but without accompanying data transmission. The contacts 21 and 22 of the relay KCR open to effect deenergization of all relays standing energized at this time. The relay KCR becomes de-energized, in the manner previously explained, upon completion of the card reading operation and return of the card reader to its home position. Removal of the badge from the badge reader then permits the now energized attendance relay KRA to effect energization of the relays KA1 and KA2 in the manner previously explained and place the transmitter in the attendance mode of operation.

Assume now that while transmission of data to the central receiver-recorder unit is in progress the receiver removes positive energization from the input line JLP (FIG. 7*b*) as occurs for any transmission error detected by the receiver during the transmission. The removal of positive energization from the line JLP de-energizes the secure lockout relay KT1 at a time when the lockout relay KLO remains energized. This causes energization of the end of message relay KEM and error relay KTE in the following manner. The relay KEM is energized through the now closed contacts 9 and 10 of the relay KLO, the normally closed contacts 1 and 2 of the relay KA2, the normally closed contacts 3 and 4 of the relay KT2 which became de-energized with de-energization of the relay KT1, and the normally closed contacts 6 and 7 of the relay KSS. The error relay KTE is now energized from the energizing circuit last traced through the now closed contacts 7 and 8 of the relay KEM. Contacts 7 and 8 (FIG. 7*c*) of the relay KTE now close to illuminate the repeat error lamp, and contacts 1 and 2 of the relay KTE energize the error buzzer. The relay KTE may be de-energized in the manner just explained by manual actuation of the card eject switch S2 (FIG. 7*g*) to energize the card release relay KCR. The operation just described likewise occurs upon removal by the receiver of energization of the line JLP at the end of a transmission when the receiver detects an error in the length of message transmitted.

As will be seen from FIG. 7*c*, an "in process" lamp is illuminated whenever the secure lockout relay KT1 is energized to close its contacts 29 and 30 during data transmissions or when the serializer relay KSS is energized to close its contacts 29 and 30 preliminary to the start of transmissions. A "clock in-out" lamp is illuminated whenever relay KA1 is energized to close its contacts 9 and 10 during periods while the transmitter is controlled to operate in the attendance mode.

If the operator realizes that a previous transmission included an error, such as a wrong setting of a variable data dial, a correction transmission procedure is used to correct the error. The previous erroneous transmission is repeated including all errors contained in it, but while performing this transmission the void switch S5 (FIG. 8*e*) is manually actuated to transfer its contacts so that the 5-space code transmitted by the contacts 9 and 10 of the serializer cam actuated contacts SS14 of FIG. 8*e* is now transmitted as a 7-cancel code by reason of the energization through the void switch S5 of the contact 13 (FIG. 8*h*) of the serializer contacts SS17. By this procedure the central receiver-recorder unit will have two data recordings which are identical except that the first recording has a 5-space code following the initial transaction code whereas the latter will have a 7-cancel code following the transaction code. During subsequent processing of the recorded information, the second recording can be made to cancel the first recording. The operator then makes a third transmission containing correct information free of the original error, and this recording is processed in normal fashion.

It is occasionally found in practice that the first index-point column of a tabulating card is code punched with a shift in its spacing from the adjacent edge of the card so that this column (and all subsequent punched-code columns) is spaced from the card leading edge by an amount slightly greater or less than the standard prescribed distance. This inaccuracy of spacing may be occasioned by slight inaccuracy of card positioning at the time of code punching or by mal-functioning of the tabulating card punch machine or may be due to change of card dimensions usually experienced as shrinkage, taking place over a prolonged period of use of the card. Since this inaccuracy of spacing of the first and subsequent index-point punched-code columns from the leading edge of the card may give rise to errors in reading the card, it may be desirable in a particular application to avoid these reading errors by use of a system of tabulating card reader contacts and an error relay KESC shown in FIG. 7*j*. This may be accomplished by removing the jumper connection between the terminals F15 and L16 (FIG. 7*b*) and thereby place in the energizing circuit of the lockout secure relay KT1 the normally closed contacts 1 and 2 of the tabulating card reader cam actuated contacts SC2–5 (FIG. 7*j*) and parallel-connected but normally open reader contacts SR2–0—SR2–12. The reader cam actuated contacts SC2–5 open during the mid portion of the reader cycle but only after any of the reader contacts SR2–0—SR2–12 have already closed by reason of the sensing of a code aperture or apertures in the card. The cam actuated contacts SC2–5 close again later in the same reader cycle and do this before any closed ones of the reader contacts SR3–0—SR2–12 open. Thus the secure lockout relay KT1 is maintained energized at the beginning and end of each reader cycle by the normally closed cam actuated contacts SC2–5, and is maintained energized during the mid portion of each reader cycle by closure of any of the reader contacts SR2–0—SR2–12 in sensing at least one code aperture.

This insures that the secure lockout relay KT1 remains energized so long as one or more code apertures are sensed in the first and successive columns of the tabulating card to the last item of data to be transmitted. While card columns following the last recorded data column may have no data recordings, the stop code 3–8 used at the end of the data to be transmitted energizes the end of message relay KEM as previously described and thereafter the now closed contacts 25 and 26 of the relay KEM maintain the secure lockout relay KT1 energized during the period required for a "message good" acknowledgment signal to be returned from the receiver-recorder to terminate access of the transmitter to the common data communication channel.

The arrangement just described is entirely satisfactory where all data to be transmitted is recorded in successive columns of the tabulating card beginning with its first column. There are occasions, however, when it is desired that the tabulating card data be recorded in groups of successive index-point columns or so-called "fields" and in these instances the data recorded in a particular field may not occupy the entire field width thus leaving one or more end columns of the field with no recorded data. In such event, the special tabulating card reader contacts shown in FIG. 7*c* energize a terminal Y1 in response to a 5–8 code and a terminal Y6 in response to a 2–8 code. One of these codes may be recorded following the last information item recorded in a tabulating card field and the other code may be recorded as the last code of the field, and these codes are then used to energize and deenergize the relay KESC shown in FIG. 7*j*. For example, a jumper connection between the terminal Y1 of FIG. 7*c* and the terminal Z1 of FIG. 9*j* effects energization of the relay KESC upon reading a 5–8 code and the now closed contacts 5 and 6 (FIG. 7*b*) of the relay KESC maintain the secure lockout relay KT1 energized while the tabulating card reader reads over those tabulating card columns of the field having no recorded data. The relay KESC is maintained energized through its now closed contacts 1 and 2, a circuit conductor X10 extending to FIG. 7*b*, and contacts of various relays energized at this time. A jumper connection between the terminal Y6 of FIG. 7*c* and one of the terminals W1, W3 or W5 of FIG. 9*j* uses the code 2–8 read from the tabulating card to apply reverse energization to the relay KESC through the now closed contacts 3 and 4 of this relay, thereby to deenergize the relay and restore control of continued energization of the relay KT1 to the reader cam actuated contacts SC2–5 and reader contacts SR2–0—SR2–12.

It was explained above that a transfer code 2–8–11 read from the tabulating card effects the transmission of variable dial data, and that a badge code 3–8–11 causes transmission of data read from a badge by the badge reader. If either the transfer code or badge code is followed by one or more columns of the tabulating card which record no data, as in omitting use of one field of the card, either or both of the transfer and badge codes may be used to energize the relay KESC of FIG. 7*j*. For example, to use the transfer code for this purpose the jumper connection between the terminals Y4 and Y5 (FIG. 7*c*) is removed after which the terminal Y4 is jumper connected to one of the terminals Z1, Z3 or Z5 of FIG. 7*j* and the terminal Y5 is then connected to the associated terminal Z2, Z4 or Z6 whereby the transfer code energizes the relay KESC through one of the diode rectifiers CR31, CR33 or CR34 and the relay KSV (FIG. 7*d*) is concurrently energized through the diode rectifier CR30, CR32 or CR35. The badge code 3–8–11 may be similarly used by removing the jumper connection between the terminals Y7 and Y8 of FIG. 7*c* and connecting these terminals in the manner just explained for the transfer code. As before, one or both of the terminals Y1 and Y6 of FIG. 7*c* may be connected to terminals W1, W3 and W5 of FIG. 7*j* to use the 5–8 or 2–8 codes to de-energize the relay KESC for purposes of reading further data from the tabulating card for transmission.

2. *Electrical circuit arrangement of the FIG. 5 data transmitter*

The electrical circuit arrangement of the FIG. 5 data transmitter is likewise conveniently considered in two sections, of which that shown in FIGS. 9*a*–9*i* arranged as in FIG. 9 is generally concerned with various relay control functions and that shown in FIGS. 10*a*–10*i* arranged as in FIG. 10 generally relates to data transmission functions. The circuit arrangement of the badge reader 24 of FIG. 5 is shown in FIGS. 11*a* and 11*b* arranged as in FIG. 11.

Considering for the moment the circuit arrangement of the badge reader, it will be noted from FIG. 11*a* that the reader unit includes its own induction drive motor B with starting relay KM energized through a POWER switch from an alternating current source of power. It will also be noted that the badge reader unit includes the plunger actuated switch S3, the badge-in switch S6, the clock in-out switch S7, the reader cam actuated contacts SRC–1, and the badge read relay KBR. However, for convenience of reference these several circuit components are also shown in FIG. 9*c* together with the interconnecting circuits indicated in broken lines by which these components provide an electrically complete system with the FIGURE 9 circuit components. Hence in describing the FIGURE 9 portion of the present transmitter electrical circuit arrangement, the description will refer to the badge reader components as though they were included in FIG. 9*c* rather than tracing the actual circuitry from FIG. 9*c* through interconnecting cables to FIG. 11*b* and back through interconnecting cables to FIG. 9*c*.

The circuit arrangement of the present transmitter is, with certain differences hereinafter noted, essentially the same as that of the FIG. 4 transmitter just previously described. Accordingly, circuit components in FIGS. 9–11 corresponding to the same components in FIGS. 7 and 8 are identified by the same reference numerals and alphabetic letter identifications.

By reason of the close similarity of the FIG. 4 and FIG. 5 transmitter circuit arrangements, all of the previous description of the FIGS. 7 and 8 transmitter circuit arrangement and operation applies to that of FIGS.

9–11 with certain exceptions hereinafter specifically con-considered. The present transmitter differs from the arrangement of FIGS. 7 and 8 principally in relation to the provisions made under transaction program selection control for placing one or both of the two tabulating card readers into operation, and for enabling variable dial read-out codes and badge read-out codes read from either of the two tabulating cards to effect the read-out operation specified. Accordingly, the three initial preliminary check operations performed after manual actuation of the start switch S1 (FIG. 10*a*) likewise characterize the operation of the present transmitter. Thus the first check operation ascertains that the variable dial switches have been properly set according to the transaction program manually selected (energizing either the dial good relay KDG or the dial error relay KDE of FIG. 10*a*), that a badge has been properly inserted in the badge reader (energizing the badge good relay KBG or the badge error relay KBE of FIG. 9*f*), and that master and detail tabulating cards are positioned in the respective master and detail tabulating card readers (energizing the card good relay KCG or the card error relay KCE of FIG. 10*a*).

The tabulating card checks of the present transmitter differ slightly from that described for the transmitter of FIGS. 7 and 8 where the card reader contacts SR1–0, SR1–1, SR1–2, and SR1–12 (corresponding to those shown in FIG. 10*a* of the present transmitter) directly energize the card good relay KCG or card error relay KCE through the transaction program contacts SP1–SP7 (corresponding to those also shown in FIG. 10*a*). In the present transmitter certain 1–2–0–12 codes are assigned to master cards and others are assigned to detail cards. This card identification code must appear, as in the transmitter arrangement first described, in the first index-point column of the tabulating card. Accordingly in performing the initial tabulating card check in the present transmitter arrangement, one tabulating card reader is checked to ascertain that it contains a master card and the other is checked to ascertain that it contains a detail card. To this end, the card good relay KCG or the card error relay KCE (FIG. 10*a*) is energized through an energizing circuit which includes the cam actuated contacts SC1–1 and SC1–4 of one card reader and the cam actuated contacts SC2–1 and SC2–4 of the other card reader as shown in FIG. 10*a*, which further includes the master card reader special code contacts SR1–0, SR1–1, SR1–2 and SR1–12 and the detail card reader special code contacts SR2–0, SR2–1, SR2–2 and SR2–12, and which further includes the transaction program selector switch contacts SP1–SP7 with appropriate jumper connections (such as the illustrative connections shown in FIG. 10*a*) completed between the master and detail card reader special code contacts and terminals K1–Q1 and K2–Q2 according to any of seven selectable transmission programs. Since the initial card check requires reading of the first code recorded in the master and detail cards, the card check must be accompanied by an initial cycle of reading operation of the master and detail card readers. To this end, the pressure roll latch release magnets LD1 and LD2 (FIG. 9*a*) of the respective master and detail card readers are concurrently energized to effect a cycle of energization of their respective reader clutch magnets LR1 and LR2 (FIG. 9*g*) through their respective pressure roll actuated switches SD1 and SD2 (and their respective cam actuated reader contacts SC1–2 and SC2–2) in the same manner as previously described in connection with FIGS. 7 and 8.

The present transmitter gains access to the common data communication channel by energization of the lockout relay KLO (FIG. 9*b*) and the lockout secure relay KT1 in the same manner as described in relation to the transmitter of FIGS. 7 and 8, and upon gaining such access likewise operates in the same manner as the earlier described transmitter to transmit a first data digit defining the transaction program selected and to transmit a space code followed by transmission of the semi-variable dial data. Upon completing transmission of the latter data, the relay KSS becomes de-energized to energize the card read relay KR in the same manner as earlier described. It may be noted that the hold circuit of the relay KR includes the master card reader cam actuated contacts SC1–5 parallelled by the detail card reader actuated contacts SC2–5 so that either reader during operation will maintain the relay KR energized until transmissions are completed.

The master card reader reading contacts are shown in FIG. 10*b* and are electrically interconnected, as earlier described in reference to FIG. 8*b*, to convert the Hollerith tabulating card code to any desired form of 8 bit code. The detail card reader contacts, indicated in FIG. 10*c* as included within a card reader contact unit 36, have the same arrangement and connections as are shown for the master card reader contacts. These reader contacts of both tabulating card readers are energized by the now closed contacts 4 and 5 (FIG. 10*c*) of the card read relay KR, and by the master card reader cam actuated contacts SC1–5, and detail card reader cam actuated contacts SC2–5 as shown. The output circuits of the reader contacts are connected in parallel through the diode rectifier devices CR1–CR15 (FIG. 10*h*), the cam actuated strobe contacts SS17, and the now closed contacts of the relay KT2 shown in FIG. 10*i* to the conductors A–H of the common data communication channel extending to the central receiver-recorder unit.

At the completion of transmission of the semi-variable dial data, a transfer relay KRT (FIG. 9*e*) is in de-energized state. This fact causes the master card reader to be placed into operation before the detail card reader. Thus the master card reader clutch magnet LR1 (FIG. 9*g*) is now energized through the master card reader cam actuated contacts SC1–2, the master card special code reader contacts shown in FIG. 9*d*, the now closed contacts 21 and 22 of the transfer relay KRT, normally closed contacts 23 and 24 of the relay KSB, normally closed contacts 21 and 22 of the relay KSV, normally closed contacts 23 and 24 of the relay KSS, now closed contacts 6 and 7 of the card read relay KR, a conductor X2 extending to FIG. 10*a*, normally closed contacts 1 and 2 of the start switch S1, normally closed contacts 1 and 2 of the relay KA1, and normally closed contacts 1 and 2 of the relay KRA.

When the master card reader reads a 3–8 stop code, the transaction selector switch contacts 8 and 9 of the transaction selector switch bank SP1–SP7 shown in FIG. 9*e* are energized. Through jumper wiring (according to a transaction program requiring reading operation of the detail card reader) between the terminals A14–G14 and the terminal I14, the transfer relay KRT becomes energized. This relay remains energized through its now closed contacts 1 "AX" and 2, the now closed contacts 9 and 10 of the card good relay KCG, and the normally closed contacts 21 and 22 of the relay KCR thus to maintain the transfer relay energized to the completion of transmission operations (and resulting energization of the card release relay KCR in the manner previously explained). The transfer relay contacts 21 and 22 (FIG. 9*d*) open to interrupt the energizing circuit of the master card reader clutch LR1, and the contacts 22 and 23 of the transfer relay KRT now close to apply energization to the detail card reader clutch LR2 (FIG. 9*g*) to initiate operation of this reader.

Now when the detail card reader special code contacts read a 3–8 stop code, the end of message relay KEM (FIG. 9*e*) is energized to de-energize the card read relay KR as soon as the detail reader cam actuated contacts SC2–2 open at 320° of the reader cam shaft. The contacts 24 and 25 of the relay KEM also now open to remove energization from the line JL–L (FIG. 9*b*) to indicate to the receiver-recorder unit that the transmission is completed. The removal of the transmitter from access to the common data communication channel upon subsequent receipt of a signal from the central receiver-recorder unit, indicating correct or erroneous receipt of the transmission, is the same as that previously described in connection with FIGS. 7 and 8.

According to a selective jumper connection completed between terminal Q9 and either of terminals Q10 or Q11 shown in FIG. *9d*, a transfer code 2–8–11 read by the master card or detail card reader effects energization of the selected variable dial relay KSV to effect serializer read out of data manually set into the variable dial switches in the manner previously described in connection with FIGS. 7 and 8.

Also according to a selective jumper connection completed between a terminal P9 and either of terminals P10 and P11 shown in FIG. *9c*, a badge read code 3–8–11 read by the master card reader or detail card reader effects energization of the select badge relay KSB (FIG. *9e*) temporarily to halt the tabulating card reading operation and cause serializer read out of the data stored in the badge reader as previously described in connection with the transmitter of FIGS. 7 and 8. There is the difference in the present transmitter, however, that the badge reader is placed into operation only under control of a badge read code by one of the tabulating card readers, and accordingly the badge anti-repeat relay KBAR of the transmitter earlier described is omitted from the present transmitter.

As in the FIGS. 7 and 8 transmitter arrangement previously described, possible tabulating card reading errors occasioned by punch-code columns improperly spaced from the leading edge of the card may be reduced by removing the jumper connection between the terminals F15 and L16 of FIG. *9b*. This places into the energizing circuit of the lock-out secure relay KT1 the cam actuated contact SC1–5 and reader contact system SR1–0—SR1–12 of the first card reader and the cam actuated contacts SC2–5 and system of reader contacts SR2–0—SR2–12 of the second card reader with these contacts connected as shown in FIG. *9j*. Also as explained in connection with the FIGS. 7 and 8 transmitter, the relay KESC of FIG. *9j* may be energized and de-energized by jumper connections to various reader-contact energized terminals Y1–Y8 (FIG. *9c*) of the second card reader or to various reader-contact energized terminals Y1'–Y8' (FIG. *9b*) of the first tabulating card reader to maintain the secure lock-out relay KT1 energized while reading through those columns of a card field which contain no recorded data. The operation is then that earlier described but with the difference that the secure lock-out relay KT1 is energized under control of the reader contacts of both tabulating card readers and under control of the relay KESC which itself is controlled to its energized and de-energized states by various selected codes of either or both of the tabulating card readers.

The operation of the present transmitter is, with the differences above explained, otherwise the same as that of the transmitter first described in reference to FIGS. 7 and 8.

The transmitter of FIG. 3 is the same as that just described with reference to FIGS. 9 and 10 except that it does not use a badge reader. The jumper connections between either of the terminals R3 and S3 (FIG. *9e*) and the contacts 6 and 7 of the transaction selector program switch banks SP1–SP7 cannot be energized in the absence of a badge reader, so that the badge good relay KBG is automatically energized in the manner previously explained but cannot be reverse energized and an initial successful badge check is accordingly performed even though a badge reader is not used. Neither the master tabulating card or detail tabulating card should contain a badge read code 3–8–11, but if this code should be read by either reader it will be ignored since the select badge relay KSB cannot be energized (there being no badge read relay KBR) and thus the relay KSB is unable to energize the serializer clutch magnet LSC (FIG. *9d*). Accordingly, and except for the absence of the badge reading operation, the operation of the FIG. 3 form of transmitter is otherwise the same as described above in connection with FIGS. 9 and 10.

3. *Electrical circuit arrangement of FIG. 6 badge transmitter*

The electrical circuit arrangement of the FIG. 6 badge transmitter is shown in FIGS. *12a–12d* arranged as in FIG. 12. As previously explained, it includes a badge reader having the physical construction disclosed in the aforementioned Blodgett copending application Serial No. 249,252 and a serializer having the construction disclosed in the aforementioned Blodgett Patent No. 3,204,051. Both of these are driven from a common synchronous drive motor B (FIG. *12c*) having a starting relay KM both energized through a POWER switch from a suitable source of alternating current PAC. The alternating current supplied by this source is rectified by diode rectifier devices CR for unidirectional power energization of the badge reader components.

The badge reader is automatically placed into operation, to transmit data read from a badge, by manual insertion of a badge into reading position in the rader. This transfers the contacts of the badge-in switch S6 and also transfers the contacts of the plunger switch S3, whereby the reader clutch magnet LRI is energized through the normally closed contacts 1 and 2 of a badge read relay KBR, the now closed contacts 2 and 3 of the switch S6, and the now closed contacts 4 and 5 of the switch S3. The reader thereupon completes a cycle of reader operation to read the data of the badge and to store this data in its reader contacts shown in FIGS. *12a* and *12b*. As this reading cycle progresses, the reader cam actuated contacts SRCC1 energize the badge read relay KBR, and the latter is maintained energized through its now closed contacts 4 and 5, the normally closed 1 and 2 contacts of the serializer cam actuated contacts SSCC16 (closed from 173.5° to 192° of each serializer cycle and from 353.5° of one serializer cycle to 12° of the next cycle) and SSCC15 (open between 167° and 190° of each cycle), and the 1 and 2 contacts of a serializer cam actuated contact here shown by way of example as contact SSCC14. The contacts 1 and 2 of the badge read relay KBR open to interrupt the energizing circuit of the reader clutch magnet LRI, thus limiting the reader to one cycle of operation.

A lockout relay KLO is now energized from the transmission line conductor JLN negatively energized from the central receiver-recorder unit and from normally closed contacts 3 and 4 of the relay KLO to the line conductor JLT which is positively energized by the central receiver-recorder unit by way of the higher order transmitters, this energizing circuit including the now closed contacts 26 and 27 of the relay KBR. The lockout relay KLO remains energized through its now closed "AX" contacts 1 and 2 and the now closed contacts 8 and 9 of the relay KBR. The contacts 3 and 4 of the relay KLO now open to interrupt the KLO energizing circuit of lower order transmitting stations as explained in connection with FIG. 2, and the contacts 5 and 6 of the lockout relay KLO open to prevent energization of the secure lockout relays of higher order stations as also explained in connection with the electrical interlock system of FIG. 2. The now closed contacts 6 and 7 of the lockout relay KLO energize a secure lockout relay KT from the line conductor JLL, which initially is positively energized from the central receiver-recorder unit, through normally closed contacts 1 and 2 of a serializer cam actuated contact SSCC13 parallelled by serializer cam actuated contacts SSCC18. The now closed contacts 29 and 30 of the secure lockout relay KT, the now closed contacts 24 and 25 of the badge read relay KBR, the parallel connected serializer contacts last mentioned, and the now closed contacts 6 and 7 of the lockout relay KLO maintain the line conductor JLL positively energized from the line conductor JLP after the positive energization of the line JLL by the receiver-recorder unit is terminated upon receipt of the first data code by this unit.

The serializer clutch magnet LRO now becomes energized through the contacts 3 and 4 of the serializer cam actuated contacts SSCC16 (which are closed from 173.5° to 192° and from 353.5° to and 12° beyond the end of the serializer cycle), the now closed contacts 25 and 26 of the secure lockout relay KT, the now closed contacts 6 and 7 of the badge read relay KBR and the contacts 3 and 4 of the serializer cam actuated contacts SSCC14. This places the serializer in operation. Its cam actuated contacts SSCC1 first close to apply the positive energization of the line JLP through the serializer strobe cam actuated contacts SSCC17 (which close for a shorter interval but concurrently with the successive closing of all others of the serializer cam actuated contacts) and through the diode rectifier devices CR13–CR15 and the now closed contacts 1–2, 6–7 and 8–9 of the lockout secure relay KT to the conductors A, C and D of the common data transmission channel extending to the receiver-recorder unit. This energization of the line conductors compress a badge read transaction code 1–3–4. Thereafter the contacts 3 and 4 of the serializer cam actuated contacts SSCC2–SSCC11 close in succession to transmit successive numeric digits, stored in the badge reader contacts, through the coding diode rectifiers CR1–CR18 and through the now closed contacts 1–2, 4–5, 6–9 and 21–24 of the secure lockout relay KT to the conductors A–F of the common data communication channel extending to the central receiver-recorder unit. The contacts 3 and 4 of the serializer cam actuated contacts SSCC12 and SSCC13 then close in succession to read out semi-variable data, such as station identification or the like data, manually set into the semi-variable data switches S1 and S2.

During transmission of the last digit of variable dial data by the serializer cam actuated contacts SSCC13, the contacts 1 and 2 (FIG. 12*c*) of the serializer contacts SSCC13 open. The serializer cam actuated contact SSCC18 opens its contacts for a shorter 12 millisecond interval but concurrently with closure of all other serializer cam actuated contacts, and accordingly open concurrently with the contacts 1 and 2 of the serializer cam actuated contacts SSCC13. The concurrent opening of these serializer contacts briefly removes for a 12 millisecond interval the positive energization applied from the line conductor JLP to the line conductor JLL, thus to inform the central receiver-recorder that the transmission has been completed.

The contacts 1 and 2 of the serializer cam actuated contacts SSCC14 (FIG. 12*d*) now open to interrupt the hold energizing circuit of the KBR relay. The contacts 24 and 25 of the relay KBR thereupon open to interrupt the energizing circuit of the secure lockout relay KT, and the contacts 8 and 9 of the relay KBR interrupt the hold energizing circuit of the lockout relay KLO. The contacts 3 and 4 of the lockout relay KLO thereupon close to complete a first electrical interlock circuit between the line conductors JLT and JLR, and the now closed contacts 5 and 6 of the lockout relay KLO complete the second interlock circuit between the line conductors JLL and JLM.

As more fully explained in the aforementioned Blodgett patent No. 3,204,051, the power driven cam shaft of the serializer must complete two revolutions during the complete operating cycle of the serializer and this requires a second energization of the serializer clutch magnet LRO at the 180° intermediate point of the serializer cycle. This is normally accomplished by the energizing circuit shown in FIG. 12*d* which includes the serializer cam actuated contacts SSCC15 (closed only from 167° to 190° of the serializer cycle) and SSCC16, both of which are normally closed at 180° of the serializer cycle, and now closed contacts of 25, 26 and 6, 7 of the respective relays KT and KBR if energized at this time. If, however, the latter relays should have been de-energized (for reasons presently to be explained) at the 180° point of the serializer cycle, the serializer clutch magnet LRO then is pulsed through the 180° serializer cyclic point by the now closed contacts 3 and 4 of the serializer cam actuated contacts SSCC16 and SSCC15. The serializer contacts SSCC15 are open to halt the serializer at its home position.

Figure 12D:
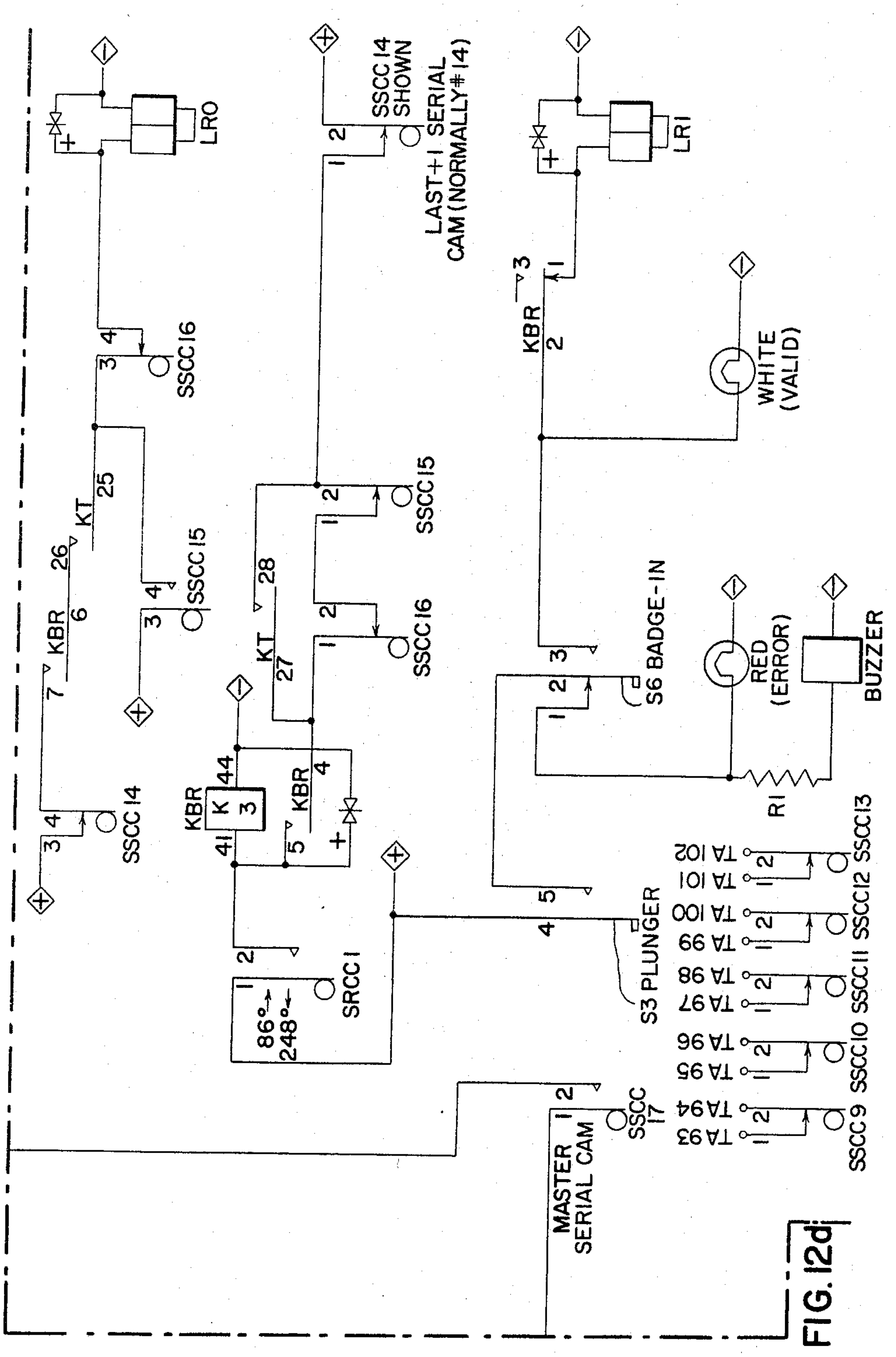

If all badges to be read at a particular transmitter record some maximum number of data digits less than ten, contacts 1 and 2 of serializer cam actuated contacts SSCC3–SSCC12 shown unconnected in FIGS. 12*b* and 12*d* may be used to minimize the time that the transmitter has access to the common data communication channel. By way of example, assume that the maximum number of data digits read from a badge is four. The first five cam actuated serializer contacts SSCC1–SSCC5 are connected to transmit the transaction code and the four data digits, and contacts 3 and 4 of cam actuated serializer contacts SSCC6 and SSCC7 are then connected to read the two digits manually set into the semi-variable data dial switches S1 and S2. The contacts 1 and 2 of the serializer cam actuated contact SSCC7 are then connected into the circuit (in place of contacts 1 and 2 of the serializer SSCC13 contacts shown) which maintains positive energization on the line conductor JLL in the manner above explained. Also contacts 1 and 2 of the cam actuated serializer contacts SSCC8 are then connected into the hold energizing circuit of the badge read relay KBR (instead of the contacts 1 and 2 of the cam actuated contacts SSCC14 as shown). This effects transmission of all data information while minimizing the period during which the relays KBR, KT and KLO remain energized, and thus minimizes the access time of the badge transmitter to the common data communication channel.

The receiver-recorder unit removes positive energization from the line conductor JLP whenever the receiver senses an error in the received data. Should this occur during an early period in the transmission of the badge data, the relay KT is deenergized. Its contacts 27 and 28 open and the relay KBR is then deenergized when contacts 1 and 2 of the serializer cam actuated contacts SSCC15 open at 167° of the serializer cycle. This in turn deenergizes the relay KLO to remove access of the transmitter to the common data communication channel.

If a badge should be inserted into the badge reader backwards or upside down, the badge in switch S6 contacts transfer while the badge is manually returned in reading position but the plunger switch S3 contacts do not transfer. The reader clutch magnet LR1 is not then energized, and the badge may be readily withdrawn from the reader. Badge withdrawal permits the contacts of the switch S6 to return to their non-transferred position, but the plunger switch S3 contacts now move to transferred position. This energizes an error lamp and a buzzer through the normally closed contacts 1 and 2 of the switch S6 and the now closed contacts 4 and 5 of the switch S3, and the plunger now prevents insertion of a badge into reading position in the reader until the plunger is manually reset to move the contacts of the switch S3 to non-transferred position to deenergize the error lamp and buzzer.

4. *The control and time transmission unit 14*

The electrical circuit arrangement of the control and time transmission unit is shown in FIGS. 13*a*–13*h* arranged as in FIG. 13.

It was earlier explained that this transmitter unit includes a time clock, having the construction disclosed in the aforementioned Stiffler Patent No. 3,205,651, with hour and day-of-the-week time registering shafts mechanically interconnected in pairs by full and segmental gearing for synchronous motor power drive actuation from a synchronous drive motor. The latter is identified by the drive motor B1 in FIG. 13*h* which, with its starting relay K1, is energized from a suitable source of alternating current as shown. As will presently be explained more fully, the drive motor B1 is periodically mechanically connected to the clock time registering elements through an electrically controlled clutch under control of a synchronous clock motor B2 energized from the alternating current power source through the normally closed contacts 2 and 3 of a clock halt switch S8. An alternating current relay KAC is energized directly from the alternating current source, and while energized its contacts 2 and 4 close to energize a rectifier system including diode rectifier devices 38 which supplies unidirectional energizing power to the time transmitter. A reset switch S9 is briefly manually actuated to close its contacts 1 and 2 to place the time transmitter in operation by energization of a power monitor relay KPM, which thereafter remains energized through its now closed contacts 1 and 2 so long as power continues to be supplied by the unidirectional rectifier system earlier mentioned. The contacts 3 and 4 of the monitor relay KPM energize a line conductor JCW from the conductor JC*e*, the energization of the line conductor JCW being required to place the receiver-recorder unit into operation and to maintain its operative state. By reason of this, the receiver-recorder unit becomes inoperative upon any power failure of the time transmitter and must be thereafter restored to operation by a tape-feed preliminary operation hereinafter described in connection with the receiver operation. A transformer 39, concurrently energized with the synchronous clock motor B2, energizes a running indicator lamp 40 to indicate that the synchronous clock motor B2 is operatively energized, and to energize a power failure indicator lamp 41 to indicate a power failure upon closure of contacts 21 and 22 of the relay KPM whenever the latter becomes de-energized by reason of de-energization for any reason of the unidirectional power supply system earlier mentioned.

As more fully explained in the aforementiond Stiffler copending application, the time clock of the transmitter includes a hundredths hour time shaft for indicating the prevailing time in hundredths of an hour, a tenths hour time shaft, an hour shaft which indicates hours of the day in the twenty-four hour continental form, and a day-of-the-week shaft. These shafts are each provided with plural cam actuated electrical contacts which are actuated singly and in coded combinations to closed contact positions to enable the generation of coded electrical signals indicative of the time digit registered by the shaft. Thus referring to FIGS. 13*a*–13*d*, the hundredths hour shaft is provided with six cam actuated coding contacts SRC1–SRC6 and includes in addition cam actuated contact SRC17 (FIG. 13*f*) which is concerned with the attendance mode of system operation to be later considered; the tenths hour shaft is provided with cam actuated contacts SRT1–SRT6 for coded time signal generation, and with cam actuated contacts SRT10–SRT17 which are used in connection with the attendance mode of system operation hereinafter described; the hour shaft is provided with cam actuated contacts SRH1–SRH6 to generate a signal indicating the units digit of the hour, with cam actuated contacts SRH7–SRH9 to generate an electrical signal indicative of the tens digit of the hour registered by the hour shaft, and is additionally provided with cam actuated contacts SRH10–SRH17 which are used in connection with the attendance mode of system operation; and the day-of-the-week shaft is provided with cam actuated contacts SRD1–SRD4 which generate an electrical signal indicative of the day of the week registered by this shaft.

Figure 13D:
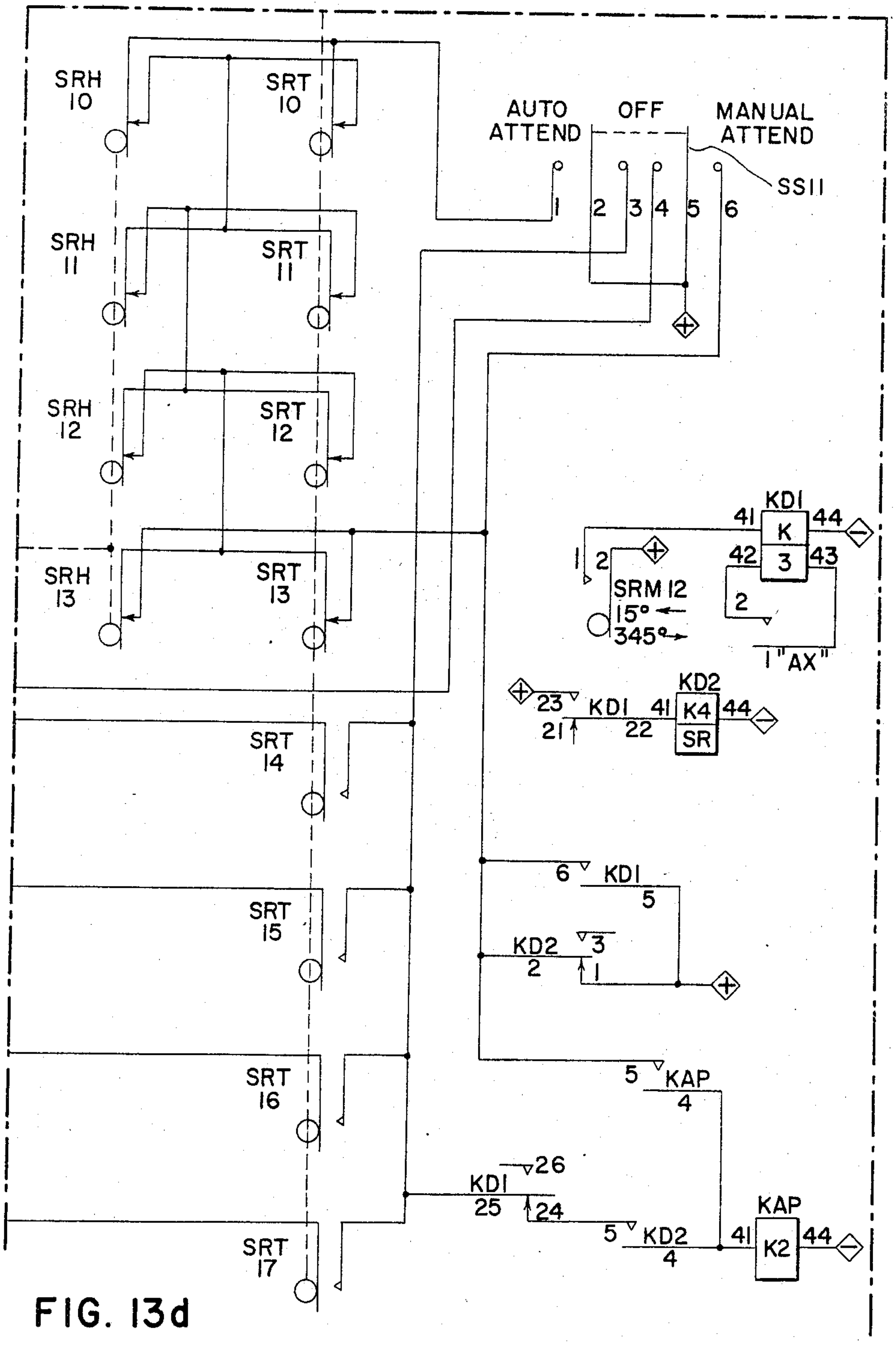
Figure 13E:
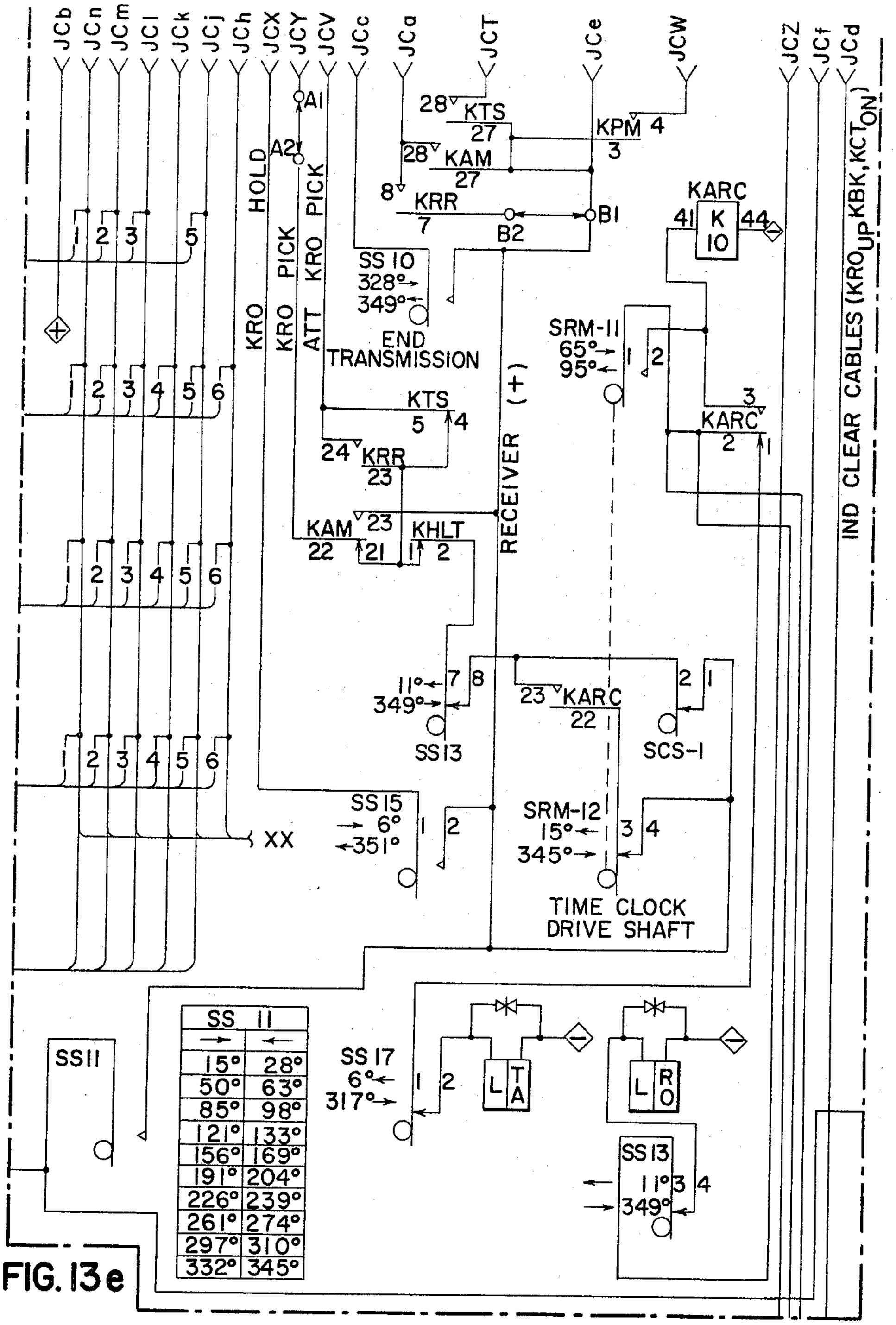
Figure 13F:
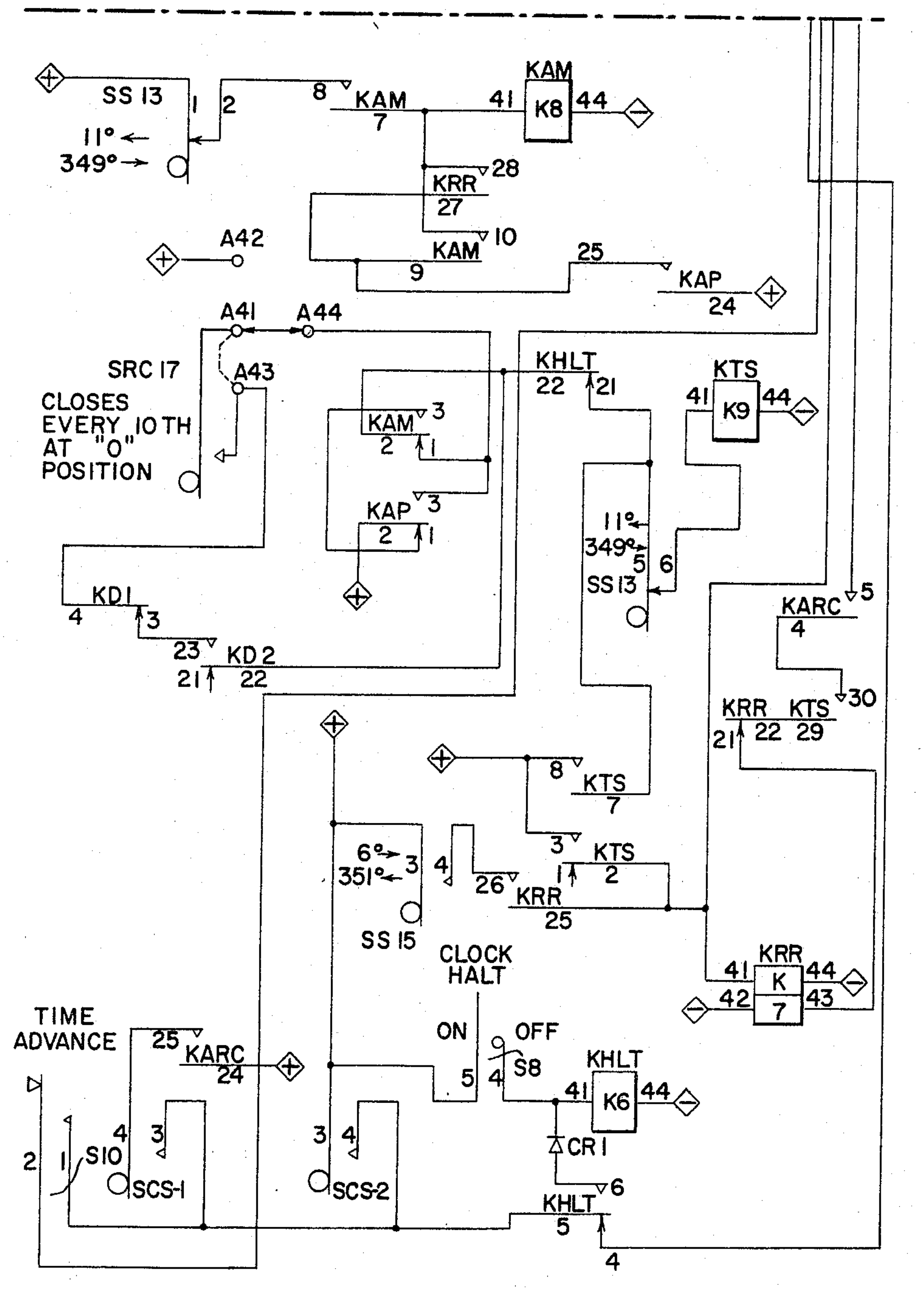
Figure 13G:
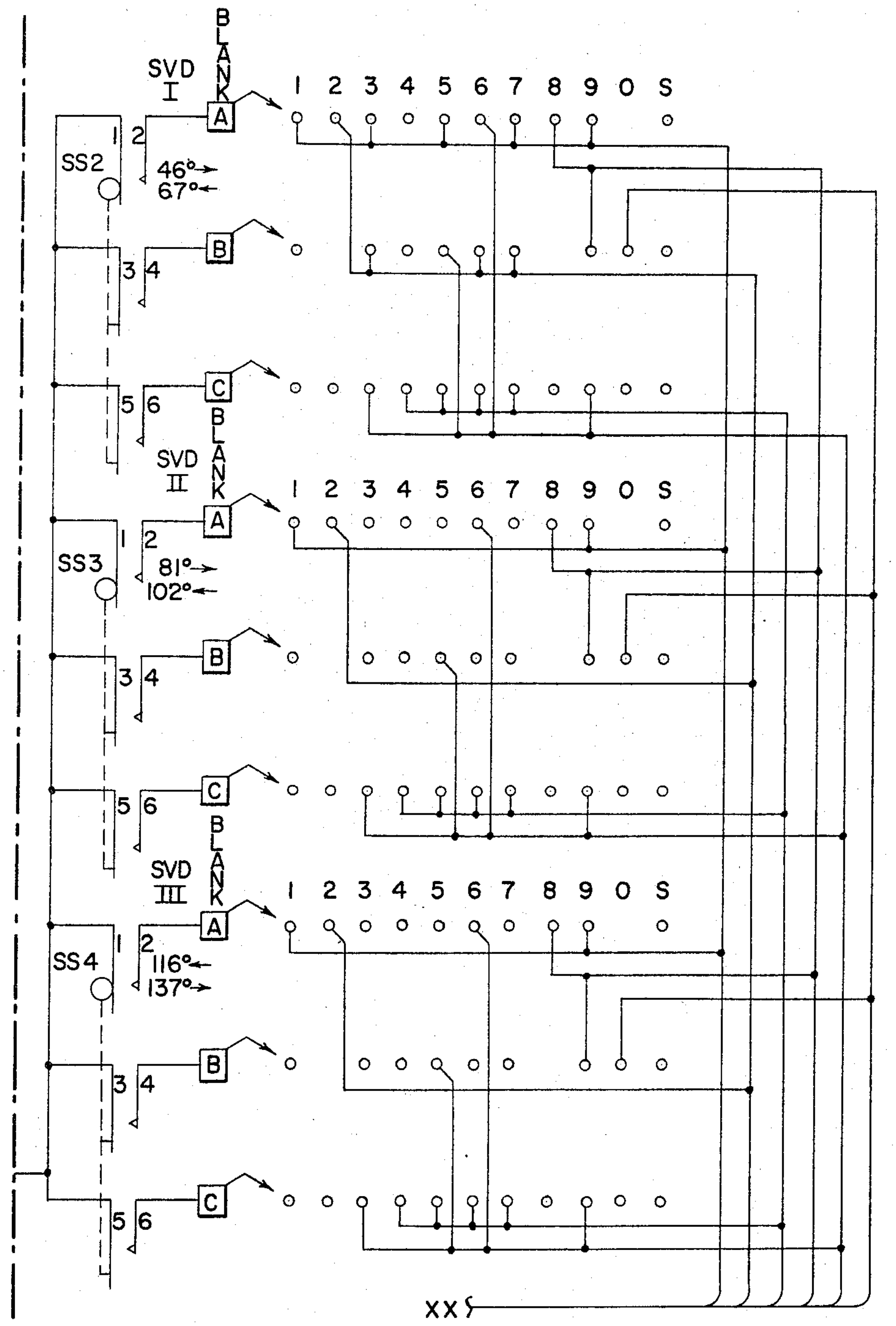

The present time transmitter is also provided with three manual switches SVDI, SVDII, SVDIII, as shown in FIG. 13*g*, which may be manually set to positions indicating to a maximum of three digits the number of the day in a calendar year (such as the two hundred and sixty-fifth day of the year). Each of these switches is of the triple deck rotary switch type having the stationary contacts of the three switch decks electrically interconnected as shown to generate a coded electrical signal indicative of the numeric value of the digit to which the switch is set. These three switches include additional contacts 10 and 11 shown in FIG. 13*a* and which are closed by a bridging member D whenever the individual switch is manually adjusted to its "S" position to indicate that these three switches have been set to effect transmission of the day of the week rather than the numeric day of a calendar year.

Normal operating time advance of the time clock is effected under control of the synchronous clock motor B2, as normally energized by manual positioning of the clock halt switch S8 to close its contacts 2 and 3. The synchronous clock motor B2 continuously operates cam actuated contacts SCS1 and SCS2 shown in FIGS. 13*e* and 13*f*, these cam actuated contacts being of the snap-operated switch type such as conventional "Micro-switches." The clock motor operation of these cam actuated contacts is such that the contacts SCS1 close one second before transfer of the contacts SCS2 and are closed for thirteen seconds during each thirty-six second interval. The contacts SCS2 transfer for three seconds during each thirty-six second interval. Each successive time advance of the clock is effected by energization of the electromagnet LTA of the time advance clutch which mechanically couples the synchronous drive motor B1 to the time clock. The energizing circuit of the electromagnet LTA includes the normally closed contacts 1 and 2 of a serializer cam actuated contact SS17, the normally closed contacts 1 and 2 of a relay KARC, the normally closed contacts 4 and 5 of a halt relay KHLT, and the contacts 3 and 4 of the clock motor cam actuated contacts SCS2 when these contacts close for a three second interval.

Energization of the time advance clutch LTA mechanically drives a clock drive cam shaft of the time clock, as more fully explained in the aforementioned Stiffler application, and at 65° of rotation of this cam shaft the cam actuated contacts SRM11 (FIG. 13*e*) close to energize a relay KARC from the clutch energizing circuit last traced. The contacts 1 and 2 of the relay KARC now open to interrupt the energization of the time advance clutch electromagnet LTA, and the contacts 2 and 3 of the relay KARC now close to establish a hold circuit for this relay through the normally closed contacts 4 and 5 of the halt relay KHLT, the now closed contacts 3 and 4 of the clock motor cam actuated contacts SCS1, and the now closed contacts 24 and 25 of the relay KARC. Energization of the relay KARC, in interrupting the energizing circuit of the time advance clutch electromagnet LTA as previously mentioned, limits the time advance to one revolution of the clock drive cam shaft. The hold circuit last described for the relay KARC remains energized for a total of twelve seconds through the now closed contacts 3 and 4 of the cam actuated contacts SCS1. Upon opening of the latter contacts, the hold circuit of the relay KARC is interrupted so that its hold-circuit contacts 24 and 25 open while its contacts 1 and 2 again close in readiness for a further time advance upon the next transfer of the contacts 3 and 4 of the cam actuated contacts SCS2.

Whenever for any reason it is desired to set the time clock to a time standard, the clock halt switch S8 (FIG. 13*f*) is manually operated to close its contacts 4 and 5 and energize a halt relay KHLT. The halt switch S8 is of the toggle type and thus remains in either the ON or OFF position to which it is manually set. The normally closed contacts 2 and 3 (FIG. 13*h*) of the halt switch S8 are opened, upon this manual actuation of the halt switch S8, and remove a shunt from the normally closed contacts 1 and 2 of the clock motor cam actuated contacts SCS2 so that the clock motor B2 becomes de-energized upon the next transfer of the cam actuated contacts SCS2. The contacts 3 and 4 of the cam actuated contacts SCS2 now close to establish a hold energizing circuit for the halt relay KHLT through the now closed contacts 5 and 6 of the latter and a diode rectifier device CR1. Since the clock motor B2 has been halted with the contacts 3 and 4 of the cam actuated contacts SCS2 closed, manual actuation of a time advance switch S10 (FIG. 13*f*) to close its contacts effects energization of the time advance clutch electromagnet LTA through the normally closed contacts 1 and 2 of the relay KARC. The relay KARC, as before, is energized by the time clock cam actuated contacts SRM11 at 65° of the clock cam shaft and the relay is maintained energized through its now transferred contacts 2 and 3 as long as the time advance switch S10 remains manually actuated to close its contacts. As previously explained, operation of the relay KARC limits energization of the time advance clutch electromagnet LTA to one clock drive shaft revolution.

Repeated manual actuations of the time advance switch S10 advances once for each operation the hundredths digit registered by the time clock. Settings of the tenths of hour, hour and day digit values registered by the time clock are then accomplished by manual setting knobs provided. When the time of the reference time standard advances to that thus manually set into the time clock, the clock halt switch S8 is once more manually operated to close its contacts 2 and 3 (FIG. 13*h*) and to open its contacts 4 and 5 (FIG. 13*f*). This re-energizes, through the now closed contacts 2 and 3 of the halt switch S8, the synchronous clock motor B2. Upon the next transfer of the clock motor cam actuated contact SCS2 to open its contacts 3 and 4, the halt relay KHLT hold energizing circuit is interrupted to de-energize this relay. The relay KHLT in remaining energized after manual operation of the clock halt switch S8 to its ON position prevents an initial undesired time advance otherwise effected by energization of the time advance clutch electromagnet LTA while the clock motor cam actuated contact SCS2 remains with its contacts 3 and 4 closed at the time the synchronous clock motor B2 was reenergized in the manner just explained.

It will later be explained in connection wtih the electrical circuit arrangement of the central receiver-recorder unit that a receiver read out relay KRO is energized when a data transmitter sends to the receiver an end of message signal and the receiver thereupon demands a time transmission. The receiver relay KRO is energized by positive energization supplied from the receiver to the conductor JC*e* of the transmitter and through an energizing circuit which includes the normally closed contacts 1 and 2 of the clock motor cam actuated contacts SCS1, contacts 7 and 8 of the serializer cam actuated contacts SS13, normally closed contacts 1 and 2 of the halt relay KHLT, and normally closed contacts 21 and 22 of the relay KAM to the output circuit conductor JCY extending to the receiver. It will be noted that this KRO relay energizing circuit includes contacts 1 and 2 of the clock motor cam actuated contacts SCS1 which open one second ahead of each time change. Since the receiver relay KRO must be energized before the receiver can demand a time transmission from the time transmitter, it will be evident that any failure of the receiver relay KRO to be energized by opening of the clock motor cam actuated contacts SCS1 just preceding each time change prevents any time transmissions while a time change is in progress. Each time transmission requires approximately 300 milliseconds, so that it is completed well prior to the next time change if the receiver relay KRO should become energized just prior to the opening of the clock motor cam actuated contacts SCS1. Now when the time read-out serializer is placed into operation in a manner presently to be explained, the serializer cam actuated contacts SS15 (FIG. 13*e*) are the first to close. These contacts apply energization from the receiver positively energized conductor JC*e* to an output circuit conductor JCX which extends to the receiver and constitutes a hold energizing circuit for the receiver relay KRO to maintain the latter energized from 6° to 351° of the serializer cycle of operation. The serializer contacts SS17 open from 6° to 317° of the serializer cycle of operation to prevent any time advance, otherwise effected by energization of the time advance clutch magnet LTA, until transmission of the last time digit has been completed at 314° of the serializer cycle of operation.

Upon energization of the receiver time read out relay KRO in the manner just explained, an electrical circuit is completed in the receiver between a transmitter positively energized output conductor JC*b* and a circuit conductor JCZ extending from the receiver to the transmitter. The positive energization of the line conductor JCZ thereupon energizes the serializer clutch magnet LRO through contacts 3 and 4 of the serializer cam actuated contacts SS13, thus initiating a cycle of operation of the serializer.

The serializer cam actuated contacts SS1 are the first to be operated to closed contact position, but these contacts are ineffective at this time since their function is to transmit an attendance mode code during the attendance mode of operation of the system later to be described.

The serializer cam actuated contacts SS2–SS4 now close in succession to transmit a maximum of three possible numeric data digits identifying the day of the calendar year if the day of the year digits have previously been manually set into the switches SVDI, SVDII and SVDIII of FIG. 13*g*. For this purpose, the serializer cam actuated contacts SS2, SS3 and SS4 are energized from the receiver positively energized conductor JC*e* through the serializer cam actuated contacts SS11 which, as shown by the table of FIG. 13*e*, close for a short interval during the longer interval when each of the other serializer cam actuated contacts close. The successively operated serializer contacts SS2, SS3 and SS4 apply this energization through the contacts of the switches SVDI, SVDII and SVDIII to the time data transmission line conductors JC*h*, JC*j*, JC*k* and JC*m*–JC*p* extending to the central receiver-recorder unit.

If the day of the year numeric data is not to be transmitted, the day of the year switches SVDI, SVDII and SVDIII last mentioned are each set to their "S" position. It will be seen from FIG. 13*g* that this is an open circuit position setting of the switches, but it will also be seen from FIG. 13*a* that these switch settings are now effective to complete an energizing circuit from the serializer cam actuated contact SS11 to the serializer cam actuated contacts SS5 which next close to energize the day shaft operated cam actuated coding contacts SRD1–SRD4 and thus effect transmission of the day of the week data digit to the central receiver recorder unit.

Thereafter the serializer cam actuated contacts SS6–SS9 close in succession to energize successively from the serializer cam actuated contacts SS11 the four groups of time clock cam actuated coding contacts SRH7–SRH9, SRH1–SRH6, SRT1–SRT6 and SRC1–SRC6 to transmit to the central receiver the prevailing hour digit setting of the time clock to two significant decimal digits.

The serializer cam actuated contacts SS10 next close to transmit through a line conductor JC*c* to the receiver an end of transmission signal which is used at the receiver, as will presently be explained more fully, to perform a check which ascertains that the correct number of digits has been received by the receiver. The serializer continues on to complete its cycle of operation, but without further data transmissions, to halt at its home position.

The data collection system may be placed in the attendance mode of operation, earlier mentioned in connection with the description of the data transmitters, by manual actuation of a switch S11 to either a manual attendance position or to an auto attendance position. The switch S11 is a three-position switch and remains in the OFF position in which it is shown in FIG. 13*d*, the manual attendance position, or the auto attendance position to which it is manually set.

Each time advance of the time clock is accompanied by energization of a delayed-release relay KD1 (FIG. 13*d*) by closure of contacts 1 and 2 of the clock cam shaft actuated contacts SRM12. A delayed-release relay KD2 is thereupon energized through the now closed contacts 22 and 23 of the relay KD1. At 345° of the time clock cam shaft rotation, the relay KD1 becomes deenergized. The opening of its contacts is delayed, however, by previous closure of the contacts 1 and 2 of the relay KD1 which complete the circuit of a winding on this relay effective to oppose a rapid decrease of the energizing magnetic flux established during energization of the relay. Accordingly, the contacts 22 and 23 of the relay KD1 are delayed in opening for approximately 15 milliseconds to effect de-energization of the relay KD2 which also is of the slow release type and does not open its contacts until approximately 25 to 30 milliseconds after the relay becomes de-energized.

With the attendance mode switch S11 operated to the manual attendance position to close its contacts 2 and 3, a relay KAP becomes energized upon delayed closure of the contacts 24 and 25 of the relay KD1 and during delayed opening of the contacts 4 and 5 of the relay KD2. The relay KAP is thereafter maintained energized through its now closed contacts 4 and 5 and the now closed contacts 5 and 6 of the attendance switch S11.

A relay KTS (FIG. 13*f*) is now energized through the normally closed contacts 5 and 6 of the serializer cam actuated contacts SS13, the normally closed contacts 21 and 22 of the halt relay KHLT (which prevent placing of the system in the attendance mode of operation during periods of clock halt by the previously described manual actuation of the halt switch S8), the normally closed contacts 1 and 2 of a relay KAM, and the now closed contacts 2 and 3 of the relay KAP. The relay KTS remains energized through its now closed contacts 7 and 8 and contacts 5 and 6 of the serializer cam actuated contacts SS13. The contacts 27 and 28 of the relay KTS close to apply the positive receiver energization of the line conductor JC*e* to a line conductor JCT which extends to the receiver to energize a relay KCT therein in a manner and for a purpose described hereinafter in connection with the description of the receiver-recorder unit.

Now closed contacts 2 and 3 (FIG. 13*f*) of the relay KTS energize one winding of a relay KRR and also apply energization to a conductor JC*f* extending to the receiver. If a receiver relay KSI or a receiver relay KMLC is energized at this time to indicate that a data transmission is in progress, the receiver applies the energization of the line conductor JC*f* to a line conductor JC*d*. The energization of the conductor JC*d* is applied through the now closed contacts 4 and 5 of the relay KARC (the latter being energized at this time since the relay energizations just described resulted by reason of a time advance of the time clock), the now closed contacts 29 and 30 of the relay KTS, and the normally closed contacts 21 and 22 of the relay KRR to a reverse energizing circuit of the relay KRR. Accordingly, the relay KRR does not become energized until its reverse energization is removed either by reason of the de-energization of both of the receiver relays KS1 and KMLC or by reenergization of the relay KARC to open its contacts 4 and 5 after a relatively prolonged delay interval of approximately thirteen seconds. It was previously explained that the receiver demand for a time transmission depended upon energization of a receiver relay KRO through the line conductor JCY. For the attendance mode, however, the previously described energization of the receiver relay KCT requires that the receiver relay KRO be now energized through a line conductor JCV. This occurs upon energization of the relay KRR to close its contacts 23 and 24 as soon as the time clock cam shaft actuated contacts SRM12 close at 345° of the cam shaft cycle to apply energization from the line JC*e* through the now closed contacts 22 and 23 of the relay KARC, the serializer contacts SS13 and the now closed contacts 1 and 2 of the relay KHLT. The contacts 27 and 28 of the relay KRR close to energize the attendance mode relay KAM through the now closed contacts 24 and 25 of the relay KAP, the relay KAM remaining energized thereafter both (1) through its now closed contacts 7 and 8 and contacts 1 and 2 of the serializer cam actuated contacts SS13 and (2) its now closed contacts 9 and 10 and the now closed contacts 24 and 25 of the relay KAP. The contacts 29 and 30 of the relay KAP close to energize the attendance mode indicator lamp (FIG. 13*h*) to indicate change over of the system operation to the attendance mode. The contacts 22 and 23 of the attendance mode relay KAM close to energize the conductor JCY from the conductor JC*e*, the energized conductor JCY providing in the attendance mode energization for message length checking in the receiver. The contacts 27 and 28 of the relay KAM close to apply energization from the conductor JC*e* to a line conductor JC*a* which extends to the receiver and energizes a receiver relay KCM. This receiver relay effects change of the data collection system to the attendance mode of operation wherein operation of badge readers only is permitted for data transmissions. The now energized receiver relays KCT and KRO complete a circuit in the receiver from the line conductor JC*b* to the line conductor JCZ to energize the serializer clutch magnet LRO. As the serializer begins its cycle of operation, the contacts 5 and 6 of the serializer cam actuated contacts SS13 open at 11° of the serializer cycle to interrupt the energizing circuit of the relay KTS. The relay KRR was maintained energized previous to this time through the closed contacts 2 and 3 of the relay KTS, but upon de-energization of the relay KTS further energization for the relay KRR is maintained through its now closed contacts 25 and 26 and the now closed contacts 3 and 4 of the serializer cam actuated contacts SS15 to 351° of the serializer cycle at which point these contacts open to de-energize the relay KRR. The now closed contacts 5 and 6 (FIG. 13*b*) of the relay KAM energizes the serializer cam actuated contacts SS1 to transmit the attendance code 1–2–3–4–5. Thereafter the serializer in continuing its cycle of operation transmits the day and hour data digits and an end-of-transmission signal in the manner earlier explained and halts at its home position. Each subsequent change of time effects a time transmission by energization of the relays KD1 and KD2 and a resultant energization of the relay KTS (and with it the relay KRR) through the now closed contacts 2 and 3 of the relay KAP, the normally closed contacts 3 and 4 of the relay KD1, the delayed opening of the contacts 22 and 23 of the relay KD2, the normally closed contacts 21 and 22 of the relay KHLT and the normally closed contacts 5 and 6 of the serializer cam actuated contacts SS13. Removal of the jumper connection between the terminals A41 and A43 shown in FIG. 13*f* restricts these periodic time transmissions to every tenth time advance when the hundredths-hour shaft actuated contacts SRC17 close.

Figure 13H:
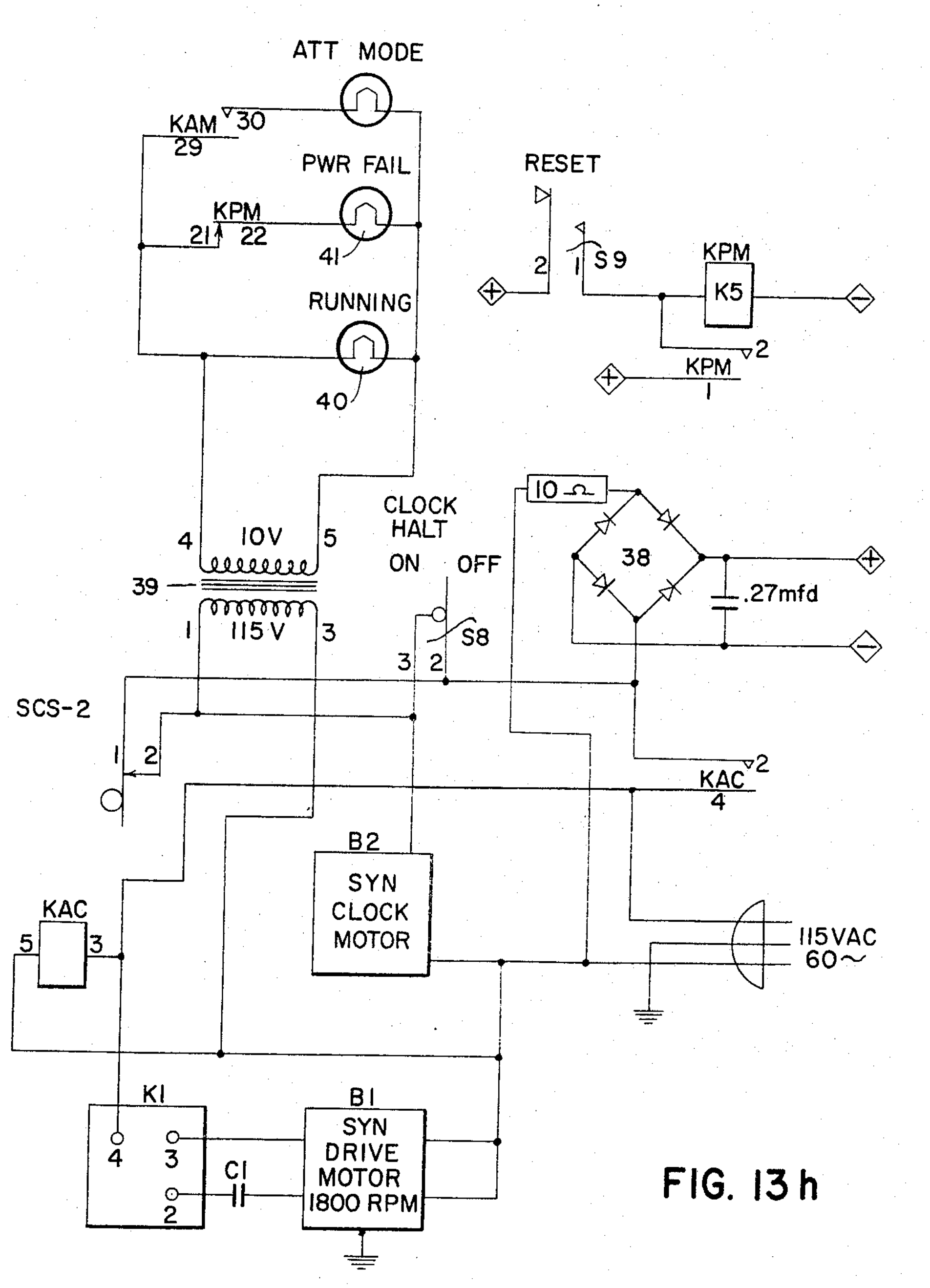

Assume now that the attendance switch S11 is moved to its OFF position. The relay KAP, which is energized at this time through its now closed contacts 4 and 5 and through the normally closed contacts 1 and 2 of the relay KD2, becomes de-energized upon the next time change when the relays KD1 and KD2 are energized in the manner previously explained. The contacts 24 and 25 (FIG. 13*f*) of the relay KAP open to interrupt one energizing circuit of the relay KAM, but a second energizing circuit for this relay extends through its now closed contacts 7 and 8 and contacts 1 and 2 of the serializer cam actuated contacts SS13. Contacts 1 and 2 of the relay KAP now close to energize the relay KTS (and with it the relay KRR) through the now closed contacts 2 and 3 of the relay KAM and a time transmission takes place during which the relay KAM becomes de-energized by opening of the serializer cam actuated contacts SS13. Contacts 29 and 30 of the relay KAM open to extinguish the attendance mode indicator lamp (FIG. 13*h*). The attendance mode of transmitter operation terminates after the serializer cam actuated contacts SS10 energize the line conductor JC*c* to cause a message length check in the receiver, and after the relay KRR is de-energized by interruption of its hold energizing circuit by the opening of the serializer cam actuated contacts SS15.

When the attendance switch S11 is manually moved to its automatic attendance position, its now closed contacts 4 and 5 apply energization to normally open cam actuated contacts SRH14–SRH17 positioned upon the hour shaft of the time clock and adjustable to be operated to closed contact position at any of four selectable hours of the day. These cam actuated contacts are connected in series with individual ones of normally open tenth hour cam actuated contacts SRT14–SRT17 which are adjustable on the tenths hour shaft of the clock for operation to closed contact position at any of four selectable tenths hour. Now when one of the hour cam actuated contacts SRH14–SRH17 and its associated tenths hour cam actuated contacts SRT14–SRT17 are concurrently operated to closed contact position, the relay KAP (FIG. 13*d*) is energized on the next time change when the relays KD1 and KD2 are energized in the manner previously explained. Energization of the relay KAP is continued, after de-energization of the relays KD1 and KD2, through the now closed contacts 4 and 5 of the relay KAP, the series-parallel connected and normally closed contacts of the tenths hour and hour shaft cam actuated contacts SRT10–SRT13 and SRH10–SRH13 of the time clock, and the now closed contacts 1 and 2 of the switch S11. The last described energizing circuit provides a continuing hold circuit for the relay KAP until the end of each preselected automatic attendance time period when one of the hour cam actuated contacts SRH10–SRH13 and a corresponding one of the tenths hour cam actuated contacts SRT10–SRT13 concurrently move to open contact position. These hour and tenths hour cam actuated contacts are also adjustably positioned upon the hour and tenths hour shafts of the time clock and accordingly may be preset to positions terminating the automatic attendance mode of operation at any of four desired hour and tenth hour times of the day. With the relay KAP energized as just described, the relays KTS, KRR, and KAM thereupon become energized in succession as previously described to effect a time transmission and to place the transmitter and data collection system in the automatic attendance mode of operation providing periodic time transmissions in the manner just described. The attendance mode subsequently terminates upon ultimate de-energization of the relays KAP and KAM under control of the automatic attendance clock contacts SRH10–SRH13 and SRT10–SRT13.

It was previously explained that upon completion of each data transmission to the receiver-recorder the latter automatically requests a time transmission from the time transmitter when the latter is used, records the resultant received time transmission, and counts the time digits as a portion of the data transmission in making a final length of message check. However, and as will be explained more fully hereinafter in connection with the description of the receiver-recorder unit, the latter has a modified character of operation which may be selected and by which the receiver-recorder unit merely receives each data transmission and checks it for message length without requesting a time transmission. For this character of receiver-recorder operation, the time transmitter transmits to the receiver periodic time transmissions in the same manner as prevously described for the operation of the system in the attendance mode but with the difference that these periodic time transmissions are made irrespective of whether the system operates to transmit data or operates in the attendance mode.

When this character of receiver-recorder operation is selected, the jumper connection between the terminals A1 and A2 (FIG. 13*e*) is removed as is the jumper connection between the terminals B1 and B2, and a jumper connection is now completed between the terminal B1 and the terminal A1 to maintain the line conductor JCY continuously energized from the receiver energized line conductor JC*e*. Also the jumper connection between the terminals A41 and A44 (FIG. 13*f*) is removed and a jumper connection is made between the terminals A41 and A42. Each time change (or every tenth time change effected by removal of the jumper connection between the terminals A41 and A42 as previously explained) now effects sequential energization of the relays KD1, KD2, KTS and KRR in the manner previously described to effect a time transmission, but the contacts 7 and 8 (FIG. 13*e*) of the relay KRR are now no longer energized to effect energization of the attendance mode receiver relay KCM each time that the relay KRR becomes energized. However, energization of the relay KAP during an attendance mode of system operation effects energization of the attendance mode relay KAM, and the contacts 27 and 28 (FIG. 15*e*) of the latter now energize the line conductor JC*a* to energize the attendance mode relay KCM of the receiver. The continuous energization of the line conductor JCY from the receiver energized line conductor JC*e* is now used by the receiver to accomplish its message length check following completion of each data transmission.

5. *The receiver-recorder unit 15*

The electrical circuit arrangement of the receiver-recorder unit is shown in FIGS. 14*a*–14*h* arranged as in FIG. 14.

The data collection system herein described may or may not employ a time transmitter. While the use of a time transmitter is quite desirable, principally for recording the times of receipt of data transmissions and to enable the system to operate in the attendance mode earlier mentioned, its use is not essential. FIGURE 14*a* accordingly shows in broken lines two alternative appropriately labelled groups of jumper connections made between the line terminals there shown when a time transmitter is not used and also when it is used. Even when time transmissions are available, they may be employed simply to enable recording of the times of receipt of data transmissions. However, the availability of a time transmitter has the important advantage that it enables operation of the system in the attendance mode for personnel attendance reporting. For this function, the receiver includes (FIG. 14*c*) a relay KCT and a relay KCM which with their associated electrical contacts and associated circuitry throughout FIG. 14 are shown in broken lines to indicate the optional use of attendance reporting. The description of the receiver electrical circuit arrangement will assume at the outset that no time transmitter is used in the system. This description will be followed by consideration of a slightly changed character of receiver operation when using a time transmitter but without system operation in the attendance mode, and the description will conclude with consideration of the receiver operation during periods of attendance reporting.

The recorder portion of the receiver-recorder unit is herein shown by way of example as comprised by a tape punch which may have the physical construction shown in the Blodgett U.S. Patent No. 2,927,158 and which punch records successive information-item groups of punch-code apertures. For this purpose, the punch unit includes punch magnets LP1–LP8 (FIGS. 14*b* and 14*c*) which are energized singly and in code combinations and includes a punch clutch magnet LPC which is energized to effect each cycle of punch operation in accomplishing an information-item recording. The punch unit is driven by a synchronous motor 50 (FIG. 14*d*) which with a motor starting relay 51 is energized from a suitable alternating current power source upon manual actuation of a power switch S4 to its ON position to close its contacts 4 and 5. A punch unit tape take-up motor (FIG. 14*d*) is also energized at this time. The punch unit also includes cam actuated contacts SPCC1 through SPCC11 shown at various locations in FIG. 14, each having electrical contacts which are operated to open-circuit and closed-circuit positions during specific angular intervals of each punch cycle as indicated by the angular notations associated with each punch cam actuated contact shown in FIG. 14.

Upon manual actuation of the power switch S4 (FIG. 14*d*) to its ON position to energize the punch motor 50 as earlier described, a unidirectional power supply system 52 is concurrently energized to provide a unidirectional power source for the receiver. A relay KCD (FIG. 14*d*) is also energized from the punch motor alternating current circuit, and an alarm buzzer 53 (FIG. 14*a*) and error indicating lamp 54 are now energized through normally closed contacts 1 and 2 of a relay KLP from a low voltage alternating current source of energization furnished by the power supply unit 52.

The receiver is placed into operation by relatively brief manual actuation of a tape feed switch S3 (FIG. 14*a*) to close its contacts 1, 2 and 4, 5. The switch S3 is manually retained in actuated position for a minimum of two cycles of the tape punch unit for a reason presently to be explained. Manual actuation of the switch S3 energizes an error relay KE (FIG. 14*g*) through normally closed contacts 21 and 22 of a relay KRT and the now closed contacts 4 and 5 of the tape feed switch S3. The relay KE is maintained energized to 41° of each punch cycle, initiated in a manner presently to be explained, through punch cam actuated contacts SPCC11 (FIG. 14*e*) and the now closed contacts 24 and 25 of the relay KE. A relay KLP (FIG. 14*a*) is also energized through normally closed contacts 5 and 6 of a relay KRT, the now closed contacts 1 and 2 of the tape feed switch S3, a punch tape switch SPT which senses the presence of unperforated tape in the tape punch unit and retains its contacts closed so long as tape is properly threaded in the tape punch in readiness to be punched, a jumper connection between the line conductors JLW and JL*e*, and the now closed contacts 2 and 4 of the relay KCD. The relay KLP is maintained energized through its now closed contacts 7 and 8 and the energizing circuit last traced through the punch tape contacts SPT. The contacts 1 and 2 (FIG. 14*d*) of the relay KLP now open to de-energize the alarm buzzer 53 and the error indicator lamp 54.

The now closed contacts 7, 8 and 22, 23 (FIG. 14*b*) of the error relay KE apply energization from the normally closed punch cam actuated contacts SPCC10 (FIG. 14*c*) through diode rectifier devices CR1–CR4 to the punch magnets LP1–LP4 and directly energize the punch magnet LP7. Each of the punch magnets has an associated diode rectifier CR7–CR14 associated with it as shown and by which the energization of any of these magnets effects energization of a relay KCR (FIG. 14*c*) to close its contacts 1, 2 and 3 of which the contacts 2 and 3 provide a hold energizing circuit for the relay KCR, and the contacts 1 and 3 energize the punch clutch magnet LPC, through the punch cam actuated contacts SPCC10. Thus the initial energization of the error relay KE is effective to punch record a 1–2–3–4–7 cancel code.

During the first cycle of the punch operation just described a message length control relay KMLC (FIG. 14*c*) is energized when the punch cam actuated contacts SPCC9 close at 30° of the punch cycle, this energizing circuit includes the now closed contacts 24 and 25 of the error relay KE. The relay KMLC is retained energized through its now closed contacts 30 and 31, the normally closed contacts 21 and 22 of a relay KET, and the now closed contacts 24 and 25 of the error relay KE. This retains the relay KMLC energized after the punch cam actuated contacts SPCC9 open at 245° of the punch cycle. The now closed contacts 28 and 29 (FIG. 14*b*) of the relay KMLC energize through diode rectifier devices CR5 and CR6 the punch magnets LP5 and LP6 so that the concurrent energization of the error relay KE and the message length control relay KMLC cause the punch unit to record a delete code 1–2–3–4–5–6–7 upon each successive cycle of the punch which continues in operation so long as the error relay KE remains energized.

Upon manual release of the tape feed switch S3, its contacts 4 and 5 open to de-energize the error relay KE. The contacts 24 and 25 of the relay KE now open to de-energize the message length control relay KMLC. A receive switch S1 (FIG. 14*d*) is now manually actuated to its ON position, this switch being of the toggle type and remaining in the ON or OFF position to which it is manually set. A receive transmission relay KRT (FIG. 14*d*) is thereupon energized through the now closed contacts 23 and 24 of the relay KLP, the normally closed contacts 23 and 24 of the relay KMLC, the now closed contacts 1 and 2 of the switch S1, and the now closed contacts 5 and 6 of the tape feed switch S3. The relay KRT remains energized through its contacts 9 and 10 and either the now closed contacts 25 and 26 of the relay KSI or the contacts 11 and 12 of the relay KMLC when the latter is energized once more. A line connecting relay KLC (FIG. 14*c*) is now energized through normally closed contacts 1 and 2 of a relay KRO, normally closed contacts 24 and 25 of a relay KET, normally closed contacts 1 and 2 of a relay KTS, normally closed contacts 3 and 4 of a time delay relay KTD, normally closed contacts 21 and 22 of a relay KPE, and now closed contacts 28 and 29 of the relay KRT. As shown in FIG. 14*b* the contacts 4–9 and 21–30 of the line connecting relay KLC complete electrical circuits between the punch magnets LP1–LP8 and individual ones of the conductors JLA–JLF, and JLH–JLJ which comprise the common data communication channel extending to all data transmitters of the system.

Positive energization is thereupon applied to the transmission line conductor JLL (FIG. 14*a*) as required, for reasons previously explained, to enable each data transmitter of the system to be placed into operation. This energizing circuit includes normally closed contacts 5 and 6 of the relay KMLC, the now closed "AX" contacts 1 and 2 of the relay KLC, the now closed contacts 4 and 5 of the receive switch S1, and the now closed contacts 28 and 29 of the relay KRT. Energization of the line conductor JLL as just described effects concurrent energization of a stop indicator relay KSI (FIG. 14*d*) through a diode rectifier device CR16. This relay has numerous contacts which complete and interrupt energizing hold circuits for numerous other relays included in the receiver as will later be explained.

It will be recalled that the first code of each data transmission is a transaction code, typical of which may be codes 2–4–5, 2–4–7, 2–4–6, 1–3–4–5–6, 1–3–4–6–7, 1–3–4–5–7 and 2–4–5–6–7 to cite these codes by way of example. It will also be recalled that a badge reader code 1–3–4 is transmitted as the first code of a badge transmitter operation, and that is 1–2–3–4–5 code signifies an attendance mode time transmission. These transaction and time codes when received energize the punch magnets LP1–LP7 for recording by the tape punch unit, and also effect energization of transaction code storage relays KC2, KC6 and KC7 shown in FIG. 14*f*. Specifically, the code bit No. 2, code bit No. 6 and code bit No. 7 of the transaction and time codes effect energization of the relays KC2, KC6 and KC7 from the individual energizing circuits of the respective punch magnets LP2, LP6 and LP7 through the respective normally closed contacts 3 and 4 of each of these relays and through normally closed contacts 1–4 and contacts 21 and 22 of the relay KMLC as shown, the energizing circuit of the relay KC2 additionally including the now closed contacts 7 and 8 of the relay KRT and the energizing circuit of the relay KC7 additionally including the normally closed contacts 21 and 22 of the relay KE. These relays are maintained energized through the now closed "AX" contacts 1 and 2 of each from the punch cam actuated contacts SPCC–10, this energizing circuit including the normally closed contacts 4 and 5 of the relay KET, a diode rectifier CR21 (FIG. 14*c*) and the contacts 1 and 3 of the control relay KCR which is energized by the received transaction code. This hold energizing circuit is interrupted at 15° of the punch cycle when the cam actuated contacts SPCC–10 open, but is then continued from 15° to 185° of the punch cycle when the cam actuated contacts SPCC–1 (FIG. 14*g*) close and continue energization through the now closed contacts 28 and 29 of the relay KRT. At 30° of the punch cycle the punch cam actuated contacts SPCC–9 (FIG. 14*c*) close to energize the relay KMLC through the now closed contacts 30 and 31 of the relay KRT, and thereafter the hold energizing circuit of the transaction code storage relays KC2, KC6 and KC7 is continued through the now closed contacts 9 and 10 of the relay KMLC and the now closed contacts 28 and 29 of the relay KRT. Also in this punch cycle a delay relay KRD is energized through the now closed contacts 2 and 3 of the relay KSI, the normally closed contacts 4 and 5 of a relay KET, and a diode rectifier device CR21 from the energizing circuit of the punch clutch magnet LPC.

The hold energizing circuit last mentioned allows the punch cam actuated contacts SPCC–7 (FIG. 14*h*), upon closing of these contacts at 100° of the punch cycle, to energize a message length count relay KML–0 through normally closed contacts 1 and 2 of a message length count relay KML–3, normally closed contacts 4 and 5 of a message length count relay KML–2, and normally closed contacts 4 and 5 of a message length count relay KML–1. Now when the punch cam actuated contacts SPCC–6 (FIG. 14*h*) close at 249° of the punch cycle, the message length count relay KML–1 is energized in series with the relay KML–0 and through the now closed contacts 2 and 3 of the message length count relay KML–0. This registers a count of one in these message length count relays corresponding to the transaction code which was received and recorded during this punch cycle.

The energization of the message length relay KMLC, effected in the manner just explained, opens its contacts 5 and 6 to remove the direct positive energization of the transmission line conductor JLL effected in the manner previously explained, and the relay KSI must now be maintained energized by positive potential applied to the line conductor JLL from the particular data transmitter which presently has access to the common data communication channel and which has just effected transmission of the transaction code. The manner in which the transmitter maintains positive energization on the line JLL was explained above during description of the data transmitters. The previously energized relay KRD is of the slow-to-release type (i.e., its contacts remain in closed contact position for a short interval after the relay is de-energized) and effectively monitors the interval during which the relay KSI remains de-energized in response to an eventual transmitter brief removal of positive energization of the line conductor JLL to signify the end of data transmission as explained above in connection with the description of the data transmitters. If by reason of a transmitter or system malfunction the relay KSI should remain de-energized sufficiently long that the contacts of the relay KRD close, an error procedure is inaugurated as will now be briefly explained. Each de-energization of the relay KSI causes a relay KTS to become energized either through normally closed contacts 21 and 22 of a relay KRO or the closed contacts of a punch cam actuated contact SPCC–2 and the now closed contacts 1 and 2 of the relay KSI from the energizing circuit which extends through the now closed contacts 9 and 10 of the relay KMLC. The concurrent de-energization of the relay KSI and closure of the contact of the delay relay KRD now cause the error relay KE to become energized through the now closed contacts 21 and 22 of the relay KTS, the normally closed contacts 1 and 2 of the relay KRD, a diode rectifier CR17, and the normally closed contacts of the punch cam actuated contacts SPCC–4 energized by the energizing circuit which extends through the now closed contacts 9 and 10 of the relay KMLC. Energization of the relay KE effects the previously described energization of the punch magnets LP1–LP4 and LP7 to punch a cancel code 1–2–3–4–7 and initiates a sequence of relay de-energization, hereinafter described, to place the receiver in readiness to receive a further data transmission. This also removes access of the data transmitter to the common data communication channel in a manner to be explained hereinafter.

After the transaction code of a data transmission is received and recorded as above explained, each subsequent received code is likewise recorded by the punch unit and is counted by the message length counter relays KML–0 through KML–3. It has just been explained that the received transaction code caused energization of the relays KML–0 and KML–1, which are then maintained energized in series by the punch cam actuated contacts SPCC–6. The next received code initiates a cycle of punch operation to effect recording of this code by the punch unit and at 100° of the punch cycle punch cam actuated contacts SPCC–7 (FIG. 14*h*) close to maintain the relay KML–1 energized through its now closed contacts 5 and 6, the normally closed contacts 4 and 5 of the relay KML–2, and the normally closed contacts 1 and 2 of the relay KML–3. The relay KML–0 is now de-energized by the opening of the punch cam actuated contacts SPCC–6 at 110° of the punch cycle and by the now open contacts 4 and 5 of the relay KML–1. When the punch contacts SPCC–6 again close at 249° of the punch cycle, the relay KML–2 is energized in series with the relay KML–1 through the normally closed contacts 1 and 2 of the relay KML–0 and the now closed contacts 2 and 3 of the relay KML–1. This concurrent energization of the relays KML–1 and KML–2 effects storage of a count of two in the message length relays which is consistent with the fact that both a transaction code and a first data code have been recorded by the punch unit. The second received data code effects a further cycle of punch operation for recording of this code, and the punch cam actuated contacts SPCC–7 close during the punch cycle to maintain the relay KML–2 energized and cam actuated contacts SPCC–6 open to de-energize the relay KML–1. Thereafter the punch cam actuated contacts SPCC–6 close to energize the message length count relay KML–3 in series with the relay KML–2 through the normally closed contacts 1 and 2 of the relay KML–0, the normally closed contacts 1 and 2 of the relay KML–1 and the now closed contacts 2 and 3 of the relay KML–2. This concurrent energization of the relays KML–2 and KML–3 records a count of three which is consistent with the recording of a transaction code and two data codes. The fourth data code in similarly initiating a cycle of punch operation causes the punch contacts SPCC–7 to retain the relay KML–3 energized while the opening of cam actuated contacts SPCC–6 de-energizes the relay KML–2, but the relay KML–3 now becomes de-energized upon subsequent opening of the punch cam actuated contacts SPCC–7 thus to leave all of the relays KML–0 through KML–3 de-energized and by their de-energized states effectively to store a count of four. Thus it will be seen that the length of message is determined on a "modulus-four" basis in that the total number of digits in a message (including the transaction code, the body of the message, and the time transmission when used) is divided by four and any remainder is indicated by the energized states of the message length relays KML–0 through KML–3.

When the data transmitter completes its transmission and removes positive energization from the line conductor JLL (FIG. 14*a*), the relay KSI is thereupon deenergized. The contacts 1 and 2 (FIG. 14*e*) of the relay KSI thereupon close to energize the relay KTS in the manner earlier explained, and energization of the relay KTS is thereafter maintained through its now closed contacts 4 and 5 which are connected in parallel with the contacts 1 and 2 of the relay KSI. The relay KLC (FIG. 14*c*) is now de-energized by interruption of its energizing circuit at the now open contacts 1 and 2 of the relay KTS and the contacts 4–9 and 21–30 (FIG. 14*b*) of the relay KLC open to disconnect the common data communication channel conductors JLA–JLF, JLH and JLJ from the punch magnets LP1–LP8. The slow-to-release relay KRD is also de-energized by the now open contacts 2 and 3 of the relay KSI, but the contacts of the relay KRD open only after approximately 25 milliseconds which is a longer interval than the approximately 12 millisecond interval before the data transmitter again applies energization to the line conductor JLL to effect re-energization of the relay KSI through the diode rectifier CR16 (FIG. 14*d*). The relay KSI now remains energized through its now closed contacts 21 and 22 and the now closed contacts 2 and 3 of the relay KTS from the energizing circuit which extends through the normally closed contacts 3 and 4 of the delay relay KTD.

The contacts of the code storage relays shown in FIG. 14*f* become energized at this time through a circuit which includes the normally closed contacts 1 and 2 of the relay KET, a jumper connection between line terminals JLFF and JLHH, the normally closed contacts of punch cam actuated contacts SPCC–3, the now closed contacts 25 and 26 of the relay KTS, the now closed contacts 23 and 24 of the relay KSI, a jumper connection between the line terminal JLY and the line terminal JL*e*, and the now closed contacts 2 and 4 of the relay KCD. According to the particular transaction code stored in the transaction code storage relays KC2, KC6 and KC7, one of the output terminals C1–C8 is energized through the storage relay contacts interconnected as shown. The number of digits transmitted, including the transaction code digit, for each transaction program selected is pre-established, and the terminals C1–C8 are accordingly jumper connected to an appropriate one of the treminals D1–D8 corresponding to the "modulus-four" remainder which should prevail by operation of the message length count relays KML0–KML3 in effecting a count of the number of received digits. If the correct number of digits has been received and counted, the energization applied to the transaction code storage relay contacts shown in FIG. 14*f* will be applied to one of the output terminals C1–C8 and by jumper connection to one of the terminals D1–D8 and will further be applied through now closed ones of the contacts 21–23 of the message length counter relays KML–0 through KML–3 and through the now closed contacts 3 and 4 of a relay KPE and a diode rectifier CR19 to energize a message good relay KG.

The message good relay KG remains energized at this time through either or both of two hold energizing circuits: (1) through the contacts 7 and 8 of the relay KG, the diode rectifier device CR17, and the normally closed contacts of the punch cam actuated contacts SPCC–4 to the energizing circuit which extends through the now closed contacts 9 and 10 of the relay KMLC; and (2) through the original energizing circuit earlier described and which includes contacts of the message length relays KML–0 through KML–3 and contacts of the transaction code storage relays KC2, KC6 and KC7. The energization applied to the relay KG is also applied through a diode receiver CR22 to one energizing winding of the error relay KE, but this relay is reverse energized at this time through the diode rectifier device CR18 (FIG. 14*e*) from the energizing circuit of the FIG. 14*f* contacts of the transaction code storage relays KC2, KC6 and KC7. Thus the error relay KE remains de-energized.

Energization of the relay KG as last described causes the line conductor JLH (FIG. 14*b*) to be positively energized through the now closed contacts 5 and 6 of the relay KG from the energizing circuit which extends through the now closed contacts 9 and 10 of the relay KMLC. At the same time the now closed contacts 24 and 25 of the relay KG energize the punch magnet LP8, to record an "end of good message" 8-code, through the normally closed contacts of the cam actuated contacts SPCC–10. It will be recalled from the previous description of the data transmitters that energization of the line conductor JLH as just described constitutes a signal signifying to the transmitter that the transmitted data has been correctly received, and that this "message received good" signal causes the transmitter to lose access to the common data communication channel and at the same time to remove transmitter positive potential energization from the line conductor JLL (FIG. 14*a*).

The relay KET (FIG. 14*e*) is now energized through the now closed contacts of the punch cam actuated contacts SPCC–5 and the now closed contacts 26 and 27 of the message good relay KG from the energizing circuit which extends through the now closed contacts 9 and 10 of the relay KMLC. The relay KET remains energized through its now closed contacts 5 and 6 from the energizing circuit last mentioned. The contacts 1 and 2 (FIG. 14*c*) of the relay KET open to interrupt the original energizing circuit (extending through the storage relay contacts of FIG. 14*f* and the counter relay contacts of FIG. 14*h*) of the message good relay KG so that this relay becomes fully de-energized when the punch cam actuated contacts SPCC–4 open at 135° of the punch cycle as the "end of good message" code 8 is punched. The message length relay KMLC is also de-energized when the cam actuated contacts SPCC–9 open at 245° of its punch cycle, the hold energizing circuit of the relay KMLC being interrupted by the now open contacts 21 and 22 of the relay KET. The now open contacts 4 and 5 (FIG. 14*e*) of the relay KET interrupt the hold energizing circuit of the transaction code storage relays KC2, KC6 and KC7 and that of the message length count relays KML–0 through KML–3, and the hold energizing circuits of both the relays KRD and the relay KTS. The contacts 2 and 3 (FIG. 14*c*) of the relay KTS thereupon open to de-energize the relay KSI, and the contacts 9 and 10 (FIG. 14*e*) of the relay KMLC open to de-energize the relay KET.

The relay KLC (FIG. 14*c*) is now again energized through the normally closed contacts 1 and 2 of the relay KRO, the normally closed contacts 24 and 25 of the relay KET, the normally closed contacts 1 and 2 of the relay KTS, the normally closed contacts 3 and 4 of the delay relay KTD, the normally closed contacts 21 and 22 of the relay KPE, and the now closed contacts 28 and 29 of the relay KRT. The de-energization of the relay KMLC as last described effects closure of its contacts 5 and 6 once more to apply positive energization to the line conductor JLL (FIG. 14*a*) and to re-energize the relay KSI through a circuit including the diode rectifier device CR16, the now closed "AX" contacts 1 and 2 of the relay KLC, the now closed contacts 4 and 5 of the receive switch S1, and the now closed contacts 28 and 29 of the relay KRT. The receiver is thereupon conditioned to receive a further data transmission.

If the receive switch S1 should be manually actuated to its OFF position while a data transmission is in progress, the receive transmission relay KRT is nevertheless maintained energized to completion of the transmission through the now closed contacts 23 and 24 of the relay KLP, the now closed contacts 9 and 10 of the relay KRT, and either the now closed contacts 11 and 12 of the relay KMLC or the now closed contacts 25 and 26 of the relay KSI.

The foregoing description of the receiver operation assumed that the good relay KG (FIG. 14*g*) became energized through the contacts of the message length counter relays KML–0—KML–3 of FIG. 14*h* and the contacts of the transaction code storage relays KC2, KC6 and KC7 of FIG. 14*f* by reason of the reception of a message having the correct number of data digits. If, however, there should be an incorrect number of digits received at the time the data transmitter briefly removes (for a 12 millisecond interval) energization from the line conductor JLL (FIG. 14*a*) first to de-energize and then to reenergize the relay KSI (FIG. 14*d*), an error indication is provided. Upon re-energization of the relay KSI by the "end of message" signal, the previously described energization applied to the contacts of the transaction storage relays KC2, KC6 and KC7 of FIG. 14*f* is applied through the diode rectifier CR18 to energize one winding of the error relay KE but no energization is applied to the relay KG or the reverse energizing circuit of the relay KE from the contacts of the message length counter relays KML–0—KML–3 shown in FIG. 14*h*. This energizes the error relay KE, and its contacts 7 and 8 (FIG. 14*b*) and 22 and 23 cause the punch unit to record a cancel code 1–2–3–4–7. A relay KEH (FIG. 14*d*) is thereupon energized through the now closed contacts 28 and 29 of the error relay KE, the now closed contacts 22 and 23 of the relay KRD, and the new closed contacts 2 and 3 of a reset switch S2. The contacts 4 and 5 of the relay KEH close to energize a MONITOR (RED) error indicator light (FIG. 14*d*), and the contacts 2 and 3 of the relay KEH now close to maintain the relay energized through the contacts 2 and 3 of the reset switch S2. This indicates a length of message error, and an error signal is transmitted to the data transmitter by removal of positive energization from the line conductor JLP (FIG. 14*a*) by opening of the contacts 1 and 2 of the error relay KE. As previously described in connection with the data transmitters, de-energization of the line conductor JLP causes the data transmitter to lose access to the common data communication channel and to light an error-repeat indicating lamp and energize an error buzzer at the transmitter. The contacts 26 and 27 (FIG. 14*e*) of the error relay KE close to duplicate the relay sequence de-energization previously described as being effected by energization of the relay KG to close its contacts 26 and 27. The receiver thus is restored to a condition in readiness to receive a further data transmission, but there is a difference that no "message good" energization of the line conductor JLH (FIG. 14*b*) takes place due to the length of message error. Manual actuation of the reset switch S2 de-energizes the relay KEH to extinguish the error MONITOR light.

Assume now that during transmission of data to the receiver energization is removed from the line conductor JLL (FIG. 14*a*) for some reason. This de-energizes the relay KSI (FIG. 14*d*) which opens its contacts 2 and 3 to de-energize the relay KRD (FIG. 14*e*). The relay KTS (FIG. 14*e*) is thereupon energized in the manner previously described and the contacts 1 and 2 of the relay KTS de-energize the relay KLC to effect disconnection of the data communication channel conductors JLA–JLF, JLH and JLJ from the punch magnets LP1–LP8. If the relay KSI remains de-energized sufficiently long to permit the delay relay KRD to close its contacts, the error relay KE (FIG. 14*g*) is energized through the now closed contacts 21 and 22 of the relay KTS, the now closed contacts 1 and 2 of the relay KRD, the diode rectifier CR17, and the punch cam actuated contacts SPCC–4 from the energizing circuit which extends through the now closed contacts 9 and 10 of the relay KMLC. A cancel code 1–2–3–4–7 is thereupon recorded and a sequence of relay de-energization thereupon takes place in the manner last described to place the receiver in condition to receive a further transmission. As before, the contacts 1 and 2 (FIG. 14*a*) of the relay KE interrupt energization of the line conductor JLP to transmit an error signal to the data transmitter, and the receiver upon being returned to receiving condition does not transmit a message good signal through the line conductor JLH (FIG. 14*b*) to the transmitter.

The tape punch recorder unit includes a system of parity check contacts 55 (FIG. 14*g*) interconnected as shown in the Blodgett et al. U.S. Patent No. 2,905,298 to provide continuity of an electrical circuit through the contacts upon recording of an information item having erroneous parity. For the data collection system herein described all codes have odd parity, so that electrical continuity is established through the contacts of the parity check contact system 55 should the punch unit record an erroneous even parity code. When this occurs, an electrical relay KPE (FIG. 14*g*) is energized through the parity check contact system 55 and the punch cam actuated contacts SPCC–8 at 125° of the punch cycle from the energizing circuit which extends through the now closed contacts 9 and 10 of the relay KMLC. The relay KPE remains energized through its contacts 1 and 2 "AX" from the energizing circuit last mentioned. The parity check contact system 55 in similar manner energizes the relay KEH (FIG. 14*d*) which remains energized through its now closed contacts 2 and 3 and the normally closed contacts 2 and 3 of the reset switch S2. The now closed contacts 4 and 5 of the relay KEH energize the MONITOR (RED) indicator light to indicate the parity error which has occurred. Upon energization of the relay KPE as just described, its contacts 21 and 22 (FIG. 14*a*) open to remove the positive energization applied to the line conductor JLP, so that the data transmitter is no longer able to impress positive potential energization on the line JLL with consequent de-energization of the relay KSI. Since the relay KPE remains energized so long as the contacts 9 and 10 (FIG. 14*e*) of the relay KMLC are closed, the period of de-energization of the relay KSI is of prolonged duration more than sufficient to allow the contacts of the relay KRD to close after de-energization of the latter by the opening of the contacts 2 and 3 of the relay KSI. The concurrent de-energization of the relays KSI and KRD effects the recording by the punch unit of a 1–2–3–4–7 cancel code and the initiation of a relay de-energization sequence initiated by the error relay KE in the manner last described and by which the receiver is placed in condition to receive a further data transmission.

The time delay relay KTD (FIG. 14*e*) is energized through the contacts 26 and 27 of the relay KMLC each time this relay becomes energized at the outset of a data transmission to the receiver. The time delay relay KTD provides a 10 second delay, and if any operating condition of the system prevails which prevents the completion of a data transmission within this 10 second delay the contacts 3 and 4 of the relay KTD open and its contacts 2 and 3 close to energize the relay KEH and thereby illuminate the MONITOR (RED) error indicator light. The opening of the contacts 3 and 4 of the relay KTD interrupts the positive energization applied to the line conductor JLP with consequent de-energization through the data transmitter of the line JLL to de-energize the relay KSI for a prolonged period. This prolonged de-energization of the relay KSI with resultant concurrent de-energization of the relay KRD effects recording by the punch unit of a cancel code and the initiation of a relay sequence de-energization in the manner previously described to condition the receiver for a further data transmission. The relay KTD is de-energized each time the relay KMLC is de-energized to open its contacts 26 and 27, and this de-energization of the relay KTD quickly resets it again to provide its normal time interval delay measurement upon its next period of energization.

If the supply of tape to the punch unit should become nearly exhausted, low tape contacts SLT (FIG. 14*d*) close to energize the alarm buzzer 53 and to illuminate the error light 54 but without interruption of operation of the receiver. This energizing circuit extends from the buzzer 53 and error light 54 through the now closed contacts 2 and 3 of the relay KLP, the now closed SLT contacts, and the now closed contacts 26 and 27 of the relay KRT.

If the tape supplied to the tape punch unit should break or become exhausted, the tape contacts SPT (FIG. 14*a*) open to interrupt the energizing circuit of the relay KLP. The contacts 23 and 24 of the relay KLP open to de-energize the relay KRT, and the contacts 5 and 6 of the relay KLP open to interrupt the positive energization applied to the line conductor JLP with consequent de-energization through the data transmitter of the line conductor JLL and consequent prolonged de-energization of the relay KSI. The various contacts of the relay KRT open to de-energize all relays which stand energized at this time, thus requiring manual operation of the tape-feed switch S3 to return the receiver to its operative state to receive a further data transmission.

The foregoing description of the receiver-recorder unit assumes that the system includes no time transmitter. Assume, however, that the system operates with a time transmitter but that in doing so neither the manual nor automatic attendance mode of operation of the system is employed.

The operation of the receiver is then the same as that previously described through the second energization of the relay KSI effected when the data transmitter after sending its "end of message" signal re-energizes the line conductor JLL. If at this time the time transmitter is not in a period of time change and otherwise stands in readiness to make a time transmission, a relay KRO (FIG. 14*a*) is energized through a circuit which includes a jumper connection between the line terminals JLS and JL*r*, the normally closed punch cam actuated contacts SPCC–3, the now closed contacts 25 and 26 of the relay KTS, the now closed contacts 23 and 24 of the relay KSI, and a circuit completed through the time transmitter in the manner previously described from the line conductor JLY to the line conductor JL*e* and through the now closed contacts 2 and 4 of the relay KCD. The contacts 5–14 and 25 and 26 of the relay KRO thereupon close to connect the punch magnets LPI–LP6 to individual ones of the time data transmission line conductors JL*h*, JL*j*, JL*k*, JL*m*, JL*n* and JL*p* extending from the time transmitter to the receiver. As previously described in connection with the description of the time transmitter circuit arrangement of FIG. 13, the relay KRO is maintained energized through its now closed contacts 31 and 32, a diode rectifier CR15, and a circuit extending through the time transmitter from the line conductor JLX to the line conductor JL*e* so that the relay KRO remains energized until the serializer contacts SS15 of the time transmitter open upon completion of the time data transmission.

The now closed contacts 29 and 30 (FIG. 14*a*) of the relay KRO and the now closed contacts 23 and 24 of the relay KTS complete a circuit between the line conductors JL*b* and JLZ which, as earlier described in connection with the time transmitter arrangement, energizes the time transmitter serializer clutch magnet to initiate a cycle of serializer operation. The time digit codes transmitted by the time transmitter are recorded by the tape punch unit in the same manner as data received from a data transmitter, and the number of time digits are included in the message length of the data transmission and are counted in the manner previously described by the message length counting relays of FIG. 14*h*. As earlier described in connection with FIG. 13, the time transmitter sends an "end of time message" signal by positive energization applied to the line conductor, JL*c* (FIG. 14*c*), and this energization is applied through the now closed contacts 33 and 34 of the relay KRO and the normally closed contacts 1 and 2 of the relay KET to the FIG. 14*f* contacts of the transaction code storage relays KC2, KC6 and KC7 to effect energization in the manner earlier described of the transmission good relay KG if the length of message (i.e., the number of data digits including the time digits transmitted) corresponds to the length of message specified by the transaction program selected. Otherwise an incorrect message length effects energization of the error relay KE. Energization of the transmission good relay KG or error relay KE causes a recording by the punch unit of a message good code or a cancel code and the initiation of a sequence of relay de-energizations in the manner earlier described to place the receiver in condition to receive a new data transmission. While this is occurring, the time transmitter interrupts the hold energizing circuit extending through the line conductor JLX to de-energize the relay KRO.

When the data collection system uses a time transmitter and is to operate in either the manual or automatic attendance mode, a jumper connection extending between terminals L14 and S14 of FIG. 14*a* is removed and a jumper connection is now made between terminals S14 and S15 so that this circuit is now completed through the normally closed contacts 21 and 22 of a relay KCM. A jumper connection extending between terminals A13 and E13 in FIG. 14*e* is also removed so that this circuit is completed through normally closed contacts 1 and 2 of the relay KCT.

It will be recalled from the previous description of the time transmitter that the data collection system is changed over to the manual or automatic attendance mode of operation upon an occurrence of a time change of the time clock. The time transmitter relay KARC is energized for 13 seconds at this time change, and a time transmitter relay KRR must be energized to complete changeover to the attendance mode of operation. The relay KRR of the time transmitter is directly energized for this purpose, but may be reverse energized temporarily if a circuit is completed between the line conductors JL*d* and JL*f* (FIG. 14*c*) through either of the contacts 7 and 8 of the relay KMLC or the contacts 4 and 5 of the relay KSI of which one or both will be energized if a data transmission is in progress at the time of the attempted change-over of the system to the attendance mode. A relay KTS of the time transmitter is energized, however, and applies positive energization to the line conductor JLT to energize a relay KCT through the normally closed contacts 24 and 25 of the relay KML–0 and the now closed contacts 27 and 28 of the relay KLP. The contacts 1 and 2 (FIG. 14*e*) of the relay KCT open to prevent receiver energization of the relay KSI and receiver energization of the line conductor JLL, which energization it will be recalled is necessary to enable a new data transmitter to gain access to the common data communication channel to the receiver. The opening of the contacts 1 and 2 of the relay KCT does not, however, de-energize the relay KSI while the latter is energized through the line JLL from a data transmitter in process of transmitting data so that this transmission is not interrupted by energization of the relay KCT. Further, the completion of the data transmissions may be accompanied by a receiver request for a time transmission from the time transmitter, and by the recording of the time transmissions followed by normal message length check as previously described.

Now as soon as any in-progress data transmissions are completed, the relay KRR of the time transmitter is energized and energizes a relay KCM (FIG. 14*c*) through a line conductor JL*a* and the now closed contacts 25 and 26 of the relay KLP. The previously energized relay KCT is now maintained energized through its now closed contacts 3 and 4, the normally closed contacts 4 and 5 of the relay KML–0, and the now closed contacts 1 and 2 of the relay KCM. Also the relay KRO (FIG. 14*a*) is energized through a circuit which includes a jumper connection from the line terminals JLS to JL*r*, the now closed contacts 11 and 12 of the relay KRT, and the now closed contacts 5 and 6 of the relay KCT to a line conductor JLV which was energized as soon as the transmitter relay KRR became energized. The contacts 5–14 and 25 and 26 of the relay KRO connect the punch magnets LP1–LP6 to the time data transmission line conductors JL*h*, JL*f*, JL*k*, JL*m*, JL*n*, and JL*p* extending to the time transmitter.

As previously explained in connection with the time transmitter, each time transmission in the attendance mode of operation is preceded by an attendance mode code 1–2–3–4–5 which is recorded and the "2" bit of which is also stored in the transaction code storage relay KC2 of FIG. 14*f*. Each time digit transmitted (including the attendance mode code) is counted by the message length counter relays KML–0—KML–3 of FIG. 14*h*. The counter relay KML–0 is energized in counting the attendance mode code, and its contacts 4 and 5 open to interrupt the hold energizing circuit of the relay KCT which thereupon becomes deenergized since the time transmitter has just previous to this time deenergized the line conductor JLT through which the relay KCT was previously energized. The end of transmission signal is transmitted as a positive energization of the line conductor JL*c*, and this energization is applied through the now closed contacts 33 and 34 of the relay KRO, the normally closed contacts 1 and 2 of the relay KET, the now closed contacts 22 and 23 of the storage relay KC2, normally closed contacts 21 and 22 of the relay KC6, normally closed contacts 24 and 25 of the relay KC7, and now closed contacts 25 and 26 of the relay KCM to the "Attendance Time" terminal P1 jumper wired to an appropriate one of the counter input terminals D1–D8. A correct number of time digits accordingly effects energization of the message good relay KG in the manner previously explained, or an error of time transmission effects energization of the error relay KE. Energization of the latter relays effects a corresponding recording of a transmission good code or a cancel code by the punch unit.

After this initial time recording effected at the time of change-over of the system to the attendance mode, either manual or automatic, the time transmitter relay KAM remains energized throughout the attendance mode period of operation and in turn maintains the relay KCM (FIG. 14*c*) energized through the line conductor JL*a*. Each subsequent time change of the time clock effects energization of the transmitter relays KTS and KRR to effect energization of the receiver relays KCT and KRO for a time transmission recording accomplished in the manner just described. While each such time transmission is in progress, the contacts 1 and 2 (FIG. 14*e*) of the relay KCT again close to effect ultimate receiver energization of the relay KSI and energization of the line conductor JLL at the end of the time transmission so that the system data transmitters may transmit badge data to the receiver for recording. However, a conductor JLU (FIG. 14*c*) is positively energized at this time in a manner presently to be explained, and it will be recalled that the energization of this line effects energization of an attendance relay in each data transmitter to change its operation to one for transmitting badge data information only.

This continuous energization of the line conductor JLU is accomplished by the continuous energization of the relay KCM (FIG. 14*c*) to close its contacts 7 and 8. The relay KCM is maintained energized, as just previously explained, through the now closed contacts 25 and 26 of the relay KLP from the line conductor JL*a*, which in turn is maintained positively energized by the energized state of an attendance mode relay KAM in the time transmitter.

While the system is in the attendance mode of operation, it may be desirable manually to operate the receive switch S1 to its OFF position such as for the purpose of putting a new supply of tape on the tape punch unit. Operation of the switch S1 to its OFF position de-energizes the relays KSI and KRT, and the latter thereupon closes its contacts 3 and 4 (FIG. 14*c*) to energize the relay KCT through the normally closed punch actuated contacts SPCC–11 and the now closed contacts 1 and 2 of the relay KCM. The relay KRO is thereupon energized as soon as the relay KRT becomes once more energized by actuation of the tape feed switch S3 and actuation of the receive switch S1 to its ON position in the manner previously explained and closes its contacts 11 and 12 (FIG. 14*a*). The contacts 29 and 30 (FIG. 14*a*) of the relay KRO thereupon close to cause a time transmission to take place and to be recorded by the punch unit.

The present receiver may, if desired, have a different character of operation than that previously described. In this modified form of operation, the receiver makes a final length of message check upon receiving the "end of message" signal from the data transmitter (a 12 millisecond interruption of energization of the line conductor J11 by the transmitter) without requesting a time transmission from the time transmitter. The operation of the latter is so modified, as previously explained in describing the time transmitter of FIG. 13, that it effects periodic time transmissions without regard to whether the overall system is operation in the normal data transmission mode or in the attendance mode.

This character of receiver operation is selected by removing the jumper connection between the terminals S14 and S15 in FIG. 14*a*, by completing a jumper connection between the conductors JLHH and JLFF of FIG. 14*a*, by completing a jumper connection between the terminals A15 and B15 of FIG. 14*c*, by removing the jumper connection between the terminals Q10 and Q11 and completing a jumper connection between the terminals Q11 and Q12 of FIG. 14*c*, and by removing the jumper connection between the terminals E10 and G12 and completing a jumper connection between the terminals G12 and G14 of FIG. 14*f*. With these modified jumper connections, the brief interruption of energization of the line conductor JLL (FIG. 14*a*) by the transmitter in transmitting its "end of message" signal effects the previously described sequential energization of the relays KTS and KSI. The time transmitter applies continuous energization to the line conductor JLY (FIG. 14*a*), and this energization is now applied through the now closed contacts 23 and 24 of the relay KSI, the now closed contacts 25 and 26 of the relay KTS, the normally closed contacts of the punch cam actuated contacts SPCC–3, the jumper connection between the conductors JLHH and JLFF, and the normally closed contacts 1 and 2 of the relay KET to the contacts of the transaction code storage relays KC2, KC6 and KC7 shown in FIG. 14*f*. This effects check of the message length, and either the message good relay KG or the error relay KE is thereupon energized to effect recording of a message good code or a cancel code and the initiation of a relay sequence to place the receiver in condition for reception of a further data transmission as previously described. It will be noted in this respect that the length of message check is not preceded by a time transmission requested by the receiver in response to the data transmitter's "end of message" signal.

The time transmitter now makes periodic time transmissions in a manner similar to that previously described in connection with the periodic time transmissions during the attendance mode of system operation. In this, the time transmitter upon each time change energizes the relay KCT (FIG. 14*c*) and the relay KRO (FIG. 14*a*) but without energization of the relay KCM (FIG. 14*c*). Each time transmission is preceded by an attendance time code 1–2–3–4–5 of which the "2" bit of the code is stored in the code storage relay KC2 (FIG. 14*f*), and each time transmission is terminated by an "end" signal appearing as a positive energization of the line conductor JL*c* (FIG. 14*c*). The latter energization is applied through the now closed contacts 33 and 34 of the relay KRO, the jumper connections between the terminals Q11 and Q12, the normally closed contacts 7 and 8 of the relay KET, the now closed contacts 7 and 8 of the code storage relay KC2, and the jumper connection between the terminals G12 and G14 to the "attendance time" terminal P1 which is jumper connected to an appropriate one of the counter input terminals D1–D8. The energization applied to the terminal G14 of FIG. 14*f* is also applied through a diode rectifier device CR23 to one energizing circuit of the error relay KE, and accordingly either the latter relay or the message good relay KG is energized in accordance with the length of message check effected by the counter relays KML–0—KML–3 of FIG. 14*h*. As before, the relay KCT is de-energized when the counter relay KML–0 in initiating a count operation opens its contacts 4 and 5 to interrupt the hold energizing circuit of the relay KCT.

The electrical circuit arrangement of a modified form of badge transmitter is shown in FIGS. 15*a* and 15*b* which are to be considered, as a complete transmitter unit, in conjunction with FIGS. 12*a* and 12*b* arranged as in FIG. 15. This badge transmitter is similar in arrangement and mode of operation to that previously described in connection with FIG. 12 except that the present transmitter not only transmits badge data but is responsive to a "transmission good" or a "transmission error" signal from the receiver before relinquishing access to the common data communication channel. As in connection with the FIG. 12 transmitter, the present transmitter utilizes a badge reader of the type disclosed in the aforementioned Blodgett application Serial No. 249,252.

In similar manner to that previously described in connection with the FIG. 12 badge transmitter, the operation of the present transmitter is initiated by manual insertion of a badge into the badge reader to transfer the lock-in plunger actuated switch S3 and to transfer the badge-in actuated switch S6 and thereby energize the badge reader clutch magnet LRI through the now closed contacts 4 and 5 of the badge-in switch S6, the now closed contacts 4 and 5 of the plunger switch S3, normally closed contacts 3 and 4 of a relay KT, normally closed contacts 1 and 2 of the relay KBR, and normally closed contacts 1 and 2 of two serializer cam actuated contacts SSCC15 and SSCC16 (both of which have their contacts closed in the 0° cyclic position of the serializer). The reader thereupon initiates a cycle of reader operation, and during this cycle the badge read relay KBR is energized through the reader cam actuated contacts SRCC1 and the serializer cam actuated contacts SSCC15 and SSCC16. The relay KBR is maintained energized through its now closed contacts 2 and 3 and the serializer cam actuated contacts last mentioned. The contacts 26 and 27 of the badge read relay KBR now close to energize the relay KLO as soon as positive potential is applied to the system interlock line conductor JLR. Upon energization of the relay KLO, this relay is maintained energized through normally closed contacts 21 and 22 of a transmission error relay KTE, the now closed contacts 1 and 2 "AX" of the relay KLO, and normally closed contacts 21 and 22 of an end of message relay KEM. The relay KLO contacts 3 and 4 interrupt energization of the system interlock conductor JLT, from the interlock conductor JLR, and the contacts 21 and 22 of the relay KLO interrupt the electrical continuity between the interlock line conductors JLM and JLL. The contacts 22 and 23 of the relay KLO now close to apply energization from the line conductor JLL (energized by the receiver-recorder unit to signify its readiness to receive a data transmission) through contacts 1 and 2 of serializer cam actuated contacts SSCC13 and parallel connected contacts 1 and 2 of serializer cam actuated contacts SSCC18 to energize the relay KTC. The relay KTC is maintained energized through its now closed contacts 1 and 2 and the normally closed contacts 3 and 4 of the end message relay KEM from the receiver energized line conductor JLP. The contacts 3 and 4 of the relay KTC directly energize a transmit relay KT.

The badge data transmission is initiated by energization of the serializer clutch LRO through contacts 3 and 4 of serializer cam actuated contacts SSCC16 (which are closed from 349° of one serializer cycle to approximately 8° of the succeeding serializer cycle and are also closed between 169° and approximately 188° of each serializer cycle), now closed contacts 7 and 8 of the relay KBR, now closed contacts 25 and 26 of the relay KT, now closed contacts 1 and 2 "AX" of the relay KLO, and normally closed contacts 21 and 22 of the relay KEM. As previously explained, the serializer clutch actuated drive shaft requires two complete revolutions during each serializer cycle and accordingly the serializer clutch magnet LRO is energized through the 180° cyclic point of the serializer by closure of the contacts of the serializer cam actuated contacts SSCC16 over the serializer cyclic range previously mentioned and by the contacts 3 and 4 of the serializer cam actuated contacts SSCC15 which are closed throughout the serializer cycle except from approximately 2° to approximately 14.5° thereof and thus are closed at the 180° point of the serializer cycle. The contacts 1 and 2 of the serializer cam actuated contacts SSCC15 open at approximately 2° of the serializer cycle to interrupt the hold energizing circuit of the badge read relay KBR which thereupon becomes de-energized.

The serializer cam actuated contacts SSCC2–SSCC13 close successively to transmit successive digits of the badge data in the same manner as previously explained more fully in connection with the FIG. 12 badge reader. If while this data transmission is in progress the receiver should remove positive energization from the line conductor JLP to signify an error in the received data, the relay KTC is de-energized and in turn de-energizes the relay KT. The contacts 23 and 24 of the relay KT thereupon close to energize a transmission error relay KTE through the now closed contacts 4 and 5 of the relay KBR, the now closed contacts 1 and 2 "AX" of the relay KLO, and the normally closed contacts 21 and 22 of the end message relay KEM. The relay KTE is maintained energized through its now closed contacts 4 and 5, and the now closed contacts 2 and 3 of the relay KTE illuminate a transmission error lamp. The transmission error relay KTE contacts 21 and 22 interrupt the hold energizing circuit for the lock-out relay KLO which thereupon becomes de-energized. The contacts 21–23 of the relay KLO transfer to energize the inter-lock conductor JLM from the inter-lock conductor JLL, and the contacts 3 and 4 of the relay KLO close to energize the inter-lock line conductor JLT from the inter-lock line conductor JLR thus to complete the relinquishment by the badge transmitter of the data transmission channel. The transmission error relay KTE must be de-energized by manual actuation of the power switch (FIG. 15*a*) to its OFF position, which is preferably a supervisory operation effected by placing the power switch in a locked compartment under supervisory control.

If the data transmission continues to completion without receipt of an error signal from the receiver-recorder unit, the contacts 1 and 2 of the cam actuated contacts SSCC13 and SSCC18 operate in the manner previously described in connection with FIG. 12 to transmit an "end of message" signal to the receiver-recorder unit. The receiver acknowledges reception of an error free message by positive energization of the line conductor JLH which, through the now closed contacts 29 and 30 of the relay KT, energizes the end message relay KEM. The latter relay is maintained energized through its now closed contacts 1 and 2 "AX". The contacts 3 and 4 of the relay KEM open to de-energize the relay KTC, which thereupon de-energizes the relay KT, and the contacts 21 and 22 of the relay KEM de-energize the lock-out relay KLO. The relay KEM itself is de-energized at the termination of the "message good" signal from the receiver-recorder unit.

It will be apparent from the foregoing description of the invention that a data collection system embodying the invention readily enables the transmission and collection of data rapidly and with extreme accuracy even though such data are manually supplied by personnel having little or no training or aptitude for clerical functions or procedures. The data collection system of the invention has the further advantage that there are such inherent safety checks and controls as effectively to eliminate all significant operator error notwithstanding that operation of the system is accomplished manually by unskilled personnel. The data collection system of the invention further is characterized by unusual versatility and flexibility in system format and application, and accordingly is one suitable for use in numerous types of business enterprise requiring different and often diverse system configurations for optimum effectiveness in the desired collection of data information. In this, the system permits various character of data to originate from time to time at any given data source yet to be readily supplied for collection at a central location with dispatch, there being immediate local control over such required changes of system operation as to maintain system compatability for the prevailing character or change of character of the originating data at the particular locality.

While a specific form of invention has been described for purposes of illustration, it is contemplated that numerous changes may be made without departing from the spirit of the invention.

We claim:

1. A data receiver comprising: means for receiving successive data information items transmitted by a data information source, a data-information-item storage means, control means responsive to reception of the first information item in each new message transmission and the translation of said first item to storage in said storage means for isolating said storage means from further received data, and means controlled by said control means and responsive to the stored information item in said storage means and to termination of each message transmission for providing an indication of accuracy of message reception.

2. A data receiver comprising: means for receiving and recording successive data information items transmitted by a data information source, a data-information-item storage means, control means responsive to the first information item received in each new message transmission for translating said first item to storage in said storage means, and means controlled by said control means and responsive to said stored information item and to termination of each message transmission for providing an indication of accuracy of message reception.

3. A data receiver comprising: means for receiving successive data information items transmitted by a data information source, a data-information-item storage means, control means responsive to reception of the first information item in each new message transmission and the translation of said first item to storage in said storage means for isolating said storage means from further received data, and means controlled by said control means and responsive to the stored information item in said storage means and to termination of each message transmission for selectively providing one of two indications of which one indicates error in reception and the other indicates error-free message reception.

4. A data receiver comprising: means for receiving and recording successive data information items transmitted by a data information source, a data-information-item storage means, control means responsive to reception of the first information item in each new message transmission and the translation of said first item to storage in said storage means for isolating said storage means from further received data, and means controlled by said control means and responsive to the stored information item in said storage means and to termination of each message transmission for effecting recording by said receiving means of an information item indicating the accuracy of message reception.

5. A data receiver comprising: means for receiving and recording successive data information items transmitted by a data information source, a data-information-item storage means, control means responsive to reception of the first information item in each new message transmission and the translation of said first item to storage in said storage means for isolating said storage means from further received data, and means controlled by said control means and responsive to the stored information item in said storage means and to termination of each message transmission for generating and recording an information item indicating the accuracy of message reception.

6. A data receiver comprising: means for receiving and recording successive data information items transmitted by a data information source, a data-information-item storage means, control means responsive to reception of the first information item in each new message transmission and the translation of said first item to storage in said storage means for isolating said storage means from further received data, means controlled by said control means and responsive to the stored information item in said storage means and to termination of each message transmission for generating and recording a terminal information item indicating the accuracy of message reception, and means responsive to recording of said terminal information item for conditioning all of said means for reception and recording of a further message transmission.

7. A data receiver comprising: means for receiving and recording successive data information items transmitted by a data information source, a data-information-item storage means, control means responsive to reception of the first information item in each new message transmission and the translation of said first item to storage in said storage means for isolating said storage means from further received data, and means controlled by said control means and responsive to the stored information item in said storage means for terminating each message recording with a terminal information item indicating the accuracy of message reception.

8. A data receiver comprising: means for receiving and recording successive data information items transmitted by a data information source, a data-information-item storage means, control means responsive to reception of the first information item in each new message transmission and the translation of said first item to storage in said storage means for isolating said storage means from further received data, a first indicating means operative to generate an erroneous-reception terminal information item, a second indicating means operative to generate an error-free-reception terminal information item, and means controlled by said control means and responsive to the stored information in said storage means and to termination of each message transmission for operating one of said first and second indicating means to generate and record one of said terminal information items according to the accuracy of message reception.

9. A data receiver comprising means for receiving and recording successive data information items transmitted by a data information source, a data-information item storage means, control means responsive to reception of the first information item in each new message transmission and the translation of said first item to storage in said storage means for isolating said storage means from further received data, a first indicating means operative to generate an erroneous-reception terminal information item, a second indicating means operative to generate an error-free-reception terminal information item, means responsive to a preselected type of data information error occurring during message transmission for operating said first indicating means to interrupt reception and recording of data information and to generate and record said erroneous-reception information item, and means conrolled by said control means and responsive to the stored information in said storage means and to completion of each message reception and recording for operating one of said first and second indicating means to generate and record one of said terminal information items according to the accuracy of complete message reception.

10. A data receiver comprising: means for receiving and recording successive data information items transmitted by a data information source and represented by individual codes having a preselected type of code parity, a data-information-item storage means, control means responsive to reception of the first information item in each new message transmission and the translation of said first item to storage in said storage means for isolating said storage means from further received data, a first indicating means operative to generate an erroneous-reception terminal information item, a second indicating means operative to generate an error-free reception terminal information item, means responsive to recording of a data information item in a code form deviating from said preselected type of code parity for operating said first indicating means to interrupt reception and recording of data information and to generate and record said erroneous-reception information item, and means controlled by said control means and responsive to the stored information in said storage means and to completion of each message reception and recording for operating one of said first and second means to generate and record one of said terminal information items according to the accuracy of complete message reception.

11. A data receiver comprising: means for receiving and recording successive data information items transmitted by a data information source and represented by individual codes having a preselected type of code parity, a data-information-item storage means, control means responsive to reception of an initial length-of-message information item in each new message transmission and the translation of said initial item to storage in said storage means for isolating said storage means from further received data, a first indicating means operative to generate an erroneous-reception terminal information item, a second indicating means operative to generate an error-free reception terminal information item, means responsive to recording of a data item in a code form deviating from said pre-selected type of code parity for operating said first indicating means to interrupt reception and recording of data information and to generate and record said erroneous-reception information item, and means controlled by said control means upon completion of each message transmission and responsive to the stored length-of-message information in said storage means for operating said first indicating means upon length-of-message error and to operate said second indicating means upon freedom from length-of-message error to generate and record one of said terminal information items.

12. A data receiver comprising: means for receiving successive data information items transmitted by a data information source, a data-information-item storage means, control means responsive to reception of the first data information item in each new message transmission and the translation of said first item to storage in said storage means for isolating said storage means from further received data, error means controlled by said control means and operative during each interval of message reception for interrupting message reception and recording upon the occurrence of a preselected type of reception error and for recording an error indicative terminal information item, and means controlled by said control means upon completion of message transmission uninterrupted by said error means and responsive to the stored information item in said storage means for terminating each message recording with a terminal information item indicating the accuracy of message reception.

13. [A data receiver comprising: means for receiving successive data information items transmitted by a data information source, a data-information-item storage means, control means responsive to reception of the first information item in each new message transmission and the translation of said first item to storage in said storage means for isolating said storage means from further received data, error means controlled by said control means and operative during each interval of message reception for interrupting message reception and recording upon the occurrence of a preselected type of reception error and for recording an error indicative terminal information item, means controlled by said control means upon completion of message transmission uninterrupted by said error means and responsive to the stored information item in said storage means for terminating each message recording with a terminal information item indicating the accuracy of message reception, and means responsive to recording of said terminal information item for conditioning all of said means for reception and recording of a further message transmission.

14. A data receiver comprising: means for receiving and recording successive data information items transmitted by a data information source, a data-information-item storage means, control means responsive to reception of the first information item in each new message transmission and the translation of said first item to storage in said storage means for isolating said storage means from further received data, a first indicating means operative to generate an erroneous-reception terminal information item, a second indicating means operative to generate an error-free-reception terminal information item, means controlled by said control means and responsive to the stored information in said storage means and to termination of each message transmission for operating one of said first and second indicating means to generate and record one of said terminal information items according to the accuracy of message reception, and means responsive to recording of said terminal information item for clearing said storage means of information and for otherwise conditioning all of said means for reception and recording of a further message transmission.

15. A data receiver comprising: means for receiving and recording successive data information items of a message transmitted by a data information source, operational initiating means responsive to the placing of said receiving means into operation for a prolonged period of message reception for automatically recording at least one information item indicating that any immediately preceding recorded message should be cancelled as an invalid message, a data-information-item storage means, control means conditioned by said operational initiating means and responsive to the first information item received in each new message transmission for translating said first item to storage in said storage means, and means controlled by said control means and responsive to said stored information item and to termination of each message transmission for providing an indication of accuracy of message reception.

16. A data receiver comprising: means for receiving and recording successive data information items transmitted by a data information source, manual means for placing said receiving means into operation for a prolonged period of message reception, operational initiating means responsive to operation of said manual means for immediately and automatically generating and recording a message-cancel information item, a data-information-item storage means, control means conditioned for operation by said operational initiating means and thereafter responsive to the first information item received in each new message transmission for translating said first item to storage in said storage means, and means controlled by said control means and responsive to said stored information item and to termination of each message transmission for providing an indication of accuracy of message reception.

17. A data receiver comprising: means for receiving and recording successive data information items transmitted by a data information source, operational initiating means responsive each time to the placing of said receiving means into operation for a period of time for immediately and automatically generating and recording a message-cancel information item, a data-information-item storage means, control means conditioned for operation by said operational initiating means and thereafter responsive to the first information item received in each new message transmission for translating said first item to storage in said storage means, means controlled by said control means and responsive to said stored information item and to termination of each message transmission for providing an indication of accuracy of message reception, and means responsive to termination of each period of operation of said receiving means for delaying such termination of the receiver means operation until completion of reception and recording of each message in progress of transmission.

No references cited.

ROBERT C. BAILEY, *Primary Examiner.*

R. B. ZACHIE, *Assistant Examiner.*